US012776091B2

(12) United States Patent
Øygard et al.

(10) Patent No.: US 12,776,091 B2
(45) Date of Patent: Oct. 27, 2026

(54) RENDERING OF PRIMITIVES WITH PRE-PASS AND FALLBACK OPERATIONS

(71) Applicant: Arm Limited, Cambridge (GB)

(72) Inventors: Tord Kvestad Øygard, Kirkenes (NO); Wing-Tsi Henry Wong, Lund (SE); Ole Magnus Ruud, Oslo (NO); Per Kristian Kjøll, Trondheim (NO)

(73) Assignee: Arm Limited, Cambridge (GB)

( * ) Notice: Subject to any disclaimer, the term of this patent is extended or adjusted under 35 U.S.C. 154(b) by 161 days.

(21) Appl. No.: 18/509,439

(22) Filed: Nov. 15, 2023

(65) Prior Publication Data

US 2024/0169647 A1 May 23, 2024

Related U.S. Application Data

(63) Continuation-in-part of application No. 17/989,548, filed on Nov. 17, 2022, now Pat. No. 12,266,052, and (Continued)

(30) Foreign Application Priority Data

Nov. 17, 2022 (GB) ...................................... 2217219
Nov. 17, 2022 (GB) ...................................... 2217223

(Continued)

(51) Int. Cl.
*G06T 15/00* (2011.01)
*G06T 11/40* (2006.01)

(52) U.S. Cl.
CPC ............ *G06T 15/005* (2013.01); *G06T 11/40* (2013.01)

(58) Field of Classification Search
CPC .................................................... G06T 15/005
See application file for complete search history.

(56) References Cited

U.S. PATENT DOCUMENTS 5,870,097 A 2/1999 Snyder
5,977,977 A * 11/1999 Kajiya .................... G06T 11/10 345/418

(Continued)

FOREIGN PATENT DOCUMENTS

WO 2018052592 A1 3/2018

OTHER PUBLICATIONS

Non-Final Office Action dated Aug. 2, 2024, U.S. Appl. No. 17/989,548, 37 pages.

(Continued)

*Primary Examiner* — Phong X Nguyen
(74) *Attorney, Agent, or Firm* — Pearl Cohen LLP

(57) ABSTRACT

When performing tile-based rendering a first, pre-pass operation in which primitives in a sequence of primitives for a tile are processed to determine visibility information for the sequence of primitives, the visibility information being usable to determine whether or not fragments for a primitive in the sequence of primitives should subsequently be processed further for the render output, is performed. Thereafter a second, main pass operation is performed in which the further processing of fragments for primitives that were processed during the first, pre-pass operation is controlled based on the determined visibility information for the sequence of primitives, such that for fragments for which the visibility information indicates that the fragments should not be processed further for the render output some or all of the processing during the second, main pass is omitted. A data structure is also built to allow entire primitives to be culled.

15 Claims, 73 Drawing Sheets

Related U.S. Application Data a continuation-in-part of application No. 17/989,671, filed on Nov. 17, 2022, now Pat. No. 12,322,023.

(30) Foreign Application Priority Data

| | | |
|---|---|---|
| Nov. 17, 2022 | (GB) | 2217236 |
| Nov. 17, 2022 | (GB) | 2217238 |
| Nov. 17, 2022 | (GB) | 2217239 |
| Nov. 17, 2022 | (GB) | 2217243 |
| Nov. 17, 2022 | (GB) | 2217245 |
| Nov. 17, 2022 | (GB) | 2217246 |
| Nov. 17, 2022 | (GB) | 2217247 |
| Nov. 17, 2022 | (GB) | 2217253 |

(56) References Cited

U.S. PATENT DOCUMENTS 6,092,097 A 7/2000 Suzuoka
6,246,415 B1 6/2001 Grossman et al.
6,259,461 B1 * 7/2001 Brown .................... G06T 15/40 345/506
6,480,205 B1 11/2002 Greene et al.
6,535,209 B1 3/2003 Abdalla et al.
7,023,437 B1 4/2006 Voorhies
7,375,727 B1 5/2008 Greene et al.
8,325,184 B2 12/2012 Jiao et al.
8,698,820 B2 4/2014 Cox et al.
9,619,937 B2 * 4/2017 Persson .................... G06T 1/20
9,626,795 B2 4/2017 Sathe
9,767,595 B2 9/2017 Nystad et al.
10,074,210 B1 9/2018 Spencer et al.
10,096,147 B2 10/2018 Goel et al.
11,030,783 B1 6/2021 Engh-Halstvedt et al.
11,216,993 B2 1/2022 Chalfin
11,972,518 B2 4/2024 Tuomi
12,154,224 B2 11/2024 Achrenius et al.
2002/0196252 A1 12/2002 Liao et al.
2007/0257905 A1 11/2007 French et al.
2013/0286009 A1 10/2013 Xu
2014/0071150 A1 3/2014 Fishwick et al.
2014/0168220 A1 6/2014 Nystad
2014/0218390 A1 8/2014 Rouet
2014/0259016 A1 9/2014 Lottes
2014/0267256 A1 * 9/2014 Heggelund ............. G06T 15/40 345/421
2014/0267258 A1 9/2014 Yang
2014/0267259 A1 9/2014 Frascati
2014/0354640 A1 12/2014 Nystad
2014/0354661 A1 12/2014 Balci et al.
2014/0354670 A1 12/2014 Heggelund
2015/0002508 A1 * 1/2015 Tatarinov .............. G06T 15/005 345/420
2015/0058859 A1 2/2015 Janssen
2015/0062154 A1 3/2015 Ellis et al.
2015/0170328 A1 6/2015 Redshaw
2015/0170407 A1 6/2015 Redshaw
2015/0325037 A1 * 11/2015 Lentz ........................ G06T 1/20 345/419
2016/0005140 A1 1/2016 Engh-Halstvedt et al.
2016/0035128 A1 2/2016 Zhao
2016/0035129 A1 2/2016 Bolz et al.
2016/0086299 A1 * 3/2016 Sharma ..................... G06T 1/20 345/422
2016/0098856 A1 4/2016 Broadhurst et al.
2016/0125649 A1 * 5/2016 Jeong .................... G06T 15/005 345/422
2016/0163087 A1 6/2016 Cho
2016/0217608 A1 7/2016 Howson
2016/0239939 A1 * 8/2016 Kakarlapudi ........... G06T 11/40
2016/0322031 A1 11/2016 Liao et al.
2017/0024927 A1 1/2017 Isomaki
2017/0148203 A1 5/2017 Hakura
2017/0161940 A1 6/2017 Liktor et al.
2017/0178386 A1 6/2017 Redshaw et al.
2017/0262951 A1 9/2017 Smith
2017/0263039 A1 9/2017 Goel
2017/0358109 A1 * 12/2017 Troiano .................... G06T 1/60
2018/0025463 A1 1/2018 Kazakov et al.
2018/0082467 A1 3/2018 Andersson et al.
2018/0082469 A1 3/2018 Andersson
2018/0197323 A1 7/2018 Howson et al.
2018/0268604 A1 9/2018 Story
2018/0349315 A1 12/2018 Heggelund et al.
2019/0005604 A1 1/2019 Acharya
2019/0012829 A1 * 1/2019 Engh-Halstvedt ........ G06T 1/20
2019/0088009 A1 3/2019 Forey et al.
2019/0197760 A1 6/2019 Cho
2019/0206121 A1 7/2019 Jin
2019/0287207 A1 * 9/2019 Wang ...................... G06T 11/40
2019/0311535 A1 10/2019 Lacey
2019/0362533 A1 11/2019 Fuller
2020/0020153 A1 1/2020 Sathe
2020/0098165 A1 * 3/2020 Gruber .................. G06T 15/005
2020/0134894 A1 4/2020 Uhrenholt
2020/0193703 A1 6/2020 Favela
2020/0312020 A1 10/2020 Zhong et al.
2020/0380745 A1 * 12/2020 Bhiravabhatla ......... G06T 11/60
2020/0380777 A1 12/2020 Lacey
2020/0402295 A1 12/2020 Lentz
2020/0402297 A1 12/2020 Brigg et al.
2021/0065437 A1 * 3/2021 Brkic .................... G06T 15/405
2021/0110510 A1 4/2021 Brigg et al.
2021/0248806 A1 * 8/2021 Yang ......................... G06T 1/20
2021/0279936 A1 9/2021 Yang
2021/0279954 A1 9/2021 Yang
2021/0295586 A1 * 9/2021 Lentz .................... G06T 15/005
2021/0383597 A1 12/2021 Voglreiter
2021/0398349 A1 12/2021 Achrenius
2021/0407191 A1 * 12/2021 Yang ....................... G06F 8/443
2022/0020206 A1 1/2022 Redshaw
2022/0028030 A1 * 1/2022 Brigg ........................ G06T 1/60
2022/0036629 A1 2/2022 Tuomi
2022/0092801 A1 3/2022 Achrenius et al.
2022/0101479 A1 3/2022 Alla
2022/0207827 A1 6/2022 Acharya et al.
2022/0237730 A1 7/2022 Brkic
2022/0319091 A1 * 10/2022 Tuomi .................... G06T 11/40
2022/0366524 A1 11/2022 Uhrenholt
2024/0005602 A1 * 1/2024 Kallio ....................... G06T 1/60
2024/0087078 A1 3/2024 Ashkar et al.
2024/0104683 A1 * 3/2024 Nikam ...................... G06T 1/20
2024/0104684 A1 * 3/2024 Bhiravabhatla ........... G06T 1/20
2024/0169639 A1 5/2024 Oygard et al.
2024/0169647 A1 * 5/2024 Øygard ................... G06T 15/40
2024/0412450 A1 * 12/2024 Li ........................... G06T 15/40

OTHER PUBLICATIONS

Non-Final Office Action dated Aug. 14, 2024, U.S. Appl. No. 17/989,671, 37 pages.

Notice of Allowance dated Jul. 15, 2025, U.S. Appl. No. 18/509,679, filed Nov. 15, 2023.

Combined Search and Examination Report under Sections 17 and 18(3) dated Jun. 3, 2024, GB Patent Application No. GB 2317492.3, pp. 1-7.

Combined Search and Examination Report under Sections 17 and 18(3) dated May 24, 2023, GB Patent Application No. GB 2217223.3, pp. 1-6.

Combined Search and Examination Report under Sections 17 and 18(3) dated May 30, 2023, GB Patent Application No. GB 2217253.0, pp. 1-6.

Search Report under Section 17 dated May 19, 2023, GB Patent Application No. GB 2217247.2, pp. 1-4.

Combined Search and Examination Report under Sections 17 and 18(3) dated May 19, 2023, GB Patent Application No. GB 2217238.1, pp. 1-7.

Search Report under Section 17 dated Jun. 19, 2023, GB Patent Application No. GB 2217246.4, pp. 1-4.

Øygard, T.K., et al., "Graphics Processors", U.S. Appl. No. 17/989,548, filed Nov. 17, 2022.

(56) References Cited

OTHER PUBLICATIONS

Øygard, T.K., et al., "Graphics Processors", U.S. Appl. No. 17/989,671, filed Nov. 17, 2022.
Øygard, T.K., et al., "Graphics Processors", U.S. Appl. No. 18/509,432, filed Nov. 15, 2023.
Øygard, T.K., et al., "Graphics Processors", U.S. Appl. No. 18/509,436, filed Nov. 15, 2023.
Øygard, T.K., et al., "Graphics Processors", U.S. Appl. No. 18/509,426, filed Nov. 15, 2023.
Kjøll, P.K., et al., "Graphics Processors", U.S. Appl. No. 18/509,679, filed Nov. 15, 2023.
Ruud, O.M., et al., "Graphics Processors", U.S. Appl. No. 18/509,441, filed Nov. 15, 2023.
Ruud, O.M., et al., "Graphics Processors", U.S. Appl. No. 18/509,448, filed Nov. 15, 2023.
Ruud, O.M., et al., "Graphics Processors", U.S. Appl. No. 18/509,676, filed Nov. 15, 2023.
Ruud, O.M., et al., "Graphics Processors", U.S. Appl. No. 18/509,687, filed Nov. 15, 2023.
PCT International Search Report and Written Opinion, dated Feb. 19, 2024, PCT International Application No. PCT/GB2023/052995, pp. 1-17.
Response to Non-Final Office Action dated Sep. 19, 2024, U.S. Appl. No. 17/989,548, 14 pages.
Response to Non-Final Office Action dated Nov. 14, 2024, U.S. Appl. No. 17/989,671, 16 pages.
Extended European Search Report dated Jul. 5, 2024, European Patent Application No. 23210210.3, pp. 1-10.
Notice of Allowance dated Nov. 22, 2024, U.S. Appl. No. 17/989,548, 25 pages.
Notice of Allowance dated Jan. 23, 2025, U.S. Appl. No. 17/989,671, 30 pages.
Examination Report dated Apr. 1, 2025, GB Patent Application No. GB2217238.1, 4 pages.
Non-final Office Action dated Jul. 21, 2025, U.S. Appl. No. 18/509,432, filed Nov. 15, 2023.
U.S. Appl. No. 19/130,178, filed May 15, 2025.
Non-final Office Action dated Aug. 8, 2025, U.S. Appl. No. 18/509,426, filed Nov. 15, 2023.
Notice of Allowance dated Aug. 25, 2025, U.S. Appl. No. 18/509,679, filed Nov. 15, 2023.
Non-final Office Action dated Aug. 26, 2025, U.S. Appl. No. 18/509,436, filed Nov. 15, 2023.
Response to Office Action dated Sep. 9, 2025, U.S. Appl. No. 18/509,432, filed Nov. 15, 2023.
Non-final Office Action dated Oct. 9, 2025, U.S. Appl. No. 18/509,441, filed Nov. 15, 2023.
Response to Office Action dated Nov. 7, 2025, U.S. Appl. No. 18/509,426, filed Nov. 15, 2023.
Notice of Allowance dated Nov. 24, 2025, U.S. Appl. No. 18/509,432, filed Nov. 15, 2023.
Response to Office Action dated Nov. 25, 2025, U.S. Appl. No. 18/509,436, filed Nov. 15, 2023.
Notice of Allowance dated Jan. 6, 2026, U.S. Appl. No. 18/509,679, filed Nov. 15, 2023.
Non-final Office Action dated Jan. 8, 2026, U.S. Appl. No. 18/509,448, filed Nov. 15, 2023.
Non-final Office Action dated Jan. 16, 2026, U.S. Appl. No. 18/509,676, filed Nov. 15, 2023.
Notice of Allowance dated Jan. 21, 2026, U.S. Appl. No. 18/509,426, filed Nov. 15, 2023.
Notice of Allowance dated Feb. 24, 2026, U.S. Appl. No. 18/509,687, filed Nov. 15, 2023.
Notice of Allowance dated Feb. 27, 2026, U.S. Appl. No. 18/509,436, filed Nov. 15, 2023.
Notice of Allowance dated Mar. 18, 2026, U.S. Appl. No. 18/509,441, filed Nov. 15, 2023.
Notice of Allowance dated Mar. 27, 2026, U.S. Appl. No. 18/509,676, filed Nov. 15, 2023.
Response to Office Action dated May 8, 2026, U.S. Appl. No. 18/509,448, filed Nov. 15, 2023.
Final Office Action dated Jul. 7, 2026, U.S. Appl. No. 18/509,448, filed Nov. 15, 2023.

* cited by examiner

RENDERING OF PRIMITIVES WITH PRE-PASS AND FALLBACK OPERATIONS

BACKGROUND

The technology described herein relates to the processing of computer graphics, and in particular to hidden surface removal in graphics processing.

Many data processing systems include a graphics processor (graphics processing unit (GPU)) as a processing resource that is operable to perform processing tasks for, e.g., applications that are executing on a, e.g., main (e.g. host) processor (CPU) of the data processing system. A graphics processor may thus be caused to perform processing tasks for applications by providing to the graphics processor a stream of commands (instructions) to be executed by the graphics processor. For example, a driver for the graphics processor may prepare a command stream containing commands (instructions) to be performed by the graphics processor, and provide the command stream to the graphics processor, with the graphics processor then performing the commands (the operations indicated by the commands) in the command stream. The graphics processor may further comprise a suitable command stream frontend that acts to parse the driver-generated commands and schedule processing tasks for the various functional units of the graphics processor accordingly.

A graphics processor may thus be provided as a hardware accelerator that is operable to perform graphics processing on demand from a main (e.g. host) processor (CPU). The graphics processor is generally configured for performing graphics processing in a more optimised manner (e.g. compared to using the main (e.g. host) processor (CPU) to perform the processing using general-purpose computations).

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing.

For a given output, e.g. frame to be displayed, to be generated by the graphics processing, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

These processes are typically carried out by testing sets of one, or of more than one, sampling position, and then generating for each set of sampling positions found to include a sampling position that is inside (covered by) the primitive in question (being tested), a discrete graphical entity usually referred to as a "fragment" on which the graphics processing operations (such as rendering) are carried out. Covered sampling positions are thus, in effect, processed as fragments that will be used to render the primitive at the sampling positions in question. The "fragments" are the graphical entities that pass through the rendering process (the rendering pipeline). Each fragment that is generated and processed may, e.g., represent a single sampling position or a set of plural sampling positions, depending upon how the graphics processing system is configured.

A "fragment" is therefore effectively (has associated with it) a set of primitive data as interpolated to a given output space sampling position or points of a primitive. It may also include per-primitive and other state data that is required to shade the primitive at the sampling position (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling positions and the pixels of a display, but more typically there may not be a one-to-one correspondence between sampling positions and display pixels, as downsampling may be carried out on the rendered sample values to generate the output pixel values for displaying the final image. Similarly, where multiple sampling position values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in a primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive lists being used accordingly to identify the primitives to be rendered for each rendering tile when generating the desired render output, e.g. to display the frame.

Thus, the command stream for causing a graphics processor to perform tile-based rendering may comprise a first set of commands to cause the graphics processor to prepare the desired primitives lists and a second set of commands to subsequently cause the graphics processor to render the rendering tiles. These rendering commands may be issued in respect of any desired regions of the render output. For example, in some arrangements, a command may be prepared by the driver for the graphics processor relating to a processing job to render a certain region comprising a group of plural rendering tiles. The command stream frontend of the graphics processor may then break the processing job into respective processing tasks for rendering the individual tiles which are then processed accordingly to perform the rendering. Various arrangements are possible in this regard.

One drawback of current graphics processing systems is that because primitives are processed sequentially, and typically not in perfect front-to-back order, a given sampling position (and hence fragment and pixel) may be shaded multiple times as an output is processed, e.g. for display. This occurs when a first received and rendered primitive is subsequently covered by a later primitive, such that the rendered first primitive is not in fact seen at the pixel(s) (and sampling position(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater). In order to improve graphics processing performance (e.g. in terms of speed and/or bandwidth), and energy efficiency, it is therefore desirable to try to avoid rendering any such invisible fragments.

The problem of "overdraw" could be significantly reduced by sending primitives for rendering in front-to-back order. However, other graphics processing requirements, such as the need for coherent access to resources such as textures, and the need to minimise the number of API calls per frame, generally mandate other ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of hidden surface removal techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.). Hidden surface removal thus concerns the process of identifying which of the geometry within a scene will actually be visible in the final render output to try to avoid unnecessarily processing fragments that have no visible effect.

For example, some form of hidden surface removal may be performed before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, and so on.

These arrangements typically try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal techniques only take account of fragments that have completed their processing (that have already been rendered) at the time the new, e.g., primitive or fragment (the primitive or fragment being "early" tested) is being tested. This is because the relevant test data (such as the Z-buffer) only contains data from fragments that have already been processed.

Another possibility is to attempt to kill threads corresponding to fragments that are found to be obscured by later fragments in-flight, e.g. using a 'forward pixel kill' operation as described in United States Patent Application Publication No. 2019/0088009 (Arm Limited). This approach generally works well in most cases.

However, such arrangements typically use a fixed-size buffer to store 'cullable' fragments which means that if the buffer is full, culling efficiency may be lost. Further, there is only a limited window in which fragments can be culled. This approach may therefore be less suitable for larger, more complex scenes, as there may be fewer opportunities for fragments to be culled.

The Applicants believe therefore that there remains scope for improved techniques for hidden surface removal in graphics processing systems.

BRIEF DESCRIPTION OF DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
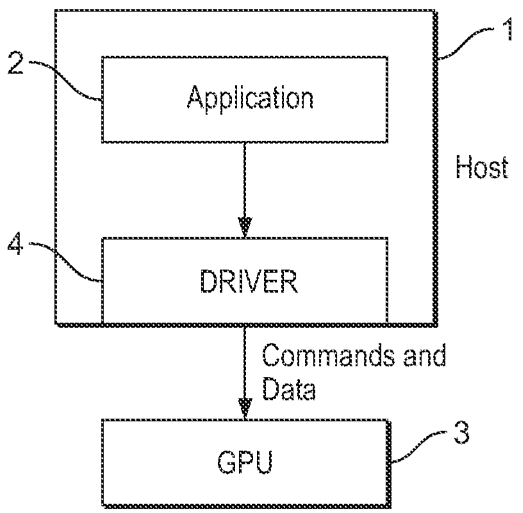
FIG. 1 shows schematically an exemplary graphics processing system.

A first embodiment of the technology described herein comprises a method of operating a graphics processor, the method comprising:

for a sequence of primitives to be rendered for a render output:

performing a first, pre-pass operation in which primitives in the sequence of primitives to be rendered are processed to determine "visibility" information for the sequence of primitives, the visibility information being usable to determine whether or not fragments for primitives in the sequence of primitives should subsequently be processed further for the render output;

generating a "primitive culling" data structure using the visibility information determination, the primitive culling data structure being usable to determine for respective sets of one or more primitives whether the sets of one or more primitives can subsequently be culled in their entirety;

the method further comprising:

thereafter performing a second, main pass operation in which at least some primitives that were processed by the first, pre-pass operation are processed again to determine rendered output data and in which second, main pass operation the processing of primitives that were processed during the first, pre-pass operation is controlled based on the primitive culling data structure.

A second embodiment of the technology described herein comprises a graphics processor that is configured to generate a render output, the graphics processor comprising a rendering circuit that is operable to render sequences of primitives for the render output, wherein the graphics processor is configured to:

for a sequence of primitives to be rendered for a render output:

perform a first, pre-pass operation in which primitives in the sequence of primitives to be rendered are processed to determine "visibility" information for the sequence of primitives, the visibility information being usable to determine whether or not fragments for primitives in the sequence of primitives should subsequently be processed further for the render output;

the graphics processor further comprising a primitive culling data structure building circuit that is configured to:

generate a "primitive culling" data structure using the visibility information determination, the primitive culling data structure being usable to determine for respective sets of one or more primitives whether the sets of one or more primitives can subsequently be culled in their entirety;

the graphics processor configured to:

cause the rendering circuit to:

thereafter perform a second, main pass operation in which at least some primitives that were processed by the first, pre-pass operation are processed again to determine rendered output data for sampling positions associated with the fragments and in which second, main pass operation the processing of primitives that were processed during the first, pre-pass operation is controlled based on the primitive culling data structure.

The technology described herein relates to hidden surface removal. In particular, the technology described herein enables improved hidden surface removal within a sequence of primitives that are to be rendered for a given render output (which sequence of primitives may, e.g., be a sequence of primitives to be rendered for an individual tile in a tile-based rendering system, but could also be any other suitably defined sequence of primitives depending on the desired render output and configuration of the graphics processor in question).

As will be explained further below, the improved hidden surface removal of the technology described herein is achieved by introducing as part of the rendering operations performed for a sequence of primitives an initial, "pre-pass" operation such that the graphics processor when rendering a sequence of primitives is effectively configured to render primitives in the sequence of primitives to be rendered in two separate processing passes.

Thus, when a sequence of primitives is issued for rendering, the graphics processor is caused to initially perform a first, "pre-pass" operation in which the primitives are in an embodiment rasterised into respective sets of fragments (each fragment corresponding to a set of one or more sampling positions within the render output) and the resulting fragments are then processed to determine "visibility" information relating to the fragments. The determined visibility information reflects whether or not a fragment will be visible in the final render output and therefore whether or not the fragment needs to be (and hence should be) processed further for the render output.

In embodiments, as will be explained further below, the visibility information determined during the first, pre-pass operation is then used to control the fragment processing during a subsequent second, "main" pass operation. That is, there is thereafter performed a second, main pass operation in which at least some primitives that were processed by the first, pre-pass operation are processed again by rasterising the primitives into their respective sets of one or more fragments for processing to determine rendered output data for sampling positions associated with the fragments and in which second, main pass operation the further processing of primitives that were processed during the first, pre-pass operation is controlled based on the primitive culling data structure. In particular, for any fragments that are not visible for the final render output (as determined based on the visibility information), and hence that do not need to be processed further, some or all of the processing of such fragments during the second, main pass operation is in an embodiment then avoided. The embodiments may therefore allow improved, e.g., and in an embodiment, sample-perfect, hidden surface removal.

The technology described herein recognises that for any primitives processed during the first, pre-pass operation for which it can be determined that none of its associated fragments needs to be processed further (e.g. since none of the primitive's fragments has any visible effect for any of the respective sampling positions within the final render output), the primitive in its entirety may be culled. In this way it is possible to avoid some or all processing of the primitive during the second, main pass. For example, the primitive processing in the fragment frontend (e.g. the processing up to and including rasterisation) may be significant. Thus, by identifying during the first, pre-pass operation which primitives, if any, do not need to be further processed, it may then be possible to cull at least some such primitives relatively earlier in the second, main pass such that some or all processing of those primitives in the second, main pass can be avoided. For example, and in an embodiment, any such primitives can be culled (in their entirety) at the start of the second, main pass operation, e.g., and in an embodiment, prior to rasterisation, thus in an embodiment avoiding any unnecessary fragment level processing for the primitive.

To facilitate such culling of primitives during the second, main pass operation, the technology described herein generates a "primitive culling" data structure. The primitive culling data structure indicates for respective sets of one or more primitives whether the set of one or more primitives should subsequently be further processed (or, correspondingly, whether the set of one or more primitives does not need to be further processed). As will be explained further below, the primitive culling data structure may be generated as part of the first, pre-pass operation, but it could also be generated after the first, pre-pass operation has completed, so long as it is generated before the corresponding second, main pass operation is started. The primitive culling data structure can thus be (and is) used during the second, main pass operation to identify primitives in the sequence of primitives to be processed by the second, main pass operation that can be culled in their entirety, and such primitives can accordingly then be (and in an embodiment are) effectively removed from the sequence of primitives to be processed by the second, main pass, thus avoiding unnecessary processing of the primitive in its entirety (and hence avoiding processing its associated fragments).

Thus, when processing primitives in a sequence of primitives in the manner of the technology described herein, for a primitive that is being processed by the second, main pass operation, there is provided as part of the second, main pass operation a step of determining using the primitive culling data structure that was generated for the sequence of primitives during the first, pre-pass operation whether (or not) the primitive should be processed further for the render output. If the primitive culling data structure indicates that the primitive can be culled, such that the primitive does not need to be further processed, the primitive can accordingly then be culled at this point, such that some or all further processing of the primitive is avoided. On the other hand if the primitive culling data structure does not indicate that the primitive can be culled (or, correspondingly, indicates that the primitive should be further processed), the primitive is then further processed during the second, main pass (e.g. by rasterising the primitive and rendering the resulting fragments (as necessary), etc., to generate desired rendered output data, as will be described further below).

The primitive culling data structure allows the graphics processor to determine during the second, main pass operation whether or not primitives (in their entirety) should be further processed, and thus allows at least some primitives to be culled (in their entirety) on this basis where it is possible to do so. Thus, in embodiments, the method further comprises: when performing the second, main pass operation: identifying using the primitive culling data structure that a primitive does not need to further processed for the second, main pass operation; and omitting some or all further processing of the identified primitive. The step of using the primitive culling data structure to identify whether a primitive can be culled is in an embodiment therefore performed for all primitives that are to be processed during the second, main pass (or at least all primitives processed during the second, main pass that were also processed during the first, main pass) to try to cull any primitives in their entirety that are, e.g., occluded (and hence can be culled).

The step of using the primitive culling data structure to identify whether a primitive can be culled can be performed at any suitable point during the second, main pass operation but as mentioned above it is in an embodiment performed relatively earlier in, e.g., and in an embodiment, at the start of the second, main pass operation. For instance, the step of using the primitive culling data structure in an embodiment takes place after (e.g. immediately after) a step of determining in the second, main pass operation whether the primitives are compatible with being processed by the pre-pass operation, as will be described further below, but in an embodiment prior to rasterising the primitives into their respective fragments.

For example, by culling a primitive at the start of the second, main pass, prior to rasterisation, it is possible to cull the primitive in its entirety and thereby avoid rasterising the primitive into its respective fragments (and hence also avoid any processing of fragments for the primitive during the second, main pass). By using the primitive culling data structure earlier in the second, main pass to identify potentially 'cullable' primitives, this then allows increased benefits of the primitive culling to be achieved, e.g., and in an embodiment, by facilitating avoiding a greater amount of processing for any primitives for which it can be determined using the primitive culling data structure that the primitive does not need to be processed further. The use of such primitive culling data structure can therefore help optimise the second, main pass by reducing the amount of (unnecessary) processing that is performed during the second, main pass for any primitives for which none of the associated fragments needs to be processed further for the render output.

The ability to cull (entire) primitives in this way may also be particularly beneficial in situations where at least some vertex attribute processing (e.g. varyings shading) is deferred to the rendering stage as in that case the use of the primitive culling data structure can (and in an embodiment does) also at least allow such vertex attribute processing to be avoided during the second, main pass for any primitives for which it can be determined using the primitive culling data structure that the primitive does not need to be processed further.

For example, each primitive in the sequence of primitives is normally defined by a set of vertices (e.g. three vertices in the case of triangular primitive). Typically the set of vertices to be used for a given graphics processing output (e.g. frame for display) will be stored as a set of vertex data defining the vertices (e.g. the relevant attributes for each of the vertices). It can often be the case in graphics processing that one or more vertex attributes may need to be processed (e.g. shaded) to transform the attributes for each vertex into a desired form for the subsequent graphics processing (rendering) operations that will use the defined vertex attributes.

The required vertex attribute processing (e.g. shading) may be performed upfront, e.g. during an initial geometry processing (e.g. tiling) operation to sort the primitives relative to the render output, with the processed (shaded) vertex attributes then being made available for subsequent use by the rendering operations. However, it is often the case in graphics processing that at least some of the processing (shading) of the attributes for the vertices is deferred to the rendering stage, e.g. to the point at which the (shaded) attributes are desired to be used. In that case, the processing (shading) of one or more attributes for the vertices is in an embodiment triggered by the rendering stage, e.g. in the fragment frontend. In such embodiments, the primitive processing operations that are performed during the first, pre-pass operation and also the second, main pass operation thus in an embodiment further comprise a step of processing (shading) one or more vertex attributes.

Thus, in some embodiments, the processing (shading) of (at least some of) the attributes for the vertices is performed during the rendering stage, and in that case the primitive culling data structure is in an embodiment used to identify potentially 'cullable' primitives prior to any step of processing (shading) of the attributes for the vertices for the primitives as part of the second, main pass operation. That is, in embodiments, where one or more vertex attributes are required to be processed as part of the second, main pass operation, the use of a primitive culling data structure as described herein may beneficially allow primitives to be culled in their entirety during the second, main pass in an embodiment before triggering any processing (shading) of the attributes for the vertices. This then avoids having to process (shade) attributes for the vertices at least during the second, main pass for any primitives that are 'cullable' in their entirety.

In contrast, without the ability to cull primitives in their entirety, it may be necessary to perform primitive processing such as rasterisation and processing (shading) of the attributes for the vertices for the primitives twice, e.g. once in the first, pre-pass operation and then again in the second, pre-pass operation, even if none of the resulting fragments for the primitive has any effect in the render output. By avoiding at least the rasterisation of primitives and any processing (shading) of the attributes for the vertices during the second, pre-pass operation, the technology described herein can therefore significantly improve performance (e.g. processing speed) and also reduce energy cost in this situation.

In this respect, it will be appreciated that a benefit of the approach of performing an initial, pre-pass operation as described herein therefore is that because the whole sequence of primitives (e.g. for a tile) is processed up-front by the first, pre-pass to determine the visibility information, the visibility information reflects the full visibility for all of the primitives (and fragments) in the sequence of primitives being processed, and so it is relatively straightforward to also identify during the first, pre-pass operation any primitives for which none of the associated fragments needs to be processed further, and hence to generate the primitive culling data structure of the technology described herein. This therefore means that the primitive culling data structure of the technology described herein can be generated by the first, pre-pass without requiring significant additional complexity.

The technology described herein may therefore provide various benefits compared to other possible approaches.

Subject to the particular requirements of the technology described herein the primitive culling data structure may have any suitable and desired form.

In embodiments, the primitive culling data structure comprises a plurality of entries with each entry capable of representing a respective set of one or more primitives in the sequence of primitives being processed. For example, the primitive culling data structure could in some embodiments comprise a list of primitive identifiers that are to be further processed (or, correspondingly, that are to be culled). In that case, the second, main pass operation may comprise a step of checking whether a primitive identifier for the current primitive is included within such list of primitive identifiers to determine whether or not the primitive should be further processed.

In an embodiment however the primitive culling data structure comprises a bit mask, with each 'entry' comprising a respective bit whose value can be set accordingly to indicate whether or not the primitive(s) represented by that entry should be further processed. For example, in an embodiment, the primitive culling data structure comprises a bit mask with the bit values being set accordingly (e.g. to 'one') if a primitive within the respective set of one or more primitives represented by the bit needs to be processed further for the render output. Thus, when a bit is set to a first value (e.g. to 'one'), this indicates that the corresponding set of one or more primitives represented by the bit should be processed further. In that case, the primitive or primitives represented by the bit cannot therefore be culled. Conversely, when the bit is set to a second value (e.g. to 'zero'), this indicates that none of the primitives in the corresponding set of one or more primitives represented by the bit needs to be processed further, and so the primitive (or primitives) represented by the bit may accordingly each subsequently be culled (during the second, main pass operation).

In general however the primitive culling data structure (entries) may take any suitable and desired form.

The primitive culling data structure (e.g. bit mask) can then be (and in an embodiment is) consumed during the processing of primitives by the second, main pass operation by reading the associated entry (bit) for a primitive that is to be processed and identifying accordingly whether or not the primitive should be processed further (or whether the primitive in its entirety can be culled at that point). Once all of the primitives have been processed by the second, main pass operation the primitive culling data structure for the sequence of primitives can then be (and in an embodiment) is discarded, e.g., and in an embodiment, without writing the primitive culling data structure to external memory.

In general there may be any suitable and desired correspondence between the entries in the primitive culling data structure and primitives in the sequence of primitives.

In a simple example, the primitive culling data structure may store a respective indication of whether or not the primitive should be processed further (or, correspondingly, whether or not the primitive can be culled) for each (individual) primitive in a sequence of primitives being processed. For example, when the primitive culling data structure comprises a bit mask, a respective bit may be used to indicate for each primitive in the sequence of primitives whether or not the primitive should be processed further. Thus, during the second, main pass, the using the primitive culling data structure to determine whether or not a primitive can be culled comprises checking the respective (unique) bit that indicates for the primitive whether or not the primitive should be processed further. This simple example where a respective bit is used to indicate for each (and every) primitive in the sequence of primitives whether or not the primitive should be processed further works well at least for relatively smaller sequences of primitives, or in cases where the length of the sequence of primitives is restricted or guaranteed such that the primitive culling data structure can be ensured to be able to store indications for each primitive in the sequence of primitives.

In this respect however the technology described herein recognises that it may be prohibitive to always store an indication for each primitive in the sequence of primitives, particularly as the graphics processor may have to process sequences of arbitrary length (as the length of a sequence of primitives is not normally restricted by the application). Thus, in order for increasingly larger sequences of primitives to be handled, the primitive culling data structure would correspondingly need to be larger. However, the primitive culling data structure may then be much larger than needed for the majority of cases where a sequence of fewer primitives is to be processed, thus using unnecessary area. This approach is also still not very flexible as it effectively imposes a restriction on the maximum length of a sequence of primitives that can be handled in this way. Alternatively, therefore, some form of dynamic storage allocation for the primitive culling data structure could in embodiments be used but this introduces additional complexity, and for increasingly larger sequences of primitives the primitive culling data structure in that case may be too large to be effectively stored locally to the graphics processor, such that the primitive culling data structure may need to be written to external memory, thus reducing performance and increasing bandwidth requirements (e.g. compared to embodiments in which the primitive culling data structure is sized and configured such that it can be (and in an embodiment is) stored locally, and then discarded after it has been used, without writing to external memory).

Thus, in particularly embodiments, the primitive culling data structure is a fixed-size data structure. That is, in embodiments, the primitive culling data structure has a fixed number of entries (e.g. bits in the case that the primitive culling data structure comprises a bit mask) which in general may be greater or fewer than the number of primitives in a sequence of primitives to be processed. In the former case, each entry (e.g. bit) may represent a single primitive. In the latter case, each entry (e.g. bit) may still represent a single primitive but in embodiments may also be used to represent a group of plural primitives. Various arrangements are contemplated in this regard for using the respective entries of the primitive culling data structure to represent which primitives can (and should) be culled for the second, main pass, as will be explained further below.

The primitive culling data structure can be generated in any suitable and desired manner. There are various embodiments contemplated for generating the primitive culling data structure but two main embodiments will be described below for illustrative purposes.

In a first main embodiment, the primitive culling data structure can be populated during the first, pre-pass operation 'on the fly', e.g., and in an embodiment, as the fragment visibility information is generated. For example, in embodiments, the visibility information for the sequence of primitives is generated by depth testing the fragments, and updating a depth buffer (as necessary). In that case, when a fragment for a primitive causes an update to the depth buffer, a corresponding entry in the primitive culling data structure can be updated accordingly to indicate that the primitive may have some visibility (and so cannot be culled).

For example, if the primitive culling data structure comprises a list of primitive identifiers, the associated primitive identifier for a fragment can be written out appropriately when a fragment causes an update to the depth buffer. However, in that case, there may be an arbitrarily long list of primitive identifiers that would potentially all need to be checked for each primitive in the second, main pass operation in order to identify whether or not the primitive can be culled.

Thus, as mentioned above, the primitive culling data structure in embodiments comprises a bit mask with each entry (bit) corresponding to a respective primitive in the sequence of primitives. In that case, the corresponding bit associated with a primitive can be set accordingly if a fragment for the primitive causes an update to the depth buffer. For example, all of the bits in the bit mask may be initialised to (e.g.) 'zero' to indicate that (at that point) none of the primitives are known to have any visibility. The first, pre-pass operation can then be performed by rasterising the primitives into their associated fragments, depth testing the fragments to determine potential visibility, and whenever a fragment for a primitive passes the depth test to cause an update to the depth buffer, the respective bit within the primitive culling data structure that corresponds to the primitive associated with the fragment that caused the depth buffer update is set accordingly (e.g.) to 'one'. In this case, once a bit is set (e.g. to 'one'), it in an embodiment then remains set. That is, according to the first main embodiment for generating the primitive culling data structure, no attempt is made to re-set a bit if a corresponding primitive is subsequently overdrawn.

According to the first main embodiment described above, the primitive culling data structure is therefore generated during the first, pre-pass operation alongside the processing of fragments to generate the visibility information for the sequence of primitives. In other words, the primitive culling data structure is effectively generated as part of the step of determination of the fragment visibility information during the first, pre-pass operation.

The first main embodiment thus has the benefit that the primitive culling data structure is in an embodiment available immediately at the end of the first, pre-pass operation, without any additional processing steps required for generating the primitive culling data structure. Thus, at the end of the first, pre-pass operation, the so-generated primitive culling data structure can be written to suitable storage, e.g. such that it is subsequently available for use for the second, main pass operation as desired (e.g., and in an embodiment to cull any primitives for which it can be identified from the primitive culling data structure that the primitive does not need to be further processed).

The generation of the primitive culling data structure according to this first main embodiment is therefore relatively simpler. However, a drawback of the approach according to the first main embodiment described above is that once a bit is set, it in an embodiment remains set. This is generally acceptable since unnecessarily rendering a primitive will still provide correct rendering results (and in embodiments the resulting fragments will ultimately be culled based on the visibility information at a later point during the second, main pass in any event) but this approach may therefore lose primitive culling efficiency since when the primitive culling data structure is generated 'on the fly' in this manner there may be some instances where a primitive was visible at the point it was processed (such that the corresponding bit was set to cause the primitive to be further processed during the second, main pass), but the primitive is subsequently fully overdrawn, such that it could in fact be culled in its entirety.

Accordingly, in a second main embodiment, rather than generating the primitive culling data structure 'on the fly' during the first, pre-pass operation, as the visibility information is being determined as in the first main embodiment, the primitive culling data structure is instead generated at the end of the first, pre-pass operation (either as part of the first, pre-pass operation, or notionally as part of a standalone primitive culling data structure building step that is performed after the first, pre-pass operation has finished), using the (full) visibility information determined for the sequence of primitives. In other words, according to the second main embodiment, the primitive culling data structure is generated using the results of the visibility determination, after the full visibility information for the sequence of primitives has been determined by the first, pre-pass operation. The approach according to the second main embodiment therefore allows more complete primitive visibility to be determined. For example, and in an embodiment, once a sequence of primitives has been processed to completion by the first, pre-pass operation to determine the desired visibility information, the first, pre-pass operation may further comprise identifying primitives, if any, for which none of the associated fragments needs to be processed further for the render, and which primitives in their entirety therefore do not need to be processed further.

In one example of the second main embodiment, the first, pre-pass operation comprises processing fragments for primitives in the sequence of primitives to determine "visibility" information indicative of whether or not the fragment should be processed further for the sampling position, wherein the determined visibility information comprises a "set of primitive identifying information". The set of primitive identifying information in this case stores for respective sampling positions within the render output respective primitive identifiers, where the primitive identifier stored for a respective sampling position indicates the primitive in the sequence of primitives that should subsequently be processed further for the sampling position. The set of primitive identifying information thus stores, in an embodiment for each sampling position in the render output, a respective primitive identifier, the set of primitive identifying information thereby identifying which of the primitives in the sequence of primitives (and hence which fragments for the primitives) should be processed further for which sampling positions within the render output.

By providing visibility information comprising such set of primitive identifying information comprising an array of primitive identifiers identifying which primitives need to be processed further, the primitive culling data structure of the technology described herein can accordingly be generated by suitably iterating over the set of primitive identifying information to identify which primitives need to be further processed (and hence also identifying any primitives that do not need to be further processed, and which can therefore be culled). For example, the primitive culling data structure can be, and in an embodiment is, generated by iterating over the entries in the set of primitive identifying information and identifying based on the primitive identifiers stored in the set of primitive identifying information which, if any, primitives need to be further processed during the second, main pass operation. The corresponding entries in the primitive culling data structure can then be populated accordingly.

Thus, for any primitives for which an associated primitive identifier is stored in the set of primitive identifying information, this means that the primitive subsequently needs to be processed further, e.g. as one or more fragments generated from the primitive is visible in the final render output. The corresponding entry in the primitive culling data structure should thus be (and in an embodiment is) updated or set accordingly to indicate that the primitive should be processed further (i.e. that the primitive cannot be culled). On the other hand, any primitives whose primitive identifier does not appear in the set of primitive identifying information can potentially be culled, and the corresponding entries in the primitive culling data structure can be populated accordingly on this basis. Various other arrangements would be possible in this regard and the iteration over the set of primitive identifying information may in general be more or less complex as desired.

The first, pre-pass operation in an embodiment thus further comprises using the determined set of primitive identifying information to generate the primitive culling data structure. This has the benefit that the primitive culling data structure can then reflect the full results of the fragment visibility testing, thus facilitating improved primitive culling compared to the first main embodiment described above.

As with the first main embodiment, the so-generated primitive culling data structure can then be written to suitable (local) storage at the end of the first, pre-pass operation, e.g. so that it can subsequently be used during the second, main pass operation to control the primitive processing (and in an embodiment to cull any primitives for which it can be identified from the primitive culling data structure that the primitive does not need to be further processed).

(In embodiments, the set of primitive identifying information is in an embodiment also written to storage at the end of the first, pre-pass operation (and subsequently used as will be explained further below for fragment level culling). However, it would also be possible to use the set of primitive identifying information solely to generate the primitive culling data structure and to control the fragment processing in the second, main pass in another way, e.g. using the depth buffer.)

According to the technology described herein, the primitive culling data structure is in an embodiment generated for a sequence of primitives (such that it can then be discarded once the sequence of primitives has been processed to completion). Thus, in embodiments, the primitive culling data structure is generated for a sequence of primitives, and stored appropriately, but then once the sequence of primitives has been processed, the primitive culling data structure is then discarded (in an embodiment without writing to external memory), and a new primitive culling data for a further sequence of primitives can then be generated and stored in its place.

In an embodiment the primitive culling data structure is stored locally to the graphics processor. For instance, as mentioned above, the primitive culling data structure is in an embodiment a fixed-size data structure. This facilitates reducing the size of the primitive culling data structure, e.g., and in an embodiment, such that the primitive culling data structure can be stored locally, e.g. in a dedicated portion of RAM, e.g., and in an embodiment, without writing out to the external memory. Thus, in embodiments, the fixed-size of the data structure is selected to allow and facilitate the primitive culling data structure being stored locally to the graphics processor, e.g., and in an embodiment, without ever having to write the primitive culling data structure to external memory.

So long as the number of primitives in the sequence of primitives is fewer than the number of entries available in the primitive culling data structure, the primitive culling may thus indicate for each primitive, on a per-primitive basis, whether or not the primitive can be culled. However, in a typical graphics processing arrangement, the sequences of primitives to be rendered (e.g. for a tile) may be relatively large. Thus, there may instances where longer sequences of primitives are received for processing for which it is not possible to use a respective entry in the primitive culling data structure for each individual primitive. Various possibilities are contemplated in this regard for using the primitive culling data structure for indicating sets of primitives that can be culled.

For example, rather than an entry in the primitive culling data structure (e.g. a bit) representing an individual primitive, in some embodiments a single entry in the primitive culling data structure may represent a group or range of primitives in the sequence of primitives. There are various ways in which this could be achieved. In an embodiment this is done based on primitive identifiers that are used to identify the primitives in the sequence of primitives to be rendered.

For instance, each primitive in the sequence of primitives in an embodiment has a unique primitive identifier, that in an embodiment uniquely identifies the primitive within the sequence of primitives. To this end, the primitives are in an embodiment indexed relative to sequence of primitives in which they appear for the purposes of the technology described herein. This indexing of the primitives can be done at any suitable point and in any suitable and desired manner. In embodiments however the primitives may be indexed as part of an initial primitive classification process, as will be explained further below. Various other arrangements would however be possible in this regard.

In an embodiment, when the primitives are indexed in this way, the primitive identifiers within the sequence of primitives monotonically change from a particular starting value. For example, and in an embodiment, the primitive identifiers monotonically increase within the sequence of primitives. Thus, in one example, the first primitive in the sequence of primitives is in an embodiment assigned the primitive identifier '1', the second primitive in the sequence of primitives is in an embodiment assigned the primitive identifier '2', and so on. In that case, so long as the value of the primitive identifier is smaller than the number of entries (bits) available in the primitive culling data structure, the primitive identifier may be used to directly indicate the entry in the primitive culling data structure that indicates whether or not the primitive can be culled. Thus, the first entry in the primitive culling data structure may (and in embodiments does) indicate whether (or not) the first primitive in the sequence of primitives can be culled, the second entry in the primitive culling data structure may indicate whether (or not) the second primitive in the sequence of primitives can be culled, and so on.

In some embodiments, if there are more primitives in the sequence of primitives than there are entries (bits) available in the primitive culling data structure, it could be the case that the primitive culling data structure only provides indications for a subset of primitives in the sequence of primitives, e.g. the first N primitives, where N corresponds to the number of entries (bits) available in the primitive culling data structure. In that case, primitive culling may only be performed up to a certain number of primitives within the sequence of primitives. This can still provide benefit but for increasingly larger sequences of primitives will of course have reduced benefit as there is then no possibility for culling later primitives in the sequence even when it would in principle be possible to do so.

In embodiments therefore various techniques may be used to allow a fixed-size primitive culling data structure to also represent primitives later in the sequence where the primitive identifiers are greater than the number of entries (bits) available in the primitive culling data structure. Various arrangements are contemplated in this regard so long as the entry (e.g. bit) associated with a given primitive can be predictably determined in the same way both during the first, pre-pass operation when generating the primitive culling data structure and during the second, main pass operation when the primitive culling data structure is used.

In one such example, when the number of primitives in the sequence of primitives exceeds the size of the primitive culling data structure, the entries can be populated based on the primitive identifiers in a 'wrap around' manner, where the entry that corresponds to a particular primitive (e.g. the bit that is set) is determined by calculating the primitive index modulo the width of the primitive culling data structure. In that case, the first entry in the primitive culling data structure may represent the combined primitive visibility information for both the primitive in the sequence and the $N+1^{th}$ primitive in the sequence of primitives (as well as the $2N+1^{th}$ primitive, and so on). Thus, if any of the first, $N+1^{th}$, $2N+1^{th}$ primitives has some visible effect, the corresponding entry is populated accordingly, and none of those primitives can be culled. On the other hand, if none of the primitive represented by a given entry needs to be processed further, this can be indicated accordingly in the primitive culling data structure to enable the primitives to be culled for the second, main pass.

As another example, rather than using a 'wrap around' function to map primitive identifiers to entries within the primitive culling data structure, the primitive identifiers could be processed to determine some other representative value, e.g. by computing a hash function from the primitive identifier bits (or a subset thereof), to determine which entries in the primitive culling data structure store indications for which primitives. Thus, in one such example, if the value of the primitive identifier is smaller than the size of the primitive culling data structure, the corresponding bit may be identified directly from the primitive identifier. However, if the value of the primitive identifier is greater than the size of the primitive culling data structure, a suitable predefined function (e.g. a hash function) is applied to the primitive identifier to determine the corresponding entry (e.g. bit position) that should be populated for that primitive. This has the benefit that any overflowing bits may then be distributed more evenly throughout the primitive culling data structure (rather than potentially being focused towards the first entries in the primitive culling data structure as in the first example).

Another example, that can be (and in an embodiment is) used at least according to the second main embodiment wherein the primitive culling data structure is generated at the end of the first, pre-pass operation would be to have each entry (e.g. bit) in the primitive culling data structure represent a range of primitives. For example, at least when the primitive culling data structure is generated at the end of the first, pre-pass operation, e.g. by iterating over a set of primitive identifying information in the manner of the second main embodiment described above, in that case the maximum primitive identifier is known at the point at which the primitive culling data structure is generated. This information can thus be used to determine which primitives in the sequence of primitives should be represented by which entries in the primitive culling data structure. For instance, in such an embodiment, for a sequence of N primitives that is to be stored in a primitive culling data structure having M entries, each entry (e.g. bit) may be used to represent a sequence of N/M primitives. Thus, the first entry (e.g. bit) represents the first set of N/M primitives in the sequence, the second entry (e.g. bit) represents the next set of N/M primitives in the sequence, and so on. Although this is still a relatively coarse approach this can in some cases work well since it is often the case that primitives defined for a given render output will have similar visibilities to their neighbouring primitives in a sequence of primitives. Again, as mentioned above, false positives are of course acceptable. That is, even in some primitives are caused to be unnecessarily processed during the second, main pass, this is still 'safe' and will not impact the final render output.

As an extension to this, if the actual (true) range of primitives that need to be processed for the sequence of primitives is known (e.g. by determining the "maximum" and/or "minimum" primitives that are visible within the sequence of primitives), this can effectively reduce the range of primitives that need to be represented, such that each bit can be used to represent a smaller group of primitives. For example, for a sequence of N primitives, in which the first visible primitive is the $N_{min}$ primitive and the final visible primitive is the $N_{max}$ primitive, and a primitive culling data structure having M entries, each entry (e.g. bit) may in that case be used to represent a sequence of ($N_{max}$−$N_{min}$/M) primitives. In this case, the primitive culling data structure should also (and in an embodiment does) store information indicative of the range of primitives that need to be processed for the sequence of primitives (e.g. by storing respective "maximum" and/or "minimum" primitive identifiers) such that the primitive culling operation in the second, main pass can determine which primitives are represented by which of the entries.

All of these examples therefore allow primitive culling indicators to be potentially stored for a greater number of primitives, but may result in some primitives being unnecessarily processed when they could in fact have been culled. This can however still provide significant benefit in terms of optimising the primitive processing for the second, main pass at least in some cases.

Various other arrangements would be possible in this regard for constructing a suitable primitive culling data structure that can be used for identifying primitives that can be culled during the second, main pass in the manner of the technology described herein.

Thus, the entries of the primitive culling data structure may be populated based on determining which primitives can potentially be culled in their entirety and when it is determined that a primitive can be culled in its entirety, using the primitive identifying information (e.g. the unique primitive identifier) for that primitive to determine a respective entry of the primitive culling data structure that should be updated. In embodiments, the relationship between the entries of the primitive culling data structure and the primitives that are being processed, i.e. which entry of the primitive culling data structure is associated with a particular primitive, may be (and is) determined using on the primitive identifying information (e.g. the unique primitive identifier) for the primitive in question. That is, there is in embodiments a predetermined relationship or heuristic that can be applied using the primitive identifying information (e.g. the unique primitive identifier) for the primitive in question to identify which entry of the primitive culling data structure is associated with that primitive.

As discussed above, the benefit of generating such primitive culling data structure is that this allows primitives in their entirety to be culled relatively earlier during the second, main pass operation, thus avoiding some or all unnecessary processing of such primitives during the second, main pass operation.

The second, main pass operation accordingly comprises a step of using the primitive culling data structure to cull primitives. This step may be performed as desired, e.g. depending on the form of the primitive culling data structure. In this way, at least some primitives in their entirety can be culled during the second, main pass operation. In this respect, it will be appreciated that the primitive culling data structure is generated using the visibility information determination during the first, pre-pass operation. Thus, any primitives that do not generate visibility information (which may, e.g., include transparent primitives that do not write depth values), will not in general be able to be culled in this manner. That is, it is only primitives for which visibility information is generated during the first, pre-pass operation (e.g. opaque primitives) that can potentially be culled in this way.

It will also be appreciated that in some cases it is nonetheless desirable (or required by the application specification) to process a primitive, or in some cases to process all of the primitives in the sequence of primitives, during the second, main pass even when it could in principle be culled on the basis that none of its associated fragments needs to be further processed for the render output.

Thus, in embodiments, the primitive culling operations of the technology described herein may be selectively enabled (or disabled), either on a per-primitive or per-sequence basis, as desired. If the primitive culling is disabled for a whole sequence of primitives the primitive culling data structure may or may not be generated during the first, pre-pass. Various arrangements would be possible in this regard.

Subject to the requirements of the technology described herein the graphics processor may otherwise be operated in any suitable and desired manner.

In an embodiment, as mentioned above, the visibility information generated during the initial, pre-pass operation can thus be (and in an embodiment is) used to control fragment processing during the second, main pass operation. The fragment visibility information allows improved, e.g. sample-perfect, hidden surface removal to be performed. Further, this can be implemented in low complexity hardware. Thus, in addition to the primitive level culling facilitated by the primitive culling data structure, additional fragment visibility testing is in an embodiment also performed for any fragments for primitives that survive the primitive culling to cull any fragments that do not to be processed further.

The technology described herein relates in an embodiment to tile-based rendering. The graphics processor may therefore have any suitable and desired processing stages and/or elements that a graphics processor may have when performing tile-based rendering.

The graphics processor of the technology described herein in an embodiment comprises a geometry processing (tiling) circuit and a rendering circuit.

The geometry processing (tiling) circuit is configured to generate primitive lists. The sorting of the primitives relative to the tiles can be done in any suitable manner, e.g. in the normal way for generating primitive lists. The primitive lists may be prepared for any suitable regions of the render output. Thus, there may or may not be a one-to-one correspondence between the primitive lists and the actual rendering tiles.

Once all of the geometry has been processed, the primitive lists are in an embodiment then written out, e.g. to external (e.g. main) memory.

The primitive lists are then used during a subsequent rendering state in order to perform the actual rendering of the individual tiles. The rendering circuit of the graphics processor thus in an embodiment comprises a primitive list reading circuit that is configured to, when a tile is issued for rendering, identify using the respective primitive list or lists applying to the tile in question a sequence of primitives that should be processed for the tile.

The primitive list reading circuit is thus in an embodiment configured to obtain the primitive lists, e.g. from memory, identify a sequence of primitives that should be processed for the tile and issue the identified primitives for rendering. This may be done in any suitable and desired manner, e.g. depending on the format of the primitive lists. For example, where the primitive lists apply to hierarchically arranged regions of the render output (such that there is not necessarily a one-to-one correspondence between primitive lists and tiles to be rendered and such that a given tile may be associated with multiple primitive lists) the step of identifying the sequence of primitives may comprise processing multiple primitive lists and merging primitives from the multiple primitive lists into the desired rendering order.

These operations are in an embodiment performed in response to a command to render a tile. The identified primitives are then issued accordingly into a rendering pipeline for further processing, as will be explained further below. In some embodiments however the sequences of primitives may be identified in advance (and, e.g., pre-fetched) of the graphics processor executing the rendering command that triggers the pre-pass operation. Various arrangements would be possible in this regard.

The technology described herein relates particularly to the rendering operations that are performed on the primitives that are identified to be processed. The rendering is in an embodiment performed in a pipelined manner as a series of processing stages. Subject to the requirements of the technology described herein the rendering pipeline may in general comprise any suitable and desired processing stages that a graphics processing (rendering) pipeline may contain.

In particular the rendering according to the technology described herein uses a rasterisation-based approach (which may include traditional rasterisation-based rendering but may also include hybrid rasterisation/ray-tracing approaches).

The rendering circuit (pipeline) of the graphics processor of the technology described herein thus generally includes a rasteriser for processing primitives into respective sets of fragments and a renderer that is configured to process (render) the resulting fragments to determine the appearance (e.g. colour) that corresponding sampling positions should have in the final render output.

The rasteriser (rasteriser circuit) can be configured to operate in any suitable and desired manner, for example as in known rasterising arrangements. It should operate to generate graphics fragments for processing in dependence upon which sampling positions (or which sets of sampling positions) of an array of sampling positions covering the area of the render output, a given primitive, etc., received by the rasteriser covers (at least in part).

The rasteriser in an embodiment generates a graphics fragment for each sampling position covered by, and/or for each set of plural sampling positions (e.g., sampling mask) found to include a sampling position that is covered by, the (and each) primitive being rasterised (and that is not otherwise culled from processing for another reason, such as by the primitive failing an early depth test).

Correspondingly, each fragment generated by the rasteriser may represent (have associated with it) a single sampling position, or plural sampling positions, as desired. In an embodiment, each fragment represents a set of plural, in an embodiment a set of four (and in an embodiment a 2×2 array of), sampling positions.

The renderer (fragment processing circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In embodiments the renderer comprises a fragment shader (a shader pipeline) (i.e. a programmable processing circuit that is operable to and that can be programmed to carry out fragment shading programs on fragments in order to render them).

The renderer (fragment processing circuit) will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile (e.g. colour) buffer (as will be the case in a tile-based graphics processing system).

The render output to be generated may comprise any render output that is to be generated by the graphics processor. Thus it may comprise, for example, a tile to be generated in a tile-based graphics processor, and/or all or part of a frame of output fragment data.

As mentioned above, in the technology described herein, the rendering of primitives is effectively performed in two, separate processing passes: a first, "pre-pass" which is performed to generate visibility information for the sequence of primitives being processed and a second, "main" pass which performs the actual final rendering operations to produce the final rendered output (e.g. colour) values.

The result of the first, pre-pass is thus to generate the desired "visibility" information. The processing that is performed in the first, pre-pass may comprise any suitable and desired processing, e.g. depending on the format of the visibility information. In general, however, the first, pre-pass operation comprises rasterising primitives into respective sets of one or more fragments and then performing one or more fragment processing operations to determine the desired visibility information. The visibility information is typically, and in embodiments, based on the fragment depth values. That is, which fragment will be visible at a particular sampling position will typically be, and is in an embodiment, determined (at least in part) by which fragment is front-most in the scene (i.e. has the closest depth value).

The first, pre-pass thus in an embodiment comprises (early) depth testing the fragments to update a depth buffer for the render output. The depth buffer stores a set of per-sampling position depth values for the render output. Thus, in embodiments, the first, pre-pass operation comprises testing a (the current) fragment's depth value against a corresponding depth value stored in a depth (Z) buffer. If the fragment survives the depth testing, the depth buffer is in an embodiment then updated to include the current fragment's depth value, and so on, until all of the fragments for the primitives have been processed. The resulting depth buffer at the end of the first, pre-pass therefore represents the depth buffer for the sequence of primitives as a whole.

In some embodiments the first, pre-pass thus comprises rasterising the primitives into respective sets of one or more fragments and then depth testing the fragments to update a depth buffer. The depth buffer is in an embodiment then written to suitable storage at the end of the first, pre-pass. The depth buffer could be written out to external memory but in embodiments the depth buffer is written to local storage, e.g. a dedicated portion of RAM that has been allocated for the current rendering operation (e.g. for a tile that is being rendered), and which local storage can thus be overwritten once the current rendering operation (the rendering of the current tile) is complete. Various arrangements would be possible in this regard.

In embodiments the fragment processing in the first, pre-pass finishes at this point, i.e. after writing out the depth buffer (and any other visibility information that may desirably be generated and written out by the first, pre-pass operation). Thus, in some embodiments, after the (early) depth testing is performed, and the depth buffer updated accordingly (as needed), the fragment processing in the first, pre-pass is finished, without, e.g., executing a fragment shader to render the fragments further (e.g. to determine colour values for the final render output).

In some embodiments a partial fragment shader may however be executed in order to update the depth buffer. For example, this may be appropriate to handle primitives where a fragment shader is needed to determine the fragment's depth value and/or sampling position coverage. (Otherwise, primitives where the shader potentially modifies the rendered output value may need to be, and in embodiments are, treated as incompatible primitives.) In that case, final (colour) output is in an embodiment still disabled and fragment shader is run just far enough to update depth buffer, but fragments are not rendered in full.

The pre-pass in an embodiment also comprises a step of primitive classification (or primitive classification checking) to determine whether or not a primitive is compatible with the pre-pass. In an embodiment the step of primitive classification checking is performed at the start of the pre-pass, e.g., and in an embodiment, prior to rasterising the primitives. Other arrangements would however be possible.

If the primitive is compatible the pre-pass continues as normal. Otherwise, if a primitive is incompatible with the pre-pass, the pre-pass is in an embodiment not performed for that primitive. In that case, the main pass is in an embodiment then initiated to process primitives in the sequence of primitives up to the primitive immediately before (preceding) the incompatible primitive, and when the main pass reaches the incompatible primitive, the graphics processor is then switched to the fallback mode of operation (as discussed above).

After the first, pre-pass is finished (or has been terminated, e.g. in response to encountering an incompatible primitive), a second, main pass operation is performed to further process the primitives that have been processed during the first, pre-pass as necessary to generate the final render output.

The result of the second, main pass is thus to generate the final render output, e.g. by performing fragment shading to generate a set of rendered output (e.g. colour) values for the final render output. The processing in the second, main pass may thus generally comprise rasterising the primitives into their respective sets of fragments and then executing a fragment shader in order to determine the corresponding rendered output values for the sampling positions in the render output (e.g. to determine the appearance (e.g. colour) that the associated sampling positions should have in the final render output, although in general the rendering may produce any suitable and desired output data).

The second, main pass may include any other rendering stages, such as blending, etc., that may desirably be performed. The second, main pass in an embodiment also comprises a step of primitive classification (checking) to determine whether or not a primitive is compatible with the pre-pass operation, and in an embodiment to trigger switching to the third, fallback mode of operation as necessary, e.g. as explained above.

The second, main pass in an embodiment further includes a visibility test that uses the visibility information generated during the first, main pass to control processing of primitives (or fragments) for the second, main pass. The nature of the visibility test in general depends on the format of the visibility information. However, in an embodiment the visibility test is performed on a per-fragment basis. Thus, in an embodiment the visibility test is performed after rasterisation. In an embodiment the visibility test is performed prior to the rendering operations that determine the rendered output values for the sampling positions (e.g., and in an embodiment, prior to fragment shading).

The visibility information may take any suitable and desired form so long as it can be used in the manner of the technology described herein to control rendering of primitives during the second, main pass.

For example, in a first main embodiment, the visibility information comprises the depth buffer itself.

In that case, the depth buffer is populated during the pre-pass operation. The main pass operation then performs a visibility test against the depth buffer which in an embodiment comprises a modified depth test with the test function comprising an 'equals to' function and with writes to the depth buffer being disabled.

Thus, during the second, main pass, the depth buffer is used to determine whether the current fragment has the correct depth value, and if so, that fragment is processed further (e.g. shaded) accordingly. On the other hand, if the current fragment's depth value does not match the current depth value in the depth buffer, the fragment can be (and is) discarded. This fragment visibility test using the depth buffer is in an embodiment therefore performed for the main pass operation after the step of rasterising the primitives into sets of fragments but before the fragments are rendered to determine the appearance that associated sampling positions should have (e.g., and in an embodiment, before the fragment shader). The depth buffer is however in an embodiment not updated during the second, main pass but is instead populated entirely during the first, pre-pass.

This approach therefore generally allows for sample-perfect hidden surface removal. It will be appreciated however that two or more fragments at the same sampling position may have identical depth values and a further mechanism may therefore be required to disambiguate such primitives during the second, main pass. In such cases it is generally known in advance which of the two or more fragments having identical depth values should be rendered and so this can be tracked, e.g. by suitably annotating the primitives, or setting a suitable flag, during the pre-pass operation to control which fragment is processed further for the respective sampling position.

Various other arrangements would however be possible, e.g. depending on the form of the visibility information.

For example, in another main embodiment, rather than simply using the depth buffer itself as the visibility information, a dedicated data structure in the form of a set of primitive identifying information (a "HSR ID buffer") is generated during the pre-pass operation that stores in an embodiment for each sampling position in the render output a respective primitive identifier indicating by reference to the associated primitive which fragment should be rendered for that sampling position. Which fragment (and hence primitive) should be processed for a respective sampling position can generally be determined based on depth testing, in a similar manner to the first main embodiment. Thus, in the second main embodiment, the depth buffer is in an embodiment updated during the first, pre-pass operation, e.g. as normal. However, rather than using the depth buffer itself as the visibility information for the second, main pass, according to the second main embodiment, the set of primitive identifying information ("HSR ID buffer") is generated during the first, pre-pass and it is the set of primitive identifying information ("HSR ID buffer") that is then used as the visibility information for controlling fragment processing for the second, main pass. For example, for any fragments for which it is determined based on the depth testing that the fragment is visible (at least based on the current state of the depth buffer), at the same time as updating the depth buffer, an associated primitive identifier is written to an entry in the set of primitive identifying information ("HSR ID buffer") corresponding to the sampling position(s) associated with the fragment in question.

In that case, the pre-pass processing may further comprise populating such a set of primitive identifying information ("HSR ID buffer") accordingly. The visibility information in such embodiments therefore comprises or is in the form of a "set of primitive identifying information ("HSR ID buffer")". The set of primitive identifying information ("HSR ID buffer") is then consumed during the second, main pass by an appropriate fragment visibility testing stage that tests the primitive identifier associated with the current fragment against the corresponding primitive identifier stored in the visibility buffer for the sampling position(s) in question to determine whether or not the fragment should be processed further. Again, this visibility testing using the set of primitive identifying information ("HSR ID buffer") is in an embodiment performed during the second, main pass operation after the step of rasterising the primitives into sets of fragments but before the fragments are rendered to determine the appearance that associated sampling positions should have (e.g., and in an embodiment, before the fragment shader).

In embodiments of the second main embodiment, the depth buffer is also updated during the first, pre-pass and remains available for subsequent use. The depth buffer may be used in various ways. For example, in some embodiments, the second, main pass in an embodiment does not update or test against the depth buffer. However, in the event that the processing needs to "fallback" (as described above), the third, fallback operation will perform depth testing as normal, with the depth buffer being updated and tested against during the third, fallback operation. It is also contemplated however that the depth buffer may also be used during the second, main pass, at least for some primitives. For example, certain primitives may be able to skip the pre-pass processing (since they do not generate any visibility information, e.g., they cannot update the depth buffer, e.g., certain transparent primitives). In that case, it may be possible to process such primitives in the second, main pass however such primitives will never match the primitive identifiers that are stored in the set of primitive identifying information ("HSR ID buffer") and so cannot be culled in the same way as (opaque) primitives that could potentially have updated the set of primitive identifying information ("HSR ID buffer") in the first, pre-pass operation (and instead different visibility testing may need to be performed). Thus, in that case, it may be desirable to also allow depth testing during the second, main pass to allow fragments for transparent primitives to be culled where possible. Various arrangements would be possible in this regard.

In the embodiments described above fragments for at least some primitives that were processed during the first, pre-pass operation are therefore processed again during the second, main pass operation but the main pass operation includes a visibility test that tests the fragments against the visibility information (in whatever form that takes) to control the further processing of the fragments during the main pass. Thus, if a fragment for a primitive fails the visibility testing in the second, main pass, the second, main pass may be terminated in respect of that fragment.

Thus, in general, the same primitives may (and in an embodiment do) undergo different processing in the respective processing passes. For example, in an embodiment, the first, pre-pass involves at least rasterising the primitives into fragments and performing depth testing that is used to generate visibility information. The pre-pass may or may not execute a fragment shader. However in an embodiment the pre-pass at least does not write out, and in an embodiment does not generate either, the final output (e.g. colour) values. The second, main pass on the other hand in an embodiment rasterises primitives into fragments, performs some visibility test using the visibility information generated during the pre-pass, and then performs fragment shading to generate and output (e.g. colour) values for any fragments that survive the visibility test.

The processing that is performed in either the pre-pass or the main pass may in general also comprise any other suitable processing steps (stages) that may be desired.

So long as the primitives are compatible with being processed in the manner of the technology described herein (using a pre-pass), the graphics processor is in an embodiment (initially) caused to process all the primitives in sequence of primitives in the first, pre-pass mode and to then process the sequence of primitives again (from the start) in the second, main pass mode.

In an embodiment therefore the same sequence of primitives is subjected to both the first, pre-pass operation and to the second, main pass operation. It is in this regard also contemplated for example that the granularity of the processing may change between the pre-pass and the main pass. For example, the pre-pass may be performed in respect of an entire tile, but the tile could then be sub-divided into smaller sub-tiles for performing the main pass, such that a plurality of main passes are performed. Correspondingly, the pre-pass operation could be performed for sub-tiles, with the main pass then being performed for multiple (e.g. all) of the sub-tiles together. Various arrangements would be possible in this regard.

In embodiments all of the primitives in a sequence of primitives are processed in the same way. However, other arrangements would be possible and dividing the rendering into two separate passes may also allow for further possible optimisations.

For example, if it can be determined that a primitive will have no further effect after having executed in the pre-pass, in that case it may be possible to avoid or omit some or all processing the primitive further in the second, main pass, regardless of the visibility information. An example of when this might be the case would be where the primitive writes only to the depth and/or stencil buffers but does not output a colour value. This is typically known in advance and can thus be determined, e.g., from suitable state information (e.g. descriptors) associated with the primitive.

Various other arrangements would be possible for skipping some or all processing during the second, main pass.

Correspondingly, if it can be determined that a given primitive does not contribute any meaningful output for the pre-pass, some or all processing of that primitive for the pre-pass can accordingly be skipped. For example this may be the case for primitives that do not write out depth values or any other visibility information. The primitive could then be processed in the main pass only (or only in the fallback mode). It may even be possible in some situations to identify that primitives can be culled in their entirety before the pre-pass operation is performed, such that the primitive is not processed by either pass.

On the other hand, there are some cases where all primitives need to be processed in a single processing pass, e.g. for occlusion/pipeline queries. In that case, the graphics processor may be configured to ensure that all of the primitives are processed in pre-pass, even if a primitive could in principle be skipped (since no visibility information is output). Alternatively, if occlusion/pipeline queries are enabled, this might simply trigger a fallback operation.

The pre-pass operation of the technology described herein also interacts with pre-frame shaders. For example, there are various full frame shaders that may be run in certain conditions prior to rendering the application-specified geometry. These can serve various purposes, e.g. pre-loading the depth, stencil and/or colour buffers with data. In general, because the pre-pass does not output colour values, the technology described herein in an embodiment does not allocate a colour buffer until the pre-pass has been completed. Thus, a pre-frame shader that populates the colour buffer (colour read back) is correspondingly in an embodiment executed after the pre-pass. This may also allow culling of the colour read backs using the visibility information. On the other hand, pre-frame shaders that populate the depth and/or stencil buffers (ZS read back) are in an embodiment executed before the pre-pass.

Various other arrangements and optimisations would be possible in this regard.

As explained above, any primitives that cannot (safely) be processed using separate pre-pass and main pass operations are instead in an embodiment processed in a third, fallback mode of operation. The fallback mode of operation in an embodiment rasterises and renders primitives in a 'fail-safe' manner, e.g., and in an embodiment, in the normal manner for a rasterisation-based rendering system. That is, during the fallback mode, primitives are rasterised into sets of fragments and the resulting fragments are then rendered to determine corresponding rendered output values (e.g. to determine the appearance (e.g. colour values) that the associated sampling positions should have).

The fallback mode may in general perform any suitable and desired fragment processing. For example, in embodiments, the fallback mode may perform other suitable forms of hidden surface removal, such as (early/late) depth testing, e.g. in the normal manner for such depth testing.

(In contrast, the depth testing is in an embodiment modified for the pre-pass and main pass operations such that the depth buffer is in an embodiment updated during the first, pre-pass operation (only) whereas the second, main pass operation then uses visibility information based on the depth buffer to control the fragment processing but in an embodiment does not update the depth buffer. (The second, main pass may or may perform use the depth buffer. However, when the depth buffer is used during the second, main pass, any depth testing using the depth buffer that is performed during the second, main pass is in an embodiment done without updating the depth buffer.) Similarly, the main pass in an embodiment does not need to perform any late depth testing since the complete fragment visibility is in an embodiment determined up-front (by the pre-pass). Various arrangements would however be possible in this regard)

As mentioned above, the fallback mode of operation is triggered when an incompatible primitive is encountered within a sequence of primitives being processed. There are various conditions that might mean that a primitive is incompatible with being processed in the manner of the technology described herein. For example, this might include one or more of: (i) the primitive is transparent; (ii) the primitive has side effects; (iii) the primitive uses stencilling; (iv) the primitive does not write to all render targets; (iv) the primitive does not write to depth buffer; (v) a shader is required to determine the primitive coverage; (vi) the shader emits a depth value. Which of these conditions mean a primitive is incompatible with being processed in the manner of the technology described herein may in general depend on the configuration of the pre-pass operation. For example, as mentioned above, in some embodiments a (partial) shader may be executed during the pre-pass, in which case the pre-pass may be able to process at least some primitives for which a shader is required to determine the primitive coverage. As another example, when the visibility information comprises a dedicated set of primitive identifying information ("HSR ID buffer"), which is generated during the pre-pass (according to the second main embodiment for determining the visibility information described above), in that case the pre-pass may be handle stencilling in the pre-pass. Various other examples might be possible depending on the configuration of the graphics processor.

It will be appreciated from the above that the rendering circuit of the graphics processor is effectively configurable in a number of different rendering states that modulate the processing that is performed for primitives that are passed to the rendering circuit. That is, in embodiments, the rendering circuit executes a graphics processing pipeline that can be configured (and re-configured in use) to perform different processing operations depending on a state of the graphics processor. Thus, when the graphics processor is in a first, pre-pass state, the graphics processing pipeline of the rendering circuit is configured to perform a first set of processing operations to perform the first, pre-pass operation, whereas when the graphics processor is in a second, main pass state, the (same) graphics processing pipeline of the rendering circuit is configured differently to perform a second set of processing operations to perform the second, main pass operation. Correspondingly, the graphics processor may also exist in a third, fallback state, in which the graphics processing pipeline of the rendering circuit is configured (differently again) to perform a third set of processing operations to perform the third, fallback operation. Thus, depending on the current state of the graphics processor, the rendering circuit may be (and in an embodiment is) configured accordingly, e.g., and in an embodiment, by enabling/disabling one or more processing stages (or one or more outputs for one or more processing stages) within the graphics processing pipeline to cause the graphics processor to perform the desired processing operations.

The rendering state of the graphics processor can be controlled in any suitable manner as desired. For example, as mentioned above, the primitives can be annotated with classification information indicating whether or not the primitives are compatible with being processed using the pre-pass operation of the technology described herein, which information can be used to cause the graphics processor to switch out of the pre-pass mode of operation. Suitable flags may also be used to determine whether the graphics processor is currently in the pre-pass or main pass state. Thus, when a primitive is being processed, a determination may be made as to the current rendering state of the graphics processor which then controls the processing that is performed.

For instance, when a (new) sequence of primitives is issued for rendering, the rendering circuit in an embodiment begins in the first, pre-pass state. Thus, if the first primitive is compatible with the pre-pass operation, the graphics processor remains in the pre-pass state, and performs the pre-pass operations accordingly. The next primitive is then issued for processing. On the other hand, if an incompatible primitive is encountered when the graphics processor is in the pre-pass state, the pre-pass operation is in an embodiment stopped in respect of that primitive, and the graphics processor is in an embodiment then switched to the main pass state, with the processing for primitives re-starting from the beginning of the sequence of primitives with the graphics processor configured in the main pass state.

Similarly, when the graphics processor is in the main pass state, so long as the primitive is compatible, the graphics processor remains in the main pass state, and performs the main pass operations. On the other hand, when the graphics processor in the main pass state encounters an incompatible primitive, this in an embodiment triggers a switch into the fallback state. The graphics processor then remains in the fallback state and continues processing the current primitive (i.e. continues from the position that the main pass stopped at).

The graphics processor state machine is therefore in an embodiment controlled in this way based on the primitive classification and the current operating mode of the graphics processor in order to control the pre-pass operation of the technology described herein. In this way, the graphics processor can be controlled to switch between operating modes (pre-pass/main pass/fallback) appropriately when processing a sequence of primitives.

It is believed that this state machine in which the rendering circuit of the graphics processor is configured between the different rendering states as described above is novel and advantageous in its own right.

Thus, a further embodiment of the technology described herein comprises a graphics processor that is configured to generate a render output, the graphics processor comprising a rendering circuit that is operable to render sequences of primitives for the render output, wherein the rendering circuit executes a graphics processing pipeline that can be configured to perform different processing operations depending on a state of the graphics processor such that when the graphics processor is in a first, pre-pass state, the graphics processing pipeline of the rendering circuit is configured to perform a first set of processing operations to perform the first, pre-pass operation, whereas when the graphics processor is in a second, main pass state, the graphics processing pipeline of the rendering circuit is configured differently to perform a second set of processing operations to perform the second, main pass operation. As described above, in an embodiment the graphics processor can also exist in a third, fallback state, in which the graphics processing pipeline of the rendering circuit is configured to perform a third set of processing operations to perform the third, fallback operation.

As will be appreciated by those skilled in the art, these further embodiments of the technology described herein can, and in an embodiment do, comprise any one or more or all of the optional features of the technology described herein described herein, as appropriate.

In embodiments therefore there is a single (physical) rendering pipeline and the operations that are performed are thus modulated based on the current state of the graphics processor, i.e. whether the graphics processor is performing a pre-pass or a main pass, etc. However, the rendering circuit could also be configured to have multiple physically separate (parallel) rendering pipelines which can handle the different operations according to the different states of the rendering circuit. Various other arrangements would be possible.

The technology described herein may generally find application in any suitable graphics processing system. The technology described herein relates particularly to tile-based rendering systems.

The technology described herein can be used for all forms of output that a graphics processing pipeline may be used to generate, such as frames for display, render-to-texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that graphics processors may also generally be used for processing other, e.g. non-graphics, data and that the technology described herein may therefore also be applied to other contexts as well.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The overall preparation of the command streams is performed by the driver 4 on the host processor 1 and the command streams may, for example, be stored in appropriate command stream buffers, from where they can then be read by the graphics processor 3 for execution. Each command stream will typically contain commands (instructions) to set parameters for graphics processor tasks, as well as commands (instructions) to execute a task, etc.

Figure 2:
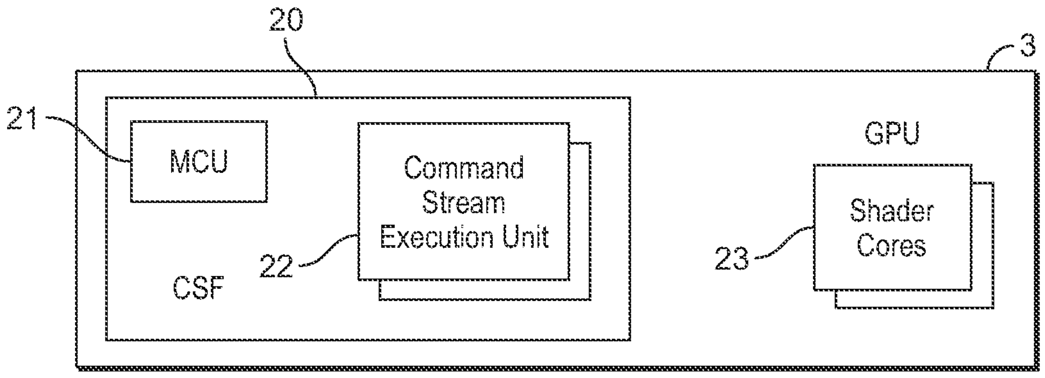
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is operable to schedule and issue commands from the command streams to respective command stream execution units 22. The command stream execution units 22 then execute the commands in the respective command streams to trigger the processing execution units 23 of the graphics processor (which in the present example are shown as comprising a plurality of shader cores, although other arrangements would, of course, be possible) to perform the desired processing tasks.

The present embodiments relate particularly to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

In a tile-based rendering system, it is accordingly usually desirable to be able to identify and know those primitives that are actually present in a given sub-region (e.g. tile), so as to, e.g., avoid unnecessarily rendering primitives that are not actually present in a tile. In order to facilitate this, it is known to prepare for respective sub-regions of the render output (which sub-regions may correspond to respective tiles, but could also, e.g., correspond to a group of tiles) a list of the primitives to be rendered for that sub-region (e.g. that will appear in the sub-region). Such a "primitive list" (which can also be referred to as a "tile-list") identifies (e.g. by reference to a primitive indicator) the primitives to be rendered for the sub-region in question (and hence can be used to identify the primitives to be rendered for the respective tile or tiles corresponding to the sub-region in question).

The process of sorting the primitives according to the regions of the render output is commonly referred to as "binning" and is usually carried out by determining (at a desired level of accuracy) the primitives that intersect (i.e. that will appear (at least in part) within) the region in question, and then preparing a list of those primitives for future use by the graphics processing system. (It should be noted here that where a primitive falls into more than one region (as will frequently be the case), it is included in the primitive list for each region that it falls within.)

Figure 3:
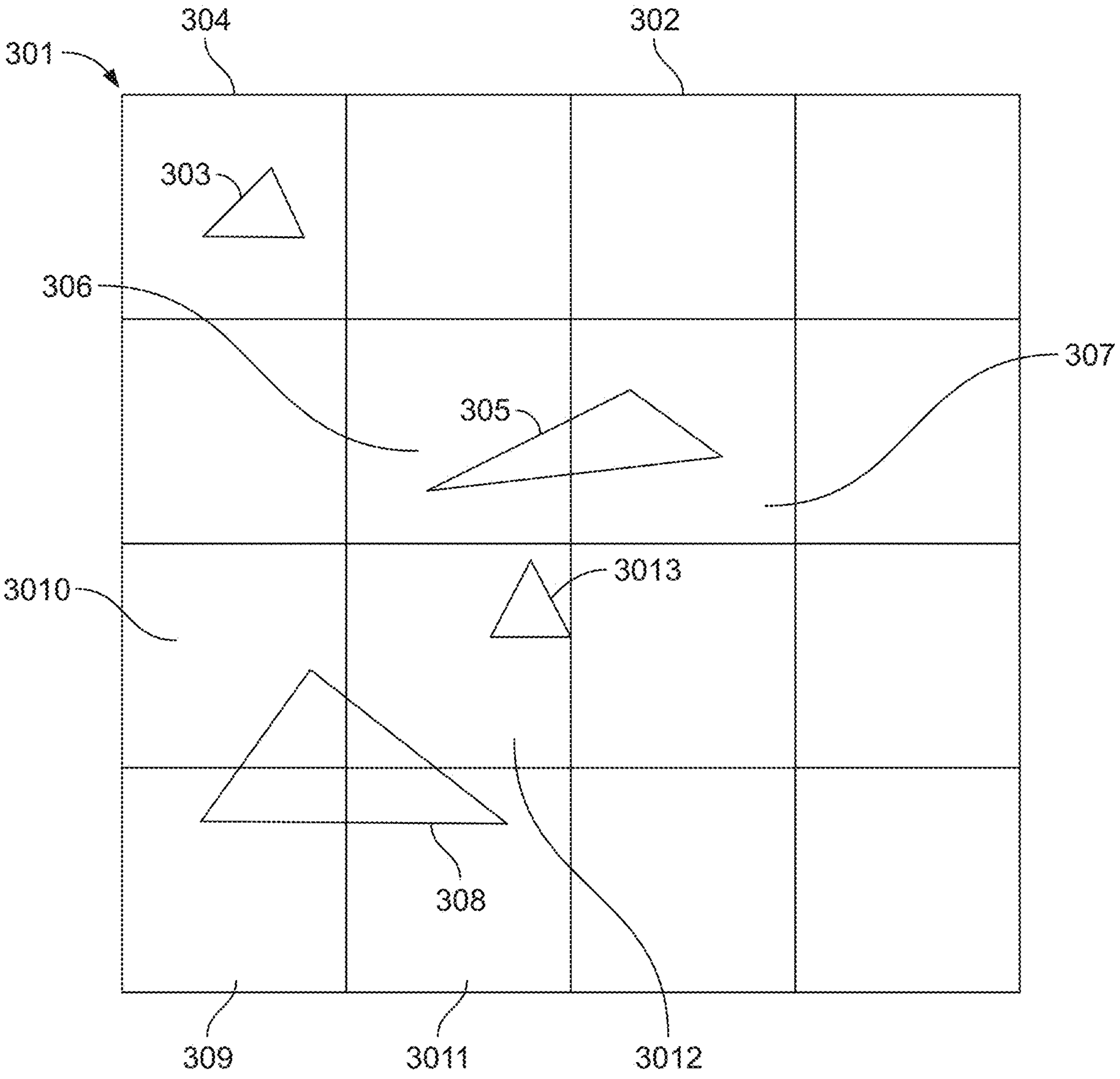
FIG. 3 illustrates an exemplary tile-based rendering operation.

FIG. 3 illustrates an "exact" binning process, where it is determined exactly which tiles a given primitive will appear at least in part in, and the primitive then included in the primitive lists for those tiles only. As shown in FIG. 3, the scene 301 to be displayed is divided into sixteen regularly sized sub-regions or tiles 302. It is then determined for each primitive in the scene, which tile or tiles the primitive actually appears (falls) within. The primitive is added to the primitive list for each tile that it is found to fall within. Thus, taking the example shown in FIG. 3, the primitive 303 is added to the primitive list for tile 304, the primitive 305 is included in the primitive list for tiles 306 and 307, the primitive 308 is included in the primitive lists for tiles 309, 3010, 3011 and 3012, and the primitive 3013 is included in the primitive list for tile 3012. (It should be noted here that FIG. 3 shows only a few tiles and primitives for clarity purposes. As will be appreciated by those skilled in the art, in an actual graphics processing operation, there will typically be many more primitives and tiles.)

It is also known however to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part). Thus, it will be appreciated that the process of determining the primitives that should be listed (rendered) for any given region described above (the "binning" process) can be carried out at varying levels of precision, for example depending on efficiency optimisations for different parts of the tiling and rendering processes.

Once lists of primitives to be rendered (primitive lists) have been prepared for each sub-region (tile) in this way, the (primitive) lists are stored for use, e.g., to allow the system to identify which primitives need to be considered (and rendered) for the respective rendering tiles.

The advantage of such tile-based rendering is that primitives that do not appear in a given tile do not have to be processed for that tile, and therefore can be ignored when the tile is processed. This can allow the overall amount of graphics processing necessary for a given scene to be reduced.

Figure 4:
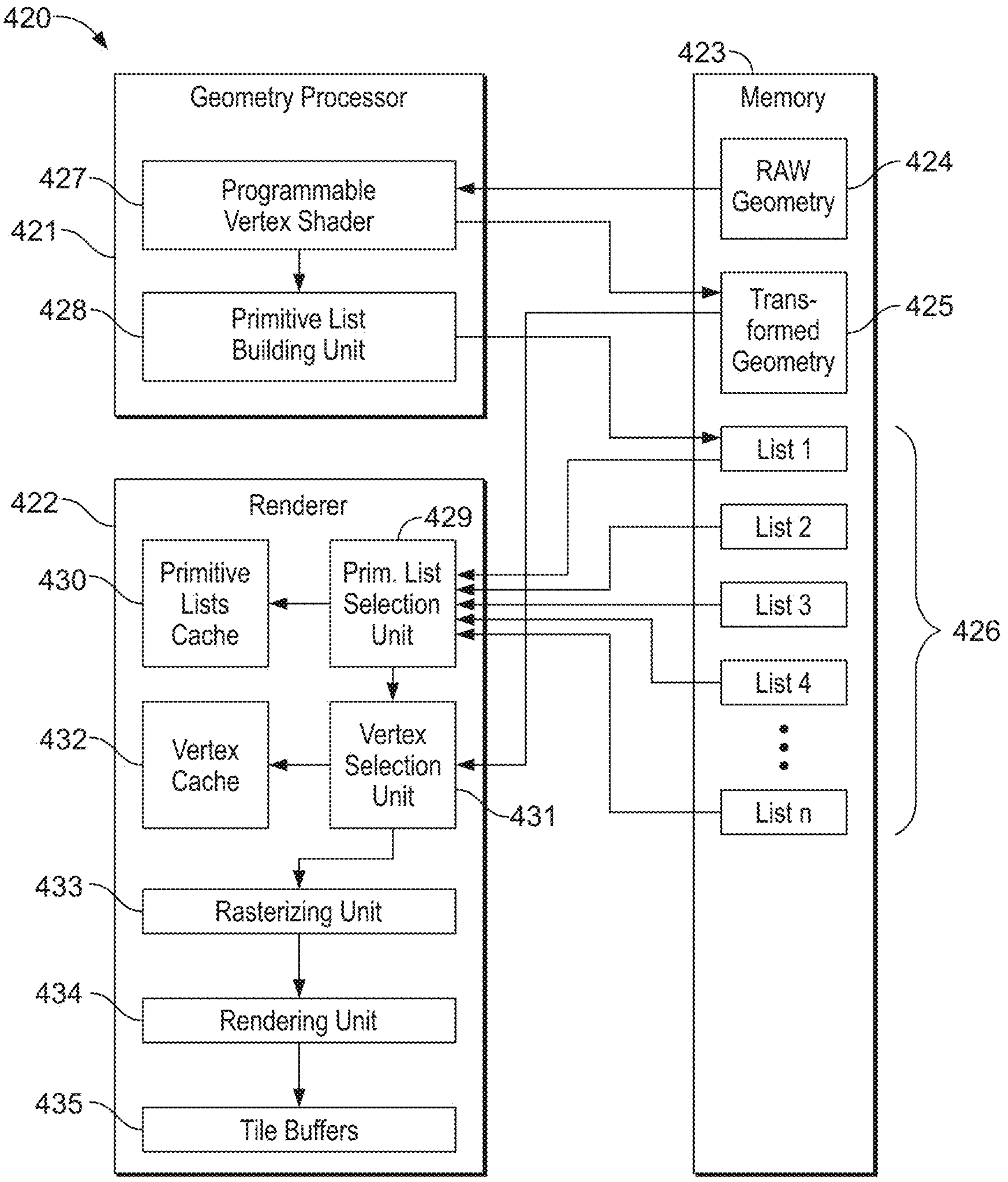
FIG. 4 and FIG. 5 schematically illustrate the operation of a traditional tile-based graphics processing system.

FIG. 4 shows schematically a graphics processor 420 that is configured to perform such tile-based rendering. The graphics processor 420 includes a geometry processor 421, and a renderer 422, both of which can access a memory 423. The memory 423 may be "on-chip" with the geometry processor 421 and renderer 422, or may be an external memory that can be accessed by the geometry processor 421 and renderer 422.

The memory 423 stores, among other things, and as shown in FIG. 4, a set of raw geometry data 424 (which is, for example, provided by the graphics processor driver or an API running on a host system (microprocessor) of the graphics processor 420), a set of transformed geometry data 425 (which is the result of various transformation and processing operations carried out on the raw geometry 424), and a set of primitive lists 426. The transformed geometry data 425 comprises, for example, transformed vertices (vertex data), etc.

The geometry processor 421 comprises, among other things, a programmable vertex shader 427, and a primitive list building unit 428. The programmable vertex shader 427 takes as it's input the raw geometry data 424 stored in the memory 423, and processes that data to provide transformed geometry data 425 (which it then stores in the memory 423) comprising the geometry data in a form that is ready for two-dimensional ('2D') placement in the frame to be displayed. The programmable vertex shader 427 and the processes it carries out can take any suitable form and be any suitable and desired such processes.

The primitive list building unit 428 carries out the tiling and primitive list preparation processes of allocating the primitives (or draw calls of primitives) to the primitive lists which are then used by the renderer 422 to identify the primitives (draw calls) that should be rendered for each sub-region of the scene to be rendered (and includes suitable circuitry for doing this). To do this, the primitive list building unit 428 takes as its input the transformed and processed vertex data from the programmable vertex shader 427 (i.e. the positions of the graphics object in the scene), builds primitive lists using that data, and stores those lists as the primitive lists 426 in the memory 423.

The renderer 422 includes a primitive list selection unit 429, a primitive list cache 430, a vertex selection unit 431, a vertex data cache 432, a rasterising unit 433, a rendering unit 434, and tile buffers 435.

The rasterising unit 433, rendering unit 434, tile buffers 435 operate, in this embodiment, in the same manner as such units normally operate in graphics processing systems. Thus the rasterising unit 433 takes as its input a primitive and its vertices, rasterises the primitive to fragments, and provides those fragments to the rendering unit 434. The rendering unit 434 then performs a number of rendering processes, such as texture mapping, blending, shading, etc., on the fragments, and generates rendered fragment data which it stores in the tile buffers 435 for providing to a frame buffer for display.

The primitive list selection unit 429 of the renderer 422 determines which primitive (or, e.g., which draw call, where primitives are batched together into draw calls), is to be rendered next. It does this by considering the primitive lists 426 stored in the memory 423, and selecting from one of those lists the next graphics object (e.g. primitive, or draw call) to be rendered.

The primitive list selection unit 429 provides the primitive that it has selected for rendering next to the vertex selection unit 431. In response to this, the vertex selection unit 431 obtains the relevant vertex data for the primitive in question, and then provides the primitive (i.e. its transformed vertex data) to the rasterising unit 433 for processing. The obtaining of the vertex data can be done in various ways as desired. For example, in some embodiments, the vertex selection unit 431 retrieves the appropriate transformed vertex data for the primitive in question from the transformed geometry data 425 stored in the memory 423. In that case, the transformed vertex data may be generated up-front by the programmable vertex shader 427 of the geometry processor 421 and then stored appropriately for subsequent use by the renderer 422. In other embodiments however the vertex selection unit 431 may itself trigger vertex shading. That is, in embodiments, as will be described further below, the renderer 422 may also comprise a programmable vertex shader (not shown in FIG. 4) that is operable to take as it's input the raw geometry data 424 stored in the memory 423, and processes that data to provide transformed geometry data, as desired. That is, in some embodiments, some or all of the vertex shading may be performed by the renderer 422. Various arrangements are contemplated in this regard.

The vertex selection unit 431 can cache vertex data that it has retrieved from the memory 423 in the vertex data cache 432, if desired. The primitive list selection unit 429 can also place one or more primitive lists in the primitive list cache 430. For example, the primitive list cache 430 and the vertex data cache 432 may comprise local memory provided on the renderer 422 that can be more rapidly accessed by processing units of the renderer (and in particular the primitive list selection unit 429 and vertex selection unit 431, respectively) than the main memory 423.

Figure 5:
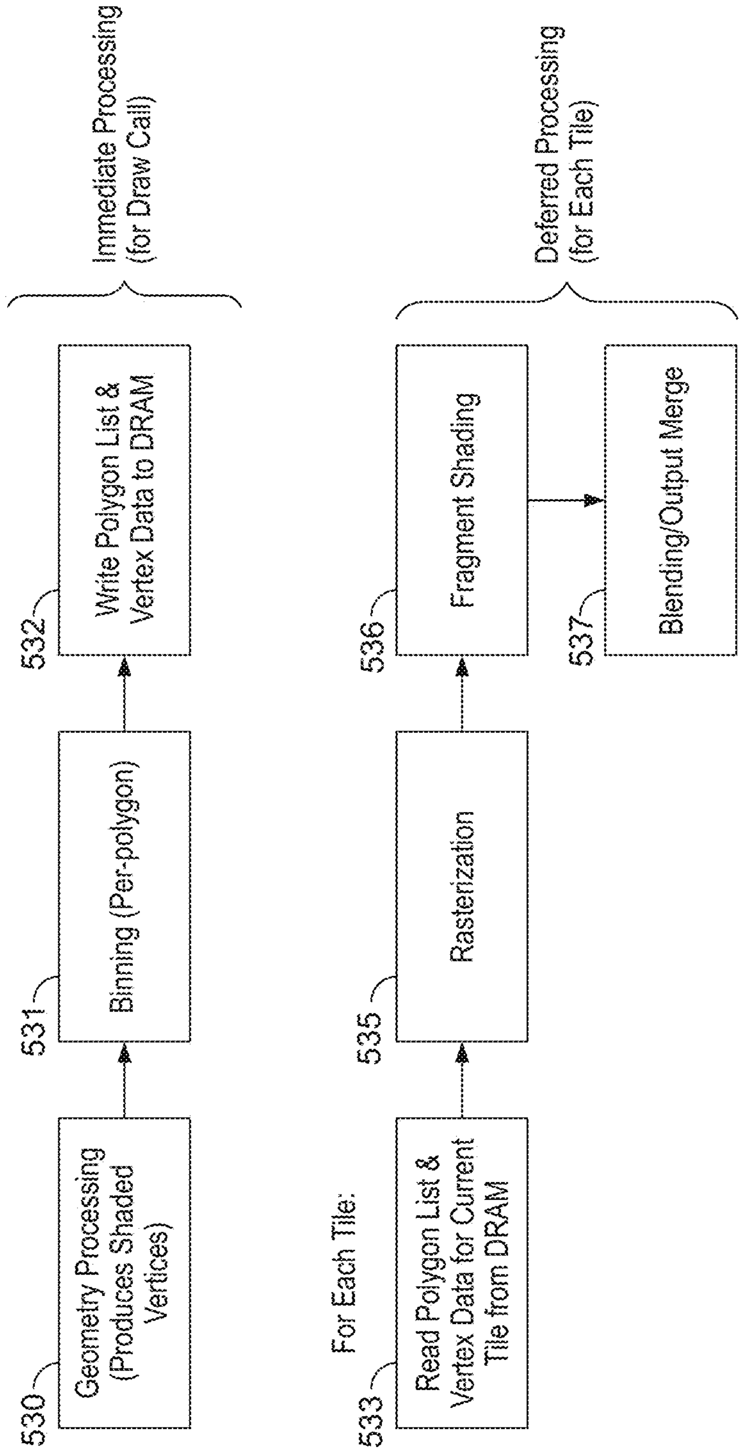

In the tile-based rendering scheme described above, a first processing stage (that is performed by the geometry processor 421) thus acts to process, e.g. sort, all of the geometry for the render output, to generate a set of primitive lists identifying which primitives should be rendered for which regions of the render output. The rendering of the individual tiles is then performed in a second processing stage (in the renderer 422). Thus, for each rendering tile, it is determined from the respective tile list(s) which primitives should be processed for that tile, and the associated transformed geometry data for those primitives is obtained, and subjected to further graphics processing to generate the desired, final rendered output data. As shown in FIG. 5, the rendering is performed using a tile buffer 435 that resides locally to the renderer 422, e.g. in on-chip memory. Thus, the rendering of a given tile is performed locally to the graphics processor. Once the rendering for the tile has complete, the rendered data is then written out to the memory 423, e.g. into a frame buffer, e.g. for display. The overall processing flow in a tile-based rendering scheme is shown, for example, in FIG. 5.

As shown in FIG. 5, in the first ("immediate") processing stage, all of the geometry-related processing for the primitives is performed (step 530), to produce a set of shaded vertices for the primitives, and a tiling operation (step 531) is then performed for the primitives to generate the primitive lists, which are then written back to the external memory, together with the shaded vertex data (step 532). This data is then used in a second ("deferred") processing stage during which the render output is generated by rasterising/rendering the polygons using their associated geometry. Thus, as shown in FIG. 5, the second processing stage involves reading in the primitive list and vertex data for the current tile (step 533), and then performing the desired rendering operations to determine the desired rendered output data.

The second processing (rendering) stage thus uses the primitive lists generated by the first processing stage to identify which primitives should be rendered for which tiles, and the individual tiles are then rendered (separately), e.g. one-after-another. Thus, when rendering a tile, the vertex data for the primitives to be rendered for that tile is obtained (which may involve obtaining the transformed geometry 425 from memory 423 but may also involve re-shading the raw vertex data 424, and various arrangements are possible in this regard for performing some or all of the geometry processing during the second processing stage). The shaded vertices for the primitives indicated to be processed for the tile are then rasterised into respective sets of fragments (step 535), and fragment shading operations are performed on the resulting fragments (step 536). Finally, the shaded fragments are subject to a blending operation (step 537), and any other such operations (such as downsampling, etc.) and the blended fragment values are then written into a suitable frame buffer, e.g. for display.

The present embodiments relate particularly to the rendering operations performed by the second ("deferred") processing stage within a tile-based rendering system. It will be appreciated that the rendering operations are triggered by the graphics processor receiving and processing a command to render a tile. For example, as described above in relation to FIG. 1 and FIG. 2, the graphics processor 3 is controlled to perform graphics processing work for an application 2 executing on a host processor 1 by a driver 4 for the graphics processor 3 preparing a command stream including commands to cause the graphics processing to perform the desired graphics processing work.

The commands prepared by the driver 4 are thus processed by the command stream frontend 20 accordingly to schedule processing work for the graphics processor's functional units. This is illustrated, for example, in FIG. 6.

Figure 6:
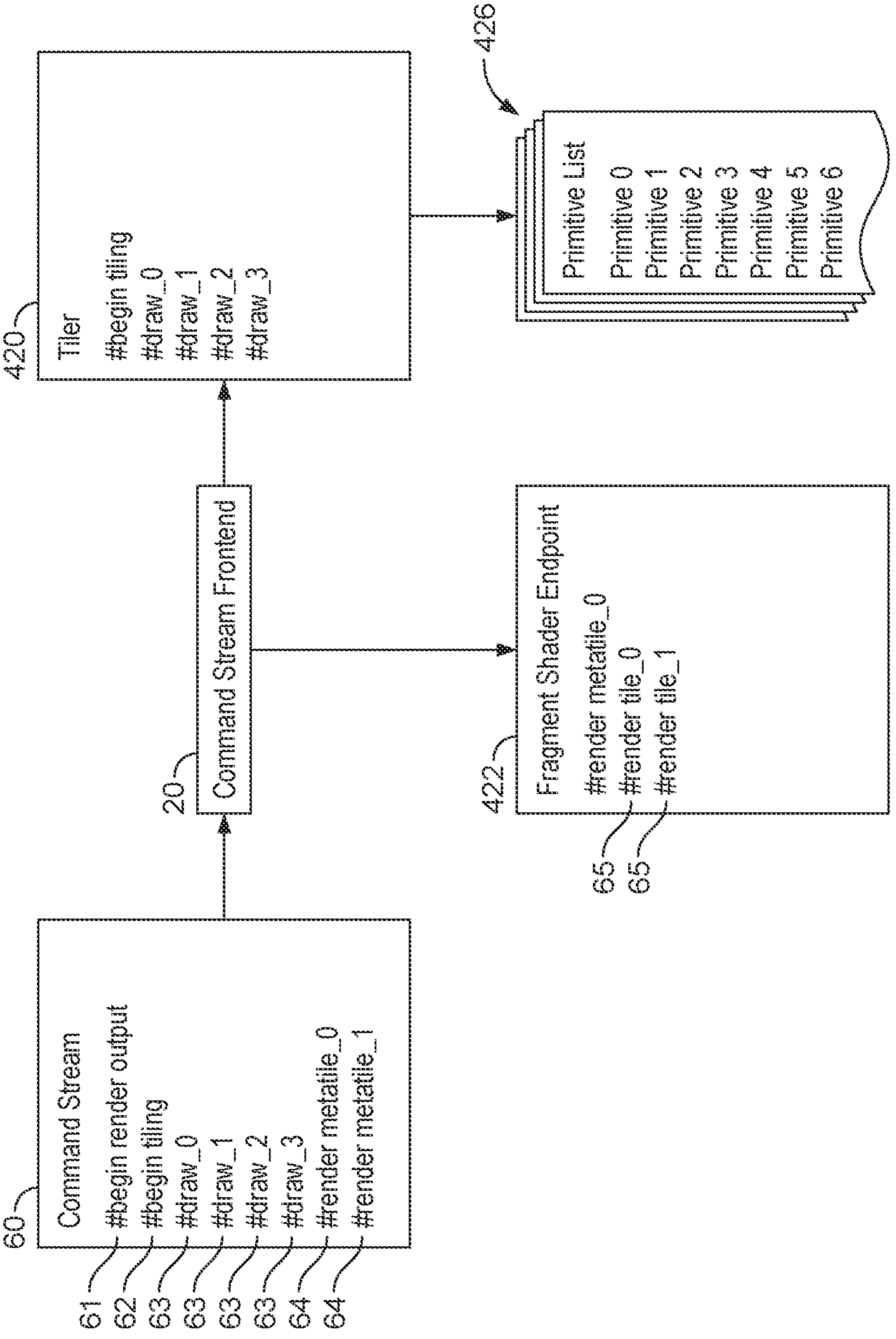
FIG. 6 schematically illustrates a command stream for causing a graphics processor to perform tile-based rendering.

FIG. 6 shows schematically an example command stream 60 for causing a graphics processor to perform tile-based rendering in the manner described above. The command stream thus starts with a suitable "begin render output" command 61 that initialises the graphics processor for the current render output (e.g. scene). This is then followed in the command stream 60 by a "begin tiling" command 62 that when executed causes the graphics processor to perform the up-front geometry processing (e.g. tiling) operations for the render output. This is then followed by a sequence of respective draw commands 63 defining the geometry for the render output that is to be processed. These draw commands are thus processed by the command stream frontend 20 to trigger the geometry processor 420 to perform the required vertex shading and primitive list building operations described above.

The result of this processing is therefore to generate a set of primitive lists which each include a respective list of primitive commands corresponding to the primitives that it has been determined should be rendered for the region(s) of the render output for which the primitive list has been prepared for. As described above, once all of the geometry has been processed and the respective primitives lists generated, the initial geometry processing operation is then complete.

The commands 62, 63 relating to the initial geometry processing operations are accordingly then followed by respective commands 64 to trigger the subsequent rendering operations. In the example shown in FIG. 6 the commands prepared by the driver 4 include commands 64 to render larger area regions ("metatiles") of the render output including groups of rendering tiles (i.e. the regions into which the render output is subdivided for rendering purposes). These metatile commands 64 are then passed to the graphics processor fragment shader endpoint that splits the metatile commands into respective processing tasks for the respective rendering tiles 65. The fragment shader endpoint then controls the scheduling and issuing of tasks 65 (e.g. for rendering tiles) to the renderer 422 for rendering. The processing of a metatile command by the command stream frontend 20 thus triggers the scheduling of one or more tile rendering tasks by the fragment shader endpoint. The fragment shader endpoint will then issue the tile rendering tasks to the renderer 422 in turn, which will trigger a sequence of processing (rendering) operations to be performed for the tile, as will be described further below.

Various other arrangements would however be possible in this regard. For example, rather than the driver 4 preparing commands relating to larger processing jobs ("metatiles") that are then split into smaller processing task (tiles) by the fragment shader endpoint, the command stream that is provided by the driver 4 to the command stream frontend 20 may itself include commands to render individual rendering tiles, such that the fragment shader endpoint schedules such tasks accordingly, but does not divide the overall processing job (metatile) into separate tiles for rendering purposes. In that case, the rendering operations (for a tile) may be triggered directly by the commands that are prepared by the driver 4.

It will also be appreciated that FIG. 6 shows a simplified command stream for illustrative purposes and that a typical graphics processing command stream may include many more commands and different types of commands to those shown in FIG. 6. Various arrangements would be possible in this regard.

In any event, in response to the graphics processor command stream frontend 20 encountering an appropriate rendering command (whether that be a command to render a metatile that launches a plurality of tile rendering tasks, or a command to render a tile as such), this ultimately triggers the rendering of a tile, in which the renderer 422 is caused to perform a desired sequence of processing operations in order to render the tile. The rendering command therefore triggers the renderer 422 to automatically perform a certain sequence of processing operations to generate the desired rendered output data for the tile in question. In particular, in response to such command, the renderer 422 may be (and ultimately is) caused to obtain via the primitive list selection unit 429 the primitive list or lists for the tile in question to identify the primitives to be rendered, obtain the relevant vertex data for the primitives, and then rasterise and render the primitives accordingly, e.g. as described above.

In the present embodiments however, rather than the rendering command triggering a rendering operation in which primitives are rasterised and then rendered in full (as necessary) in a single rendering pass, e.g., as in the second processing stage depicted in FIG. 5, a novel "pre-pass" operation is introduced into the processing operations that are automatically performed in response to the rendering command, such that the rendering of primitives for a (and each) tile is effectively divided into two separate processing passes (although in some cases there may be more than two processing passes, in particular when a third, "fallback" operation is triggered during the rendering of a tile, as will be explained further below). In the present embodiments, the fragment shader endpoint when scheduling the rendering of a tile is accordingly configured to split the rendering of a tile into two processing passes, such that the same tile is effectively issued for rendering twice, but with the graphics processor configured to perform different sequences of processing operations for the respective, different processing passes.

In particular, and as will be explained further below, when rendering a sequence of primitives for a tile (which sequence of primitives may be the entire sequence of primitives for the tile, or may be a draw call for the tile, for example), the processing of primitives in the sequence of primitives is performed in two passes whereby a first, "pre-pass" operation is initially performed to process the primitives to determine a set of "visibility" information for the sequence of primitives, and which first, pre-pass operation is followed by a subsequent, "main" pass operation that processes at least some of the primitives that were processed by the corresponding first, pre-pass operation again to complete their rendering and produce the final rendered output data (e.g. to determine the appearance (e.g. colour) that the respective sampling positions covered by the primitives should have in the final render output). Thus, for a given tile to be rendered, the fragment shader endpoint will schedule respective tasks for the renderer 422 to perform a first, "pre-pass" operation and to then perform a corresponding "main" pass operation.

According to the present embodiments, the first, pre-pass operation therefore does not produce any rendered output data, but instead serves only to determine a set of "visibility" information for the sequence of primitive. As will be explained further below, the "visibility" information can take various suitable forms but generally reflects whether or not a given fragment for a primitive in the sequence of primitives is visible (and hence whether or not the fragment should be processed further for the render output). The visibility information determined by the first, pre-pass operation can thus be (and is) subsequently used during the corresponding second, main pass operation in order to control the processing of fragments during the second, main pass, e.g., and in particular, to cull any fragments for which it can be determined from the visibility information that the fragments have no visible effects, and therefore do not need to be processed further. This then has various benefits in terms of providing improved, e.g. sample-perfect, hidden surface removal as will be explained further below. In particular, because the first, pre-pass operation is operable to process the sequence of primitives up-front to determine the "visibility" information for the entire sequence of primitives, this then means that when the same sequence of primitives is processed again during the second, main pass operation, the processing of the primitives in the second, main pass operation can be controlled accordingly based on the determined "visibility" information such that at each sampling position, only the primitive (or primitives) that need to be processed further for that sampling position are processed further.

Figure 7:
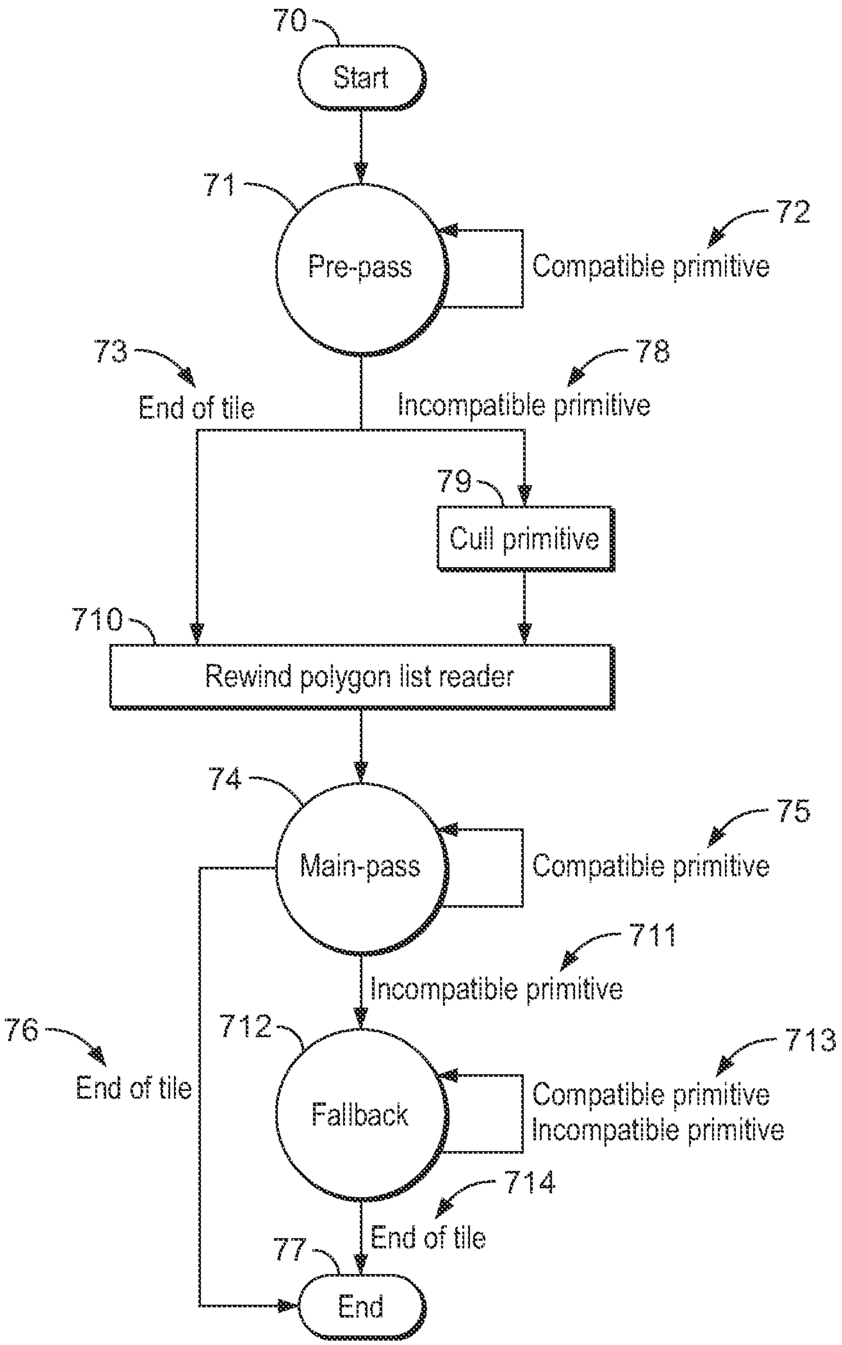
FIG. 7 schematically illustrates a rendering operation according to an embodiment in which a novel "pre-pass" operation is introduced such that primitives are effectively rendered in two processing passes.

FIG. 7 is a state diagram illustrating the rendering operation that is performed for an individual rendering tile according to an embodiment of the technology described herein. As mentioned above, the rendering operation is triggered by the graphics processor encountering an appropriate command to render the tile and the fragment shader endpoint scheduling the corresponding rendering passes in response to such command. The rendering operation is then performed automatically, and under hardware control, with the graphics processor transitioning between different respective "states" (wherein the graphics processor is configured in a respective state to perform a respective corresponding processing operation) according to the state diagram shown in FIG. 7, as will be explained further below.

Thus, in response to a suitable such command (step 70—start), the graphics processor in the present embodiment is caused to automatically perform the rendering operation shown in FIG. 7, in particular by the fragment shader endpoint scheduling an appropriate task to perform the first, pre-pass operation for the tile in question. The graphics processor at this point is therefore configured in the "pre-pass" state. The rendering operation accordingly starts by processing primitives that are identified to be rendered for the tile by the first, pre-pass operation in order to generate the desired "visibility" information for the sequence of primitives (tile) (step 71). The first, pre-pass operation may generally comprise any suitable sequence of processing operations, depending on the desired format of the "visibility" information. Various different examples of how the first, pre-pass operation may be configured will be described below but FIG. 8 illustrates the processing operations (the graphics processing pipeline) according to the first, pre-pass operation in a first example in which the determined visibility information comprises a depth buffer for the sequence of primitives (tile).

Figure 8:
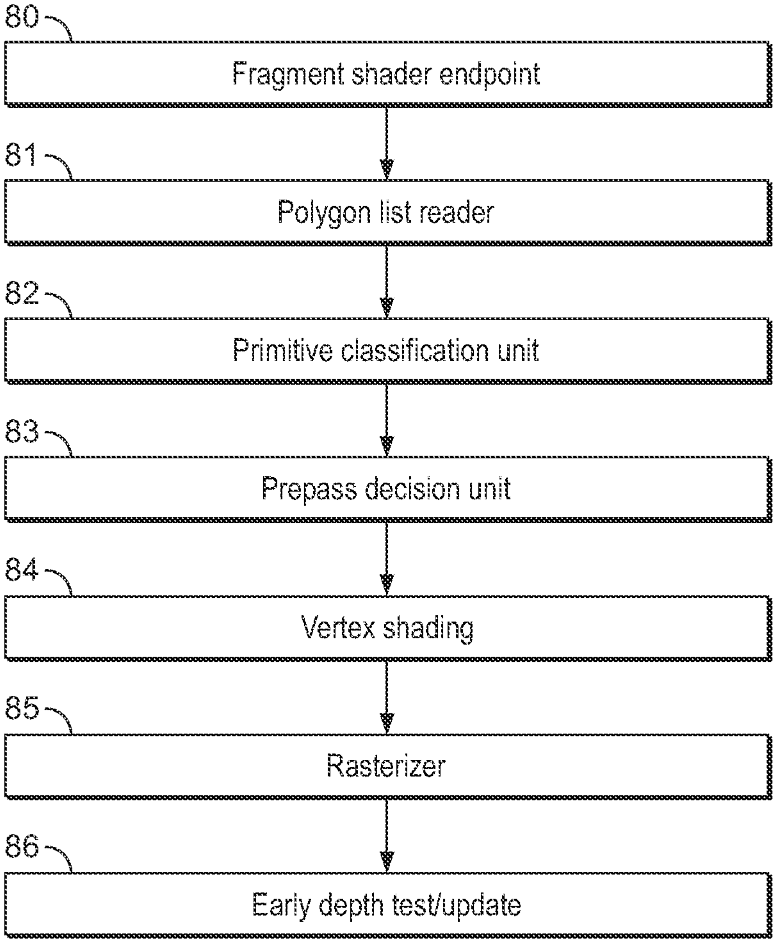
FIG. 8 shows schematically a sequence of processing operations for a pre-pass operation according to a first example.

In the first example as shown in FIG. 8, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (e.g. shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

Accordingly, when the fragment shader endpoint 80 issues a tile for rendering, the primitive list reader (polygon list reader 81) issues primitives in the sequence of primitives in turn to the graphics processor for processing by the first, pre-pass operation. The primitive are then processed by the processing stages shown in FIG. 8 accordingly in order to determine the desired "visibility" information. In this first example, the "visibility" information comprises the depth buffer. Thus, the primitives are processed up to and including the (early) depth test/update stage 86 but in this example are not processed further (such that there is no fragment shading, for example, during the first, pre-pass operation). In this first example, once the depth buffer has been updated (if necessary), the pre-pass processing of a primitive stops at that point, and the next primitive in the sequence is processed accordingly.

So long as the primitives in the sequence of primitives being processed are compatible with being processed by the first, pre-pass operation (which can be (and is) determined by the primitive classification unit 82, as will be explained in further detail below), the first, pre-pass operation works through the primitives in the sequence of primitives (step 72), processing the primitives accordingly to update the depth buffer for the sequence of primitives, until the first, pre-pass operation reaches the end of the sequence (the end of the tile) (step 73) (or until the first, pre-pass operation is otherwise stopped).

Once the first, pre-pass operation has finished (or is stopped), and the depth buffer (visibility information) for the sequence of primitives determined, at that point, the second, main pass operation should be initiated (step 74). The graphics processor should thus be (and is) switched at this point into a "main pass" state. As mentioned above, the second, main pass operation is performed to process again at least some primitives that were processed by the first, pre-pass operation (step 71) in order to generate the final, desired rendered output data. Thus, at the end of the first, pre-pass operation, the primitive list reader (polygon list reader 81) is in an embodiment "re-wound" to the start of the sequence of primitives (step 710) ready for the corresponding second, main pass. The fragment shader endpoint 80 then issues a corresponding task for the second, main pass operation to be performed. Thus, in response to the respective task for the second, main pass operation, the graphics processor is caused to transition into the "main pass" state, and the sequence of primitives is then re-issued, from the start, for processing by the second, main pass operation. The second, main pass operation thus works through the primitives in the sequence of primitives (again) accordingly to produce the desired rendered output data, e.g. by rasterising the primitives again into their respective fragments, and then completing the rendering of the fragments. However, when performing the second, main pass, the graphics processor uses the visibility information generated by the first, pre-pass operation to cull fragments when it is possible to do. For example, as will be explained further below, after rasterising a primitive into its respective fragments, the second, main pass then performs a fragment visibility test using the visibility information to determine whether or not the fragments need to be processed further. Any fragments that fail the fragment visibility test can therefore be culled accordingly, such that further processing of those fragments is avoided.

Figure 9:
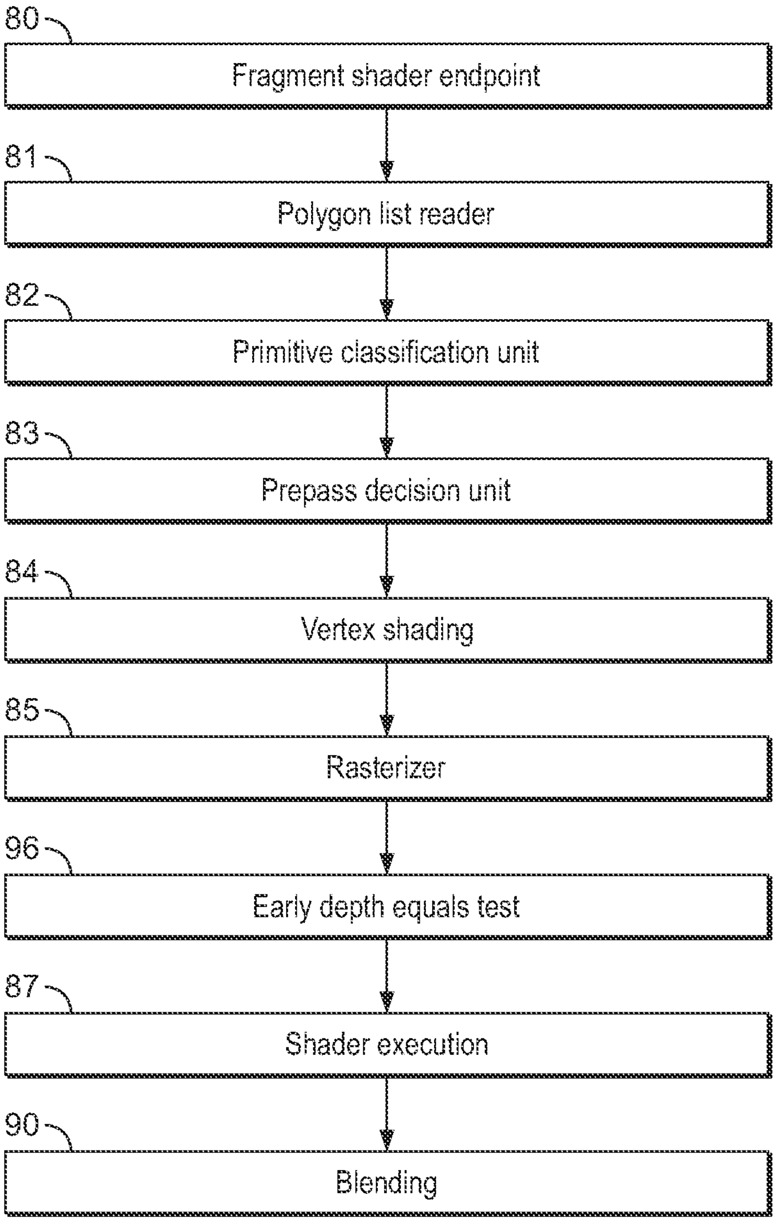
FIG. 9 shows schematically a sequence of processing operations for a corresponding main pass operation to be performed after the pre-pass operation shown in FIG. 8.

FIG. 9 illustrates the corresponding processing operations performed according to the second, main pass operation in this first example. As shown in FIG. 9, the second, main pass operation comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation also performs depth testing of the fragments. However, depth buffer writes are disabled for the depth testing that is performed during the second, main pass operation such that the second, main pass operation does not update the depth buffer. Instead, as shown in FIG. 9, in this example, the depth test function is modified for the depth testing in the second, main pass operation such that the depth testing comprises an 'equals' test. The early depth equals test 96 accordingly tests whether or not the depth value for the fragment being tested matches the depth value stored in the depth buffer for the corresponding sampling position. Thus, if the fragment has the same depth value as that stored in the depth buffer, the fragment survives the early depth equals test 96, and is therefore further processed by executing a fragment shader 87, and then performing blending 90, etc., to generate the final rendered output data. On the other hand, if the fragment's depth value does not match the depth value stored in the depth buffer, such that the fragment fails the early depth equals test 96, the fragment can be (and is culled) at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

The result of the second, main pass operation is thus to produce the desired, final rendered output data for the tile. This can then be written out accordingly from the tile buffer, e.g. to a frame buffer, e.g. for display.

Again, so long as the primitives are compatible with being processed in this way, the primitives in the sequence of primitives are processed in turn by the second, main pass (step 75) until all of the primitives in the sequence have been processed (e.g. the end of the tile is reached) (step 76), at which point the rendering of the tile is completed (step 77—end).

That is, so long as the primitives are compatible with being processed in the two-stage manner described above, the primitives are processed in this way, such that the same primitive is subject to both the first, pre-pass operation and to the second, main pass operation. However, there are certain types of primitives that have one or more properties that mean that they cannot be safely processed in this manner. There are various reasons why this might be the case, as will be discussed further below, but generally this will be because dividing the processing into two separate passes may introduce artefacts to the final rendered output data.

As shown in FIG. 7, the graphics processor is in the present embodiment also therefore operable in a third, "fallback" operation. The third, fallback operation can be (and is) triggered by the first, pre-pass operation encountering an 'incompatible' primitive, i.e. a primitive for which it has been determined that the primitive cannot safely be processed using the pre-pass operation. In that case, to ensure continued safe processing of the sequence of primitives, the graphics processor may switch to a third, fallback operation in which primitives are processed in a 'fail-safe' manner. This is particularly important as the rendering in the technology described herein is performed under hardware control, and the graphics processor should therefore be (and in the present embodiment is) capable of 'safely' handling all different types of primitives that an application may specify to be rendered, i.e. without potentially introducing artefacts. The switching to the third, fallback operation in the present embodiments may be (and is) triggered and controlled by the pre-pass decision unit 83 based on the output from the primitive classification unit 82, as will now be explained further.

For instance, as mentioned above, the first, pre-pass operation shown in FIG. 8 (and the second, main pass operation shown in FIG. 9) includes a primitive classification unit 82 and pre-pass decision unit 83. The primitive classification unit 82 is able to identify whether the current primitive is compatible or not with the pre-pass operation. The pre-pass decision unit 83 is then able to determine how the processing should proceed. For example, in the case that the primitive classification unit 82 identifies that a primitive is incompatible with being processed by the first, pre-pass operation (step 78 in FIG. 7), the pre-pass decision unit 83 causes the first, pre-pass operation to be stopped at that point (and the incompatible primitive is culled for the first, pre-pass operation—step 79—such that it can subsequently be processed instead by the third, fallback operation).

When the first, pre-pass operation is stopped due to an incompatible primitive, at this point, the primitive list reader (polygon list reader 81) is again "re-wound" to the start of the sequence of primitives (step 710), and the second, main pass operation is then performed to complete the rendering operation for primitives in the sequence of primitives up to the primitive immediately before the incompatible primitive (step 74). That is, rather than immediately aborting the pre-pass operation to perform the third, fallback operation, the graphics processor is first switched to the second, main pass operation to complete the rendering of the primitives that have been processed so far by the first, pre-pass operation. When the second, main pass operation reaches the incompatible primitive, the primitive classification unit 82 in the second, main pass operation will accordingly identify again that the primitive is incompatible (step 711), and the pre-pass decision unit 83 will accordingly cause the second, main pass operation to be stopped at that point. The graphics processor is then switched to the third, fallback operation to process the incompatible primitive (step 712) (and in this example the graphics processor then continues processing primitives by the third, fallback operation until the end of the tile (step 714)).

Figure 10:
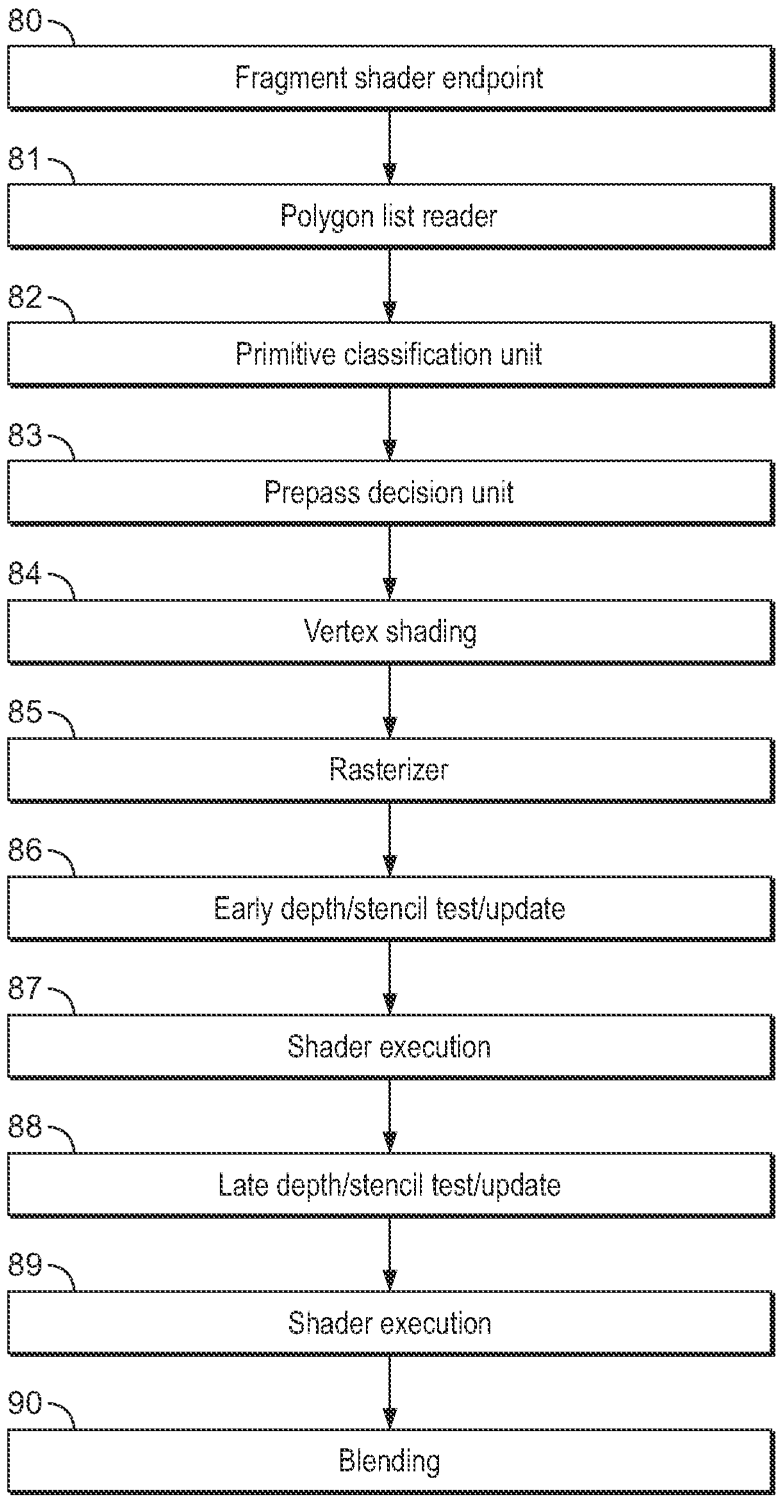
FIG. 10 shows schematically a sequence of processing operations for a fallback operation in which primitives are processed in a fail-safe manner.

FIG. 10 illustrates the processing operations according to the third, fallback operation in the first example. In the example shown in FIG. 10, the third, fallback operation thus comprises a pipelined sequence of processing operations including: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output. In the third, fallback operation, after rasterisation, the fragments are then subject to an early depth (and optionally (early) stencil) test/update 86, e.g. as in the first, pre-pass operation, but the processing then continues by executing a fragment shader 87 for any fragments that survive the early depth test/update 86, performing a late depth (stencil) test/update 88, and then executing a final fragment shader 89, and performing blending 90, etc., for any remaining fragments to generate the desired rendered output data. Note that in FIG. 10 the early depth test/update 86 and late depth test/update 88 also perform corresponding (early/late) stencil test/updates. That is, in this example, stencilling is disabled during the first, pre-pass and second, main pass operations but is active in the third, fallback operation.

Accordingly, as shown in FIG. 10, the third, fallback operation processes primitives in 'full' in a single rendering pass, e.g., similarly to the normal rendering operations within a traditional tile-based rendering system (e.g. as shown in FIG. 5). The third, fallback operation thus allows primitives to be processed in a 'fail-safe' manner. This then ensures that the sequence of primitives can continue to be processed to generate the desired rendered output data even if there are some primitives that cannot be processed in this way. This is beneficial in ensuring an improved, safer hardware implementation that is able to handle all different types of primitives (and primitive properties) that may be encountered, e.g. by falling back if necessary to processing in such 'fail-safe' manner (at the cost of hidden surface removal efficiency). In the example shown in FIG. 7, the remaining primitives in the sequence of primitives are then all processed by the third, fallback operation (step 713) until all of the primitives for the tile have been processed. (It is also contemplated however that in some embodiments the graphics processor may attempt to switch back from the third, fallback operation to the first, pre-pass operation within a sequence of primitives for a tile when it is possible to do so. This will be explained further below in relation to FIG. 73.)

At that point, once of the primitives to be rendered for the tile have been processed accordingly to generate the final rendered output data (with some of the primitives, i.e. the primitives that were before the incompatible primitive in the sequence of primitives having been processed by the pre/main pass operations, and others of the primitives, i.e. the incompatible primitive, and any following primitives in the sequence of primitives, processed by the third, fallback operation) (step 714) and the rendering of the sequence of primitives (for the tile) is completed (step 77—end).

Once the rendering of the sequence of primitives (e.g. for the current tile) is completed (step 77—end), assuming there are further sequences of primitive (tiles) to be rendered, the fragment shader endpoint 80 can then (and does) schedule the next sequence of primitives for rendering accordingly. For example, the fragment shader endpoint 80 at this point may issue respective processing tasks for rendering the next tile that is to be rendered (although the next sequence of primitives to be rendered could also, e.g., be another draw call for the current tile).

The next sequence of primitives to be rendered is then processed in the same manner described above in relation to FIG. 7, e.g. by initiating a new pre-pass operation and then subsequently controlling the state of the graphics processor as necessary to render the primitives. In this respect, it will be appreciated that even in the event that a tile does contain an incompatible primitive, such that the graphics processor has to revert to the third, fallback operation for that tile, this may only affect that tile, and the rendering operation for the next tile can re-start with a new pre-pass operation. Thus, hidden surface removal efficiency is only temporarily lost in the event that an incompatible primitive is encountered, and the improved hidden surface removal can be resumed for the next tile. Of course if the or another incompatible primitive is encountered during the rendering of that tile, the third, fallback operation will again be triggered in the same way, but at least for tiles that do not contain any incompatible primitives, and for those tiles it is possible therefore to achieve sample-perfect hidden surface removal using the novel pre-pass operation of the present embodiment.

The "in-tile" pre-pass operation of the present embodiment can therefore provide significant improvement in hidden surface removal, and can thus improve the overall graphics processing operation.

Figure 11:
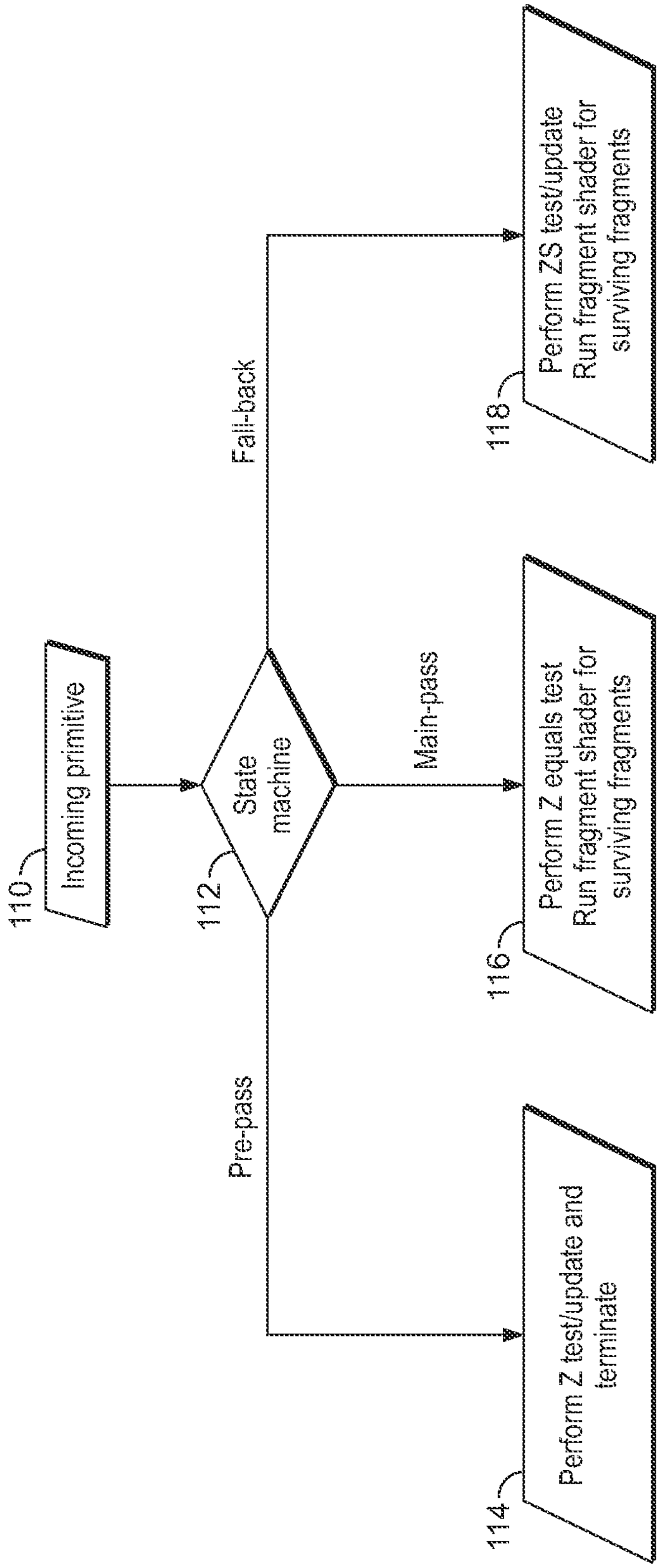
FIG. 11 shows schematically a state machine for a graphics processor operating according to the first example

It will be appreciated from the description above that the first, pre-pass, second, main pass and third, fallback operations described above are in an embodiment performed using the same graphics processing pipeline but with different stages enabled/disabled appropriately. Thus, the fragment shader endpoint 80 may be configured to issue the same sequence of primitives rendering multiple times, but with the processing operations that are performed for each pass effectively being modulated according to the state of the graphics processor, with different processing stages 'active' for the different configurations of the graphics processor. The fragment shader endpoint 80 can thus indicate to the graphics processing pipeline which type of task is being performed and the graphics processing pipeline can then be configured (or re-configured) accordingly to perform the desired processing operation. This is illustrated, for example, in FIG. 11. FIG. 11 thus illustrates a state machine 112 showing, for an incoming primitive 110 to be processed, how the primitive 110 is processed differently according to the different possible states of the graphics processor in this first example.

For example, when the graphics processor is performing the first, pre-pass operation (i.e. the graphics processor is configured in the pre-pass state 114), the primitive is accordingly processed in the manner described above with the graphics processing pipeline configured as shown in FIG. 8, with (only) those processing stages 'active', such that the primitive is processed by the graphics processing pipeline up to and including the depth testing/updating of the depth buffer, but the processing of the primitive finishes at that point, without performing further processing. Correspondingly, when the graphics processor is performing the second, main pass operation (i.e. the graphics processor is configured in the main pass state 116), the (same) primitive is processed again but with the graphics processing pipeline configured as shown in FIG. 9, in the main pass stage, with a different set of processing stages 'active'. Thus, during the second, main pass operation, as described above, the (same) primitive may be processed again up to the depth testing, but the depth testing is now modified to perform an equals test, and the fragment shader and blending stages are additionally active such that a fragment shader is then executed, and blending is performed, for fragments that survive the depth equals test, to thereby produce the final rendered output data.

On the other hand, in the third, fallback operation (state 118), the primitive is processed with the graphics processing pipeline configured as shown in FIG. 10. In this case, the primitive undergoes depth (and optionally stencil) testing with any fragments that survive the early/late depth testing being shaded accordingly, e.g. in the normal manner for depth (stencil) testing. For example, in the fallback state, all of the graphics processing pipeline stages may be 'active' such primitives are processed in full in a single processing pass.

Example 1—Primitive Classification

As mentioned above, the determination as to whether or not a primitive is compatible with being processed by the pre-pass operation (and hence the possible triggering of the third, fallback operation, when needed) is performed based on a primitive "classification". In general, there are various reasons why a primitive may not be compatible with being processed by the pre-pass operation, depending on exactly how the pre-pass operation is configured. The primitive classification can thus be performed by checking various conditions associated with the primitive (or properties of the primitive) to determine whether the primitive is or is not compatible with the pre-pass operation.

Figure 12:
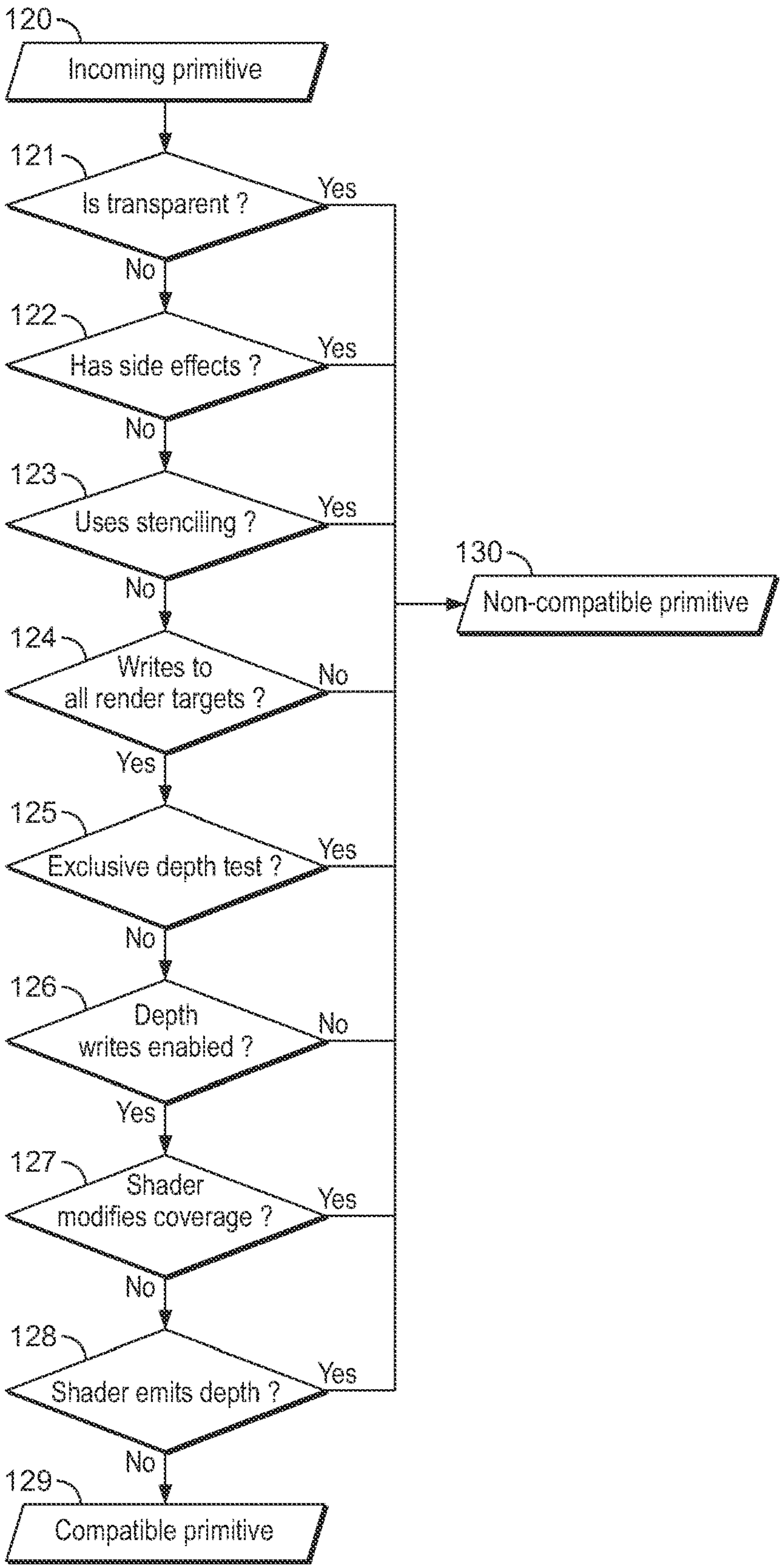
FIG. 12 illustrates a primitive classification process according to the first example.

FIG. 12 shows an example primitive classification process for the first example described above in which the pre-pass operation is configured as shown in FIG. 8 and the corresponding main pass operation is configured as shown in FIG. 9. In this example, as mentioned above, the pre-pass operation populates a depth buffer, and the second, main pass operation then performs 'equals' depth testing against the depth buffer, with only primitives that survive the equals depth testing being further processed by the second, main pass operation.

In this example, for an incoming primitive 120 to be classified, the conditions that are checked to determine whether a primitive is (potentially) incompatible with the pre-pass operation in this example include the following conditions;

1) The primitive is transparent (step 121)—since transparent primitives will typically not update the depth buffer and so would be incorrectly culled by the depth equals test during the main pass shown in FIG. 9;
2) The primitive has side effects (step 122)—since any primitives with side effects should generally only be processed once;
3) The primitives uses stencilling (step 123);
4) The primitive doesn't write to all render targets (step 124);

5) The primitive uses an exclusive depth test during the first, pre-pass operation (such as a ‘greater than’ test rather than a ‘greater than or equals’ depth test) (step 125);
6) The primitive does not write depth (step 126);
7) A fragment shader is required to determine the primitive coverage (in other words the fragment shader potentially modifies the coverage) (step 127); or
8) A fragment shader is required to determine the depth value (in other words the fragment shader emits a depth value) (step 128).

As shown in FIG. 12, the primitive classification process in this first example thus comprises checking each of the conditions listed above in order to determine whether or not the primitive is compatible, and only if none of the conditions are satisfied is the primitive identified as being compatible with the pre-pass (step 129). That is, in this example, with the pre-pass operation configured as described above, if any of the above conditions are satisfied, the primitive is identified as being incompatible with the pre-pass (step 130), and is handled accordingly (i.e. by causing the graphics processor to switch to the third, fallback operation to process that primitive).

The result of the primitive classification process is therefore to identify whether or not primitives are compatible with being processed by the first, pre-pass operation. The primitive classification result can therefore be provided to the pre-pass decision unit 83 to control the state of the graphics processor according to the state machine shown in FIG. 7 and thus control depending on which state the graphics processor is currently in how the primitive should be processed (as shown in FIG. 11). It will be appreciated that this primitive classification may generally be performed on a primitive-by-primitive basis or for larger units of geometry, e.g. on a draw call basis, depending on how the system is configured. For instance, the properties identified above will typically vary only on a draw call basis, such that classification can be (and in embodiments is) performed for draw calls of primitives. Other arrangements would however be possible.

The primitive classification process shown in FIG. 12 may be performed during the first, pre-pass operation by the primitive classification unit 82 with the result of the primitive classification then being used accordingly by the pre-pass decision unit 83 to determine how the processing should continue (i.e. whether the pre-pass operations should continue or whether the pre-pass should be terminated, and the primitive instead subsequently processed by the fallback operation).

However, it will be appreciated that at least some of the primitive properties that are being considered during the primitive classification in FIG. 12 will typically be known in advance, such that some or all of the primitive classification process that is shown in FIG. 12 may correspondingly also be performed in advance, e.g. by the driver 4 for the graphics processor 3 when preparing the corresponding command stream for the graphics processor 3. In that case, the driver may annotate the primitives (or draw calls) within the command stream accordingly with a suitable flag (e.g. an associated bit) to indicate to the graphics processor whether or not the primitive is compatible with the pre-pass operation. The flag can then be provided to the graphics processor and checked accordingly by the primitive classification unit 82 with the result of the primitive classification checking then being used by the pre-pass decision unit 83 to determine whether (and how) the processing should continue. For example, if an ‘incompatible’ flag is present (i.e. the relevant bit is set, or not set, depending on design), the primitive classification unit 82 can identify this, and the pre-pass decision unit 83 can then trigger the third, fallback operation appropriately. Typically, however, at least some of the primitive classification is performed at run-time, during the respective first, pre-pass and/or second, main pass operations, particularly for the more complex classifications that will be described in the examples that follow later.

It will be appreciated that the primitive classification process shown in FIG. 12 is based on the particular configuration of the pre-pass operation in the first example described above, wherein the pre-pass includes the specific processing operations shown in FIG. 8 but does not, e.g., perform stencilling, or execute a fragment shader, such that any primitives that require stencilling, or that require a fragment shader to be executed, are treated as incompatible. Thus, it should be understood, that depending on the particular configuration of the pre-pass operation, there may be (and generally will be) different sets of conditions that mean that a primitive may or may not be compatible with being processed by that pre-pass operation. That is, the pre-pass operation according to embodiments of the technology described herein may be more or less complex as desired and may therefore be able to handle various different types of primitives without having to revert to the third, fallback operation. Various arrangements are contemplated in this regard and a number of examples will now be contemplated to illustrate alternative pre-pass configurations that can handle further types of primitives (or further primitive properties).

Example 2—Exclusive Depth Test Disambiguation

For instance, in the primitive classification process shown in FIG. 12 relating to the first example, a primitive is considered to be incompatible with the pre-pass operation if the primitive depth testing uses an exclusive depth test (step 125). This is because if an exclusive depth test is specified for a primitive, because the depth testing that is performed during the second, main pass operation is modified to use depth ‘equals’ test (for all primitives, regardless of the depth test function used during the first, pre-pass operation, e.g. as specified by the application), if there are two primitives that write the same depth value, the second, main pass may not be able to replicate the correct rendering behaviour.

In particular, when two primitives write the same depth value, but the depth test function used in the first, pre-pass operation for the later primitive is an exclusive test (i.e. is strictly ‘less than’ or ‘greater than’, rather than ‘less than or equal’, ‘greater than or equal’, or ‘equals’), the correct behaviour as specified by the API requirements is for the later primitive to be culled. That is, if the depth buffer is updated by the earlier primitive to record that depth value, the later primitive with the same depth value should fail the exclusive depth test, e.g. since it’s depth value would be equal to the depth value stored in the depth buffer, and not strictly greater (or lesser) than the stored depth value. However, because for the purposes of the present embodiments the depth test in the second, main pass operation is modified to comprise a depth equals’ test for all primitives, in this situation, the later primitive writing the same depth value would also incorrectly survive the depth ‘equals’ test.

In some embodiments, therefore, any primitives that the application specifies should use an exclusive depth test function during the first, pre-pass operation are therefore simply treated as being incompatible with the pre-pass operation, and are instead caused to be processed by the third, fallback operation. This is the case, for example, in FIG. 12, as shown above. This can work well to ensure continued safe processing of the primitives for the render output in such situations.

In other embodiments, however, according to a second example, the pre-pass and corresponding main pass operations can be configured to handle such primitives by providing a suitable depth test disambiguation mechanism that allows two primitives that write the same depth value to be disambiguated to thereby ensure the correct rendering behaviour. For example, as mentioned above, when there are two primitives that write the same depth value, the correct rendering behaviour for the later primitive when the later primitive uses an exclusive depth test function in the first, pre-pass operation is for the later primitive to be culled. (Whereas, if the later primitive uses an inclusive depth test function, it should survive.)

The solution to this in the second example is to store in the depth buffer a suitable 'tracking' bit that can be set/cleared appropriately during the first, pre-pass operation and/or during the second, main pass operation in order to ensure the correct rendering behaviour. This depth test disambiguation mechanism is illustrated, for example, in FIG. 13 and FIG. 14. In these examples it is assumed that the depth compare function is either a 'greater than' (exclusive) or 'greater than or equals' (inclusive) test. However, a similar approach could also be used for 'lesser than' (exclusive) or 'lesser than or equals' (inclusive) tests.

Figure 13:
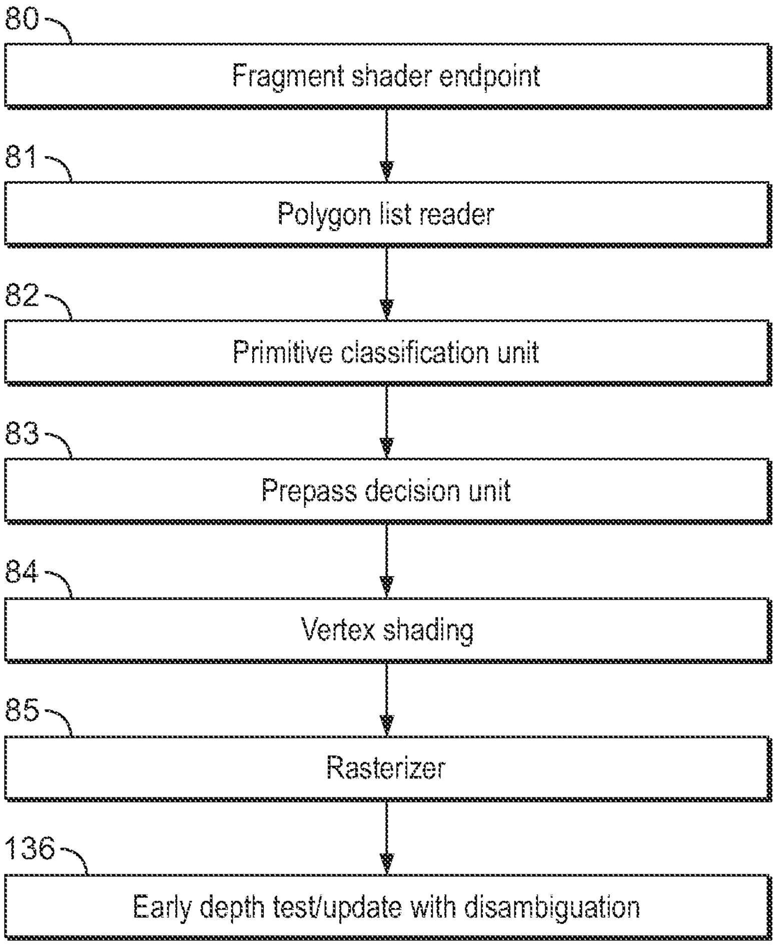
FIG. 13 shows schematically a sequence of processing operations for a pre-pass operation according to a second example including a depth test disambiguation mechanism.

FIG. 13 illustrates the processing operations (the graphics processing pipeline) according to the first, pre-pass operation according to this second example. The processing operations are the same as described above in relation to FIG. 8 except the depth testing/updating stage 136 is modified to include a further disambiguation mechanism that sets the 'tracking' bit appropriately to ensure the desired rendering behaviour during the subsequent second, main pass operation. The disambiguation mechanism during the first, pre-pass is illustrated in FIG. 14.

Figure 14:
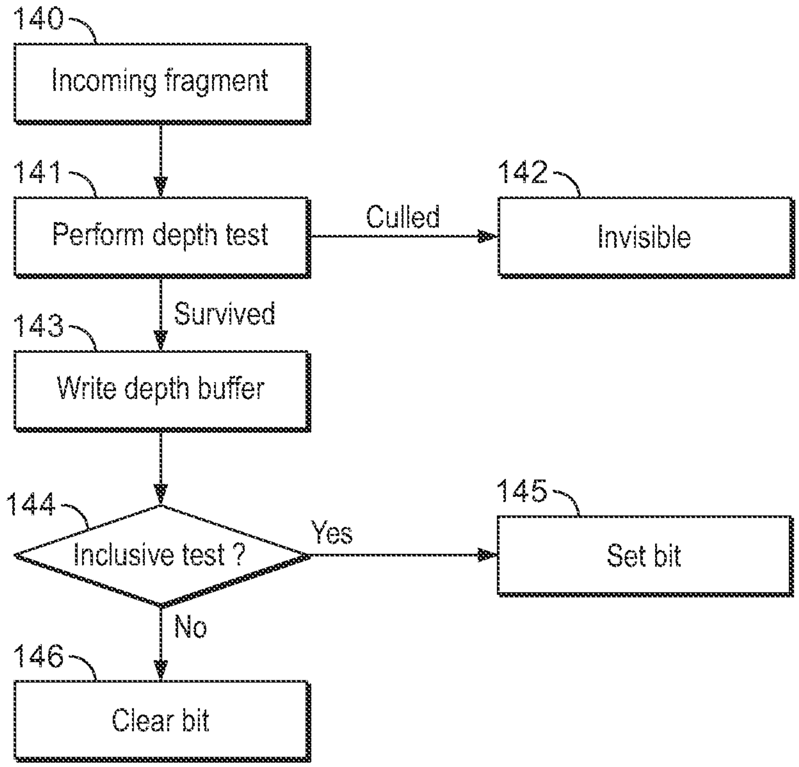
FIG. 14 shows schematically an example of a depth test disambiguation mechanism that may be performed in the pre-pass operation according to the second example.

As shown in FIG. 14, for an incoming fragment 140 to the depth testing/updating stage 136, depth testing is performed for the fragment (step 141). The fragment depth testing is performed in the normal manner for (early) depth testing. For instance, the primitive that generated the fragment will be associated a certain depth test function that has been specified for the primitive (e.g. by the application). The fragment's depth value is then tested against the corresponding entry in the depth buffer according to the specified depth test function. If the fragment fails the depth testing, the fragment is determined to be invisible, and so is culled on that basis (without updating the depth buffer) (step 142). On the other hand, if the fragment survives the depth testing, the depth buffer is updated accordingly (step 143) to record the depth value of the fragment.

In the event that a fragment causes an update to the depth buffer (step 143), it is then further checked whether the specified depth test function for the fragment that caused the depth buffer updated was an inclusive test function (step 144). If the depth test function is inclusive (step 144—yes), the extra 'tracking' bit in the depth buffer associated with the sampling position in question is set accordingly (step 145). Otherwise, if the depth test function is exclusive (step 144—no), the 'tracking' bit is not set (or is cleared if it has previously been set) (step 146).

Thus, during the first, pre-pass operation, if a fragment survives the original depth (or stencil) test, the corresponding 'tracking' bit associated with the sampling position is then set/cleared accordingly depending on whether or not the original depth test function was inclusive or exclusive.

For example, in an embodiment, if a fragment survives the original depth (or stencil) test, and the original depth test function for the fragment is inclusive, the 'tracking' bit is in an embodiment set to a first value (e.g. to '1') at this point. On the other hand, if a fragment survives the depth (or stencil) test, and the original depth test function for the fragment is exclusive, the 'tracking' bit is in an embodiment cleared (to '0', or generally set to a second value).

The processing of primitives continues in this way and the resulting content of the depth buffer at the end of the first, pre-pass operation is then stored appropriately for use by the subsequent, second, main pass. Thus, the status of the extra per-sample 'tracking' bit is carried through to the second, main pass with the depth buffer. The 'tracking' bit can thus be used during the depth testing in the second, main pass to ensure the correct rendering behaviour. The use of this 'tracking' bit during the second, main pass operation is illustrated, for example, in FIG. 15 and FIG. 16.

Figure 15:
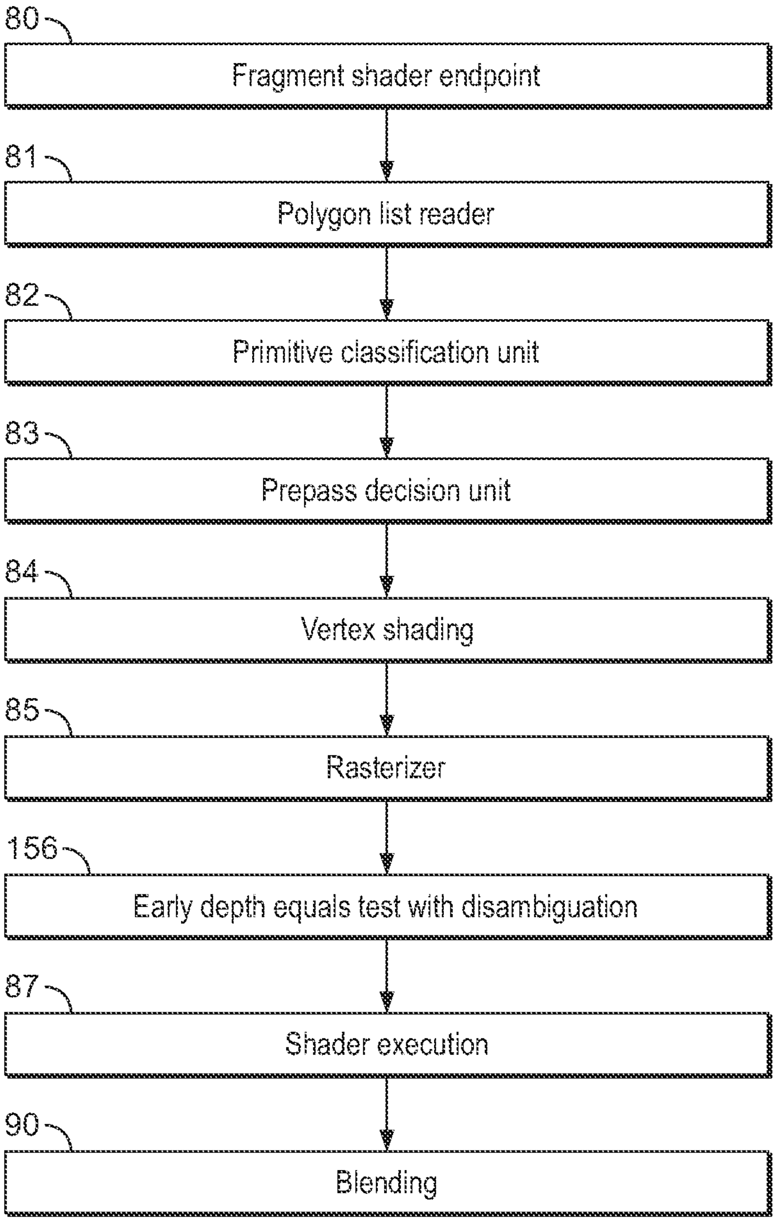
FIG. 15 shows schematically a sequence of processing operations for a corresponding main pass operation to be performed after the pre-pass operation shown in FIG. 13 according to the second example.

FIG. 15 illustrates the processing operations (the graphics processing pipeline) according to the second, main pass operation in this example. The processing operations are the same as described above in relation to FIG. 9 except the depth equals test 156 is modified to include a further disambiguation process that checks the status of the extra bit appropriately to ensure the desired rendering behaviour. The disambiguation process during the second, main pass is illustrated in FIG. 16.

Figure 16:
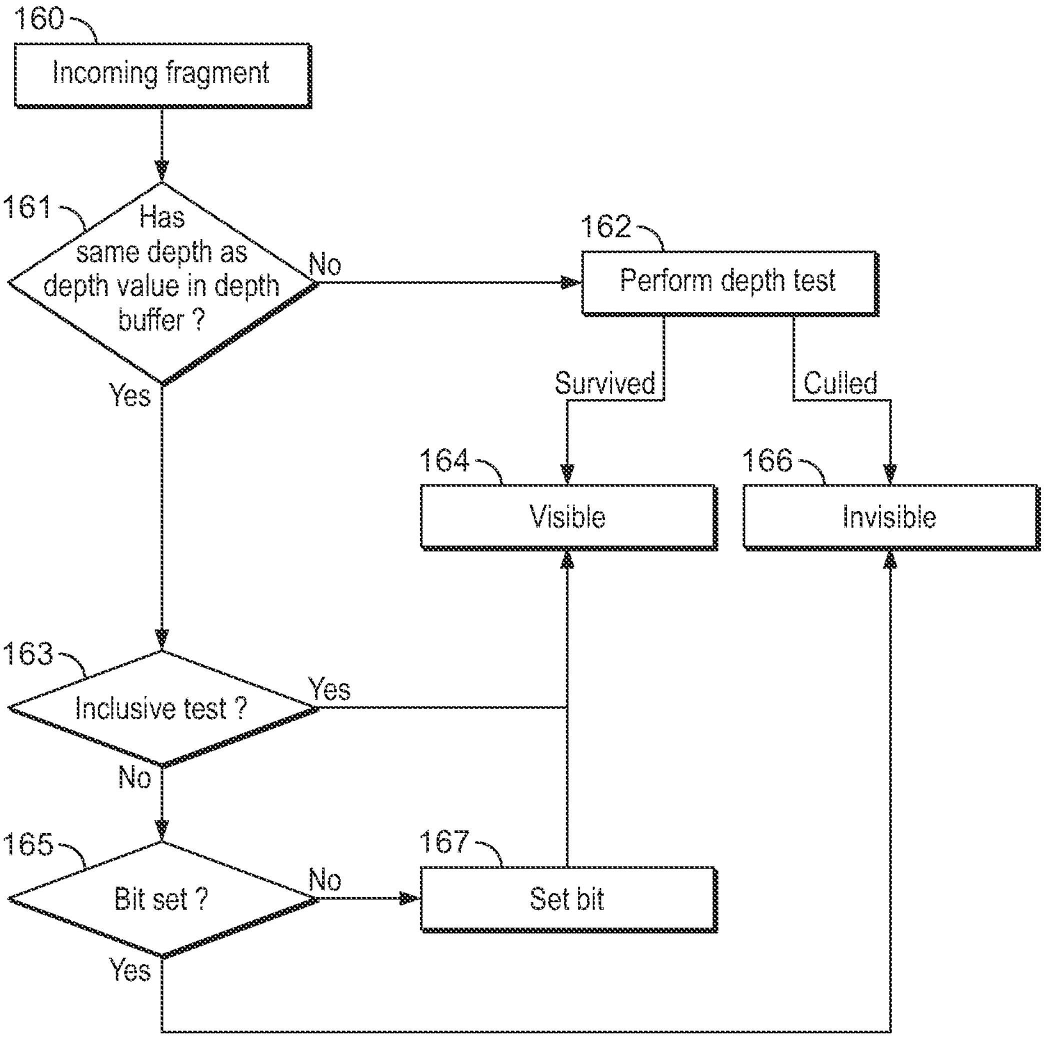
FIG. 16 shows the corresponding depth test disambiguation mechanism in the second, main pass operation according to the second example

FIG. 16 thus shows the processing flow that is performed during the second, main pass operation for fragments incoming to the depth equals test 156 stage in FIG. 9. For an incoming fragment 160 to the depth equals test 156, it is thus checked whether the fragment 160 has the same depth value as the corresponding depth value recorded in the depth buffer (step 161). If the depth values do not match (step 161—no), further depth testing may then be performed (step 162), and depending on the outcome of the depth testing, the fragment may either survive the depth testing (such that it is determined to be visible—step 164), or may be culled at this point (such that it is determined to be invisible—step 166) (note that in this example, when using the depth 'equals' test, any primitives that do not match the depth value stored in the depth buffer (step 161—no) may already be culled on that basis, such that the further depth testing (at step 162) may not be necessary in this example).

On the other hand, if the depth values do match, such that the fragment 160 survives the depth equals test (step 161—yes), it is then checked whether the original specified depth test function for the associated primitive (and hence for the fragment) was an inclusive test (step 163). If the original depth test function was inclusive (step 163—yes), the fragment 160 should be rendered, and the fragment 160 is therefore determined to be visible (step 164). However, if the original depth test function was exclusive (step 163—no), the correct rendering behaviour is that only the first fragment at that depth value should survive. It is therefore checked whether or not the 'tracking' bit in the depth buffer associated with the sampling position in question has been set (step 165).

If the 'tracking' bit has not been set (step 165—yes), this means that the fragment 160 is the first fragment having that depth value, and the fragment 160 should therefore survive (and so the fragment is determined to be visible—step 164). At this point, the 'tracking' bit is set (step 167). This then means that if another later primitive is processed that has the same depth value (step 161—yes), and for which an inclusive test was used (step 163—yes), the 'tracking' bit will have been set at this point, i.e. by a previous primitive having the same depth value. Thus, when the later primitive is processed, it will now be determined at this step that the 'tracking' bit is set (step 165—yes), which will cause the later fragment to be (correctly) culled (step 166).

Accordingly, if the fragment survives the depth equals test during the second, main pass operation, the behaviour is then determined based on the original depth test function for the fragments and the state of the 'tracking' bit is then set as follows;

If the fragment's original depth test function was inclusive and the 'tracking' bit is set, the fragment is passed, and is processed further to generate the desired rendered output data;

If the fragment's original depth test function was inclusive and the 'tracking' bit is not set, the fragment can be (and in an embodiment is) culled (note that this state should not be possible as the 'disambiguation' bit should always be in the first state if the original depth test function was inclusive);

If the fragment's original depth test function was exclusive and the 'tracking' bit is set, the fragment can be (and in an embodiment is) culled; and If the fragment's original depth test function was exclusive and the 'tracking' bit is not set, the fragment is passed, and is processed further to generate the desired rendered output data, and the 'tracking' bit is set at this point.

The effect of all this is therefore that the extra 'tracking' bit essentially tracks for fragments for primitives for which the original depth test function was exclusive whether or not the fragment for the primitive was the fragment that caused the depth buffer update, and hence whether or not the fragment should be processed further. In particular, because the 'tracking' bit is set (to the first state) as a result of condition (iv) being met, this ensures that any later arriving fragments that write the same depth value but for which the original depth test function was exclusive will be correctly culled (based on the 'tracking' bit being set).

In this way, the extra 'tracking' bit in the depth buffer can be used to ensure the correct rendering behaviour is maintained, even when the depth testing in the second, main pass is modified to use a depth equals test, such that the original depth test function is not used during the second, main pass. By providing such mechanism for disambiguating primitives that write the same depth value based on the type of depth test function, this means that such primitives can be safely handled by the pre-pass operation.

For instance, consider an example in which three primitives P0, P1, P2 all write the same depth value, and in which each primitive may have either an inclusive or an exclusive depth compare function. The following table then shows the operation according to each of the eight possible cases. It can be seen that in all cases the desired rendering behaviour is achieved (i.e. the final visible primitive is the correct primitive based on the application-specified depth compare functions).

TABLE 1

Depth Test Disambiguation Examples

| Depth Compare Functions | | | Pre-Pass Results | | | | Main Pass Results | | | |
|---|---|---|---|---|---|---|---|---|---|---|
| P0 | P1 | P2 | P0 | P1 | P2 | Bit | P0 | P1 | P2 | Final visible primitive |
| Excl. | Excl. | Excl. | Pass Z, clear bit | Fail Z | Fail Z | 0 | Pass Z. Pass bit test. Set bit. Survive | Pass Z. Fail bit test. Cull | Pass Z. Fail bit test. Cull | P0 |
| Excl. | Excl. | Incl. | Pass Z, clear bit | Fail Z | Pass Z test, set bit | 1 | Pass Z. Fail bit test. Cull | Pass Z. Fail bit test. Cull | Pass Z. Pass bit test. Survive | P2 |
| Excl. | Incl. | Excl. | Pass Z, clear bit | Pass Z, set bit | Fail Z | 1 | Pass Z. Fail bit test. Cull | Pass Z. Pass bit test. Survive | Pass Z. Fail bit test. Cull | P1 |
| Excl. | Incl. | Incl. | Pass Z, clear bit | Pass Z, set bit | Pass Z, set bit | 1 | Pass Z. Fail bit test. Cull | Pass Z. Pass bit test. Survive | Pass Z. Pass bit test. Survive | P2 |
| Incl. | Excl. | Excl. | Pass Z, set bit | Fail Z | Fail Z | 1 | Pass Z. Pass bit test. Survive | Pass Z. Fail bit test. Cull | Pass Z. Fail bit test. Cull | P0 |
| Incl. | Excl. | Incl. | Pass Z, set bit | Fail Z | Pass Z, set bit | 1 | Pass Z. Pass bit test. Survive | Pass Z. Fail bit test. Cull | Pass Z. Pass bit test. Survive | P2 |
| Incl. | Incl. | Excl. | Pass Z, set bit | Pass Z, set bit | Fail Z | 1 | Pass Z. Pass bit test. Survive | Pass Z. Pass bit test. Survive | Pass Z. Fail bit test. Cull | P1 |
| Incl. | Incl. | Incl. | Pass Z, set bit | Pass Z, set bit | Pass Z, set bit | 1 | Pass Z. Pass bit test. Survive | Pass Z. Pass bit test. Survive | Pass Z. Pass bit test. Survive | P2 |

It should be noted that the disambiguation mechanism described above assumes that the depth test function is monotonic, i.e. that the polarity of the depth test function does not change between primitives (or between the front/back faces of a primitive) within a sequence of primitives, e.g., such that the depth test function does not change from a 'greater than' (or 'greater than or equal to') test to a 'less than' (or 'less than or equal to') test, or vice versa, and also that the depth test function does not change to 'always' write to the depth buffer. In those cases, the correct rendering behaviour becomes more complex such that it may not be possible to track the correct behaviour using a single 'tracking' bit and more complex tracking mechanisms may therefore need to be used. Otherwise, such cases can be handled using the fallback operation, which is the case in this example.

Figure 17:
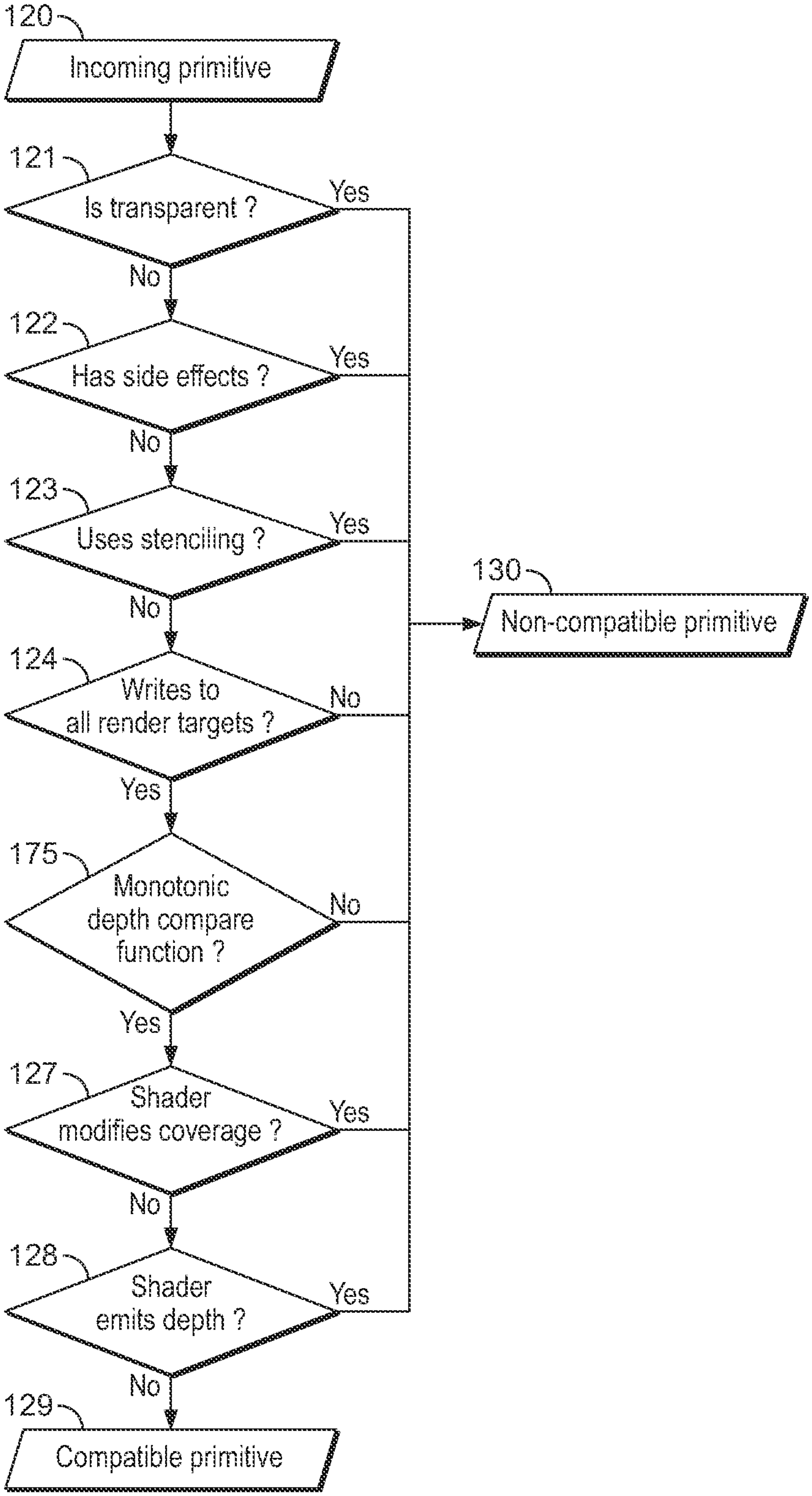
FIG. 17 illustrates a primitive classification process according to the second example in which primitives having an exclusive depth test function are no longer treated as being incompatible with the "pre-pass" operation.

Thus, the primitive classification process for this example is shown in FIG. 17, and as shown, the primitive classification generally checks the same conditions as the example shown in FIG. 12, except rather than checking whether the primitive has an exclusive depth test function (step 125 in FIG. 12), it is instead checked whether the primitive has a monotonic depth compare function (at step 175). In this example, the third, fallback operation may therefore (and will) be triggered accordingly when it is determined that the depth test function changes polarity within a sequence of primitives. Note that it is also no longer required for this example to check that depth writes are enabled as the limitation that the depth compare function must be monotonic eliminates this requirement as well.

Example 3—Stencilling

The description so far focusses mainly on determining visibility information based on depth testing fragments for primitives during the first, pre-pass operation, and then using the depth buffer determined by the first, pre-pass operation to control the subsequent rendering of primitives during the second, main pass operation. For instance, in the first and second examples presented above, stencilling is not performed either in the first, pre-pass operations or the corresponding second, main pass operations. Thus, for these examples, stencilling is effectively disabled, and any primitives that require stencilling are therefore instead treated as incompatible primitives during the primitive classification process, as shown in FIG. 12. In the examples described so far, any primitives requiring stencilling are therefore processed subsequently by the third, fallback operation (for which both depth and stencil test/updates are performed, as shown in FIG. 10).

However, it will be appreciated stencilling may in some cases (and in some embodiments is) handled in a similar manner as the depth testing described above. For example, certain types of stencil testing can be performed during the first, pre-pass operation in a corresponding manner as the depth testing described above in order to populate a stencil buffer, e.g., and in particular, so long as the front and back compare operations are monotonic (have the same polarity). The stencil buffer can then be used to control fragment processing during the second, main pass by performing a suitable stencil 'equals' test. Again, if two primitives write the same stencil value, a suitable disambiguation mechanism may be required in the situation that an exclusive stencil test function is being used. The stencil equals testing disambiguation mechanism is in an embodiment performed in the same manner described above in relation to the depth equals testing disambiguation mechanism, but now using an additional per-sample 'tracking' bit associated with the stencil buffer.

Figure 18:
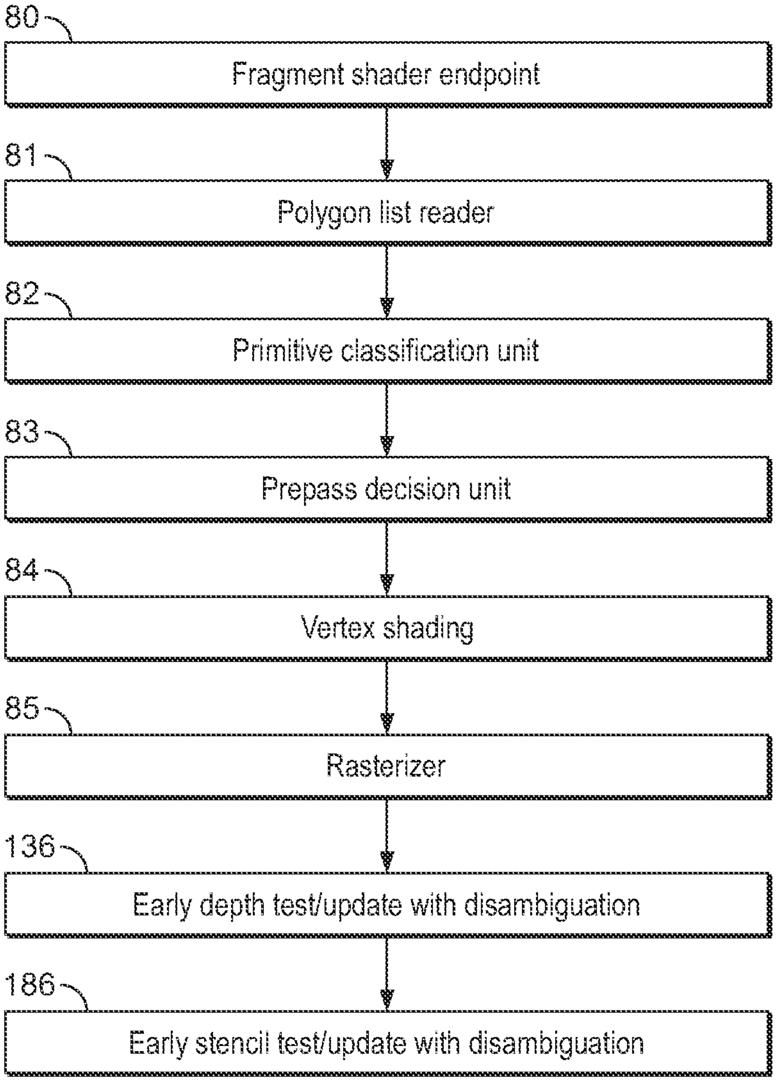
FIG. 18 shows schematically a sequence of processing operations for a pre-pass operation according to a third example in which stencil testing/updating is performed.

FIG. 18 illustrates the processing operations (the graphics processing pipeline) according to the first, pre-pass operation in a further example in which stencilling is enabled. The processing operations are otherwise the same as described above in relation to FIG. 8 and FIG. 13 except that there is an additional step of early stencil test/update with disambiguation 186 performed after the depth test/update 136. The per-sample 'tracking' bit that is stored in the stencil buffer can thus be set/cleared accordingly during the first, pre-pass operation in the same manner described above in relation to FIG. 14, but based on the stencil test rather than the depth test (at step 141). The corresponding disambiguation process for stencilling during the second, main pass operation is thus illustrated in FIG. 19 and basically mirrors the disambiguation process for depth testing described above in relation to FIG. 16.

Figure 19:
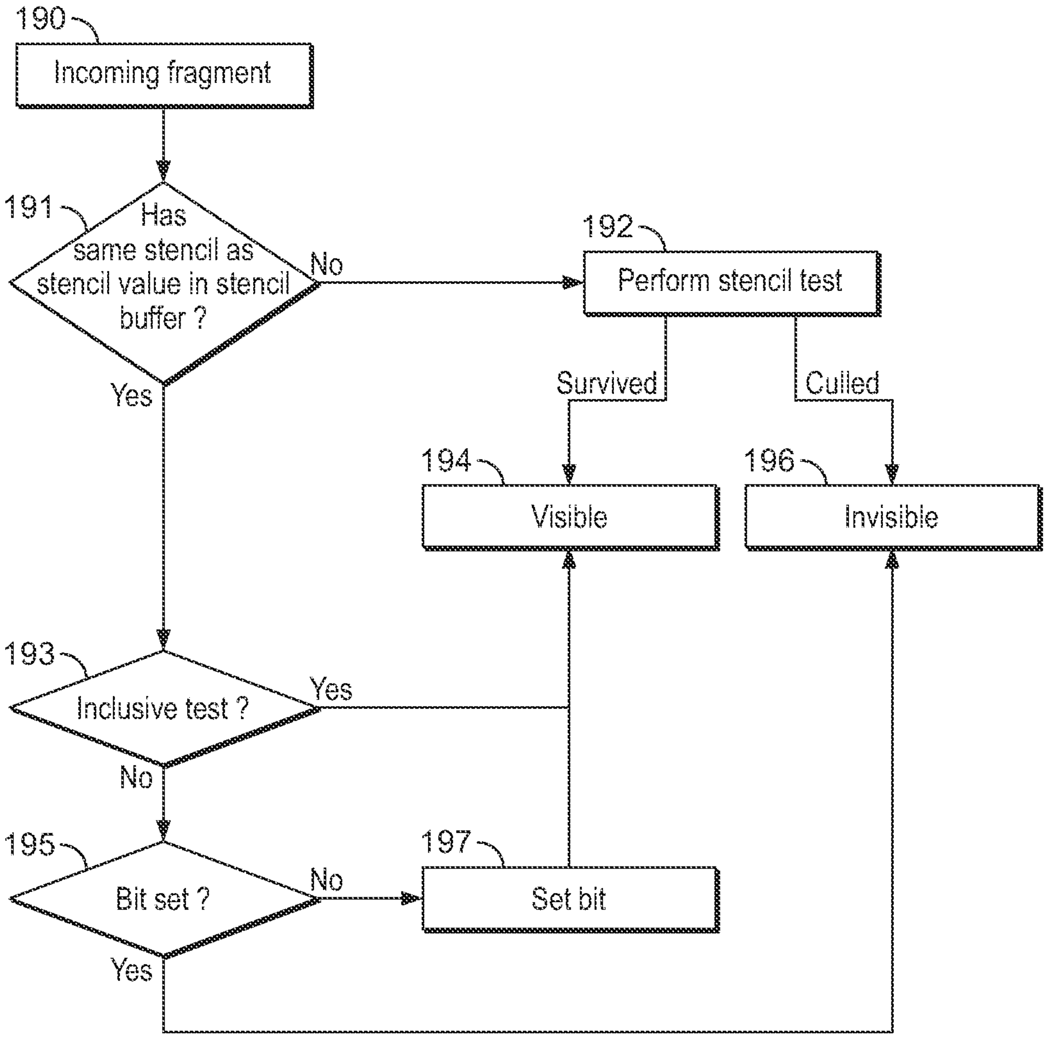
FIG. 19 shows schematically a stencil test disambiguation mechanism that may be performed during the second, main pass operation according to the third example.

Thus, as shown in FIG. 19, for an incoming fragment 190 to the stencil test 186, it is thus checked whether the fragment 190 has the stencil value as the corresponding stencil value recorded in the stencil buffer (step 191). If the stencil values do not match (step 191—no), further stencil testing may then be performed (if necessary/desired) (step 192), and depending on the outcome of the stencil testing, the fragment may either survive the stencil testing (such that it is determined to be visible—step 194), or may be culled at this point (such that it is determined to be invisible—step 196). If the stencil values do match, such that the fragment 190 survives the stencil equals test (step 191—yes), it is then checked whether the original specified stencil test function for the associated primitive (and hence for the fragment) was an inclusive test (step 193). If the original stencil test function was inclusive (step 193—yes), the fragment 190 should be rendered, and the fragment 190 is therefore determined to be visible (step 194). However, if the original stencil test function was exclusive (step 193—no), the correct rendering behaviour is that only the first fragment at that stencil value should survive. At this point, it is therefore checked whether or not the 'tracking' bit in the stencil buffer associated with the sampling position in question has been set (step 195). If the 'tracking' bit has not been set (step 195—yes), this means that the fragment 190 is the first fragment having that stencil value, and the fragment 190 should therefore survive (and so the fragment is determined to be visible—step 194). At this point, the 'tracking' bit is set (step 197). This means that if another later primitive is processed that has the same stencil value (step 191—yes), and for which an inclusive test was used (step 193—yes), the 'tracking' bit will have been set at this point, i.e. by a previous primitive having the same stencil value. Thus, it will be determined at this point that the 'tracking' bit is set (step 195—yes), which will cause the later fragment to be (correctly) culled (step 196).

Figure 20:
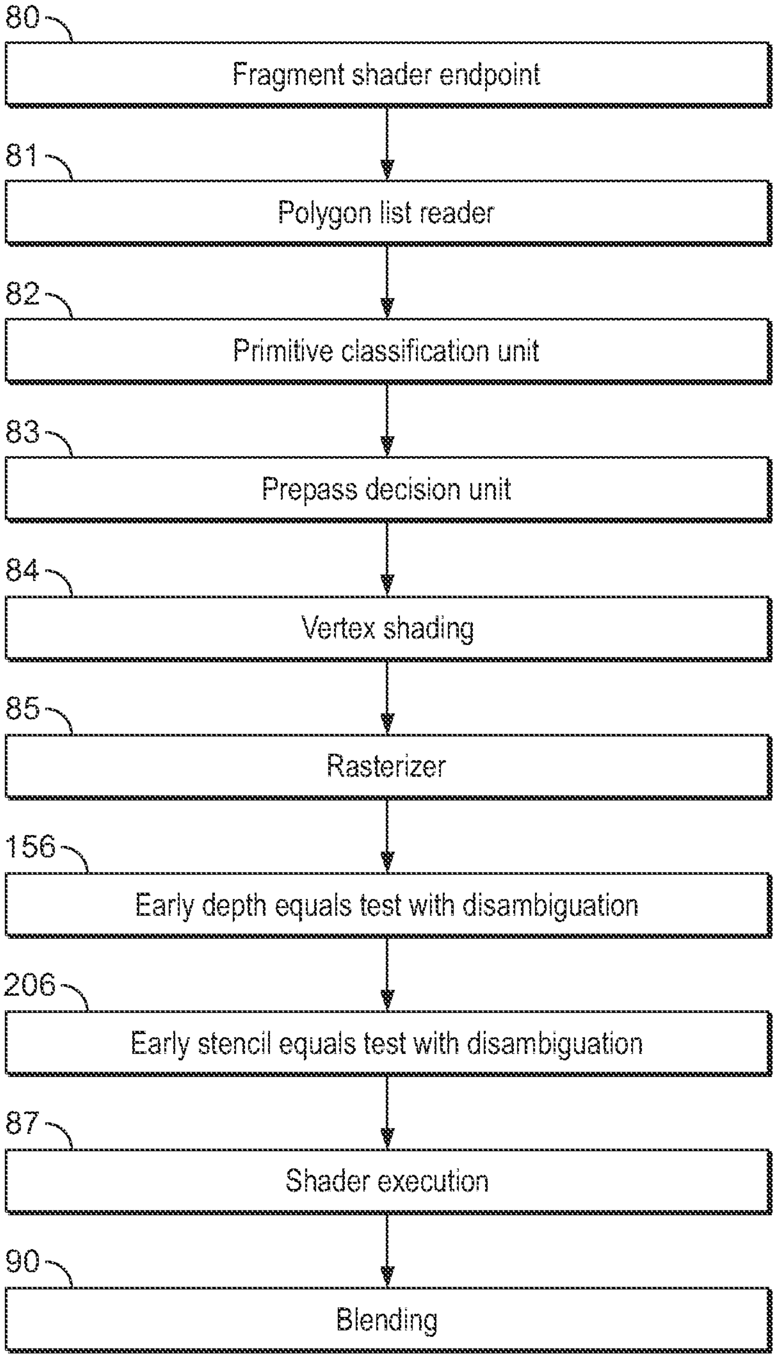
FIG. 20 shows the sequence of processing operations for corresponding main pass operation to be performed after the pre-pass operation shown in FIG. 18 according to the third example.

FIG. 20 illustrates the corresponding processing operations (the graphics processing pipeline) according to the second, main pass operation in this further example in which stencilling is enabled. This is the same as the processing pipeline illustrated in FIG. 15 except that an additional early stencil equals test with disambiguation stage 206 is included after the early depth equals test with disambiguation stage 156.

Figure 21:
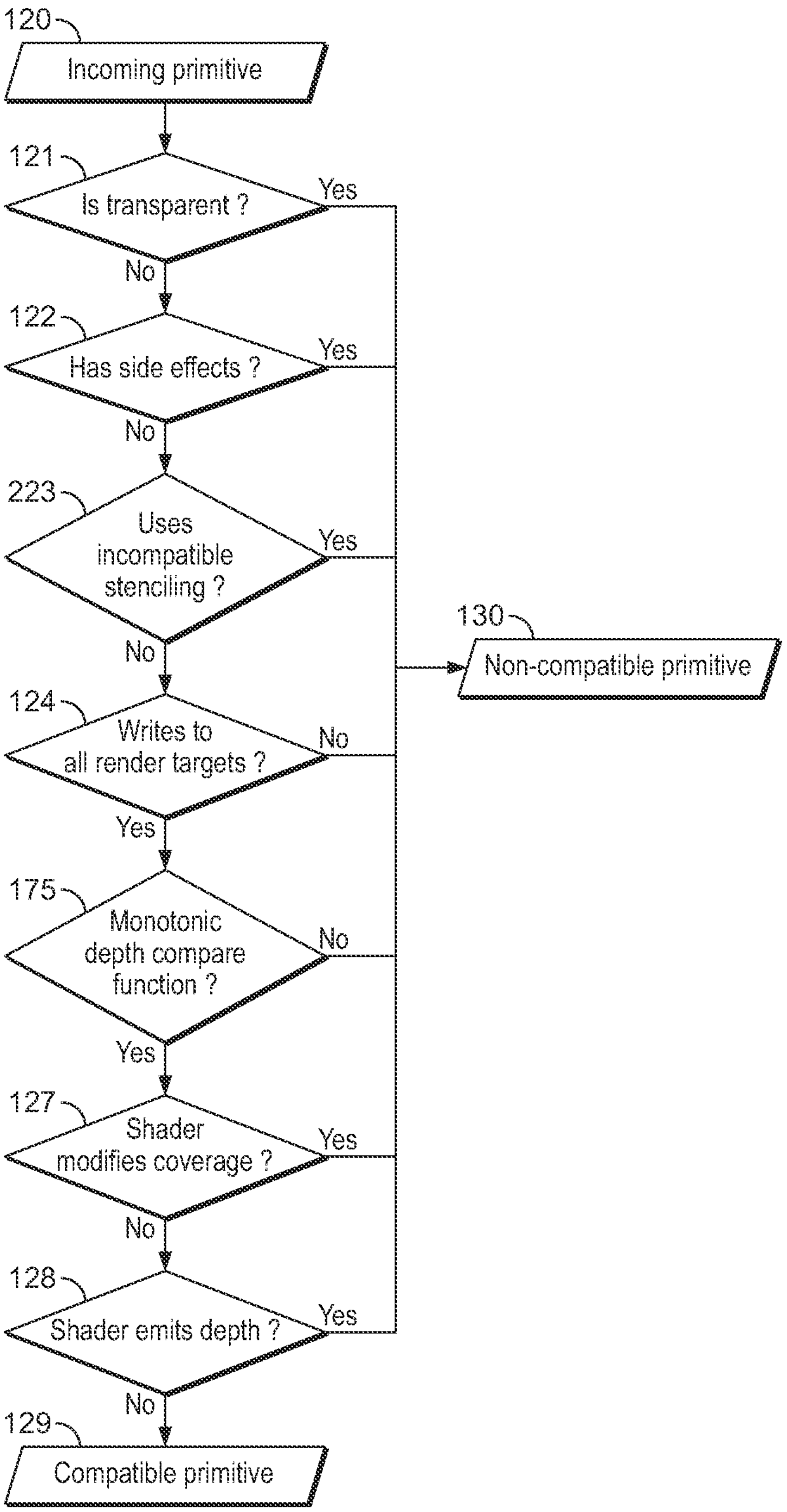
FIG. 21 illustrates a primitive classification process according to the third example in which primitives having certain types of stencilling can be made compatible with the "pre-pass" operation.

The effect of this is that at least some types of stencilling can now be handled by the pre-pass operation. FIG. 21 thus shows a corresponding primitive classification process for this example. In particular, as shown in FIG. 21, the primitive classification is generally the same as described above except now it is only certain types of incompatible stencilling that are considered incompatible with the pre-pass operation (at step 223). That is, there may be some types of stencilling that are still incompatible with the pre-pass operation. There are various conditions that may mean that stencilling is still incompatible with the pre-pass operation and these can generally be determined in advance, e.g. based on the properties of the stencil testing. For example, this may be the case where the front and back stencil test functions have different polarities. In that case, the primitives are therefore still treated as being incompatible, such that they should instead be handled using the third, fallback operation, as described above.

Example 4—Shader Modifies Coverage

In the examples described above, the first, pre-pass operation does not execute a fragment shader. This means that any primitives that require a fragment shader to be executed in order to fully determine the coverage and/or depth values for the primitive must be treated as incompatible, and this is shown accordingly in FIG. 12. That is, as shown in FIG. 12, primitives are determined to be incompatible with the pre-pass operation when the primitive has either of the properties shader modifies coverage (step 127) or shader emits depth (step 128). However, it may be desirable to execute at least a partial fragment shader during the first, pre-pass operation in order to expose the pre-pass to enough information to be able to handle such primitives, and in further examples this is therefore done.

For instance, as explained above, the purpose of the first, pre-pass operation is to determined "visibility" information for the sequence of primitives, which "visibility" information is then usable to control the fragment processing during the second, main pass operation, e.g., and in an embodiment, to cull fragments during the second, main pass operation for which it can be determined based on the visibility information that the fragments have no visible effect for the render output. The "visibility" information is in an embodiment generated based on depth (and optionally stencil) testing the fragments.

The application requiring the graphics processing may however specify various different types of primitives in which fragment shading is required in order to determine the final fragment coverage and/or depth values. Accordingly, for such primitives, it may be desirable to execute a first ("pre-pass") fragment shader routine during the first, pre-pass operation in order to determine the desired "visibility" information (otherwise, the primitive may have to be treated as being 'incompatible' with the pre-pass operation, e.g. and instead processed by a third, fallback operation, as in the examples described so far). An example of this is illustrated in FIG. 22 which shows the configuration of the first, pre-pass operation according to a fourth example in which the first, pre-pass operation is also operable to execute a respective (partial) fragment shader.

Figure 22:
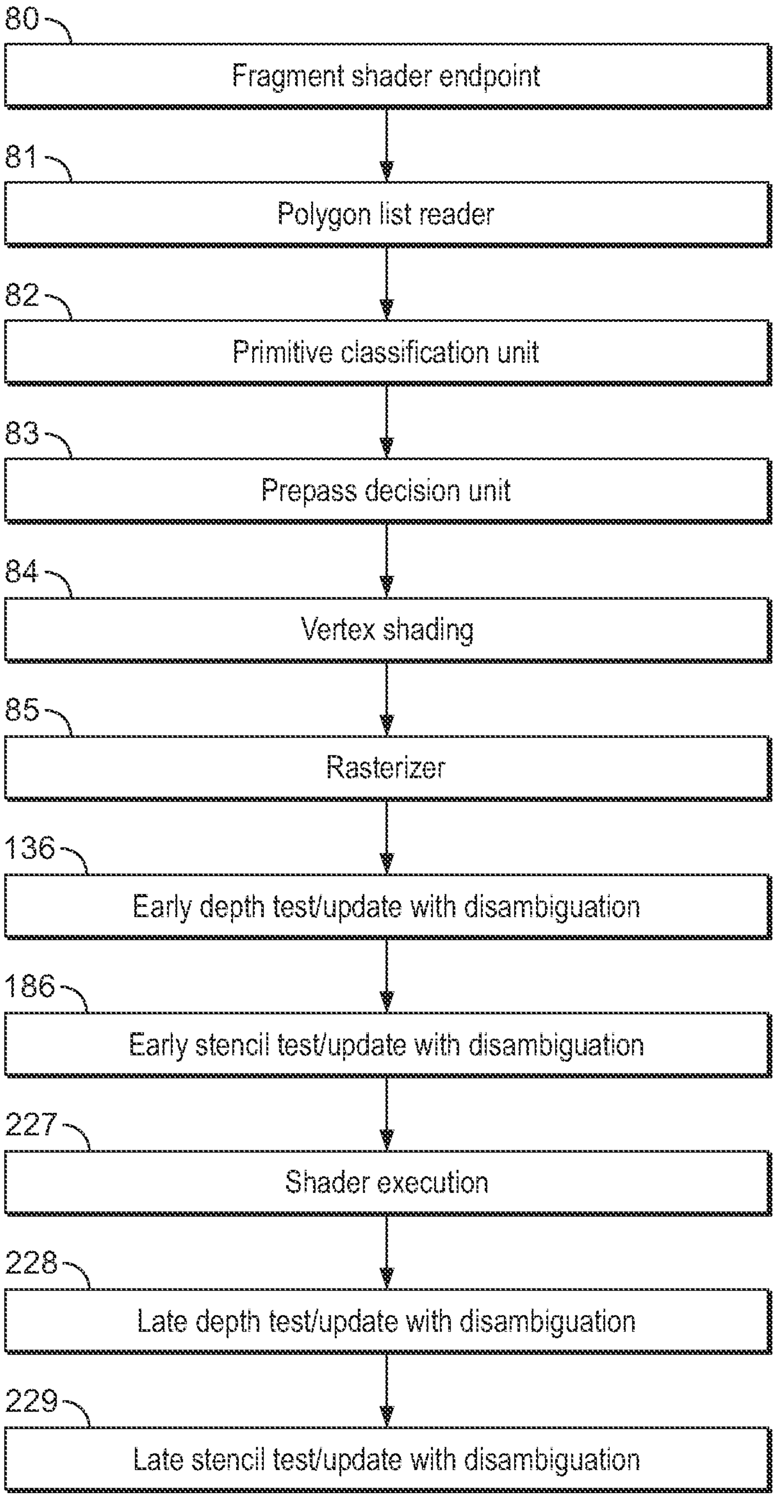
FIG. 22 shows schematically a sequence of processing operations for a pre-pass operation according to a fourth example in which a fragment shader is executed during the first, pre-pass operation.

FIG. 22 thus illustrates the processing operations (the graphics processing pipeline) according to the first, pre-pass operation according to a fourth example in which the visibility information comprises the depth/stencil buffer (such that the initial processing is in common with the example shown in FIG. 18) but in which after the (early) depth/stencil testing is performed, the first, pre-pass operation is further operable to execute a fragment shader 227 at least for primitives that require a fragment shader to be executed to determine the final coverage. The fragment shader 227 can then be executed accordingly to determine the final coverage which can then be used accordingly to perform late depth testing/update 228 and late stencil testing/update 229. The late depth/stencil testing/update can be performed in the normal manner but in an embodiment also include suitable disambiguation mechanisms for ensuring the correct rendering behaviour for primitives that use an exclusive depth/stencil test function in the situation that there are two primitives that write the same depth/stencil value, e.g. as described above in relation to the second and third examples.

The fragment shader is thus operable to execute a first fragment shader routine during the first, pre-pass operation. For example, this is in an embodiment a partial version of the full fragment shader that is executed during the second, main pass operation. For example, the first fragment shader routine may execute up to a certain 'discard' instruction with the fragment shader routine being executed accordingly just far enough to generate the desired visibility information, but not producing the final rendered output data (which is still deferred to the second, main pass operation which in an embodiment then runs the full fragment shader, when required to complete the rendering to produce the final rendered output data). Various arrangements are contemplated for determining how far and whether a fragment shader should be executed during the first, pre-pass operation, e.g. depending on the desired shader state (including potential shader side effects) that may desirably be obtained during the respective processing passes.

Figure 23:
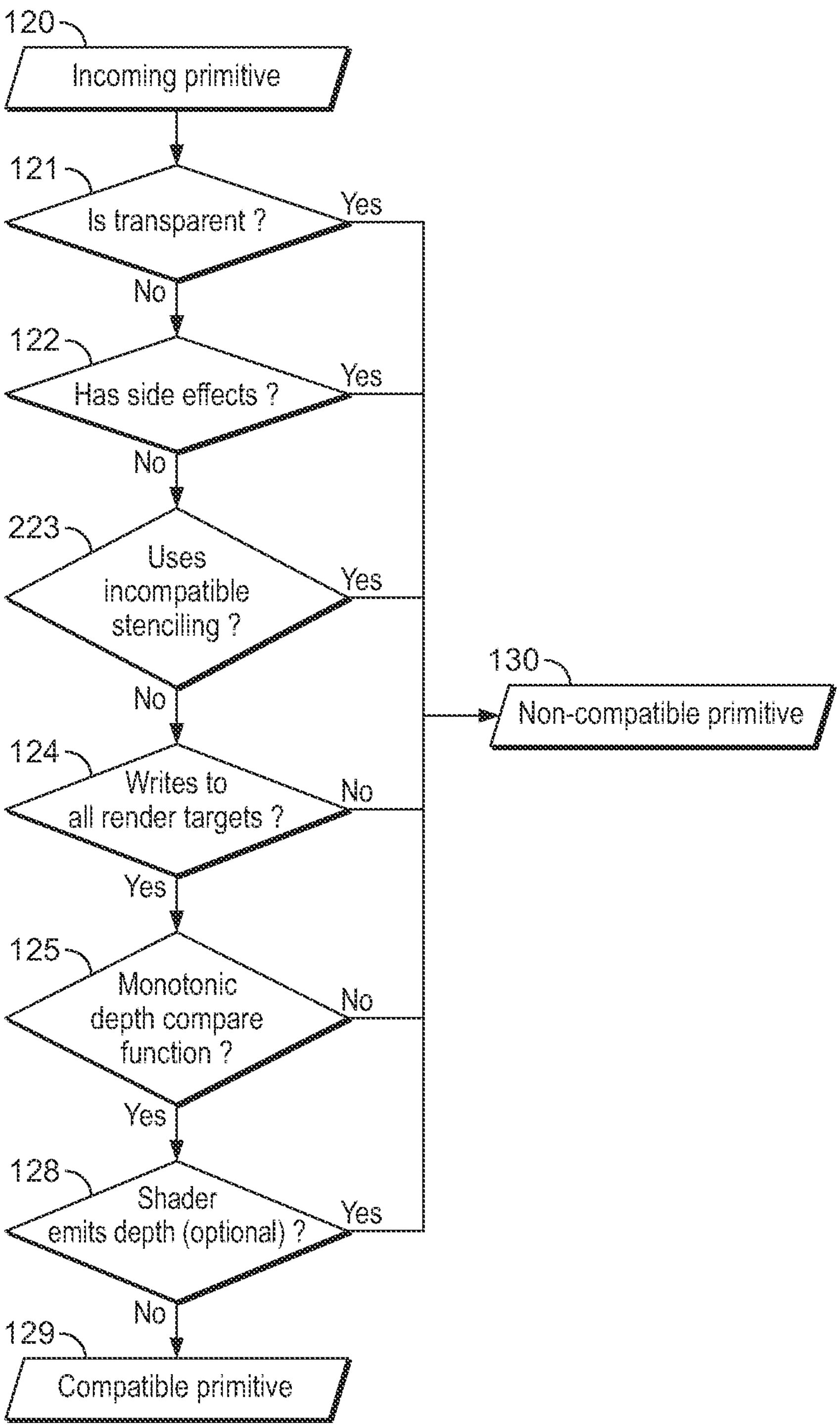
FIG. 23 illustrates a primitive classification process according to the fourth example.

The classification process in this fourth example is therefore correspondingly modified as shown in FIG. 23 such that primitives for which the shader modifies coverage are no longer treated as being incompatible with the pre-pass operation. The classification process is thus generally similar to that described above and shown in FIG. 17, except that the shader modifies coverage condition no longer needs to be checked.

In the specific example that is shown in FIG. 23 the condition shader emits depth is still considered incompatible (since in this example the fragment shader does not write depth). However, it would of course also be possible to allow the shader that is executed in the pre-pass operation to write depth, in which case shader emits depth primitives would also no longer be determined to be incompatible. That is, the fragment shader that is executed in the pre-pass operation may be executed up to and including the discard point to determine whether the shader modifies coverage and may also be executed up to and including the point where late depth is determined. In general, the fragment shader that is executed in the pre-pass operation may therefore be executed up to any suitable and desired point in order to expose the first, pre-pass operation to enough state to determine the full visibility information, whatever that involves. Various arrangements are contemplated in this regard for how far the fragment shader that is executed in the first, pre-pass may be executed.

Example 5—"HSR ID" Buffer

The examples described so far all relate to a first main embodiment in which the depth buffer (and optionally also the stencil buffer) generated during the first, pre-pass operation is used as the "visibility" information for controlling fragment processing during the second, main pass operation. Various other examples are however contemplated and the "visibility" information that is generated during the first, pre-pass operation that is then used to control the processing during the second, main pass operation may in general take any suitable and desired form.

For example, in a second main embodiment for generating the "visibility' information, rather than using the depth (stencil) buffer itself as the "visibility" information that is used to control the further processing of primitives during the second, main pass operation, the first, pre-pass operation generates "visibility" information in the form of a dedicated set of per-sample primitive identifying information that stores for respective sampling positions within the render output a respective primitive identifier indicating which primitive should be further processed for the sampling position in question (which primitive identifiers will also be referred to herein as hidden surface removal identifiers ("HSR IDs"), with the set of per-sample primitive identifying information correspondingly being referred to as a "HSR ID buffer").

The HSR ID buffer may generally take any suitable and desired form but may generally match the size and form of the depth buffer in that it is capable of storing a respective HSR ID for each sampling position within the render output in a similar fashion to how the depth buffer stores a respective depth value for each sampling position within the render output. The HSR ID buffer can thus be (and is in this example) populated during the first, pre-pass operation to record the desired visibility information for the respective sampling positions of the render output. The result of this is thus that the HSR ID buffer at the end of the first, pre-pass operation stores a respective set of HSR IDs indicating which primitives should be processed further for which sampling positions within the render output.

Figure 24:
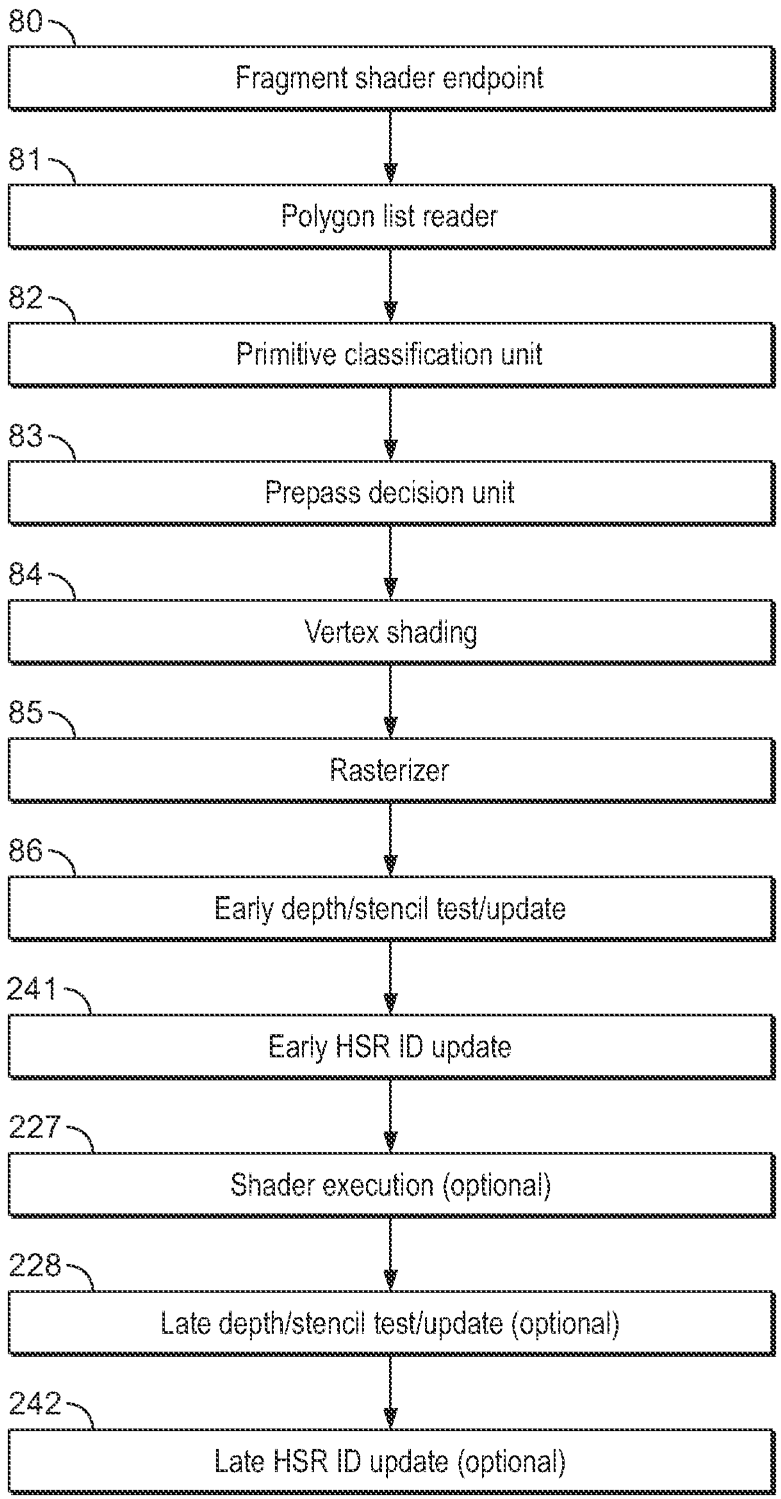
FIG. 24 shows schematically a sequence of processing operations for a pre-pass operation according to an example according to an embodiment in which visibility information is generated in the form of a set of per-sample primitive identifying information (which will be referred to hereinafter as a "HSR ID" buffer)

FIG. 24 shows a sequence of processing operations for a pre-pass operation according to an example according to an embodiment in which visibility information is generated in the form of such HSR ID buffer. In this example, the first, pre-pass operation thus comprises a pipelined sequence of processing operations including: a fragment shader endpoint 80 that schedules the rendering work that the graphics processing pipeline needs to perform in order to render a tile; a primitive list reader (polygon list reader 81) that reads the appropriate primitive list(s) for the tile to identify the primitives that are to be rendered for the tile; a primitive classification unit 82; a pre-pass decision unit 83; a vertex processing (shading) stage 84 that obtains (and shades, if necessary) the relevant vertex data for the primitives to be rendered for the tile; a rasteriser 85 that rasterises primitives into respective fragments corresponding to sampling positions within the render output; and an (early) depth test/update stage 86 that performs fragment depth testing and updates the depth buffer accordingly.

So far, the processing pipeline is therefore similar to that described above in relation to the earlier examples. In this example, however, after the (early) depth/stencil test/update 86, a further HSR ID update 241 is performed that updates the HSR ID buffer as needed in response to the (early) depth/stencil test/update 86. In the example shown in FIG. 24 the first, pre-pass operation may optionally also execute a fragment shader 227 and perform late depth/stencil test/update 228 as described above in relation to FIG. 22. In that case, there may be a further late HSR ID update 242 that updates the HSR ID buffer as needed in response to the results of the late depth/stencil test/update 228.

Figure 25:
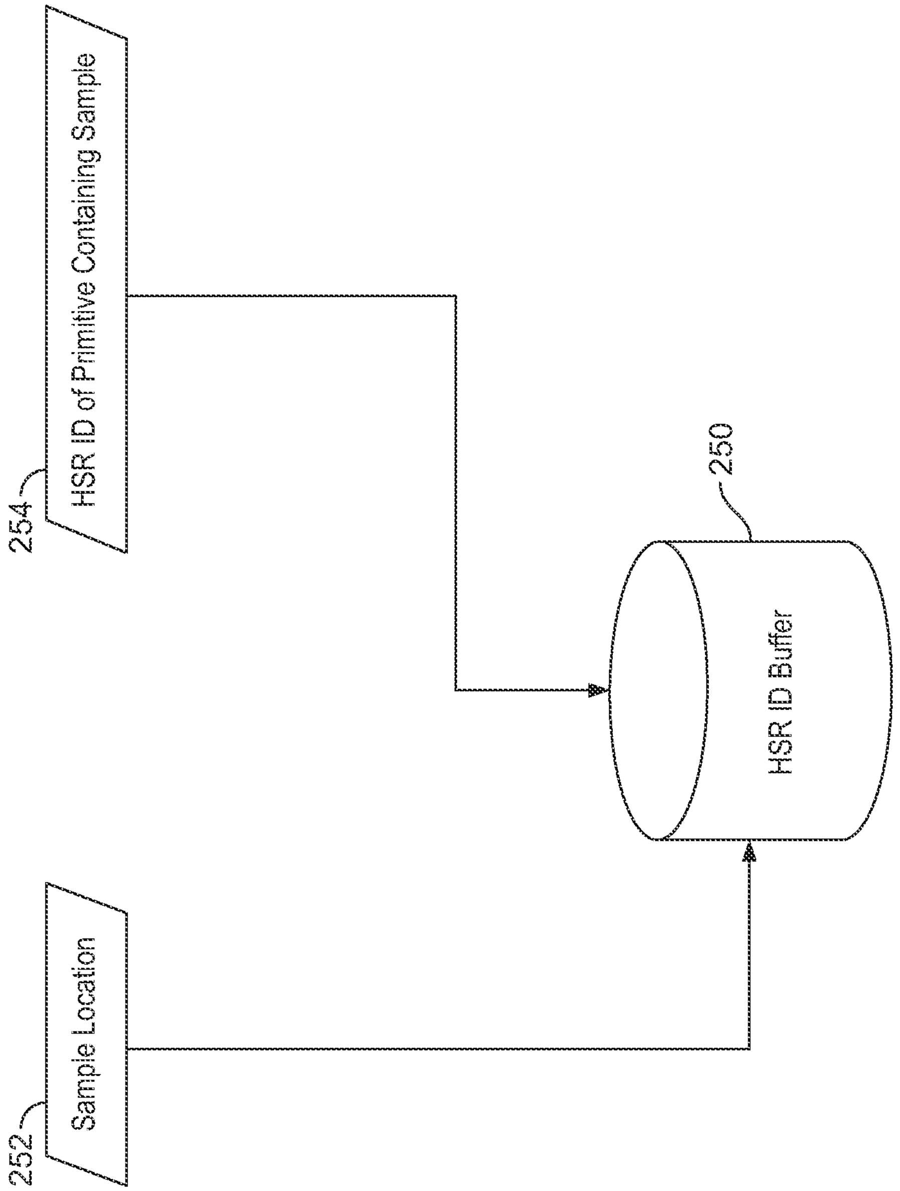
FIG. 25 shows schematically how such HSR ID buffer may be populated during the first, pre-pass operation.
Figure 26:
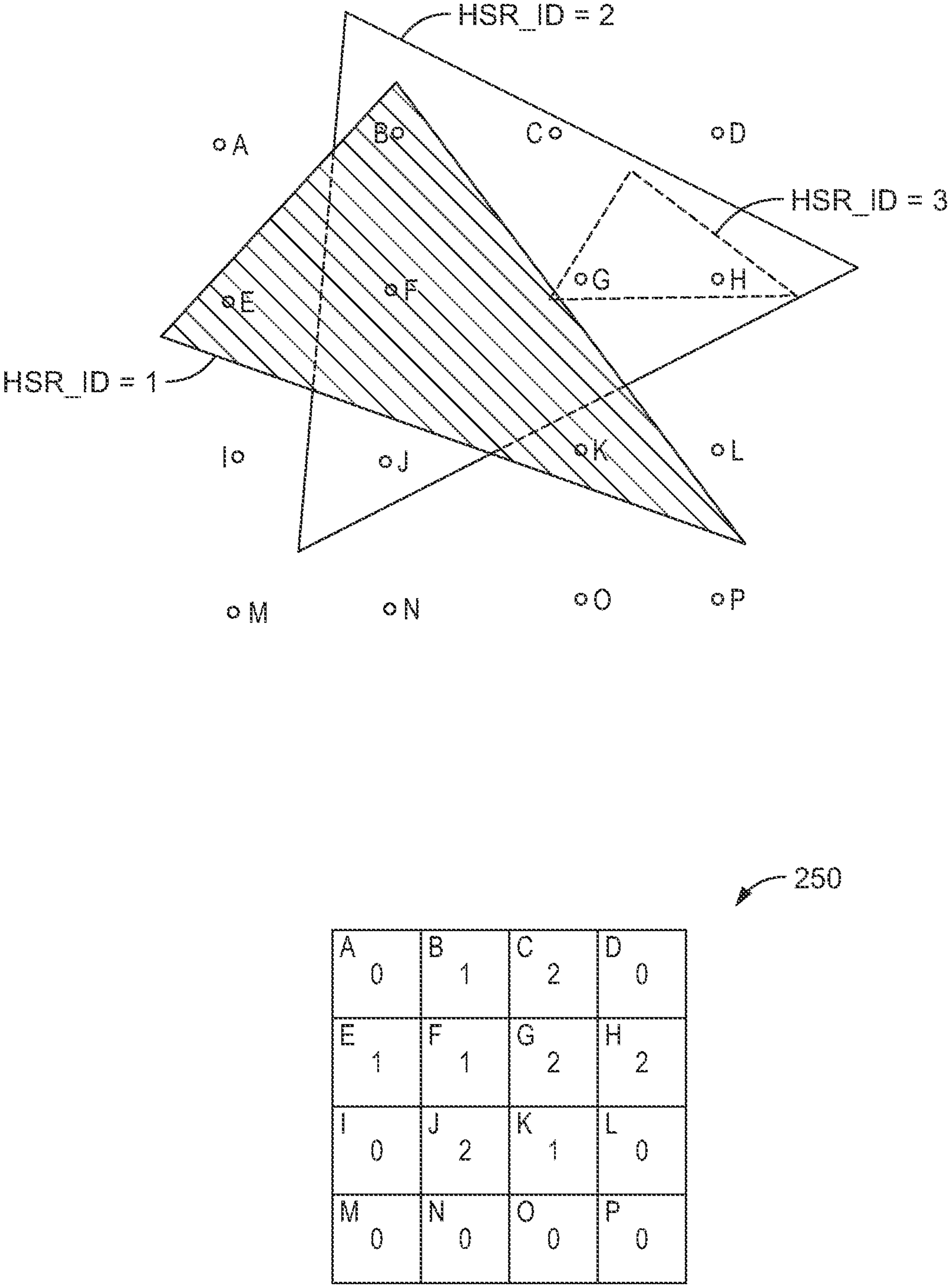
FIG. 26 shows schematically an example of populating such HSR ID buffer.

The updating of the HSR ID buffer is thus performed based on the depth/stencil testing. FIG. 25 shows schematically how such HSR ID buffer may be populated during the first, pre-pass operation. In particular, as shown in FIG. 25, when it is determined during the early depth/stencil test/update 86 that a fragment for a primitive is visible at the sampling position or positions to which the fragment relates, the HSR ID buffer 250 is then updated at that point to record the associated HSR ID for the primitive to which the fragment relates. Whenever a fragment is determined to survive the early depth/stencil test/update 86, such that the fragment is determined to be visible at the respective sampling position or positions to which the fragment relates (at least based on the visibility information generated so far), the first, pre-pass operation writes to the HSR ID buffer accordingly, with the address of the write being determined by the sample location 252 and the value being written corresponding to the HSR ID of the primitive containing the sample in question 254. A worked example of populating the HSR ID buffer in this way is illustrated in FIG. 26.

In this example, there is shown three primitives that at least partially overlap with each other. It will be appreciated in typical case there will be many primitives that need to be rendered but this simplified example is used for ease of illustration. As will be described further below, each primitive is allocated a respective unique primitive identifier, i.e. a respective HSR ID. In this example, the frontmost primitive is drawn first, and is thus allocated the first HSR ID (i.e. its HSR ID=1). There is a larger primitive drawn behind that (with HSR ID=2) and another primitive (with HSR ID=3) that is completely behind the other two primitives (such that it is not visible in the final render output). There is also shown a corresponding set of sampling positions {A, B . . . P}, defined within the render output.

In this example, it can be seen that the top left sampling position (position A) is not covered by any of the three primitives. Thus, as shown in FIG. 26, a 'null' value ('zero') is recorded in the HSR ID buffer in the respective entry for sampling position A. For the next sampling position (sampling position B), it can be seen that this is covered by the first two primitives, however, it can be seen from FIG. 25 that the first primitive (with HSR ID=1) should be visible, as it is drawn in front of the other primitive. Thus, in this example, the fragment for the first primitive will survive the depth testing at sampling position B and thus cause the HSR ID buffer to be updated accordingly such that its HSR ID ('1') is stored in the respective entry for that sampling position. The corresponding fragment for that sampling position for the next primitive (with HSR ID=2) in this example fails the depth testing, and so does not cause the HSR ID buffer to be updated again. This is then repeated for all primitives and all sampling positions appropriately in order to determine the final HSR ID buffer. The determined HSR ID buffer is then used during the second, main pass operation in order to control the subsequent fragment processing.

Thus, during the first, pre-pass operation, primitives in the sequence of primitives are processed into their respective fragments, and the resulting fragments are then processed to determine the desired visibility information associated with the fragments (e.g., and in an embodiment, by depth (and optionally also stencil) testing the fragments against a corresponding depth (stencil) buffer to determine the fragment's visibility), with the HSR ID buffer being updated accordingly during the first, pre-pass operation. That is, as mentioned above, whenever a fragment for a primitive is determined to be visible for a respective sampling position within the render output based on the visibility information generated so far by the processing of earlier primitives in the sequence of primitives, a respective entry in the fragment visibility buffer for the sampling position or positions to which the fragment relates should be (and in this example is) updated accordingly to record the primitive identifier for the primitive in question (i.e. the primitive that caused the update). This is then repeated for further primitives in the sequence of primitives. Thus, it will be appreciated that the entry for a given sampling position may (and will) subsequently be overwritten if a fragment for a later primitive is subsequently determined to be visible at that sampling position. The effect of this is therefore that at the end of the first, pre-pass operation the HSR ID buffer correspondingly reflects the full visibility information for the sequence of primitives, with the stored HSR IDs indicating, on a per-sampling position basis, which primitives should be further processed for which of the sampling positions.

Figure 27:
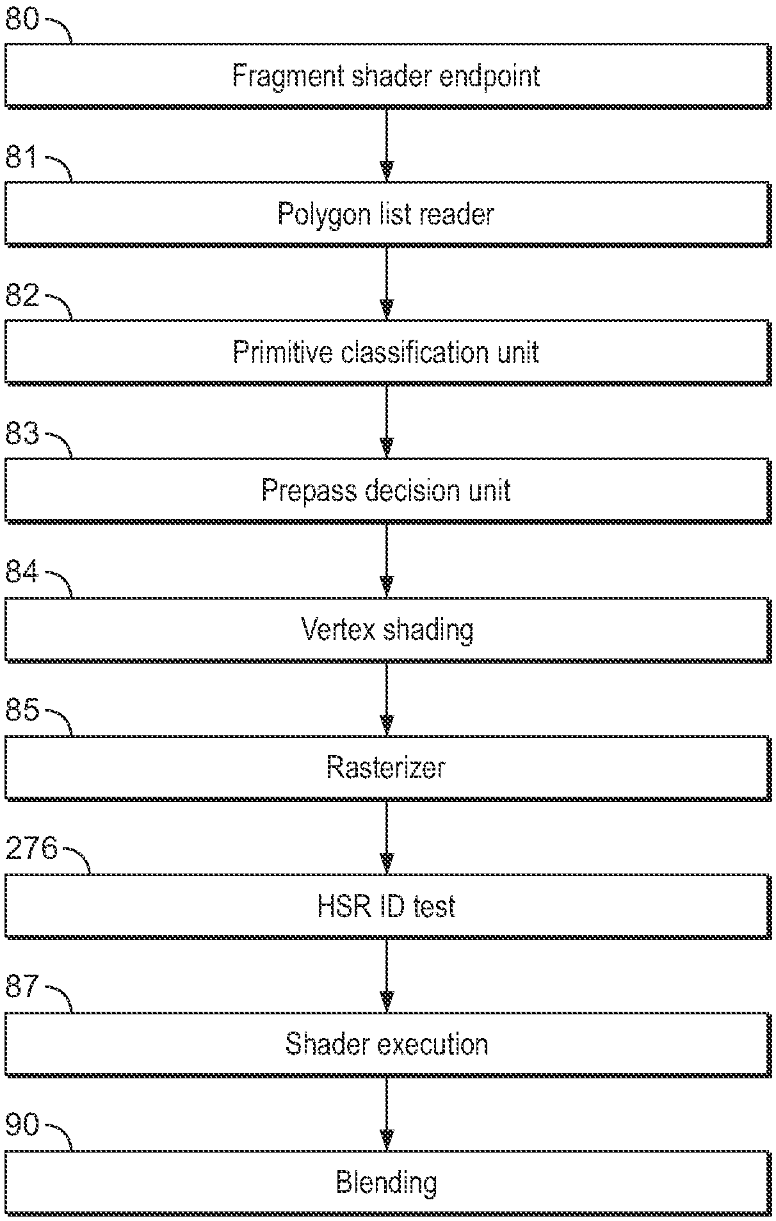
FIG. 27 shows schematically a sequence of processing operations for a corresponding main pass operation to be performed after the pre-pass operation shown in FIG. 24 including a visibility test against the HSR ID buffer.

The per-sampling position primitive identifiers can then be used as part of a subsequent fragment visibility testing operation during the second, main pass operation to identify which primitive should be further processed for a given sampling position, and hence allow fragments for other primitives to be culled accordingly for the second, main pass. FIG. 27 shows the sequence of processing operations for the corresponding main pass operation in this example that is to be performed after the pre-pass operation shown in FIG. 24.

As shown in FIG. 27, the second, main pass operation in this example comprises a pipelined sequence of processing operations including, in common with the first, pre-pass operation: the fragment shader endpoint 80 that schedules the rendering work that the graphics processing pipeline needs to perform in order to render a tile; the primitive list reader (polygon list reader 81) that reads the appropriate primitive list(s) for the tile to identify the primitives that are to be rendered for the tile; the primitive classification unit 82; the pre-pass decision unit 83; the vertex processing (shading) stage 84 that obtains (and shades, if necessary) the relevant vertex data for the primitives to be rendered for the tile; and the rasteriser 85 that rasterises primitives into respective fragments corresponding to sampling positions within the render output.

The second, main pass operation in this example does not perform depth testing of the fragments (although further depth testing could be performed if desired) but instead performs a HSR ID test 276 that tests whether the HSR ID for the fragment being tested matches the HSR ID value stored in the HSR ID buffer 250 for the sampling position or positions to which the fragment relates. Thus, if the fragment has the same HSR ID value as that stored in the HSR ID buffer 250, the fragment survives the HSR ID test 276, and is therefore further processed by executing a fragment shader 87, and then performing blending 90, etc., to generate the final rendered output data. On the other hand, if the fragment's HSR ID does not match the value stored in the HSR ID buffer 250, such that the fragment fails the HSR ID test 276, the fragment can be (and is) culled at this point during the second, main pass, with the fragment shading 87, etc., being avoided. In this way, the fragment processing during the second, main pass operation can be controlled based on the depth buffer generated during the first, pre-pass operation such that rendered output data is only produced for fragments that are actually visible.

Figure 28:
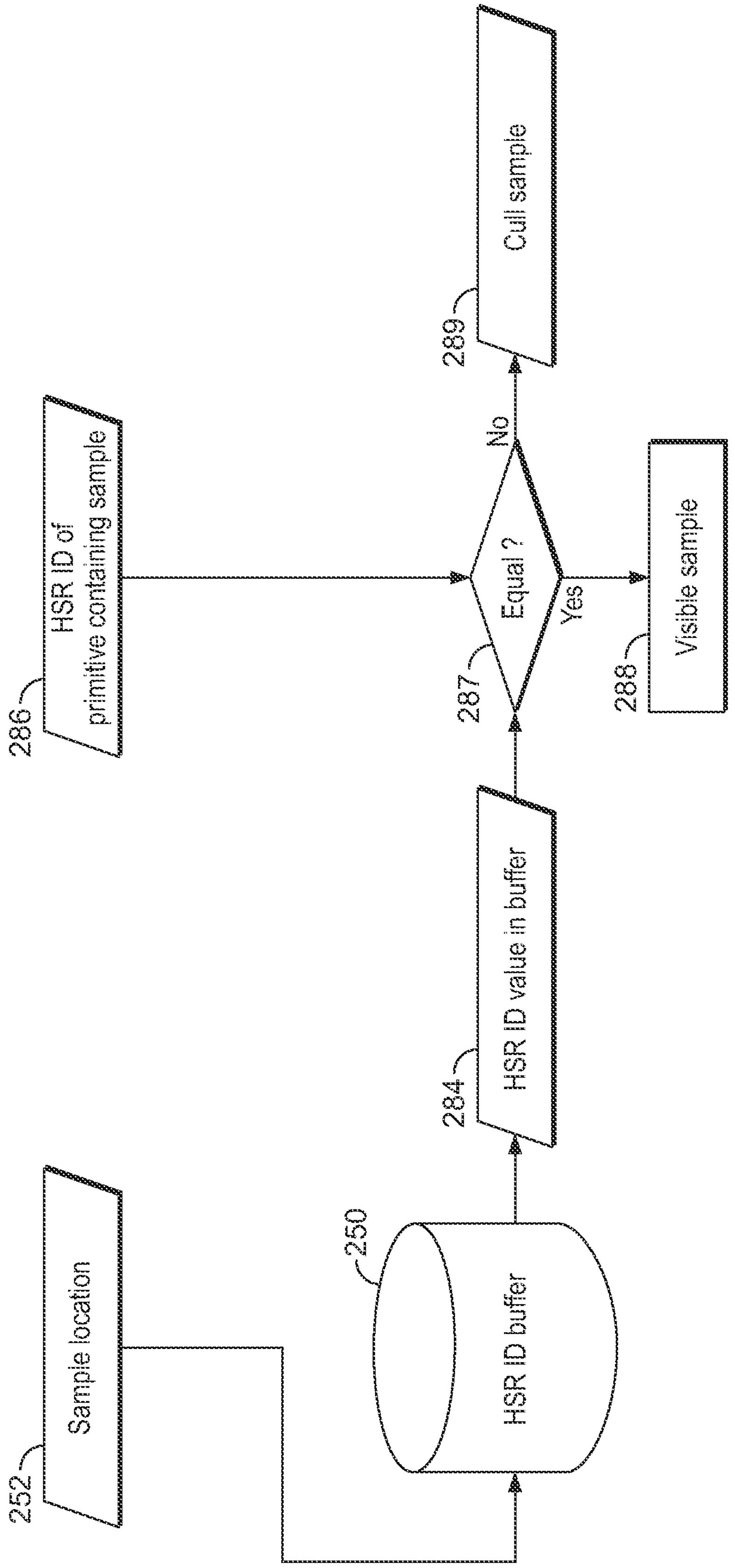
FIG. 28 shows schematically how such visibility testing against the HSR ID buffer is performed during the second, main pass operation.

FIG. 28 shows schematically how such visibility testing against the HSR ID buffer is performed during the second, main pass operation. Here, the address of the location to read from the HSR ID buffer 250 is determined by the sample location 252. The read HSR ID value stored in the buffer 284 is then compared to the HSR ID 286 of the primitive the sample being tested was rasterised from. If the values are equal (step 287—yes), the fragment is determined to be visible and is thus passed for further processing. On the other hand, if the values are not equal (do not match) (step 287—no), the sample is accordingly determined to be invisible. That is, for primitives that were processed during the first, pre-pass operation, and which could therefore have updated the HSR ID buffer in respect of a particular sampling position (but did not do so), this means that the primitive must have no visibility at that sampling position, and the fragments for the primitive relating to that sampling position can accordingly be culled on this basis (step 289).

Thus, in this example, the HSR ID test 276 uses an 'equals' test function. For instance, for any primitives that were processed during the first, pre-pass operation, and that could potentially therefore have updated the HSR ID buffer 250, if a fragment for such a primitive is visible in the final render output, the associated HSR ID for that primitive should be (and is) stored in the respective entries in the HSR ID buffer for the sampling position or positions to which the fragment relates. The HSR ID test 276 thus allows the graphics processor to cull any fragments for primitives that are not visible for the final render output when it is possible to do so, and to thereby provide sample-perfect hidden surface removal. The HSR ID values that are stored in the fragment visibility buffer 250 are thus usable during the subsequent visibility testing in the second, main pass operation to determine which primitives should be processed further for which sampling positions within the render output.

To facilitate the generation and use of the HSR ID buffer in this way, each primitive is therefore allocated a respective HSR ID that uniquely identifiers the primitive within its sequence of primitives (i.e. within the tile). This can be done during primitive classification as shown in FIG. 29.

Figure 29:
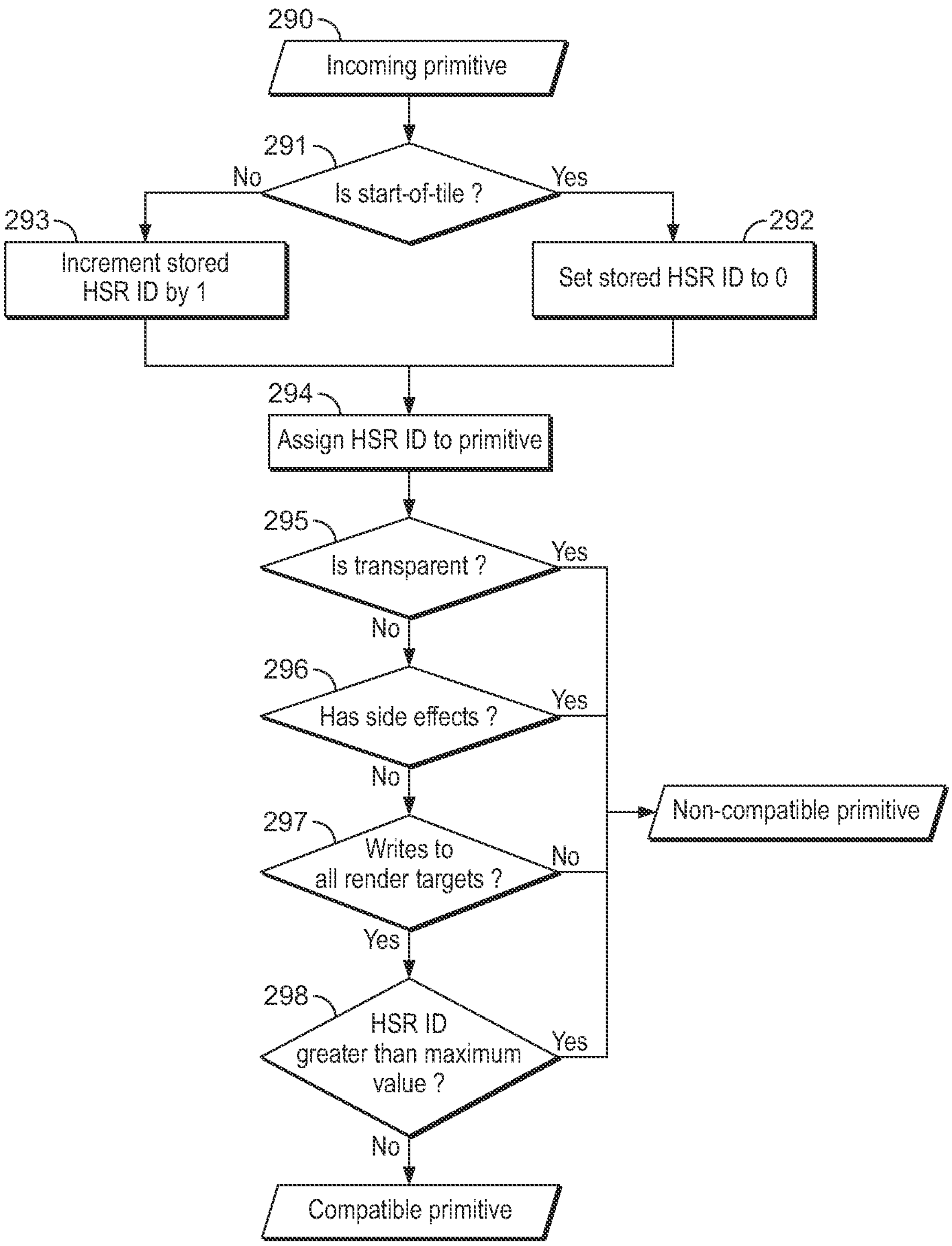
FIG. 29 shows schematically an example primitive classification process according to an embodiment using a HSR ID buffer.

FIG. 29 thus shows an example primitive classification process according to this fifth example in which the visibility information generated during the first, pre-pass operation comprises a dedicated HSR ID buffer. In this example the primitive classification may be performed at run-time. As shown in FIG. 29, for an incoming primitive 290 to the primitive classification, it is first checked whether the primitive is simply indicating the start of the tile (step 291) (in which case the HSR ID is set to 'zero' (step 291—yes)). For all subsequent primitives (step 291—no), the stored HSR ID is incremented by one, and then assigned to the primitive accordingly (step 294). Thus, each primitive in the sequence of primitives being processed is associated with a unique primitive identifier, with the primitive identifiers increasing monotonically within the sequence of primitives. In particular, in this example, the primitives may be indexed within the sequence of primitives starting from 'one' (such that the first primitive in the sequence may be identified as primitive 'one', the second primitive identified as primitive 'two', and so on). The value 'zero' is thus used to indicate as a null, or 'clear' value, to indicate that there is no primitive coverage at the sampling position in question.

The primitive classification in this example then continues as shown in FIG. 29. In particular, in this example, any primitives that are transparent (step 295), have side effects (step 296), or that do not write to all render targets (step 297) are treated as incompatible primitives. In this example, there is a further condition to be checked, namely whether or not the HSR ID is greater than the maximum possible HSR ID value. For example, if there are too many primitives to be processed, the system may effectively run out of HSR IDs that can be allocated. In that situation, any primitives that exceed the maximum possible HSR ID value are in this example simply treated as being incompatible with the pre-pass operation (step 298), and are therefore instead processed by the third, fallback operation as described above. Otherwise, if none of these conditions are met, the primitive is determined to be compatible with the pre-pass operation and is processed accordingly.

As described above, the primitive classification result is then used to drive the state machine for the graphics processor such that the pre-pass decision unit causes the graphics processor to initially process primitives by the first, pre-pass operation, and continue in this manner to the end of the tile so long as the primitives are compatible with being processed by the first, pre-pass operation, but is caused to transition to the third, fallback operation in the event that an incompatible primitive is encountered (as described above and shown in FIG. 7, for example).

Figure 30:
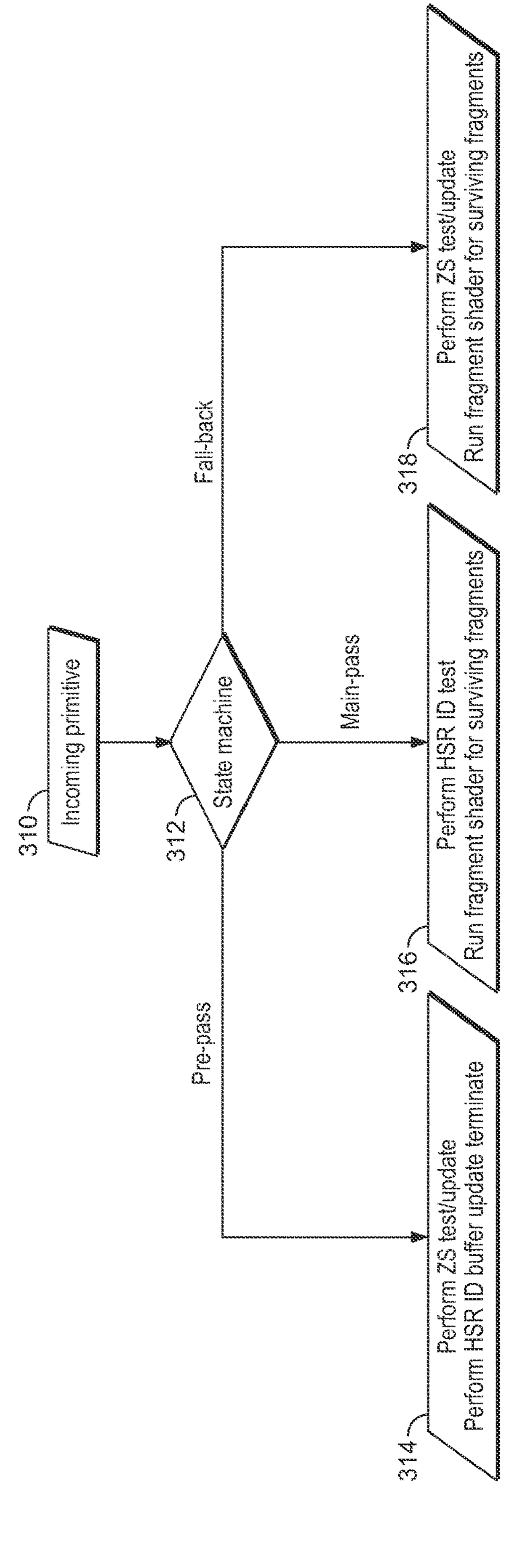
FIG. 30 shows schematically a state machine for a graphics processor operating according to this example using the HSR ID buffer.

FIG. 30 shows schematically a state machine 312 for a graphics processor operating according to this example using the HSR ID buffer showing, for an incoming primitive 310 to be processed, how the primitive 310 is processed differently according to the different possible states of the graphics processor in this example. Thus, when the graphics processor is configured in the pre-pass state 314, the pipeline stages shown in FIG. 24 are active, and the primitive is processed accordingly. Likewise, when the graphics processor is configured in the main pass state 316, the primitive is processed accordingly by the pipeline stages shown in FIG. 27. In this example, the graphics processor in the fallback state 318 may be configured as shown in FIG. 10 above, such that depth testing is performed as normal but no attempt is made to update the HSR ID buffer once the fallback mode is triggered (although in some cases the HSR ID update 241 may be left on during the fallback mode as well).

A benefit of this approach compared to the earlier examples is that there is no need to disambiguate primitives having the same depth (or stencil) values, since this can all be worked out during the first, pre-pass operation when determining the HSR ID buffer 250. This approach can also naturally handle stencilling, for example, since the stencil testing can be performed as normal during the first, pre-pass operation and the resulting visibility information recorded in the form of the HSR ID for the fragment that survives the depth/stencil testing. Thus, it can be seen from FIG. 29 that there are fewer conditions that trigger the fallback mode in this example compared to some of the earlier examples.

Example 6—HSR ID Buffer, ZS-Only Primitives

In example classification shown in FIG. 29, primitives that do not write to all render targets are however still treated as incompatible with the pre-pass operation (step 297). However, in some examples, primitives that do not write to all render targets may be compatible so long as they do not write to the final rendered output data, e.g. so long as they are only write depth/stencil values. This is illustrated in FIG. 31 and FIG. 32, for example.

Figure 31:
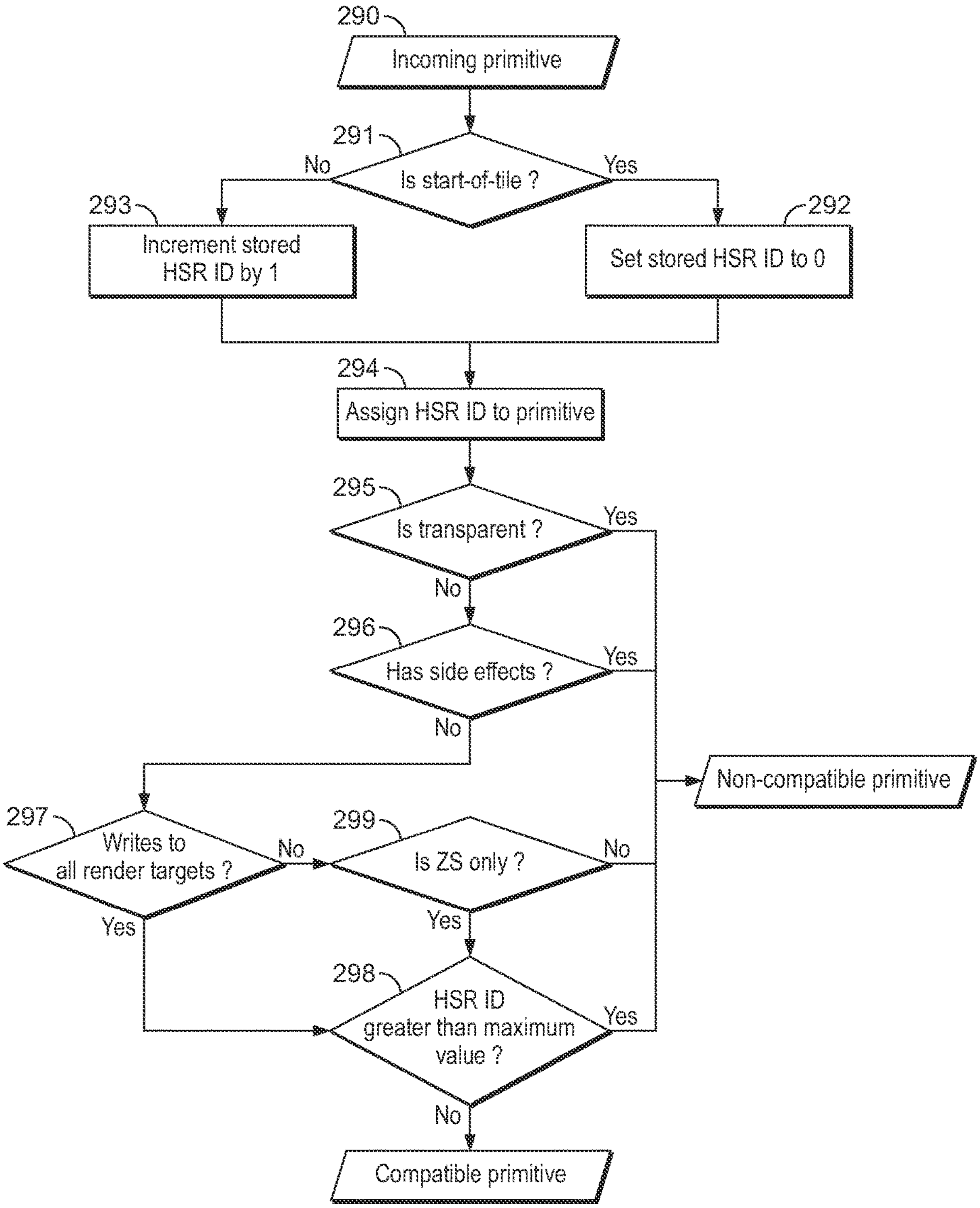
FIG. 31 shows schematically an example primitive classification process according to an example in which primitives that do not write to all render targets are made compatible with the pre-pass operation, so long as they only write depth/stencil values.

FIG. 31 shows a corresponding classification process for this example. The primitive classification process shown in FIG. 31 is generally similar to that shown in FIG. 29 except that for primitives that do not write to all render targets (step 297—no), it is then checked whether the primitive only writes depth/stencil values (step 299). If the primitive only writes depth/stencil values (step 299—yes), then so long as the HSR ID does not exceed the maximum possible HSR ID value (step 298—no), the primitive is determined to be compatible.

Figure 32:
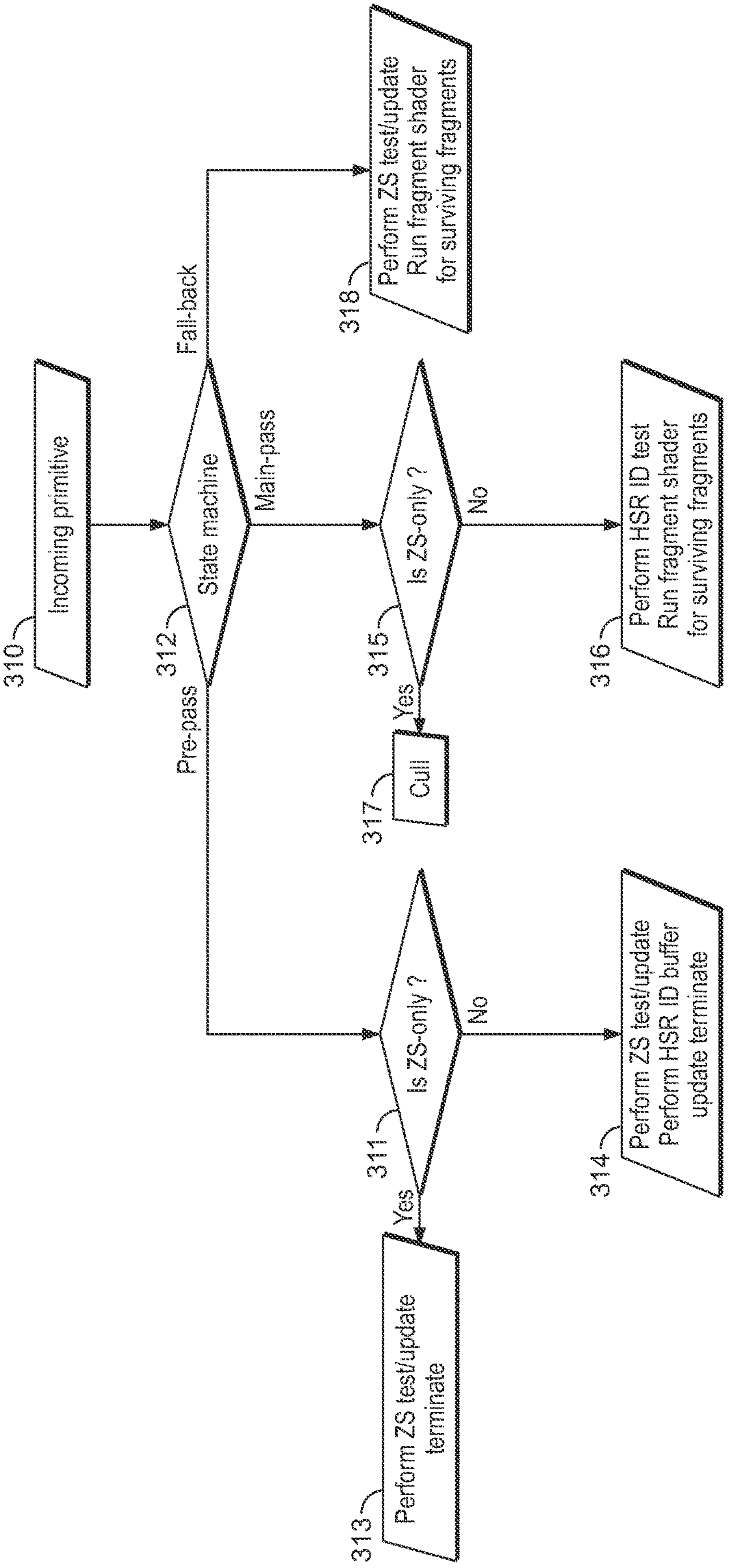
FIG. 32 shows the operation of the corresponding state machine for the example that is illustrated in FIG. 31.

FIG. 32 shows the corresponding pre-pass decision logic in this example. Again, this is generally the same as the state machine 312 shown in FIG. 30 except that it is also checked during the first, pre-pass operation whether the primitive only writes depth/stencil values. If the primitive only writes depth/stencil values (step 311—yes), the depth/stencil test/update is then performed but there is no need to update the HSR ID buffer (step 313). Otherwise, the first, pre-pass operation is performed as described above (step 314). This condition is also checked during the second, main pass operation in order to cull primitives that only write depth/stencil values (step 315). Thus, any primitives that only write depth/stencil values (step 315—yes), and hence do not need to be processed by the second, main pass to produce the final rendered output data, are culled at this point (step 317).

Example 7—HSR ID Buffer, Transparent Primitives

In the examples above, "transparent" primitives are determined to be incompatible with the pre-pass operation. This is because transparent primitives generally do not write depth values, and so cannot update the depth buffer, or therefore the HSR ID buffer. This means that the HSR ID equals testing if performed as described above would always cull any such transparent primitives that are not capable of updating the HSR ID buffer (since the HSR ID for the transparent primitive can never match the stored value in the HSR ID buffer), even if the correct behaviour based on the original depth testing is for the transparent primitive to be rendered.

For instance, as described above, at least for primitives that were capable of updating the HSR ID buffer during the first, pre-pass operation, the visibility testing during the second, main pass operation against the HSR ID buffer should (and does) comprise an 'equals' test. This works because if the primitive was already processed in the first, pre-pass operation such that it could in principle have updated the HSR ID buffer in respect of a particular sampling position, but it did not do so, this must mean that the primitive is not in fact visible at that sampling position. In other words, only primitives that were determined during the first, pre-pass operation to be visible at a particular sampling position will be recorded in the HSR ID buffer, and so only fragments whose HSR ID matches the value stored in the HSR ID buffer for the sampling position or positions to which the fragment relates should survive the HSR visibility testing. However, this does not work for transparent primitives that are not capable of updating the HSR ID buffer.

In the example described above therefore any transparent primitives are simply treated as being incompatible with the pre-pass operation. Another option would be to always pass transparent primitives and allow them to be dealt with appropriately by the fragment shader (or even by additional depth testing after the HSR ID test, if that were desired). In an embodiment, however, transparent primitives are also tested against the HSR ID buffer to try to cull them where it is possible to do so. To do this, the HSR ID test 276 that is performed during the second, main pass operation is modified accordingly for such transparent primitives such that a 'greater than' test function is used. That is, the HSR ID test 276 may either use an 'equals' test or a 'greater than' test, depending on the type of primitive (in particular whether or not the primitive could potentially have updated the HSR ID buffer in the first, pre-pass operation). In this case, there may be no need to process the transparent primitives in the first, pre-pass operation at all.

Figure 33:
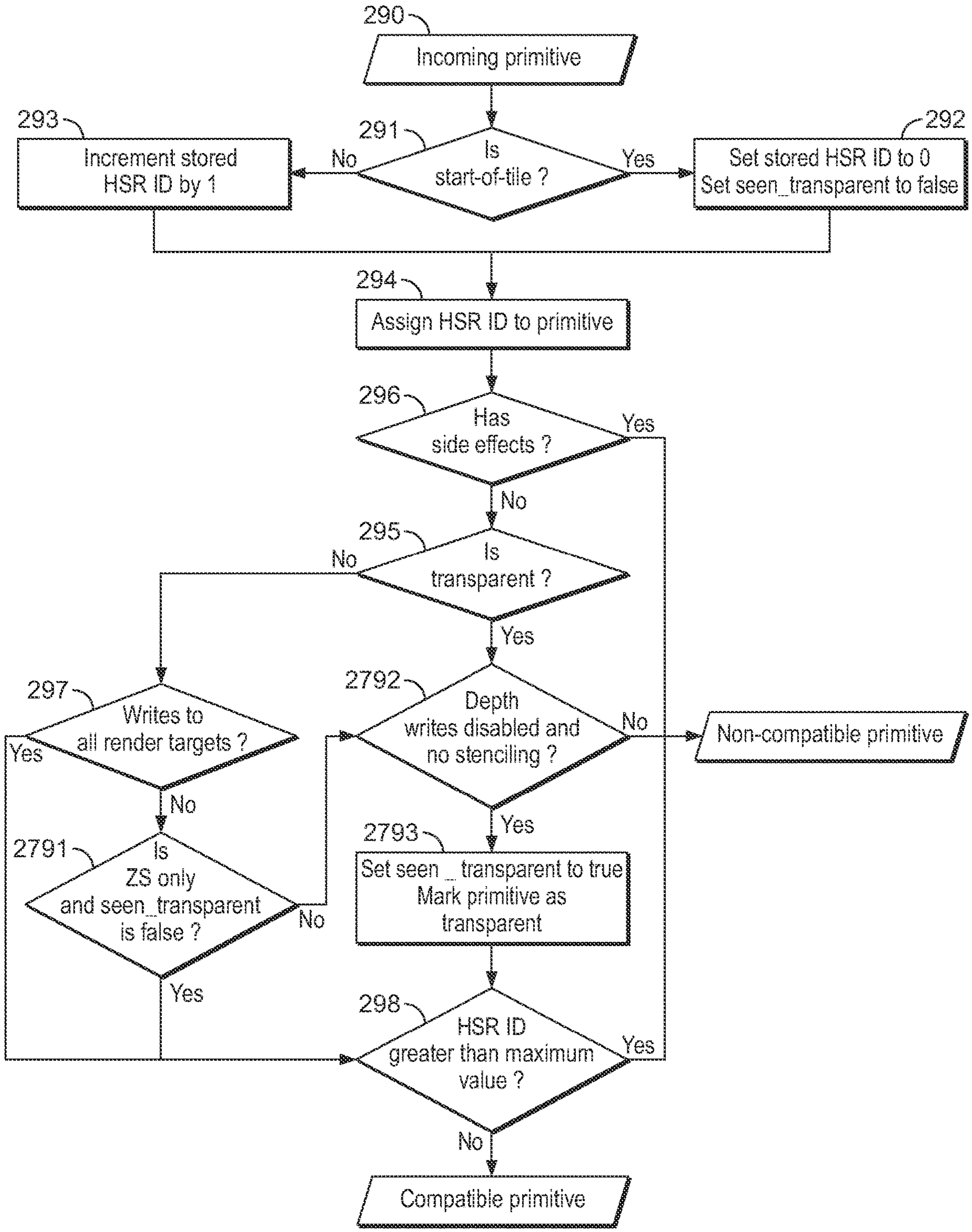
FIG. 33 shows schematically an example primitive classification process according to another example in which primitives that are marked as 'transparent' may be handled by processing the transparent primitives only by the second, main pass operation.

The following example illustrates how "transparent" primitives may be handled by the pre-pass operation. FIG. 33 shows a corresponding classification process for this example and FIG. 34 shows the corresponding pre-pass decision logic in this example.

As shown in FIG. 33, the primitive classification in this example generally proceeds as described above in relation to FIG. 31, except that in this case, if a primitive is determined to be transparent (step 295—yes), rather than this itself leading to the primitive being classified as incompatible, it is then checked whether depth writes are disabled and no stencilling is required for the primitive (step 2792). If this is not the case, as either depth writes are enabled or stencilling is required (step 2792—no), the primitive is then determined to be incompatible. Otherwise, so long as the HSR ID value is not greater than the maximum available HSR ID value (step 298—no), the primitive is compatible. In this even, the primitive is marked as transparent and a 'seen_transparent' flag is set to 'true' to indicate that a transparent primitive has been seen (step 2793) (note that this flag is initially set to false at the start of the tile (at step 292)).

The 'seen_transparent' flag is also used in the case that a primitive is not transparent (step 295—no), and the primitive does not write to all render targets (step 297—no). In that case, if the primitive writes only depth/stencil values and no transparent primitives have been seen so far (i.e. the 'seen_transparent' flag is set to false) (step 2791—yes), the primitive may still be compatible, assuming that there are no other conditions that would make it incompatible. If the primitive does not write only depth/stencil values or the 'seen_transparent' flag is set to true (step 2791—no), the classification then continues to determine whether depth writes are disabled and no stencilling is required for the primitive (step 2792) and the testing proceeds as above from that step.

Figure 34:
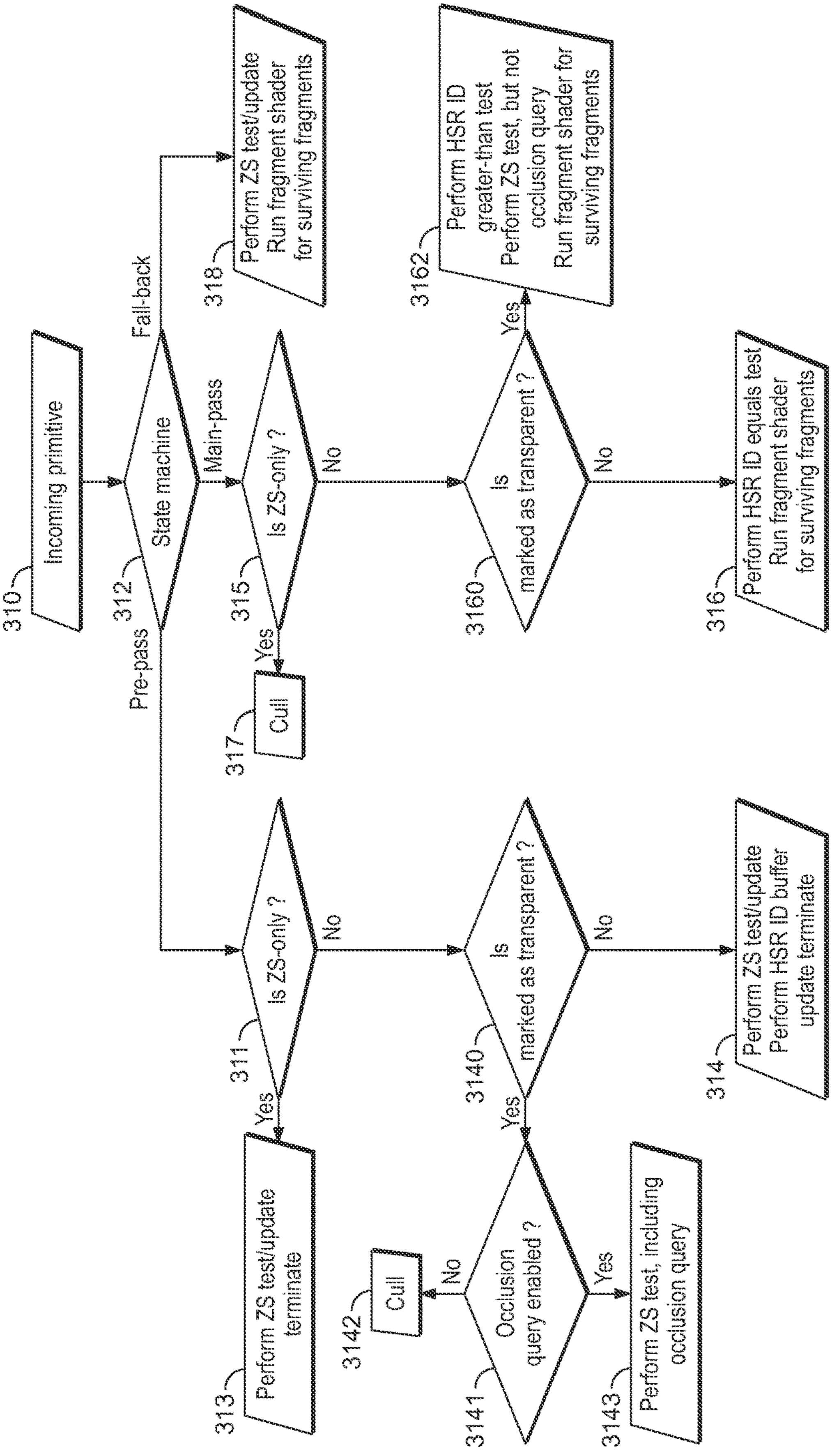
FIG. 34 shows the operation of the corresponding state machine for the example that is illustrated in FIG. 33.

FIG. 34 shows the corresponding pre-pass decision logic in this example. This basically corresponds to the state machine shown in FIG. 32 except that further decision logic is incorporated to handle primitives that are marked as transparent (at step 2793 in FIG. 33 above). In this example, the graphics processor in the fallback state 318 is again configured as shown in FIG. 10 above.

Thus, as shown in FIG. 34, when the graphics processor is configured in the pre-pass state, such that the pipeline stages shown in FIG. 24 are active, for primitives that do not only write depth/stencil values (step 311—no), it is further checked (at step 3140) whether primitives are marked as transparent. For primitives that are not marked as transparent (step 3140—no), the first, pre-pass operation is performed in the same manner described above, with the processing pipeline configured as shown in FIG. 24.

For transparent primitives, when the graphics processor is in the pre-pass state, if the primitive is transparent (step 3140—yes), the primitive may generally be culled unless an occlusion query is enabled that means that all primitives should be processed during the first, pre-pass operation. Thus, if occlusion queries are not enabled (step 3141—no), the transparent primitive is culled at this point (step 3142). Otherwise, if occlusion queries are enabled (step 3141—yes), the depth/stencil test should be performed including the occlusion query (step 3143).

Correspondingly, when the graphics processor is in the main pass state, if the primitive is transparent (step 3160—yes), the primitive should be passed to the graphics processing pipeline for further processing, but in this case the HSR ID test should be modified to comprise a 'greater than' test (step 3162). Thus, if the HSR ID for the transparent primitive is greater than the corresponding value stored in the HSR ID buffer 250, the transparent primitive survives the HSR ID test, and is further processed accordingly. On the other hand, if the HSR ID is not greater than the corresponding value stored in the HSR ID buffer 250, the greater than test is failed, and the transparent primitive can be culled on this basis (since the transparent primitive does not write a depth (or stencil) value (otherwise the transparent primitive would be determined to be incompatible with the pre-pass operation, as shown in FIG. 31) and so the correct behaviour is for the later opaque primitive to survive). (In this case further depth/stencil testing in an embodiment performed in main pass to cull transparent primitives that survive the 'greater than' test when it is possible to do so. However, occlusion queries should be disabled.) A fragment shader can then be run for any surviving fragments.

Accordingly, in this example, transparent primitives that do not write depth or stencil values and do not perform any stencilling operations are no longer necessarily treated as incompatible with the pre-pass operation but are instead in an embodiment processed only during the second, main pass operation as shown in FIG. 34.

Example 8—HSR ID Buffer, Primitives that Write to Less than all Render Targets In the examples above, primitives that do not write to all render targets are determined to be incompatible with the pre-pass operation. For example, in addition to depth, stencil, etc., a primitive may write to multiple different render colour targets. In that case, in the examples presented so far, the primitives are simply treated as incompatible primitives, and processed by the third, fallback operation. However, in further examples the primitive classification can be further modified in order to handle such primitives, at least in some situations. The following example thus illustrates how primitives that write to less than all render targets may be handled by the pre-pass operation.

Figure 35:
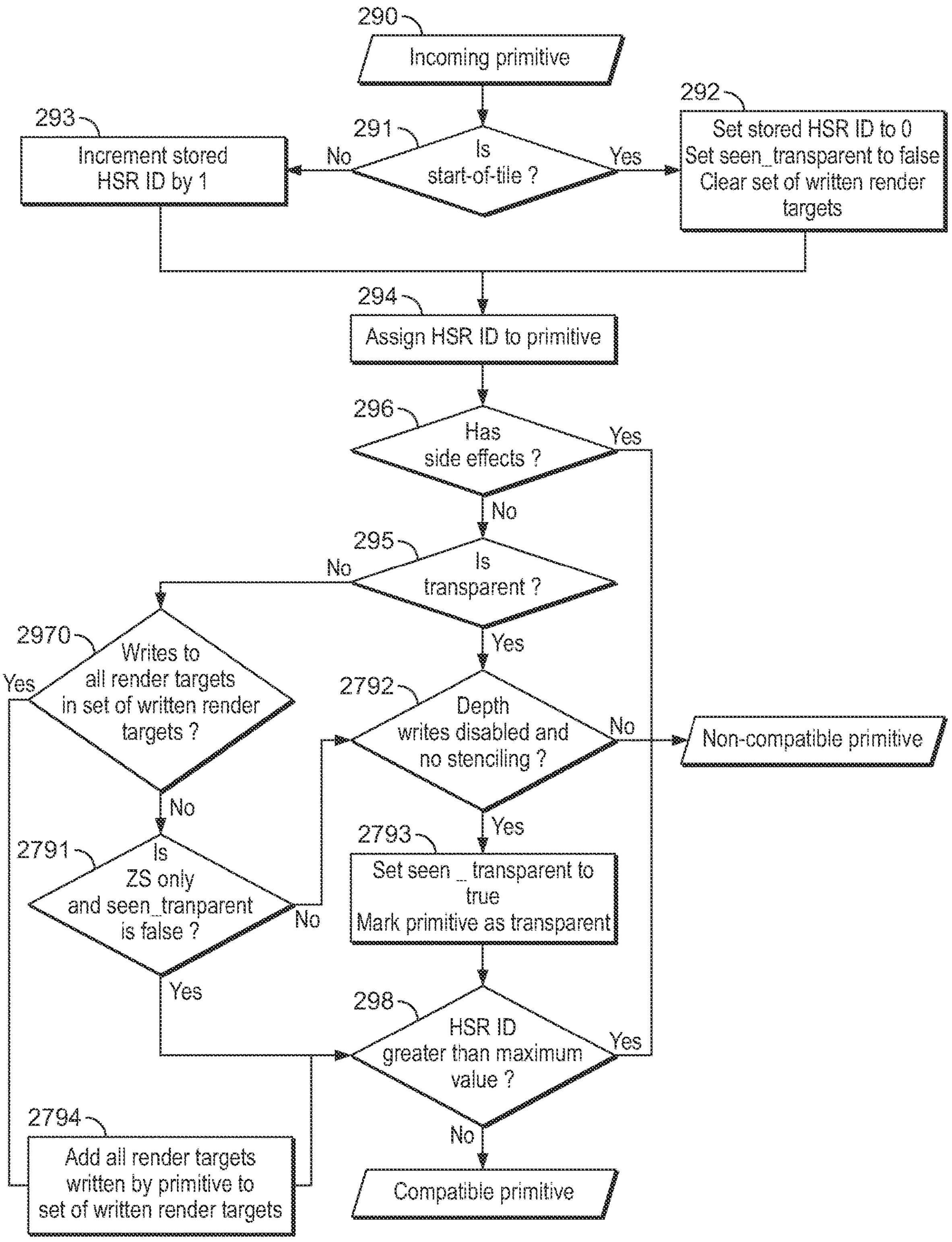
FIG. 35 shows schematically a corresponding classification process according to yet another example using the HSR ID buffer wherein the classification is performed to allow the pre-pass operation to handle some primitives that do not write to all render targets.

FIG. 35 shows a corresponding classification process according to another example using the HSR ID buffer wherein the classification is performed to allow the pre-pass operation to handle some primitives that do not write to all render targets (whereas in FIG. 29 above, any primitives that do not write to all render targets are automatically treated as incompatible). In this example, it is again assumed that any occlusion queries are performed during the depth/stencil testing stage.

As shown in FIG. 35, the primitive classification is generally the same as the primitive classification described above in relation to FIG. 33, except that instead of considering (at step 297) whether or not all render targets are written to, the primitive classification only requires that all render targets that have previously been written to are written to (step 2790). Thus, a set of render targets written render targets is maintained, and if the primitive writes to all render targets in the set of render targets written render targets (step 2790—yes), any (further) render targets written by the primitive are added to the set of written render targets (step 2974), and the primitive is then determined to be compatible (so long as its HSR ID does not exceed the maximum possible HSR ID (step 298)). This example can therefore support primitives that write only a subset of render targets. In this example the set of previously written render targets is thus cleared to zero at the start of the tile (at step 292) and then incremented as primitives are processed. It will be appreciated that in this example the primitive must therefore be performed at run-time.

Figure 36:
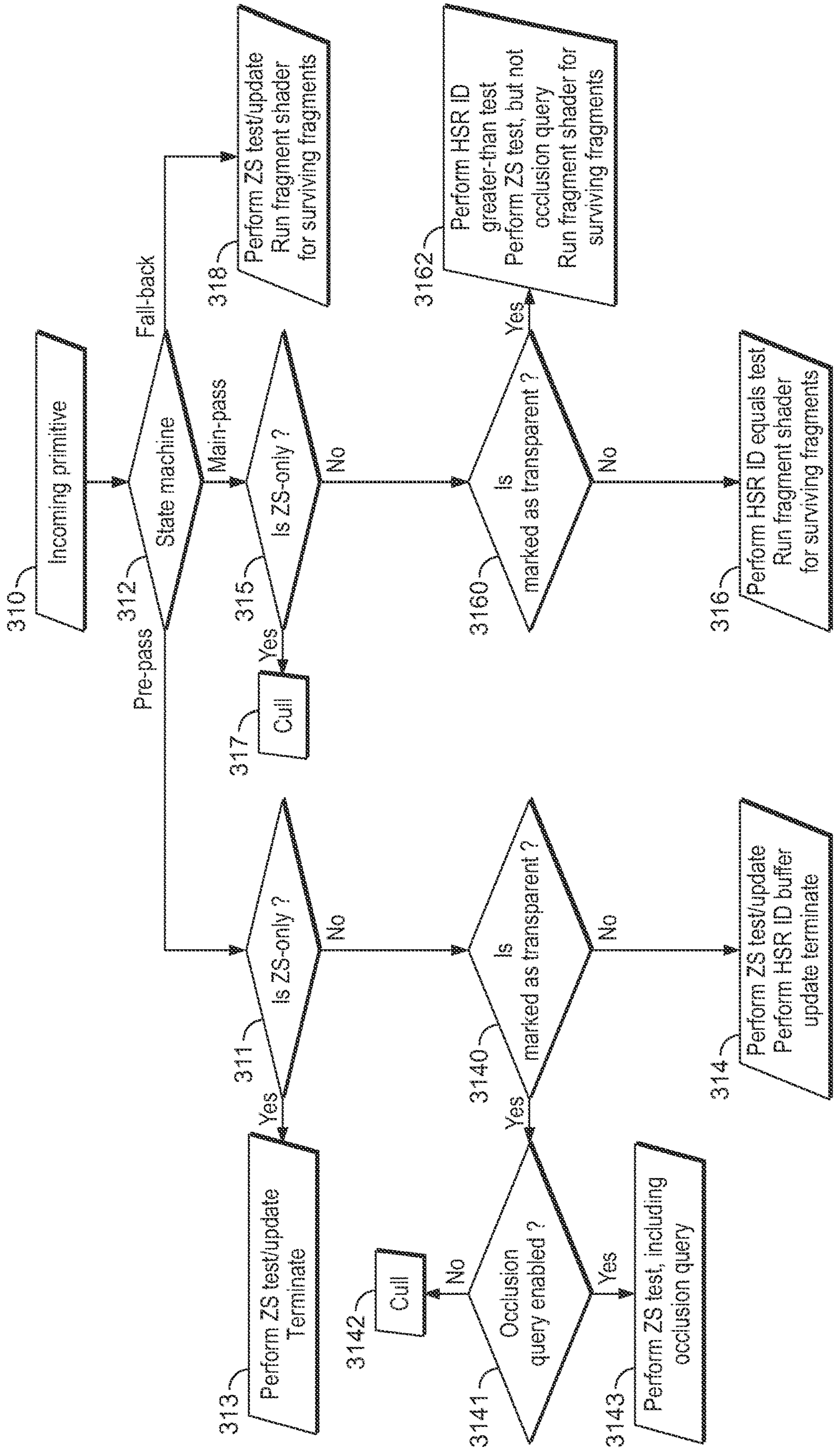
FIG. 36 shows the operation of the corresponding state machine for the example that is illustrated in FIG. 35.

FIG. 36 shows the corresponding pre-pass decision logic in this example. As shown in FIG. 36, the corresponding pre-pass decision logic in this example is the same as that shown in FIG. 34.

Example 9—HSR ID Buffer, Hierarchical HSR ID Testing

In the examples described above the HSR ID buffer stores a respective HSR ID for each sampling position within the render output. In some embodiments the HSR ID buffer however is also capable of (and contains respective entries for) storing HSR IDs for groups of plural sampling positions (with the groups of sampling positions corresponding to respective "patches" (regions) of the render output, and hence, correspondingly, "patches" of sampling positions).

In particular, the HSR ID buffer may (and does) store for respective patches of the render output a respective "minimum" HSR ID indicating the first primitive in the sequence of primitives that may subsequently need to be processed further for a sampling position encompassed (covered) by the patch and a corresponding "maximum" HSR ID indicating the final primitive of the primitives that were processed by the first, pre-pass operation that may need to be processed again during the second, main pass operation.

As will be explained further below, by arranging the HSR ID buffer in this "hierarchical" manner, such that respective HSR IDs are stored both at the level of the individual sampling positions within the render output and for higher level groups of sampling positions ("patches"), this can then then allow subsequent visibility testing to be performed at one or more different levels of subdivision of the render output, e.g., and in particular, by allowing groups of fragments to be tested at the patch level, and culled (when possible), in one go, e.g. thus avoiding having to test individual fragments when it is possible to determine already at the patch level that the fragments have no visible effect for their respective sampling positions. This can therefore facilitate speeding up the visibility testing and hence make the overall graphics processing operation more efficient.

For instance, in some examples the rasteriser 85 may use a "hierarchical" rasterisation arrangement in which primitives are iteratively tested against progressively smaller patches (regions) of the render output area (and thus, correspondingly, patches of fragments (and patches of sampling positions)). A primitive to be rasterised is thus in an embodiment first tested against a larger patch (e.g. a tile, in a tile-based rendering system) of the render output, to determine if the primitive covers (at least in part) any smaller patches of the render output encompassed by the larger patch. If the primitive does cover (at least in part) any smaller patches of the render output encompassed by the larger patch, the larger patch is then sub-divided into those smaller patches, and the process is then repeated for each smaller patch of the render output that was found to be at least partially covered by the primitive, until a minimum patch size is reached.

The HSR ID buffer may correspondingly also be arranged in such "hierarchical" manner to allow the primitive patches output by the rasteriser 85 to be tested against the respective per-patch entries (the "minimum" and "maximum" values for the respective patches) of the HSR ID buffer.

Figure 37:
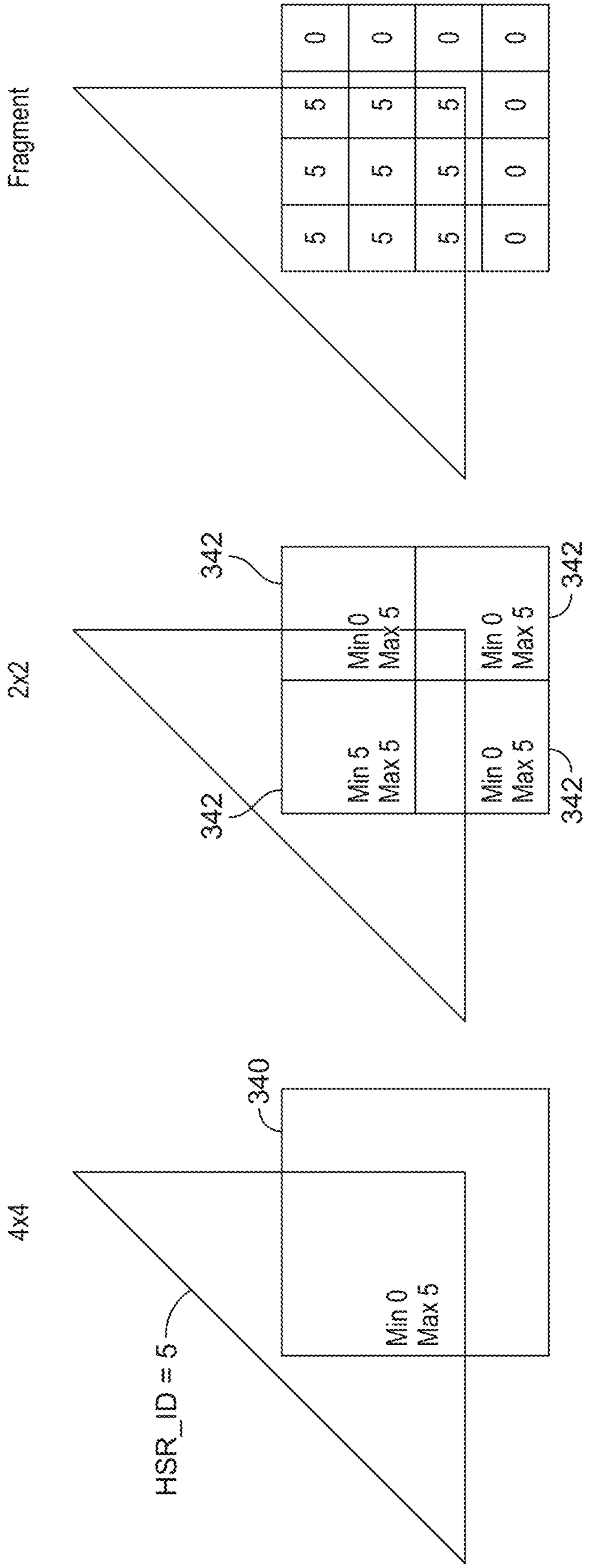
FIG. 37 shows schematically a "hierarchical" arrangement of such HSR ID buffer in which respective minimum and maximum primitive identifiers are stored for larger area "patches" of the render output.

FIG. 37 shows schematically a "hierarchical" arrangement of such HSR ID buffer in which respective minimum and maximum primitive identifiers are stored for larger area "patches" of the render output. In particular, FIG. 34 shows an arrangement in which the render output is subdivided into larger patches 340 which in this example correspond to patches of 4×4 fragments, and which larger patches 340 in turn are subdivided into smaller patches of 2×2 fragments 342. Although in this example only a single larger patch 340 is illustrated it will be appreciated that the entire render output will be similarly subdivided in this way into respective (non-overlapping) patches. It will also be appreciated that the patch sizes may be selected as desired and FIG. 34 is merely one example.

In the example shown in FIG. 37, there is a single visible primitive having HSR ID value of 5 which partially covers the larger patch 340. Therefore, it can be assumed that the earlier primitives with HSR ID values 1 to 4 are fully occluded by the visible primitive.

Figure 38:
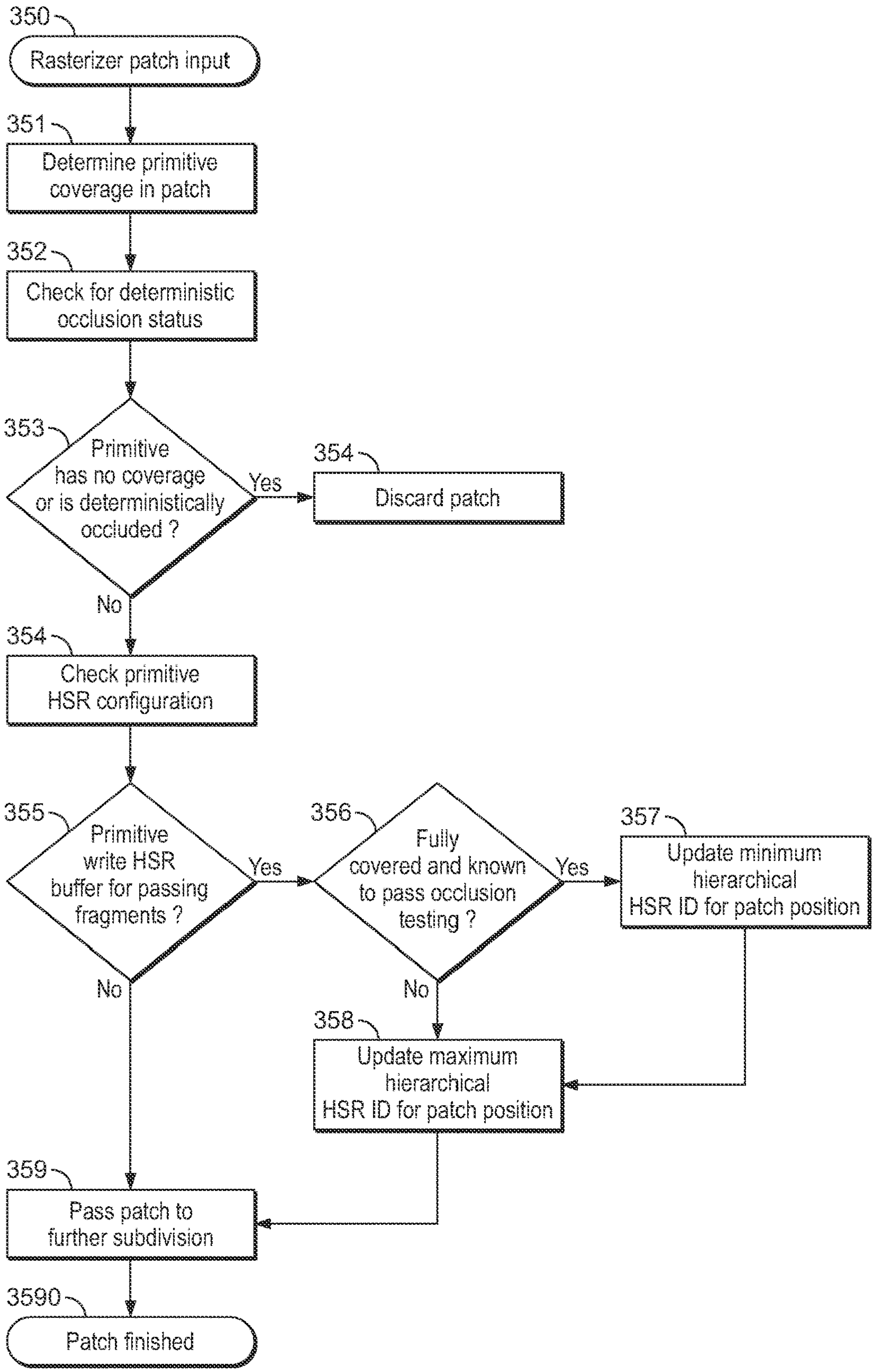
FIG. 38 shows schematically the generation of such hierarchical HSR ID buffer during the first, pre-pass operation.

FIG. 38 illustrates how the hierarchical HSR ID buffer can be generated during the early HSR ID update 241 in the first, pre-pass operation, which in this example is performed in a hierarchical manner, by first testing larger patches of the render output, and then testing progressively smaller patches of the render output, as necessary, down to the level of the individual fragments, in order to determine the HSR ID buffer.

As shown in FIG. 38, for an incoming primitive patch from the rasteriser (step 350), the primitive coverage in the patch is first determined (step 351). It is also determined whether or not the primitive patch is deterministically occluded (step 352). If the primitive has no coverage in the patch, or is deterministically occluded (step 353—yes), the primitive patch is then discarded (step 354), with no further testing. This then means that any further testing of the primitive against the individual sampling positions encompassed by the patch can be omitted as it has been determined already at the patch level that the primitive is not visible for any of those sampling positions.

On the other hand, if the primitive at least partially covers the patch, and is not deterministically occluded (step 353—no), testing of the patch continues. It is thus then checked whether or not the primitive is configured to write to the HSR ID buffer (step 354). This can be determined from the primitive classification, e.g. as described above. If the primitive is configured such that passing fragments do not update the HSR ID buffer (step 355—no), the HSR ID buffer should not be updated, and assuming there are further patches to be tested, the patch should instead be passed for further subdivision (step 359), and the testing of that patch is finished (step 3590).

For primitives that are configured such that passing fragments for the primitive should write to the HSR ID buffer (step 355—yes), the testing should continue to determine whether or not the HSR ID buffer should be updated for the patch in question. Accordingly, it is then determined whether the primitive fully covers the patch that is being tested and is visible at that patch. If the patch is fully covered and visible at the patch (step 356—yes), the minimum HSR ID for the patch position is updated accordingly to record the HSR ID associated with the primitive that is being tested (step 357). The maximum HSR ID for the patch position is also updated in either situation (step 356—yes or no) based on the primitive being potentially visible, in that it has been determined at this point that the primitive must partially cover the patch (step 353—yes) and it is known that any surviving fragments should write to the HSR ID buffer (step 355—yes). Thus, it cannot be excluded that the primitive might be visible within the patch, and the primitive should therefore be further processed (so the maximum HSR ID should be incremented accordingly).

The determined hierarchical HSR ID buffer including the per-patch minimum and maximum values is then used during the HSR ID test 276 in the second, main pass operation to try to cull primitives at the patch level, when it is possible to do so, thus avoiding having to always test the individual sampling positions. The testing against the hierarchical HSR ID buffer is shown in FIG. 39, for example.

Figure 39:
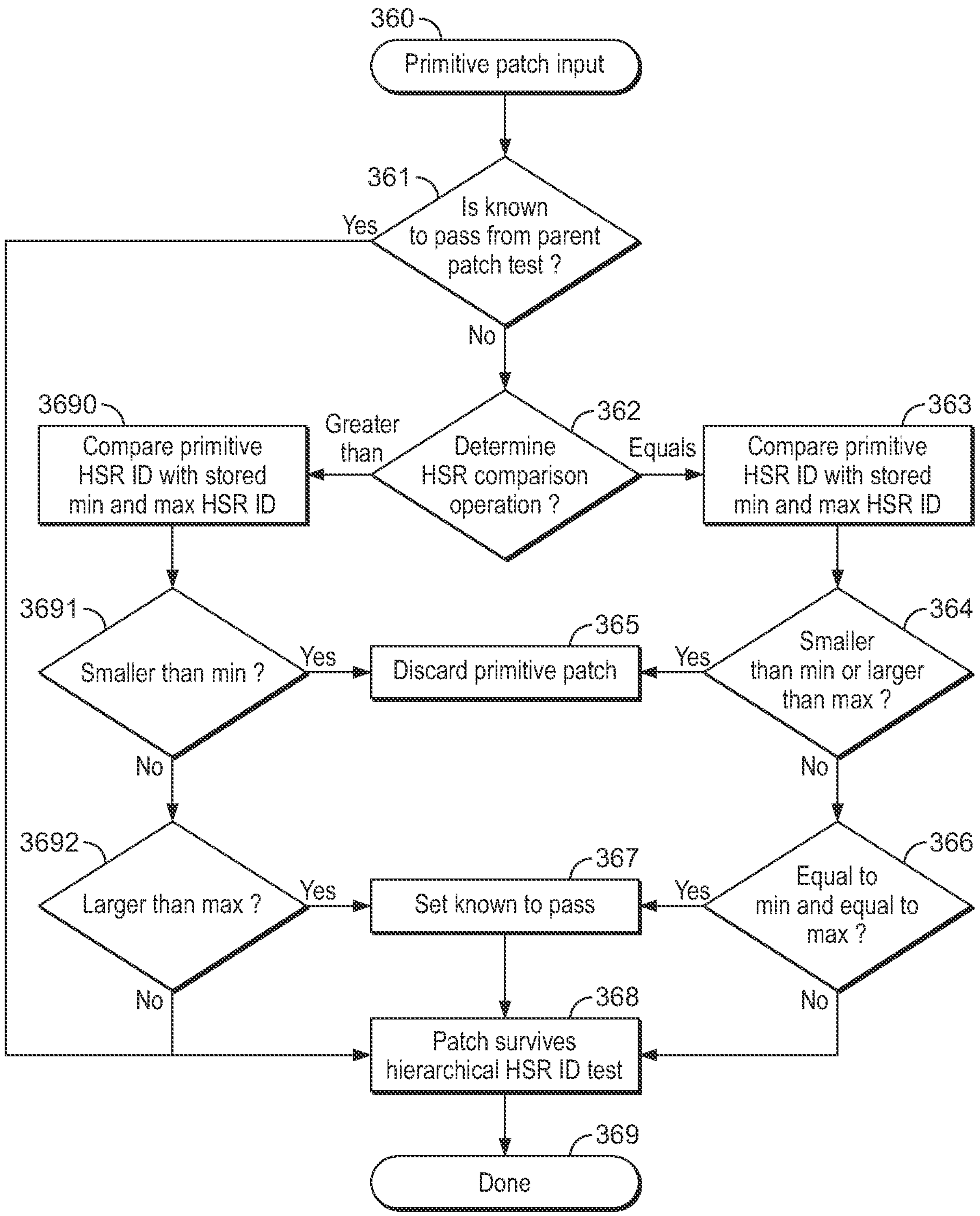
FIG. 39 shows the corresponding use of such hierarchical HSR ID buffer during the second, main pass operation.

As shown in FIG. 39, for an incoming primitive patch to be tested (step 360) against a respective patch of the render output, it is first checked whether or not the primitive patch is already known to pass based on it having already passed the testing in respect of a parent patch (step 361). Thus, if the primitive patch is set known to pass (step 361—yes), the patch is determined to survive the hierarchical HSR ID test without further explicit testing (step 368), and the testing of the patch is done (step 369). The testing can then proceed to the next smaller patch, as necessary.

Assuming that the primitive patch has not been set as known to pass (step 361—no), the testing then proceeds as follows. Firstly, it is determined what type of HSR ID test function should be used (step 362). For primitives that use an 'equals' test function, the primitive HSR ID associated with the primitive is then compared with the stored minimum and maximum HSR IDs for the patch (step 363). If the HSR ID associated with primitive patch being tested is smaller than the minimum HSR ID for the patch or greater than the maximum HSR ID for the patch (step 364—yes), this means the primitive patch can be culled (step 365), and no further subdivision or testing of the primitive is necessary.

If the HSR ID associated with the primitive patch lies between the stored minimum and maximum HSR IDs for the patch, the primitive patch should generally survive the hierarchical HSR ID testing at this level. However, there is a special case in which the stored minimum and maximum HSR IDs for the patch are the same. In that case, if the HSR ID associated with the primitive patch is equal to both the minimum and maximum HSR IDs for the patch (step 366—yes), it is known that the primitive must pass all further visibility testing for any sampling positions encompassed by the current patch, since it is only primitive that can survive. In this case, the primitive may therefore be set as known to pass (step 367). The primitive patch thus survives (step 368) and the testing of that patch is done (step 369). In this situation, because the primitive is set as known to pass, any smaller primitive patches also automatically pass the testing (step 361—yes).

Otherwise, if the stored minimum and maximum HSR IDs for the patch are not the same, so that the HSR ID associated with the primitive patch cannot be equal to both of them (step 366—no), the primitive is determined to survive the hierarchical HSR ID test at this level (step 368), and the testing at that level is done (step 369), but the primitive patch may still need to be tested further against smaller patches of the render output, assuming the minimum patch size has not yet been reached.

The above relates to the testing for primitives that use the 'equals' test (e.g. opaque primitives that could in principle have updated the HSR ID buffer during the pre-pass operation). As mentioned earlier, there may be other primitives that use a different 'greater than' test. This is particularly the case for transparent primitives that do not write depth or stencil values and which are in some examples processed only during the second, main pass operation.

For such primitives using the 'greater than' test, the HSR ID associated with the primitive patch is again compared with the stored minimum and maximum HSR IDs for the patch in question (step 3690). However, in this case, the patch can only be discarded (step 365) if the HSR ID associated with the primitive is lower than the stored minimum HSR ID for the patch (step 3691—yes). That is, since the test comprises a 'greater than' test, the primitives cannot be culled based on the maximum HSR ID. Conversely, if the HSR ID associated with the primitive patch is greater than the maximum HSR ID (step 3692—yes), this means that the primitive must always pass the greater than testing for all of the sampling positions encompassed by the patch. In that case, therefore, the primitive may be set as known to pass (step 367), such that the primitive is caused to pass the hierarchical testing at the current level (step 368) and is always set to automatically pass the testing for all sampling positions encompassed by the current patch.

Otherwise, if the HSR ID associated with the primitive patch lies between the stored minimum and maximum HSR ID values for the patch (step 3692—no), the primitive survives the testing against the current patch (step 368), but the primitive should be further subdivided and tested further against smaller patches of the render output, assuming the minimum patch size has not yet been reached. For instance, it may be possible that the HSR ID associated with the primitive patch is either smaller than the minimum value stored for a smaller patch of the render output, or greater than the maximum value, in which case the smaller primitive patch can be culled/passed at that level.

The effect of this is therefore that the minimum HSR ID stored for a patch indicates the first primitive that may need to be processed further for the patch in question. Thus, referring to the example shown in FIG. 37, for the larger patch 340, the shown primitive does not fully cover the larger patch 340 (step 356—no). Thus, the minimum HSR ID cannot be updated for the larger patch 340. The HSR ID buffer thus stores in respect of the larger patch 340 a minimum HSR ID value of 0 and a maximum HSR ID value of 5. This means that during the HSR ID testing 276 in the second, main pass operation, each of the primitives having HSR IDs 1 to 5 will survive the hierarchical HSR ID testing against the larger 4×4 patch 340.

The hierarchical HSR ID testing will accordingly then proceed to test each primitive against the set of smaller 2×2 patches 342. In this case, as shown in FIG. 37, the top left 2×2 patch is fully covered, and so the minimum HSR ID stored for that patch 342 will be updated accordingly during the first, pre-pass operation such that the minimum HSR ID stored for that patch is 5. Thus, when testing against the top left 2×2 patch 342, the primitive patch having associated HSR ID of 5 will be detected as known to pass, since its HSR ID matches both the minimum and maximum stored HSR ID values for that patch. In this case, the individual testing of the top left four fragments can be avoided since those fragments are all known to pass based on the hierarchical testing. Otherwise, in this example, it is not possible to cull/pass any other patches, and so the remaining fragments must be individually tested.

In the example described above the hierarchical HSR ID buffer is thus determined 'on the fly' as part of the HSR ID update 241 during the first, pre-pass operation. Thus, as described above, the minimum HSR ID stored for a patch is generally updated whenever a primitive that fully covers that patch is found to be visible, as described above in relation to FIG. 38.

In further examples, a finalisation ('baking') process may be performed at the end of the first, pre-pass operation that iterates over the determined hierarchical HSR ID buffer to try to refine the stored minimum and maximum HSR values for the different patches. For example, it may be the case that there is no single primitive that fully covers a patch, but the patch is fully covered by a group of primitives. In that case, it may be possible to identify a (narrower) range of primitives that should be processed further for the patch, and the minimum and maximum HSR ID values stored for the patch may thus be updated accordingly. This is illustrated in FIG. 40, for example.

Figure 40:
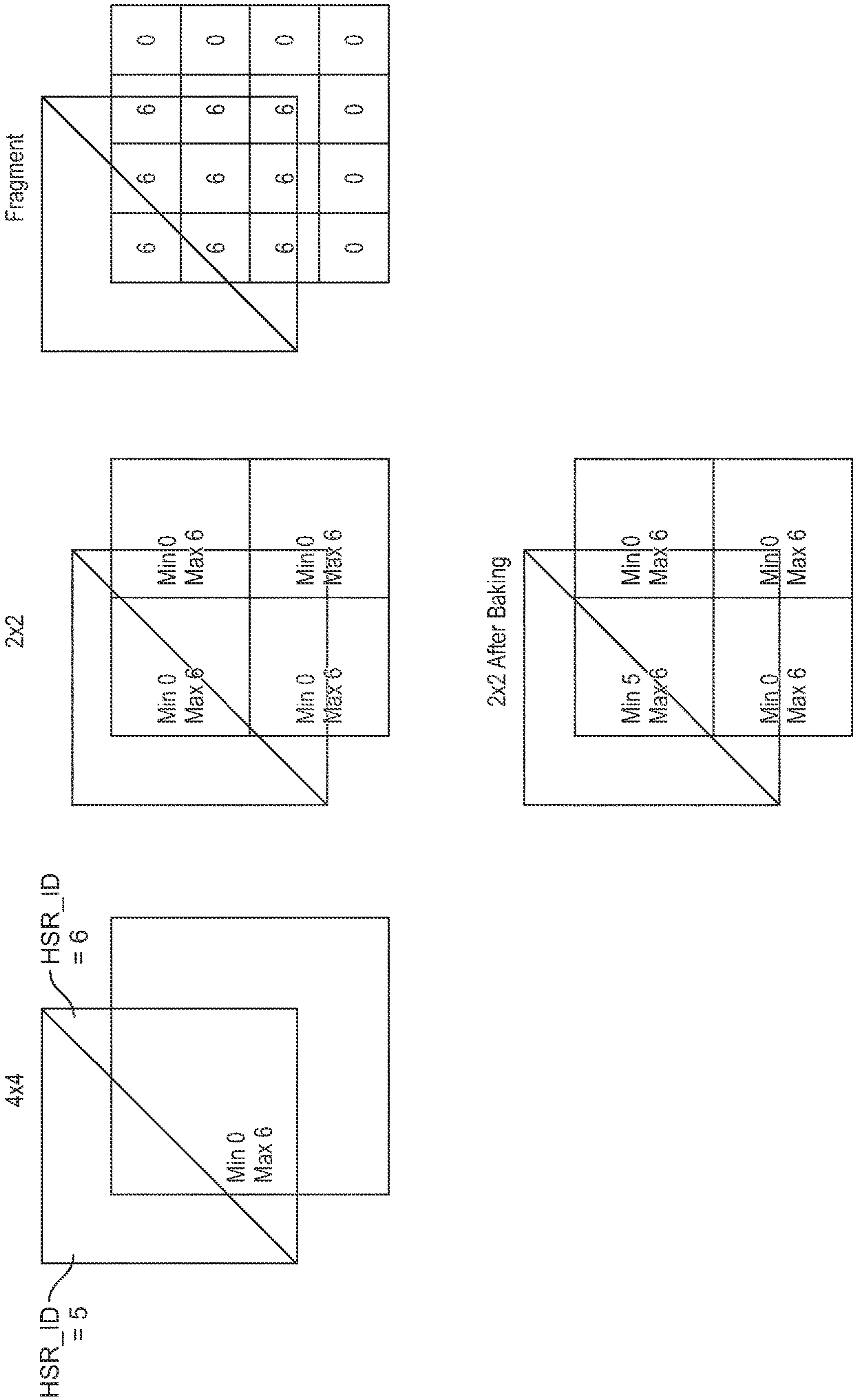
FIG. 40 shows schematically a finalisation ("baking") process for refining the hierarchical HSR ID buffer at the end of the first, pre-pass operation.

In the example shown in FIG. 40 there are now two visible primitives, having respective HSR ID values 5 and 6. As shown in FIG. 40, neither primitive fully covers the larger 4×4 patch. Likewise, neither primitive fully covers any of the smaller 2×2 patches. Thus, according to the scheme as shown in FIG. 35 above, the stored minimum HSR ID is not updated for any of the patches during the first, pre-pass operation. However, it can be seen from FIG. 40 that the top left 2×2 patch is in fact fully covered by the combination of the two primitives. Thus, by suitably iterating over the initially determined HSR ID buffer, the minimum HSR ID for that patch can be updated accordingly (such that the minimum HSR ID value is now 5). This therefore allows at least the primitives with HSR ID values 1 to 4 to be culled for that patch, without having to test those primitives against the individual sampling positions covered by that patch.

Figure 41:
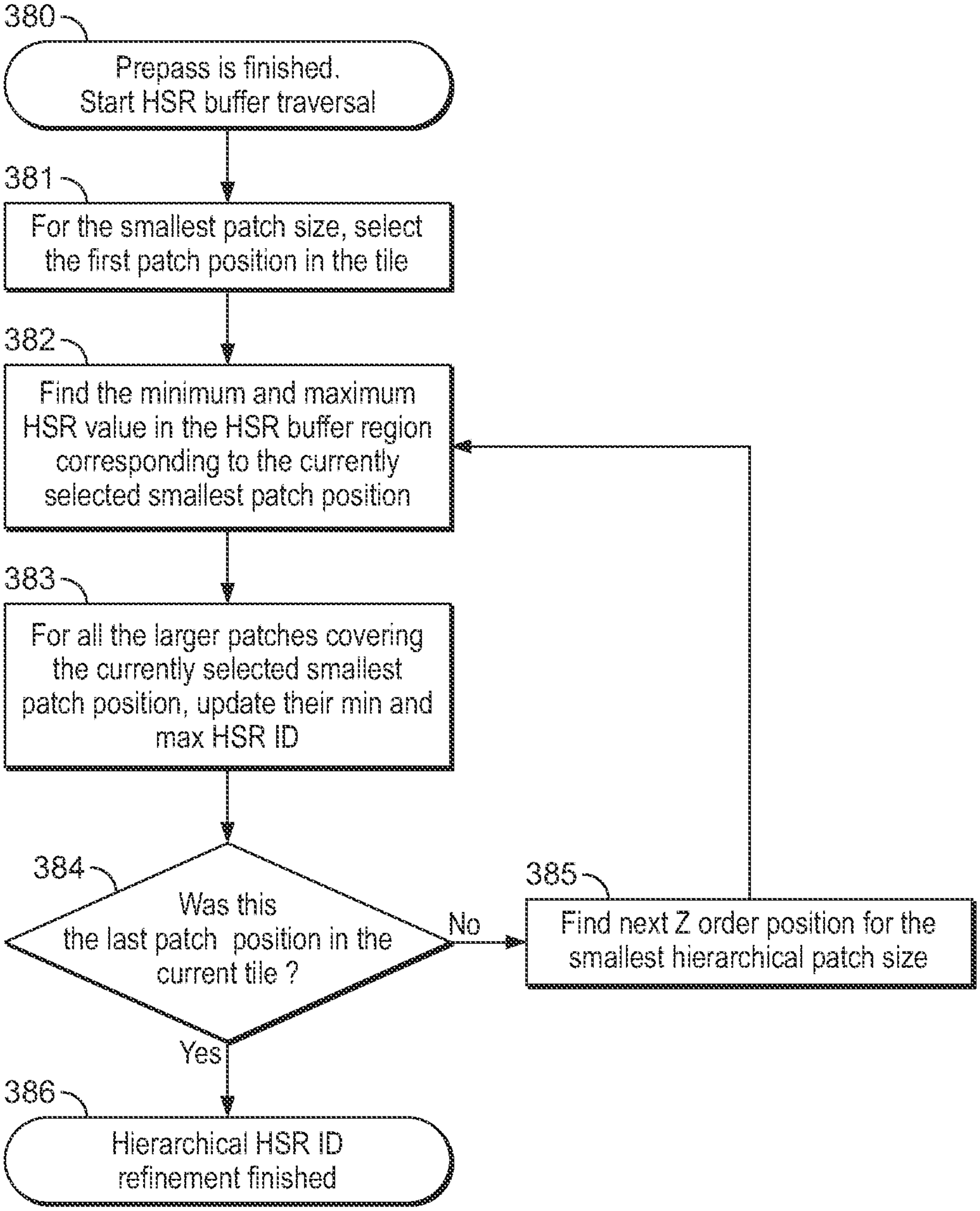
FIG. 41 shows further details of the finalisation ("baking") process.

The finalisation ('baking') process in this example is shown in FIG. 41. As shown in FIG. 41, once the pre-pass operations for a tile have finished, such that all primitives for the tile that are to be processed by the pre-pass have passed through the graphics processing pipeline shown in FIG. 24, to thereby determine an initial HSR ID buffer, the finalisation ('baking') process is initiated by starting a traversal over the initially determined HSR ID buffer (step 380).

In this example, the traversal starts at the smallest patch size, and selects the first patch position in the tile (step 381). The traversal then iterates over the sampling positions encompassed by the selected patch to find the actual minimum and maximum HSR ID values that are stored in the HSR ID buffer for the sampling positions encompassed by the selected patch (step 382). For all larger patches covering the currently selected patch position, the minimum and maximum HSR ID values are then updated accordingly (if it is possible to do so) (step 383). Assuming the current patch position is not the last position in the current tile (step 384—no), the next patch position is selected (step 385), and the process is repeated for that patch position. Once all of the patch positions have been processed in this way (step 384—yes), the hierarchical HSR ID buffer refinement is finished (step 386).

Figure 42:
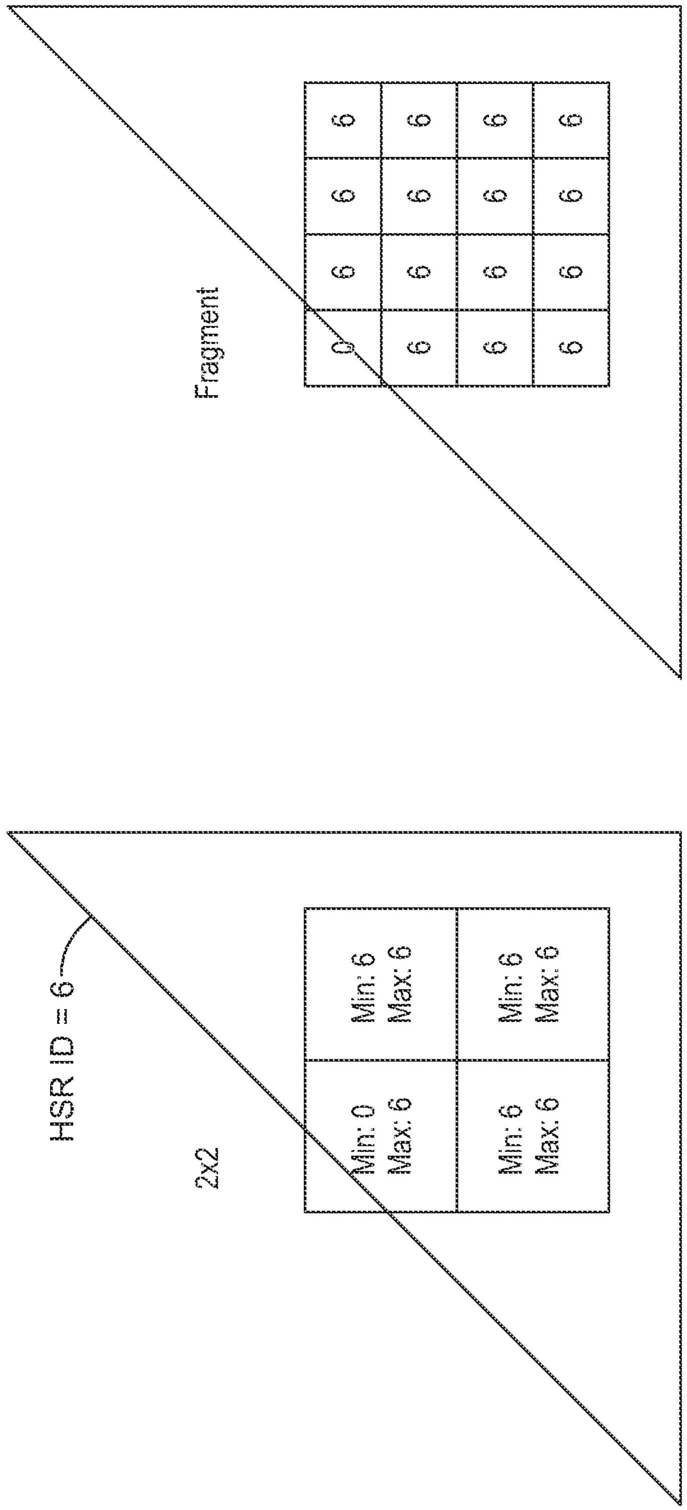
FIG. 42 illustrates how it may be determined during the first, pre-pass operation that no further refinement of the HSR ID buffer is possible.

In the example shown in FIG. 41, the finalisation ('baking') process thus iterates over all of the sampling positions in the render output. This can therefore take a significant time. In this respect, however, it will be appreciated that at least some of this iteration may be omitted if it can already be determined from the initially determined HSR ID buffer that no further refinement would be possible. An example of this is shown in FIG. 42. In this example, it can be seen that three of the 2×2 patches are fully covered by the same primitive, having HSR ID value of 6. As described above according to the 'on the fly' population of the HSR ID buffer as shown in FIG. 38, the HSR ID buffer will therefore store as the respective minimum and maximum HSR IDs for each of these patches the same value (i.e. '6'), with this indicating that the primitive with HSR ID of 6 is known to pass for all sampling positions encompassed by the 2×2 patch. In this case, it is clear that no further refinement of the minimum or maximum is possible for those patches.

Figure 43:
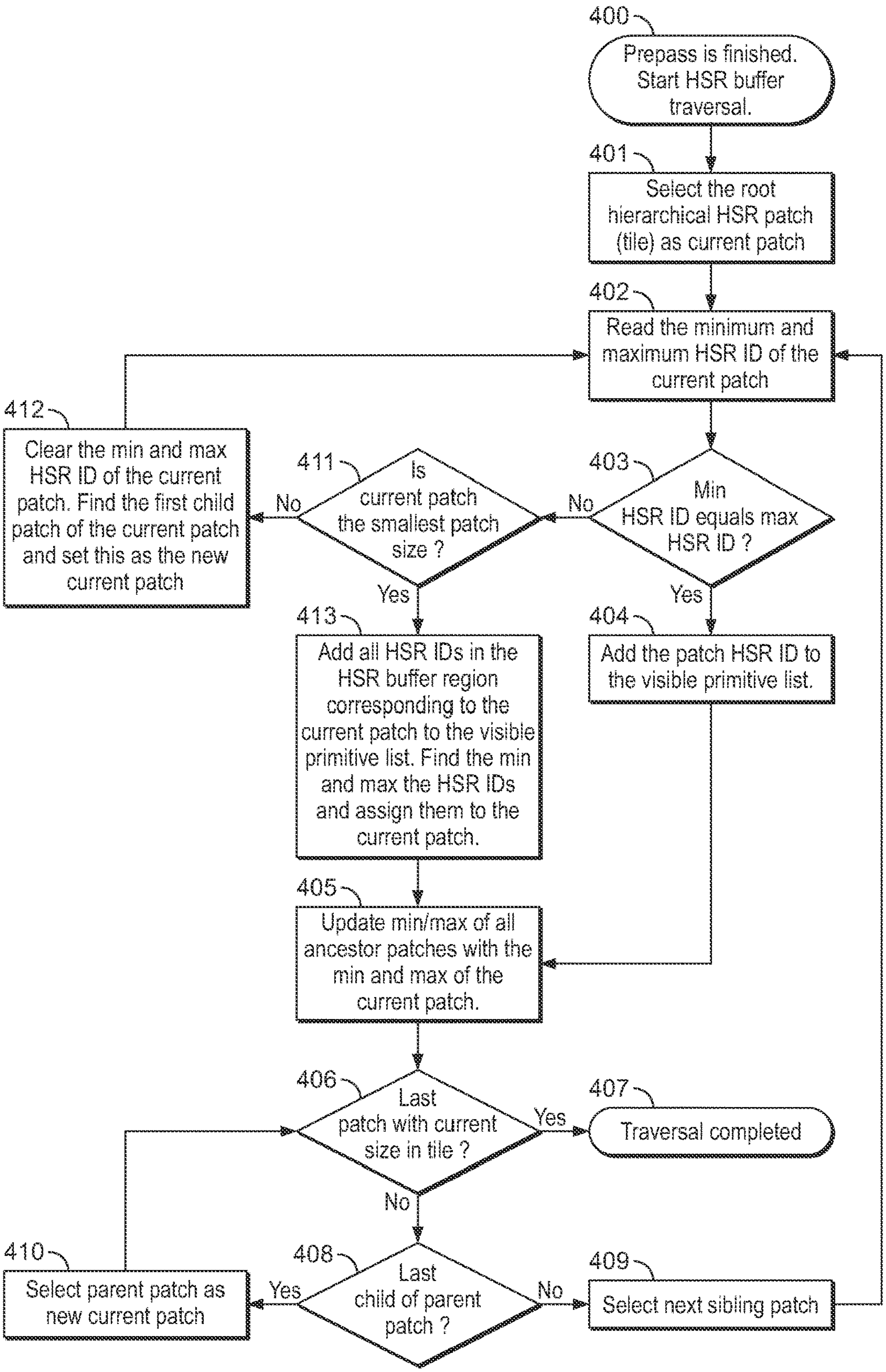
FIG. 43 shows schematically an improved finalisation ("baking") process for refining the hierarchical HSR ID buffer at the end of the first, pre-pass operation in which iteration is skipped for patches for which further refinement of the HSR ID buffer is possible.

FIG. 43 thus shows an improved finalisation ("baking") process according to a further example in which the traversal can be accelerated in such situations where it can already be determined that no refinement is possible. Again, this starts (step 400) once the pre-pass operations for a tile have finished, such that all primitives for the tile that are to be processed by the pre-pass have passed through the graphics processing pipeline shown in FIG. 24, to thereby determine an initial HSR ID buffer. In this example, the minimum and maximum HSR IDs for the current patch are read (step 402), and it is determined whether or not they are the same (i.e. whether the minimum HSR stored ID matches the maximum stored HSR ID). If the minimum and maximum HSR IDs for the current patch are the same (step 403—yes), the patch HSR ID is then added to a list of visible primitives (step 404). At this point, the minimum and maximum values for all higher level patches are updated (as necessary) with the minimum and maximum values for the current patch (step 405). If the current patch is the last patch at the current level of testing (step 406—yes), the traversal is then completed (step 407). Otherwise, if current patch is not the last child of a given parent patch, such that there are further 'sibling' patches to be tested (step 408—no), the next sibling patch is selected (step 409), and its minimum and maximum HSR ID values are then read accordingly (step 402), etc. If the current patch is the last child of its parent patch, the parent patch is selected as the new current patch (step 410), as shown in FIG. 43.

If it is determined that the minimum and maximum HSR IDs for the current patch are not the same (step 403—no), it is determined whether the current patch is the smallest patch size, and if not (step 411—no), the minimum and maximum HSR IDs of the current patch are cleared, and the first child patch of the current patch is selected as the new current patch for testing (step 412). This process thus traverses the hierarchical HSR ID buffer from the top down to find the smallest patch size, unless it is determined at a higher level that no further refinement is possible. Once the smallest patch size is reached (step 411—yes), the sampling positions encompassed by that patch are then iterated over (step 413), in a similar manner as described above in relation to FIG. 41, and the minimum and maximum values for all higher level patches are then updated accordingly (step 405). It is then checked whether there are further patches to be processed (step 406, etc.) until the traversal is complete (step 407).

The traversal thus starts by first selecting the root (i.e. largest) hierarchical HSR patch as the current patch (step 401). If the minimum and maximum HSR IDs for the root (largest) patch are the same (step 403—yes), the traversal is then completed at that point. Otherwise, the traversal continues by checking for progressively smaller patches whether or not the minimum and maximum HSR IDs are the same to check whether further refinement is possible. In this way, the iteration over the individual sampling positions (step 413) is only performed when there is some possible refinement that could be made. This can therefore speed up the finalisation of the HSR ID buffer.

In the examples above, during the first, pre-pass operation, in the event that a primitive is determined to cover one or more sampling positions within the render output, the HSR ID for the primitive is written to the HSR ID buffer in respect of the sampling position(s) for which the primitive is visible. Especially if a larger patch is found to cover many sampling positions this can therefore represent a significant write bandwidth. In order to clear the HSR ID buffer a number of "clear" bits are provided in registers that when set are able to indicate that N sampling positions represented by the clear bit are all zero. In a further example, these clear bits are re-purposed to simplify the updating of the HSR ID buffer, as will be explained in relation to FIG. 44, for example.

Figure 44:
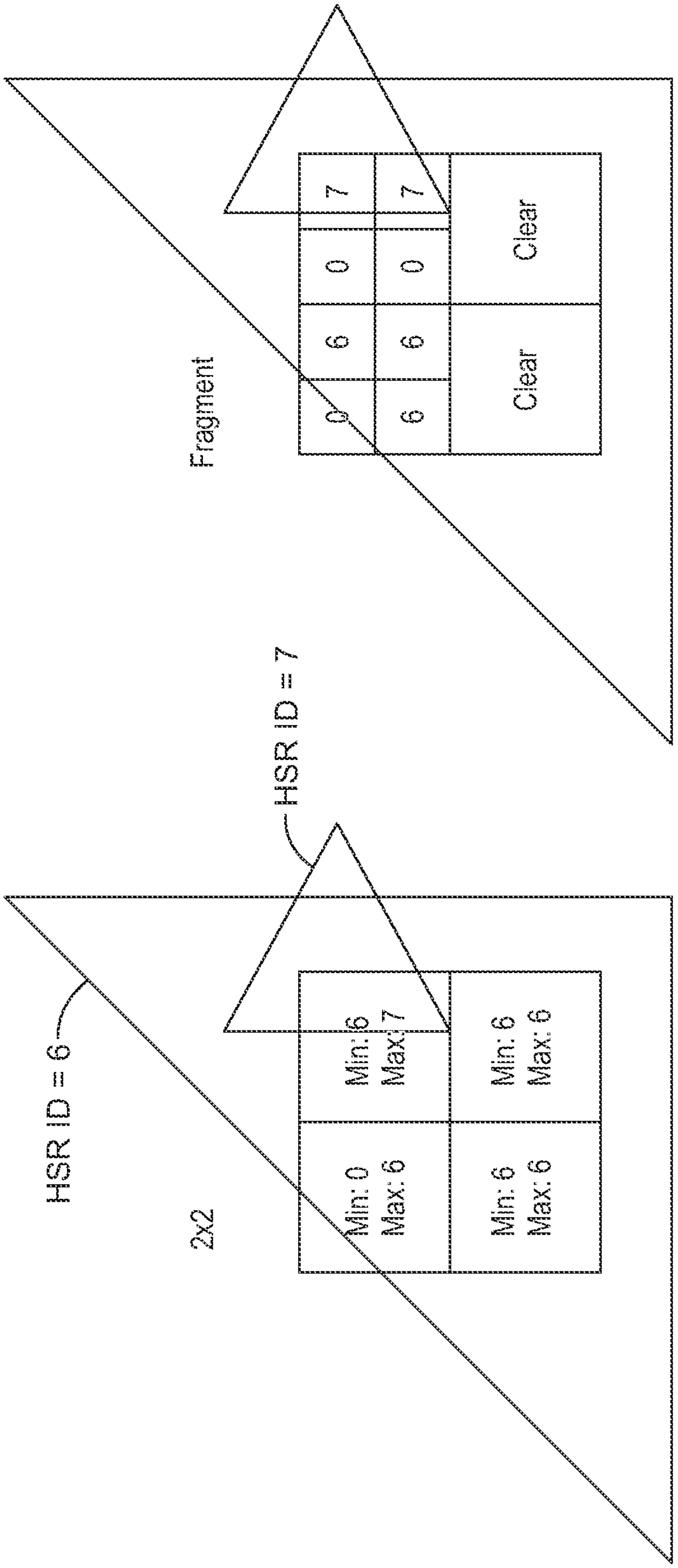
FIG. 44 illustrates how the updating of the HSR ID buffer may be simplified in some cases to save having to write the same HSR ID out repeatedly to many sampling positions encompassed by a patch.

FIG. 44 thus shows an example where there are two primitives, having respective HSR ID values of 6 and 7. In this example, the bottom two 2×2 patches are both fully covered by the primitive with HSR ID value 6. The top left 2×2 patch is partially covered by the primitive with HSR ID value 6. The top right 2×2 patch is fully covered by the primitive with HSR ID value 6 but is partially overwritten by the later primitive with HSR ID value 7. The result of the finalisation process discussed above is therefore that the minimum and maximum stored HSR IDs for each 2×2 patch are set as shown in FIG. 44. Thus, the minimum HSR ID for all of the top right and bottom two 2×2 patches is set to 6.

Figure 45:
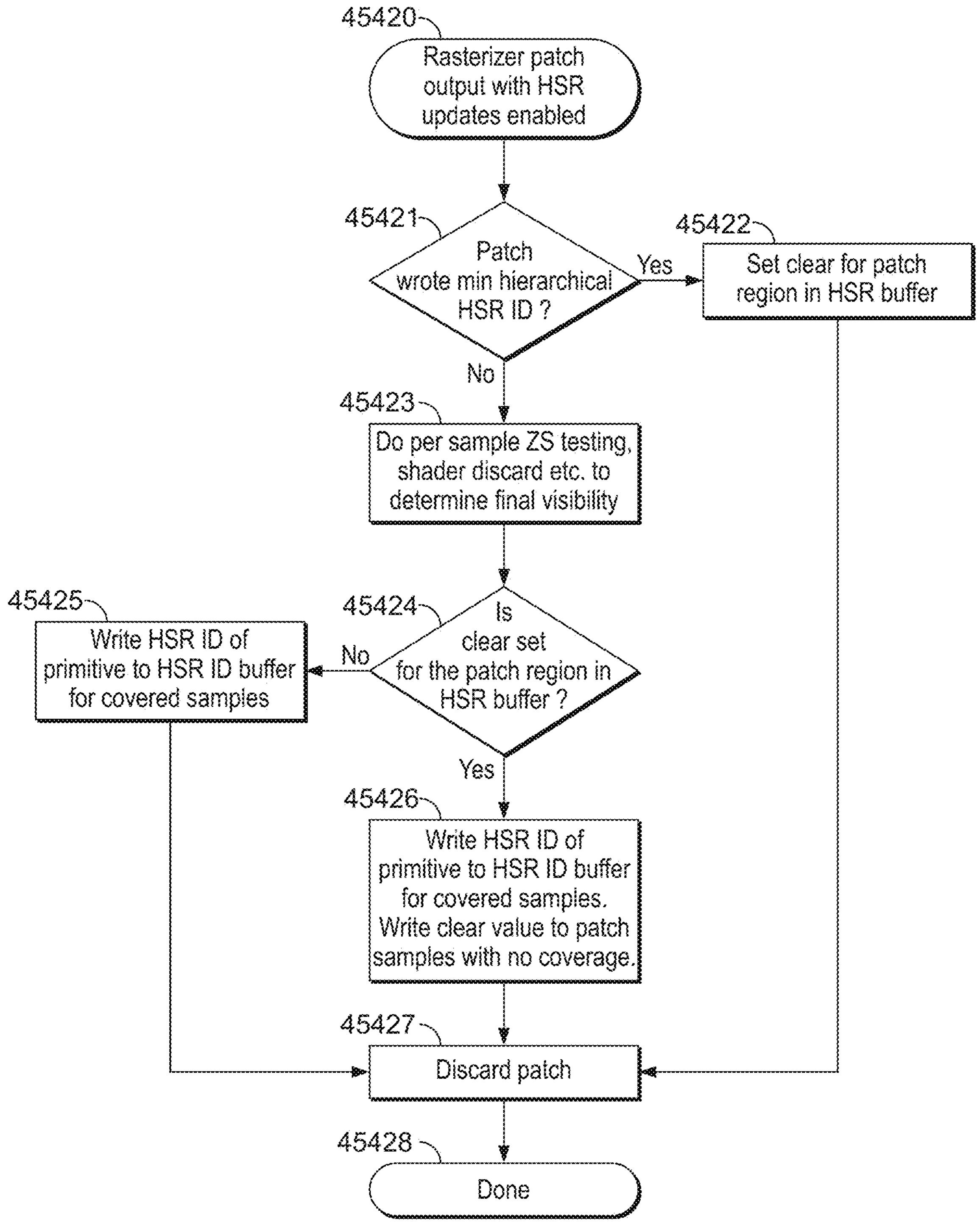
FIG. 45 shows schematically the updating of the HSR ID buffer during the first, pre-pass operation according to an example in which when a visible primitive is found to fully cover a patch of the render output, the sampling positions encompassed by the patch are cleared.
Figure 46:
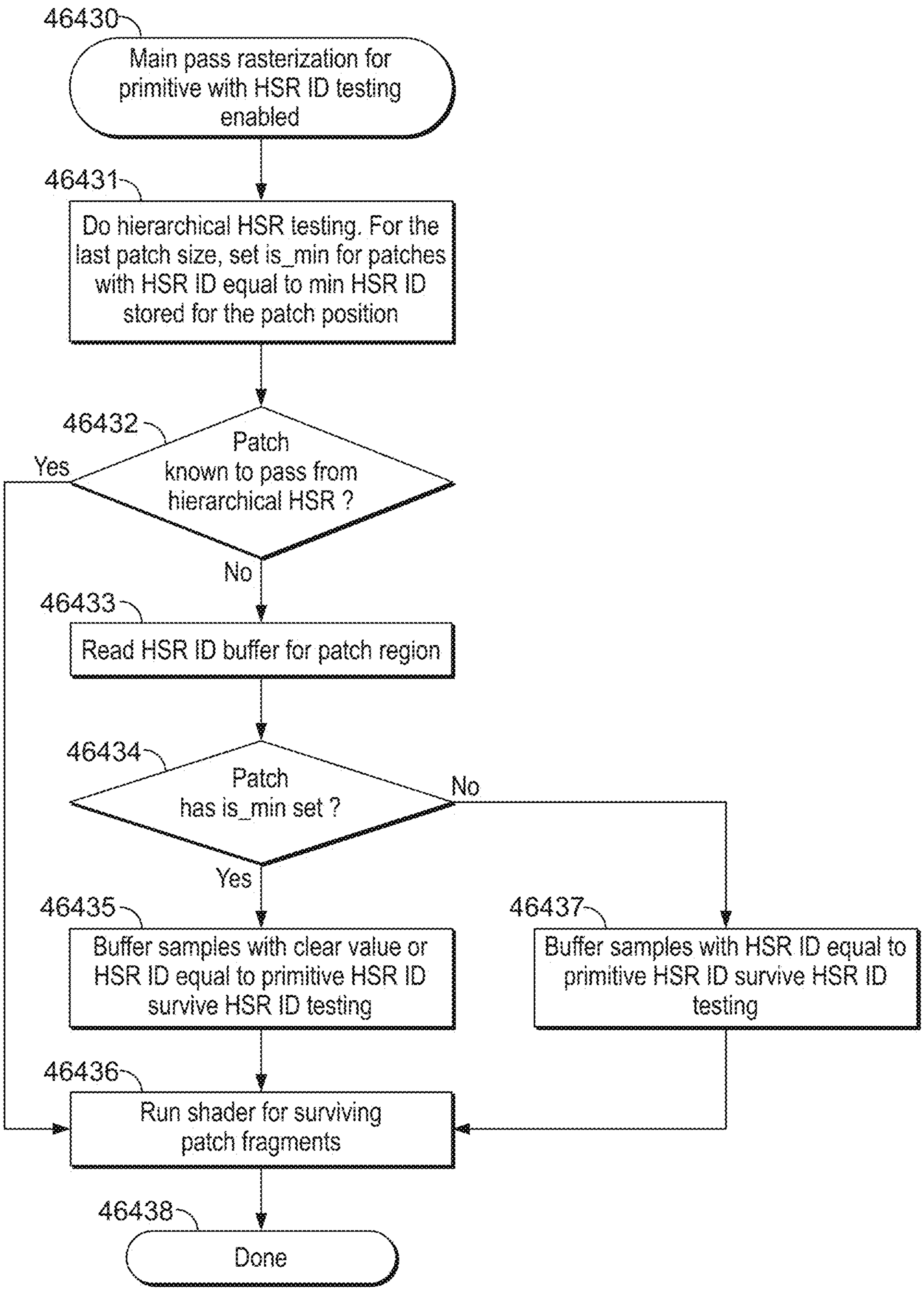
FIG. 46 shows schematically how the corresponding second, main pass operation can interpret any "clear" or zero values in order to ensure the correct rendering behaviour.

In this example, rather than writing the value 6 to each of the sampling positions encompassed by those patches, a "clear" value, i.e. 0 is instead used, as will be explained further below. This then saves having to explicitly write the same value out many times when it is possible to avoid doing so. FIG. 45 illustrates the operation of writing to the HSR ID buffer during the first, pre-pass operation and FIG. 46 illustrates how the "clear" values are used during the second, main pass operation to ensure the correct rendering behaviour.

As shown in FIG. 45, for an incoming primitive patch that is capable of updating the HSR ID buffer (step 45420), it is first determined whether the primitive patch is derived from the primitive that wrote the minimum HSR ID value for the corresponding patch (step 45421). If yes, a corresponding "clear" bit is set for the patch region in the HSR ID buffer (step 45422) to indicate that all of the sampling positions covered by the patch can be cleared (at this point). The primitive patch can thus be discarded (step 45427), and the updating of the HSR ID buffer for the primitive patch in respect of the sampling positions covered by the primitive patch is thus done (step 45428). The next primitive can thus be processed accordingly.

If the primitive patch does not correspond to the primitive that wrote the minimum HSR ID value for the corresponding patch (step 45421—no), the operation proceeds to perform the per-sampling position depth (and stencil) testing, as well as any fragment shader execution, etc., necessary to determine the final visibility for the sampling positions encompassed by the patch (step 45423). If the "clear" flag has not been set for the patch region in the HSR buffer (step 45424—no), the HSR ID of the primitive is then written to the HSR ID buffer for any covered sampling positions (step 45425), as described above. On the other hand, if the "clear" flag has been set (step 45424—yes), the HSR ID of the primitive is still written to the HSR ID buffer for any covered samples, and the "clear" value is written to any patch samples with no coverage. In either case, at that point, the primitive patch can be discarded (step 45427), as the updating of the HSR ID for that primitive patch is done (step 45428).

The effect of this is that for any sampling positions encompassed by a patch of the render output that are covered by the primitive associated with the stored minimum HSR ID for the patch in question, rather than storing the same HSR ID in respect of each of the individual sampling positions that are covered by that primitive, the sampling positions are instead cleared. Thus, referring back to FIG. 44, it can be seen that the sampling positions encompassed by the bottom two 2×2 patches, for which the primitive having HSR ID of 6 is visible, are all set to the clear value, without having to explicitly write that value to the HSR ID buffer. Likewise, for the top right 2×2 patch, the primitive having HSR ID of 6 is visible for the two left-most sampling positions, and so a 'zero' value is stored in the HSR ID buffer for those two sampling positions. The two right-most sampling positions are however overwritten by the primitive having HSR ID of 7, and so that value is stored for those sampling positions. This then reduces write bandwidth associated with updating the HSR ID buffer. However, it is then necessary to be able to correctly interpret any clear values during the second, main pass operation to ensure the correct rendering behaviour. This is illustrated in FIG. 46, for example.

FIG. 46 thus shows the corresponding HSR ID testing for an incoming primitive to be processed (step 46430). Firstly, hierarchical HSR ID testing is performed, as described above. If the primitive is determined to match the stored minimum HSR ID value for the current patch that is being tested, the primitive is marked accordingly by setting an 'is_min' bit to indicate that the primitive is the primitive that caused the update to the minimum HSR ID value for the current patch (step 46431). This 'is_min' bit when set can then be used to allow any fragments to automatically pass testing for any sampling positions for which the "clear" or zero value is set.

If the primitive patch being tested is known to pass all visibility testing from the hierarchical HSR ID testing (step 46432—yes), the primitive patch as a whole is passed for further processing, and a fragment shader is executed accordingly for all of the fragments encompassed by the patch (step 46436) to determine the rendered output data, and the second, main pass operation is then done for the sampling positions encompassed by the primitive patch being tested (step 46438).

On the other hand assuming the primitive patch being tested is not known to pass all visibility testing from the hierarchical HSR ID testing (step 46432—no), the testing of the primitive patch continues by reading the HSR ID buffer for the patch region (step 46433) and checking whether or not the 'is_min' bit has been set for the primitive in question (step 46434). If the 'is_min' bit has not been set (step 46434—no), the testing of the fragments against the individual sampling positions is then performed as normal, e.g. such that for primitives that use the 'equals' test, the fragments survive the HSR ID testing when their associated HSR ID matches the value stored in the HSR ID buffer (step 46437). Whereas, when the 'is_min' bit is set (step 46434—yes), the testing is performed such that in addition to fragments surviving the testing when their associated HSR ID matches the value stored in the HSR ID buffer, the fragments are also caused to automatically pass the visibility testing for any sampling positions for which the "clear" or zero value is set.

The above examples relating to a hierarchical HSR ID buffer arrangement thus allow various optimisations of the HSR ID testing, and hence allow for improved overall graphics processing operation.

Culling Vertex (Varyings) Attribute Shading

As mentioned above, the rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

The vertex shader execution typically produces (transformed) vertex positions and one or more outputs explicitly written by the vertex shader. Attributes communicated from the vertex shader to rasterisation and rendering other than position are usually referred to as "varyings". (Thus the non-position outputs from the vertex shader (and only the non-position outputs from the vertex shader) are "varyings".)) Once the vertex attributes have been shaded, the "shaded" attributes are then used when processing the vertices (and the primitives to which they relate) in the remainder of the graphics processing pipeline.

The primitives that are to be processed for the render output according to the present embodiments are (each) defined in terms of a set of vertices (e.g., and in an embodiment, chosen from a larger set of vertices to be used for the graphics processing output (e.g. frame for display)). Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question. These vertex attributes are then used when rasterising and rendering the primitives.

As is often the case in graphics processing, the vertex data (the vertex attributes) may need to be processed (e.g. shaded) in order to transform the vertex attributes into a desired form for subsequent processing. Thus, according to the present embodiments, the graphics processor comprises a vertex processing circuit (e.g., and in an embodiment, in the form of a "vertex shader") that is configured to process (e.g. shade) vertex data in the form in which it is stored/obtained by the graphics processor (the 'raw' vertex data) to generate appropriately vertex shaded attribute data for vertices to be processed for primitives for a render output.

The processing (shading) of the vertex attributes can be performed at various stages within the overall graphics processing operation. For example, in the present embodiment, the graphics processor operates a tile-based rendering scheme as described above, in which, as shown in FIG. 4, a programmable vertex shader 427 is executed as part of the initial geometry processing stage in order to process (shade) at least the vertex position attributes to facilitate such sorting of the geometry. The initial upfront geometry processing could also shade the non-position (varyings) vertex attributes, and store all of the transformed vertex geometry (attributes) 425 together in memory 423 such that it can subsequently be obtained and used by the renderer 422 to perform the rendering operations.

In some examples, however, the processing of (at least some of) the, e.g., non-position (varyings), vertex attributes is deferred to the rendering stages of the graphics processing operation, i.e. to the point at which those vertex attributes are desired to be used. This can advantageously reduce bandwidth requirements, e.g., by saving having to write out all of the vertex shaded varyings data upfront, as at least some of the vertex attribute processing (shading) can instead be performed for an individual tile, rather than for the entire render output.

Figure 47:
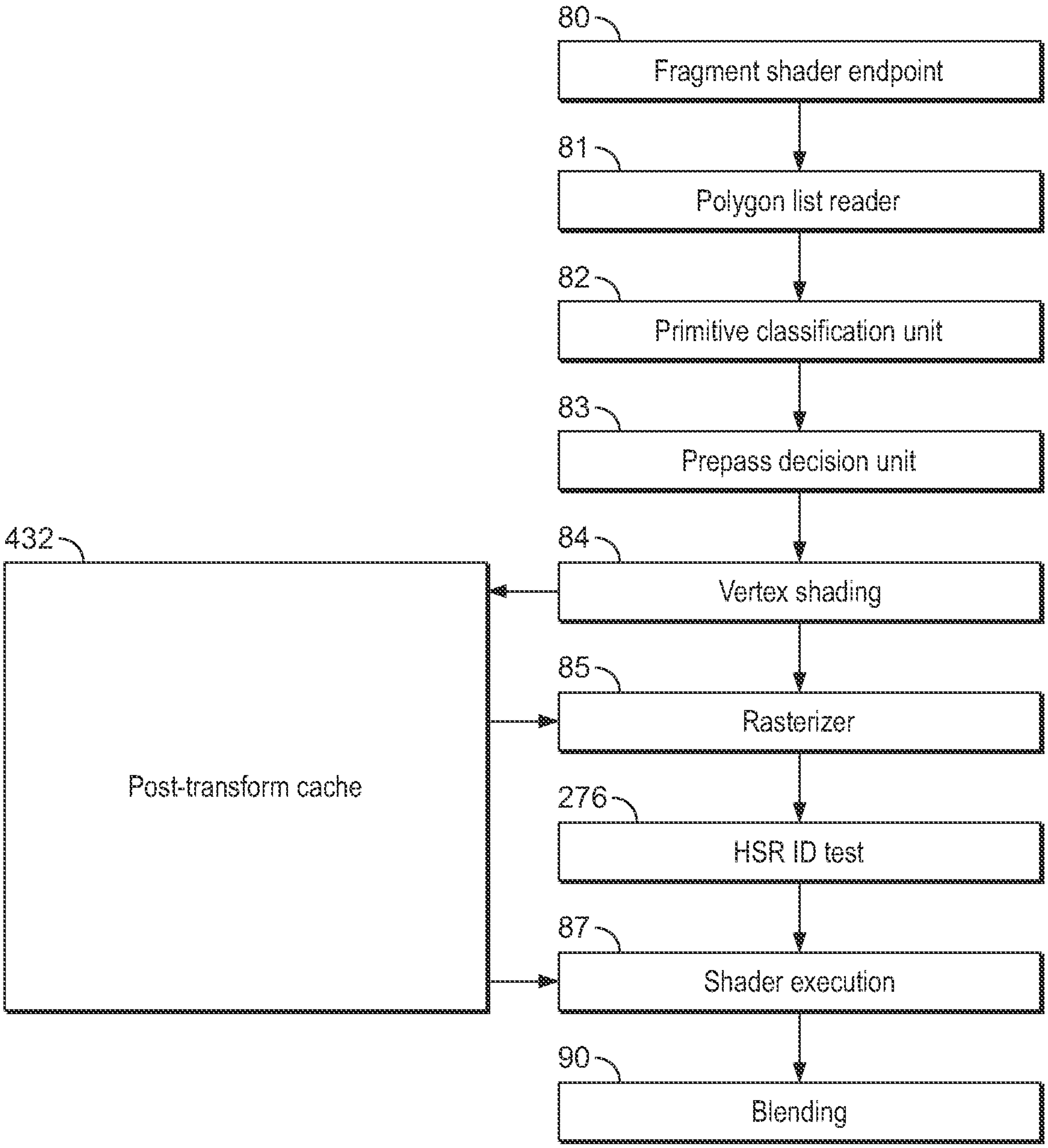
FIG. 47 shows schematically an arrangement in which at least some vertex attribute shading is deferred to the rendering stages of the graphics processor.

FIG. 47 shows a corresponding graphics processing pipeline according to such examples. As shown in FIG. 47, the vertex processing (shading) stage 84 in this example performs vertex shading. The vertex processing (shading) stage 84 in this example can thus trigger a vertex processing circuit (e.g. vertex shader) to process the vertex data for the set of vertices defining the primitive in question to generate vertex shaded attribute data for the primitive in the desired form for further processing of the primitive. As shown in FIG. 47, the vertex processing (shading) stage 84 is also coupled to the vertex cache (post-transform cache) 432. When the fragment shader endpoint 80 issues a primitive for rendering, this can therefore trigger a vertex processing (shading) operation to process the corresponding vertex data (vertex attributes) for the primitive in question. The transformed (vertex shaded) geometry data is then in an embodiment suitably stored, and read back into the graphics processor at the relevant graphics processing stages, i.e. by the rasteriser 85 and the fragment shader 87, in order to rasterise and render the primitive.

The graphics processing pipeline shown in FIG. 47 generally corresponds to the graphics processing pipeline shown in FIG. 27 above, in which the testing comprises the HSR ID test 276. However, it will be appreciated that deferred vertex shading may also be performed for any of the other examples described above, and is not limited to examples using the HSR ID buffer.

As described above, the fragment shader endpoint 80 is caused to issue the same primitives to the graphics processing pipeline twice, namely to perform the respective first, pre-pass operation for the primitive and to then perform the corresponding second, main pass operation for the primitive. This means that some of the processing for a primitive (and its corresponding fragments) is performed twice, i.e. as the same primitive may be subject to both the first, pre-pass operation and the second, main pass operation. For example, when the same primitive is subject to both the first, pre-pass operation and the second, main pass operation, it will typically (necessarily) be rasterised twice, since both passes involve processing primitives into their associated fragments. Similarly, because in the example shown in FIG. 47 at least some vertex attribute processing (shading) in the technology described herein is deferred to the rendering stages, this means that vertex attribute processing (shading) may be (and in some cases will be) triggered during the first, pre-pass operation and then triggered again during the second, main pass operation.

In an example therefore the graphics processor is caused to skip at least some varyings shading in the pre-pass if it can be determined that the varying is not in fact required by the first, pre-pass operation to determine the desired "visibility" information. For example, for primitives that would otherwise be compatible with the pre-pass operation, the following conditions can be used to prove that no varyings are used in the first, pre-pass operation: (i) the fragment shader does not modify coverage; (ii) the fragment shader does not emit depth, and (iii) alpha-to-coverage is not in use.

Figure 48:
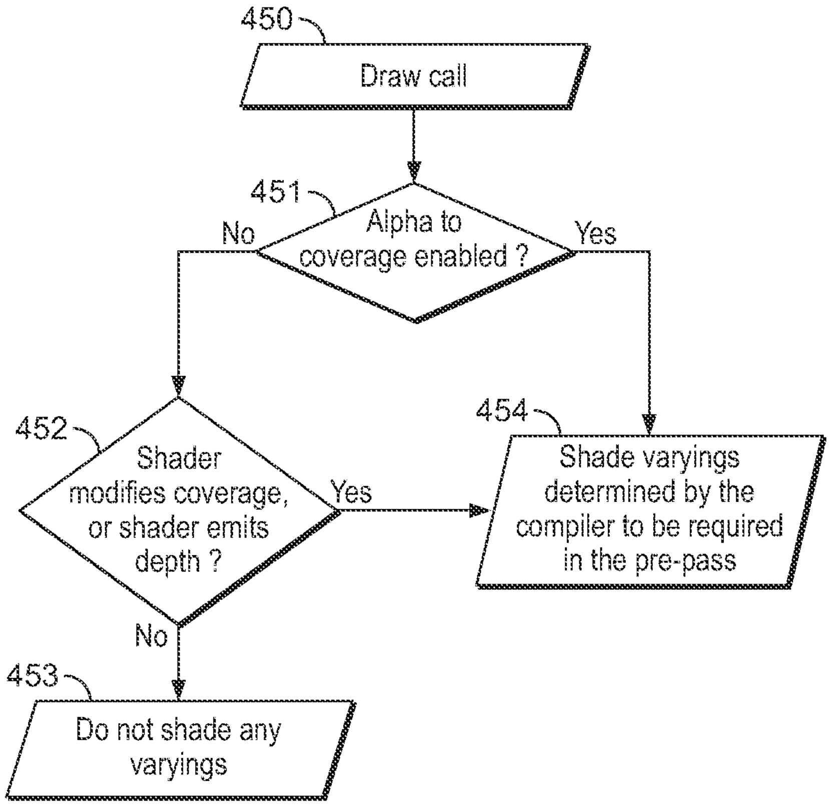
FIG. 48 shows schematically a driver operation that determines whether or not vertex attribute (varyings) shading is required during the first, pre-pass operation.

This can be determined by the driver 4 for the graphics processor 3, as shown in FIG. 48. FIG. 48 is thus a flow chart illustrating the driver operation to determine whether or not varyings are required for the first, pre-pass operation. Thus, for an incoming draw call (step 450), it is checked whether alpha-to-coverage is enabled (step 451) and also whether or not the shader modifies coverage or emits depth (step 452). If either of these conditions are satisfied, the pre-pass operation should therefore shade the varyings determined by the compiler to be required in the pre-pass operation (step 454). Otherwise, if none of these conditions are satisfied, varyings shading can be omitted in the first, pre-pass operation (step 453).

This can be flagged accordingly. For example, in some cases, if any of the varyings are required, the graphics processor may be caused to shade all of the varyings. That is, this may be indicated in a binary manner. However, the compiler is also able to determine which varyings are actually required. For example, when the first, pre-pass operation executes a fragment shader, the fragment shader program can be configured (ordered) such that fragments only run up to a certain point. The compiler can thus check whether there is any path through the fragment shader that will read a particular varying before that point. In that case, the indication of which varyings are required may be more complex and may indicate a set of one or more varyings that should be shaded during the first, pre-pass operation.

Figure 49:
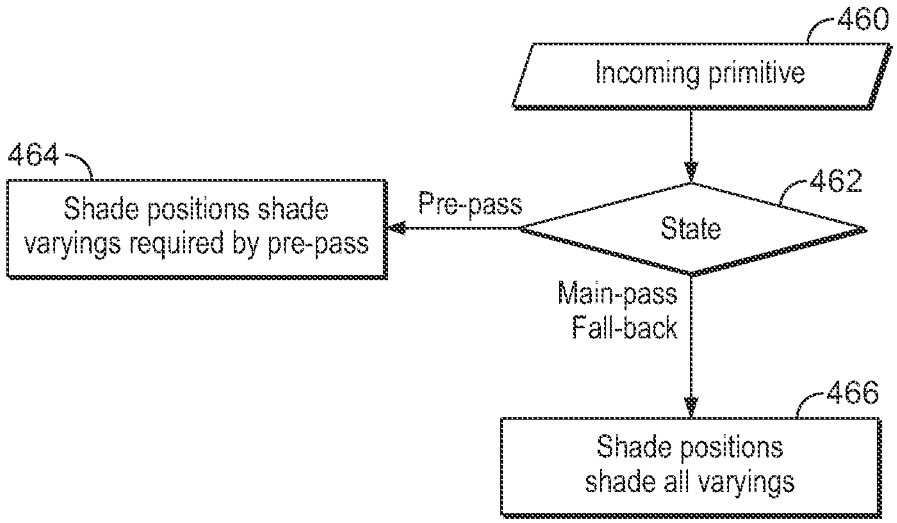
FIG. 49 shows schematically a state machine illustrating how the graphics processor may be controlled according to this example.

FIG. 49 is a state diagram showing how the operation of the graphics processor is controlled in the different states depending on whether or not the varyings are required. As shown in FIG. 49, for an incoming primitive (step 460), if the graphics processor state machine (462) is the pre-pass state, the vertex shader 84 is caused to shade all vertex position attributes but to shade only the vertex non-position (varyings) attributes that have been determined to be required for the first, pre-pass operation (step 464). When the graphics processor is in the main pass state, the vertex shader 84 is in this example caused to shade all of the vertex attributes including both the vertex position and non-position (varyings) attributes (step 466). (In the fallback state, again, all of the vertex attributes including both the vertex position and non-position (varyings) attributes will be shaded.)

Various examples are possible for allocating storage for vertex data in the vertex cache (post-transform cache) 432 when some of the vertex attribute shading is omitted during the first, pre-pass operation.

Figure 50:
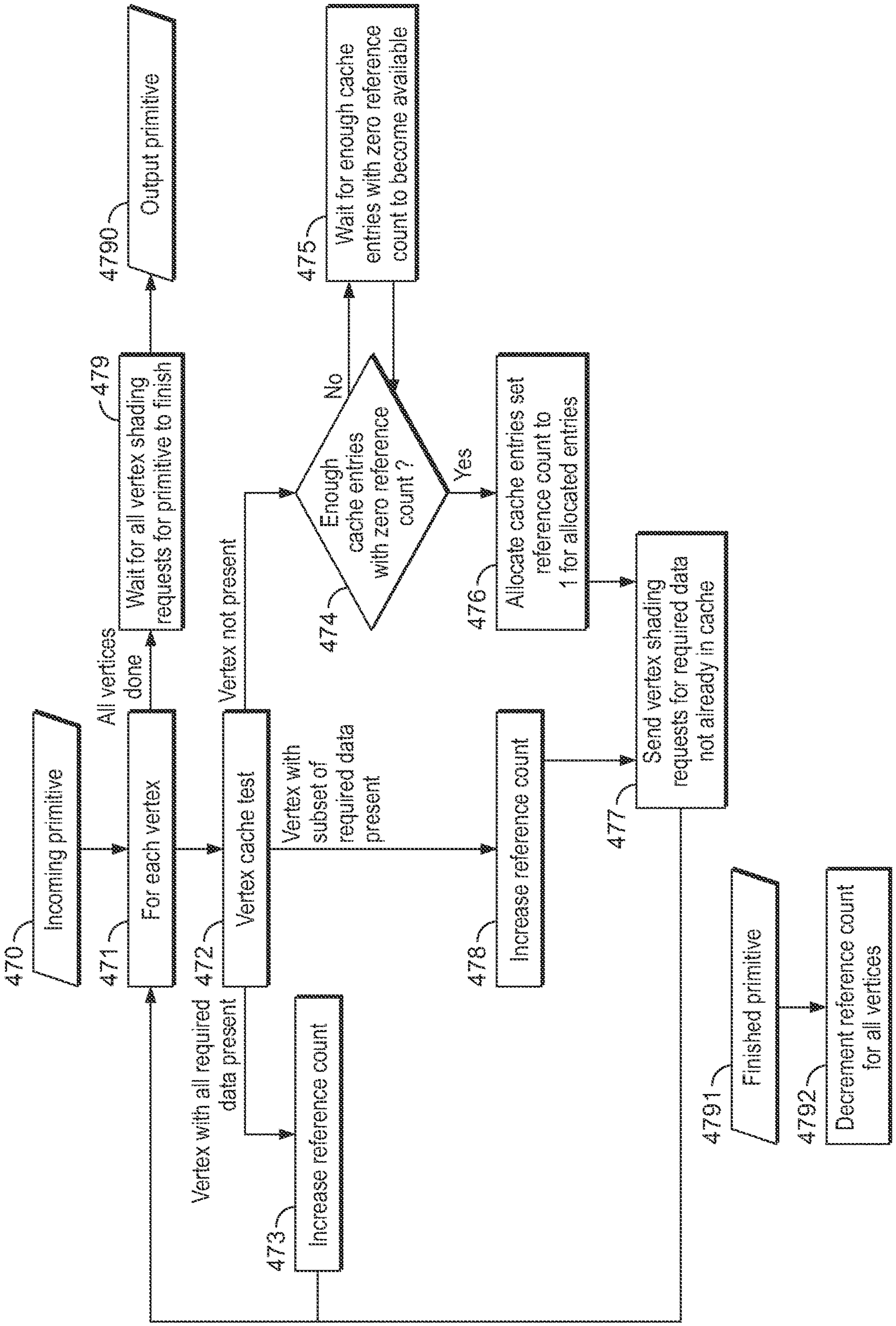
FIG. 50 shows schematically an example of how vertex data may be handled when vertex attribute (varyings) shading is omitted by the first, pre-pass operation.

A first example is illustrated in FIG. 50. In the example shown in FIG. 50, enough space is allocated in the vertex cache (post-transform cache) 432 during the first, pre-pass operation for the entire vertex, even if only the vertex position attributes are populated.

As shown in FIG. 50, for an incoming primitive (step 470), for each vertex (step 471), a vertex cache look up is performed to determine whether or not the vertex is already stored in the cache (step 472). If the vertex with all of the required vertex data is already stored in the cache, no further processing for that vertex is required, so the reference count is incremented accordingly (step 473), and the next vertex is processed. On the other hand, if the vertex is not yet present in the cache at all, so long as there is sufficient space for the entire vertex in the cache (step 474—yes), respective cache entries are allocated for storing the entire vertex, and the reference count is set to 1 for the allocated entries (step 476). If there is not sufficient space for the entire vertex in the cache (step 474—no), the vertex processing waits for enough cache entries to be available (step 475).

The desired vertex shading requests are then issued for the required vertex data (step 477). Thus, if the vertex varyings attributes are not required, the request at this point may simply be issued for the vertex position attributes. In this way, at the end of the first, pre-pass operation, the vertex will be stored in the cache with a subset of the required vertex data. Thus, during the corresponding second, main pass operation, when the vertex data is required for that vertex, the vertex cache test (step 472) will determine that the vertex is present, but only with a subset of the required data present in the vertex cache (i.e. the position attributes are stored but some or all varyings attributes are not stored). In that case, the reference count is increased (step 478), and vertex shading requests are then issued for the missing vertex data (step 477).

Once all vertices have been processed, the process then waits for all vertex shading requests to finish (step 479), before outputting the respective primitive (step 4790). Once the primitive is finished (step 4791), the reference count for all vertices is decremented accordingly (step 4792).

The approach shown in FIG. 50 thus allows the vertex packet to be re-used during the main pass. However, this requires a larger than necessary vertex cache allocation during the pre-pass operation, which can increase the frequency of allocation stalls.

Figure 51:
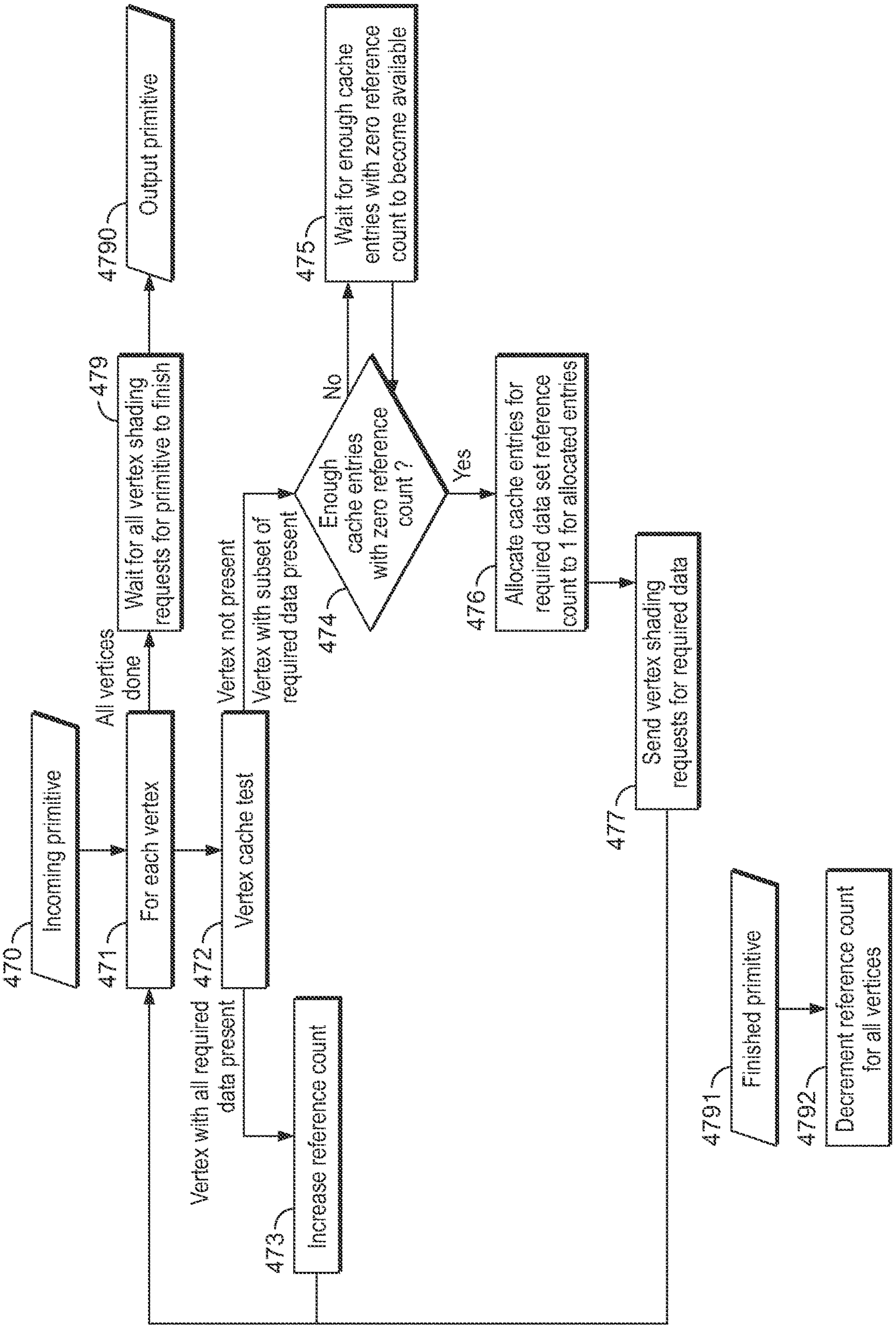
FIG. 51 shows schematically another example of how vertex data may be handled when vertex attribute (varyings) shading is omitted by the first, pre-pass operation.

Another approach is thus illustrated in FIG. 51 in which during the pre-pass operation, when the varyings are not required, there is only allocated enough space in the vertex cache for the vertex positions. The second, main pass when looking for a vertex does not then re-use the position data but instead makes a new allocation that can fit both the position and varyings attributes for the entire vertex. This keeps the vertex cache allocation small in the pre-pass but at the cost of having to shade the positions twice. The vertex processing in FIG. 51 is therefore similar to FIG. 50 except that in FIG. 51 there is no check whether the vertex is already present in the cache but with only a subset of the required data and instead in all cases when the required vertex data is not already present in the vertex cache, a new vertex cache allocation is made for the entire vertex (step 476).

Figure 52:
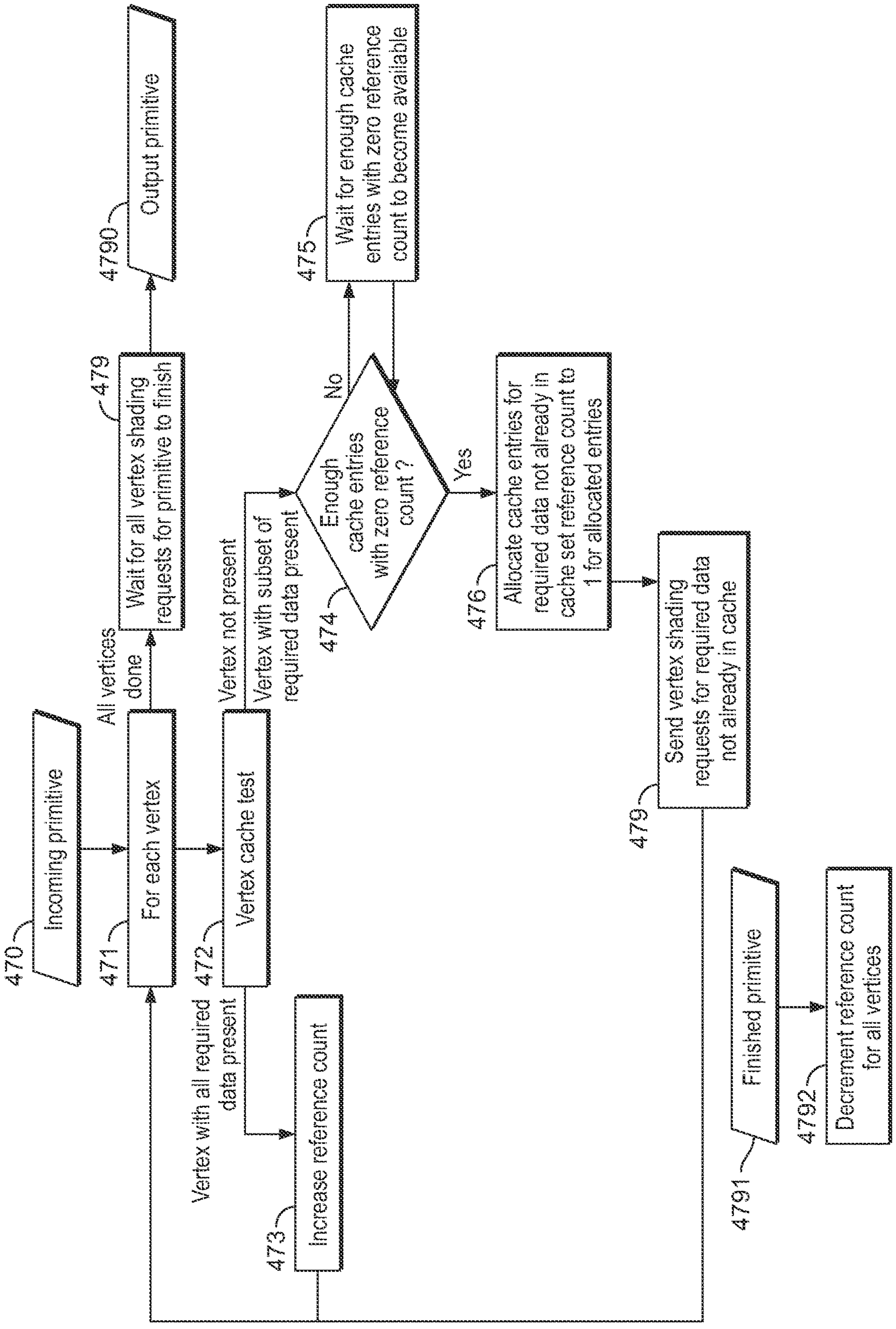
FIG. 52 shows schematically another example of how vertex data may be handled when vertex attribute (varyings) shading is omitted by the first, pre-pass operation.

FIG. 52 illustrates another approach similar to FIG. 51 but wherein the main pass attempts to re-use the position attributes from the first, pre-pass, and makes only a new allocation for the varyings attributes during the second, main pass. This also works but the positions and varyings may now end up in different allocations. Again, the vertex processing in this example is therefore similar to that described above except in this case, the vertex cache allocation in the second, main pass is made only for the required data that is not already present in the vertex cache (step 496). Correspondingly, vertex shading requests are only issued for required data that is not already present in the cache (step 497).

Various other arrangements would be possible for processing the vertex data as part of the pre-pass operations described herein.

Primitive Culling

The first, pre-pass operation may comprise any other suitable processing operations as desired. For example, in some embodiments, a "primitive culling" data structure is also generated during the first, pre-pass operation that can be used to identify entire primitives that do not need to be processed further, and which can therefore be culled relatively earlier in the second, main pass operation (e.g. prior to rasterisation and also prior to any vertex processing that is performed during the main pass operation). For example, for any primitives processed during the first, pre-pass operation for which it can be determined that none of the associated fragments needs to be processed further (e.g. since none of the fragments has any visible effect for their respective sampling positions within the final render output), the primitive in its entirety may be culled. In this way it is possible to avoid some or all processing of the primitive during the second, main pass.

This can then avoid primitive processing in the fragment frontend (e.g. the processing up to and including rasterisation). For example, the ability to cull (entire) primitives in this way may also be particularly beneficial in situations where at least some vertex attribute processing (e.g. varyings shading) is deferred to the rendering stage as in that case the use of the primitive culling data structure can (and in an embodiment does) also at least allow such vertex attribute processing to be avoided during the second, main pass for any primitives for which it can be determined using the primitive culling data structure that the primitive does not need to be processed further.

Figure 53:
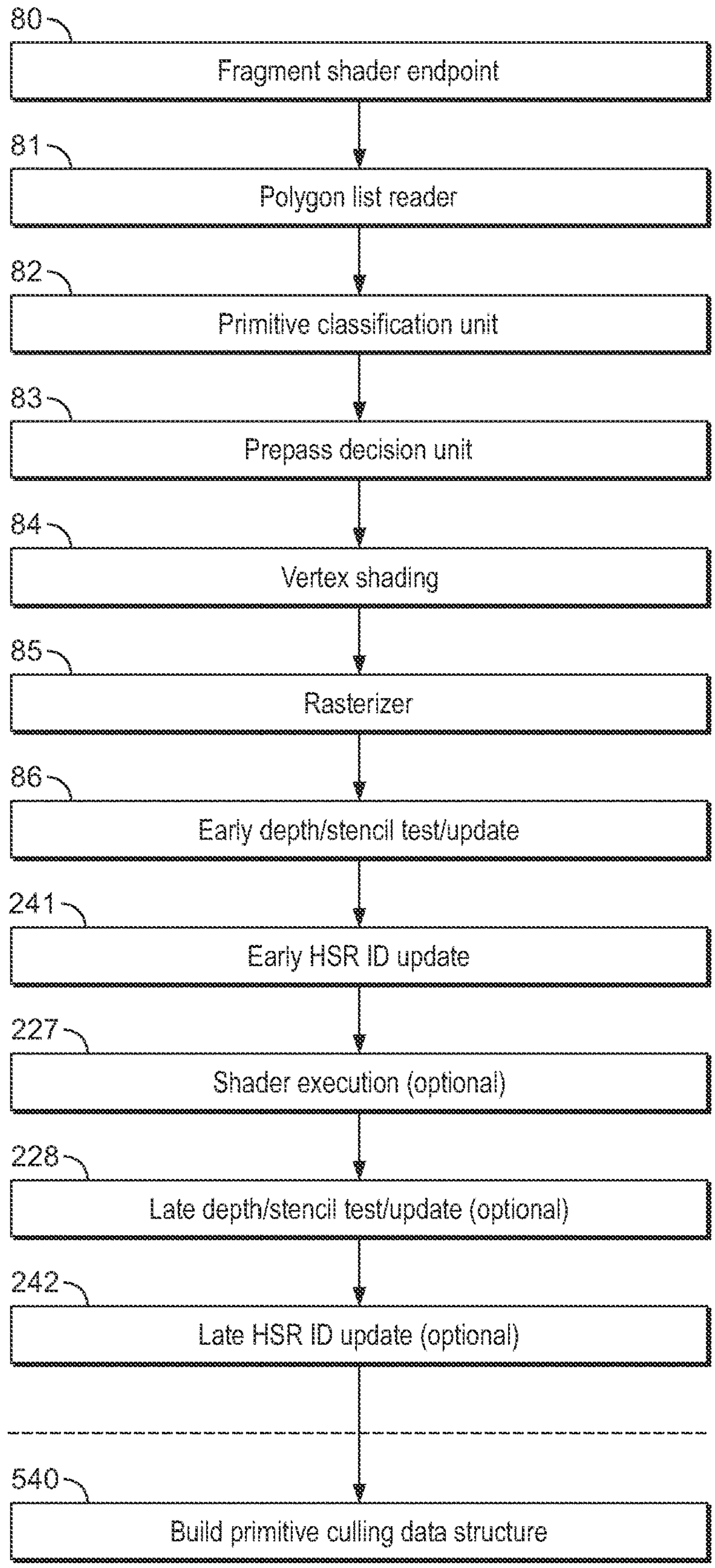
FIG. 53 illustrates an example in which a "primitive culling" data structure is built at the end of the first, pre-pass operation.

FIG. 53 shows a first example of building such "primitive culling" data structure based on the pre-pass operation that is illustrated in FIG. 24 above. In this example, the primitives are thus subject to the same graphics processing pipeline operations as described above in relation to FIG. 24, with the first, pre-pass operation accordingly generating a HSR ID buffer reflecting the visibility information for the sequence of primitives. In FIG. 53 however an additional final step of building a "primitive culling" data structure 540 is performed after the final determination of the HSR ID buffer. The step of building a "primitive culling" data structure 540 is thus executed at the end of the pre-pass operation, such that it is only performed once for every tile.

Figure 54:
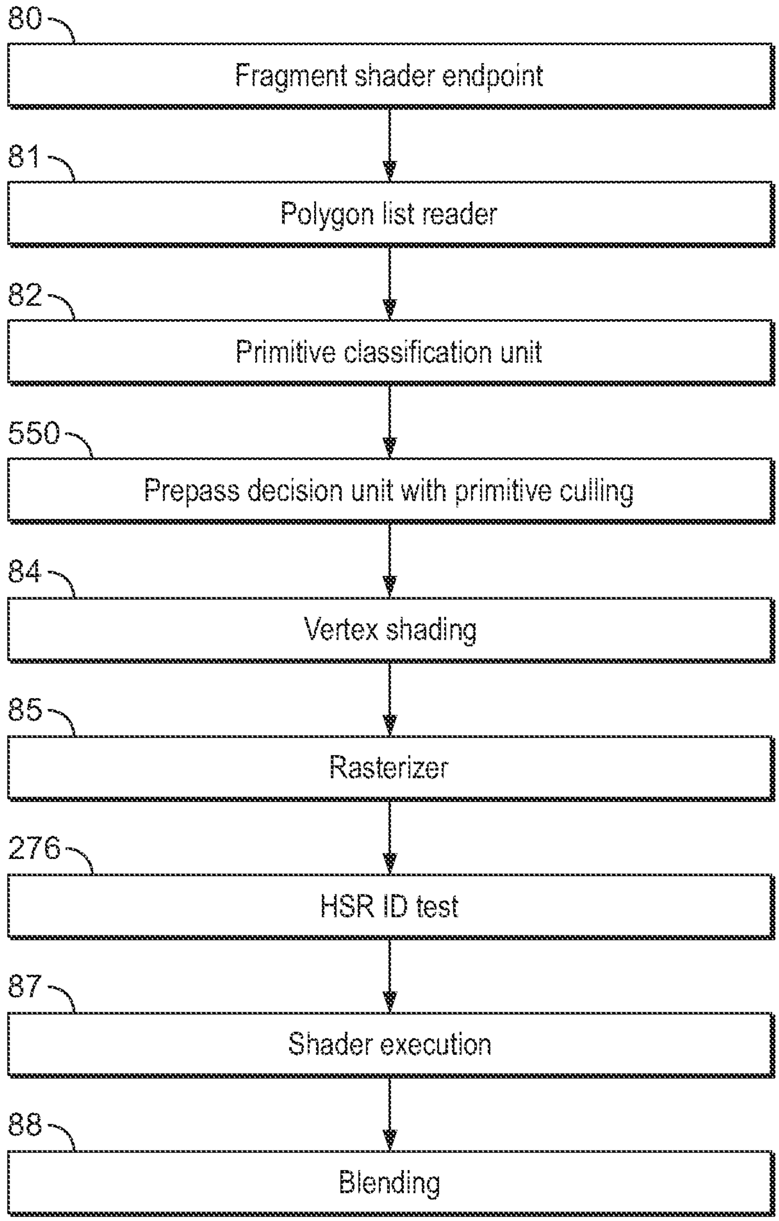
FIG. 54 shows schematically the corresponding second, main pass operation for the example shown in FIG. 53 using the generated "primitive culling" data structure.

FIG. 54 then shows the corresponding modified main pass operation according to this example in which the main pass operation proceeds as described above in relation to FIG. 27, except that the pre-pass decision stage 550 is also operable to cull entire primitives against the "primitive culling" data structure.

Figure 55:
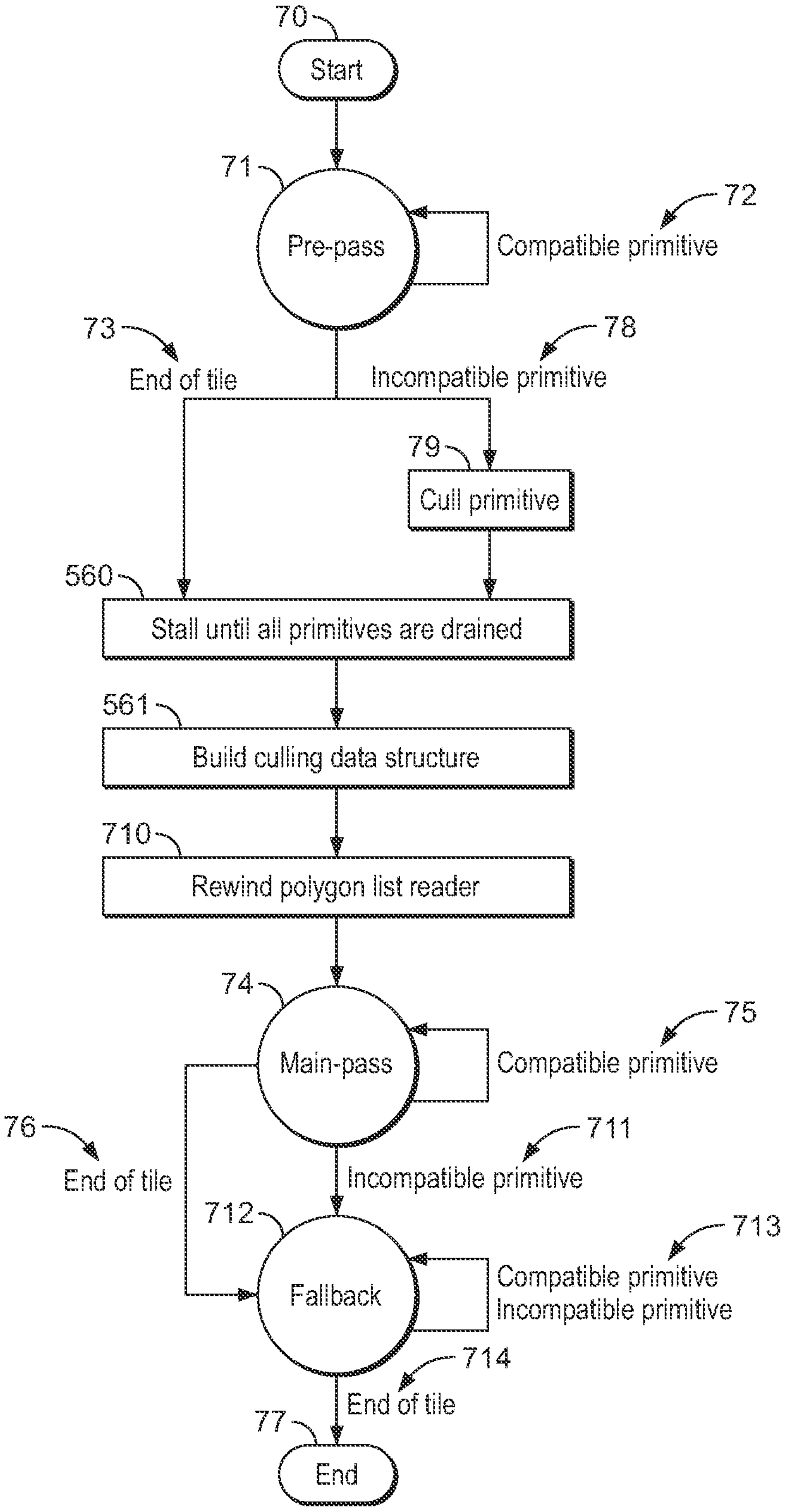
FIG. 55 shows schematically a state diagram for the graphics processor according to this example.

FIG. 55 is a state machine showing the operation of the graphics processor in this example. The state machine in this example is essentially the same as that described above in FIG. 7 except that after the first, pre-pass operation is finished, or is stopped in response to encountering an incompatible primitive, prior to rewinding the primitive list reader (step 710) ready for the subsequent main pass operation (step 74), the graphics processor must first stall until all primitives have completed the first, pre-pass operation (step 560), to allow the primitive culling data structure to be built (step 561) before the second, main pass operation is started.

Figure 56:
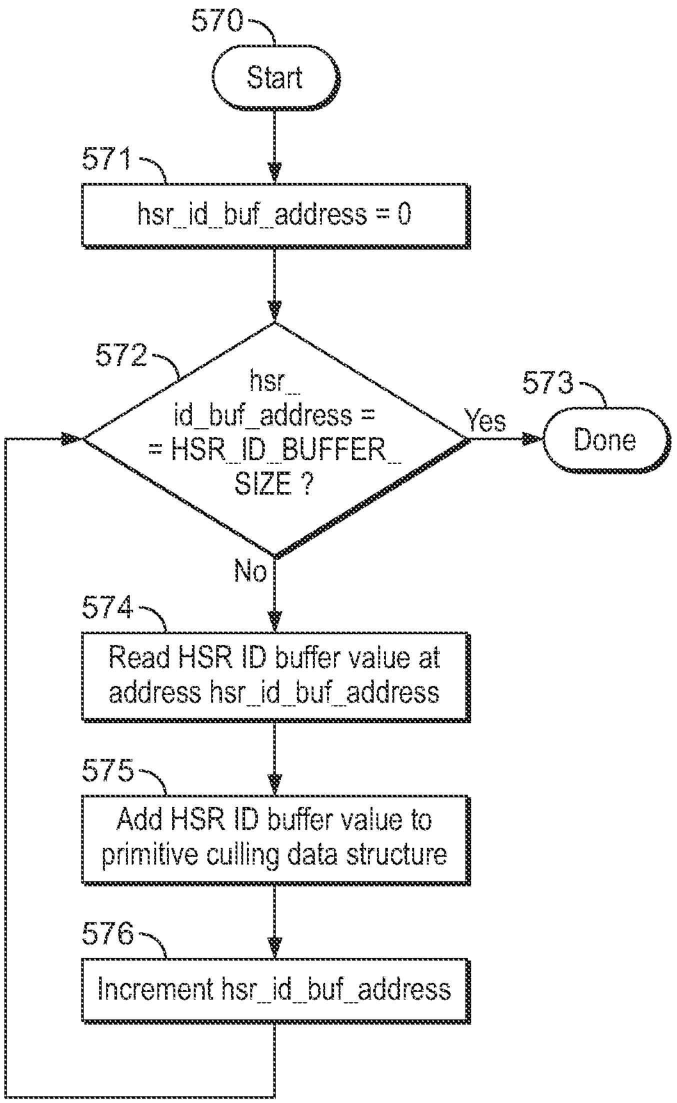
FIG. 56 shows in more detail the generation of the "primitive culling" data structure according to an example.

FIG. 56 is a flow chart illustrating how the primitive culling data structure may be built from the HSR ID buffer according to one example. As shown in FIG. 56, at the start of the process (step 570), the HSR ID buffer address is initialised to zero (step 571). The current HSR ID buffer address is then checked to see whether it matches the size of the HSR ID buffer (step 572). If the current HSR ID buffer address matches the size of the HSR ID buffer (step 572—yes), this means that all entries of the HSR ID buffer have been processed, and the process is therefore done (step 573). Otherwise, the primitive culling data structure is built by reading the HSR ID value that is stored at the current HSR ID buffer address (step 574), adding the HSR ID value accordingly to the primitive culling data structure (step 575), and then incrementing the HSR ID buffer address (step 576) to cause the processing to continue with the next HSR ID buffer address, and so on.

The result of this is thus to identify by their HSR ID values all primitives for which a HSR ID value is stored in the HSR ID buffer and add these to the primitive culling data structure. Any remaining primitives that are not added to the primitive culling data structure are therefore not visible at any sampling positions within the render output and can accordingly be culled in their entirety.

Figure 57:
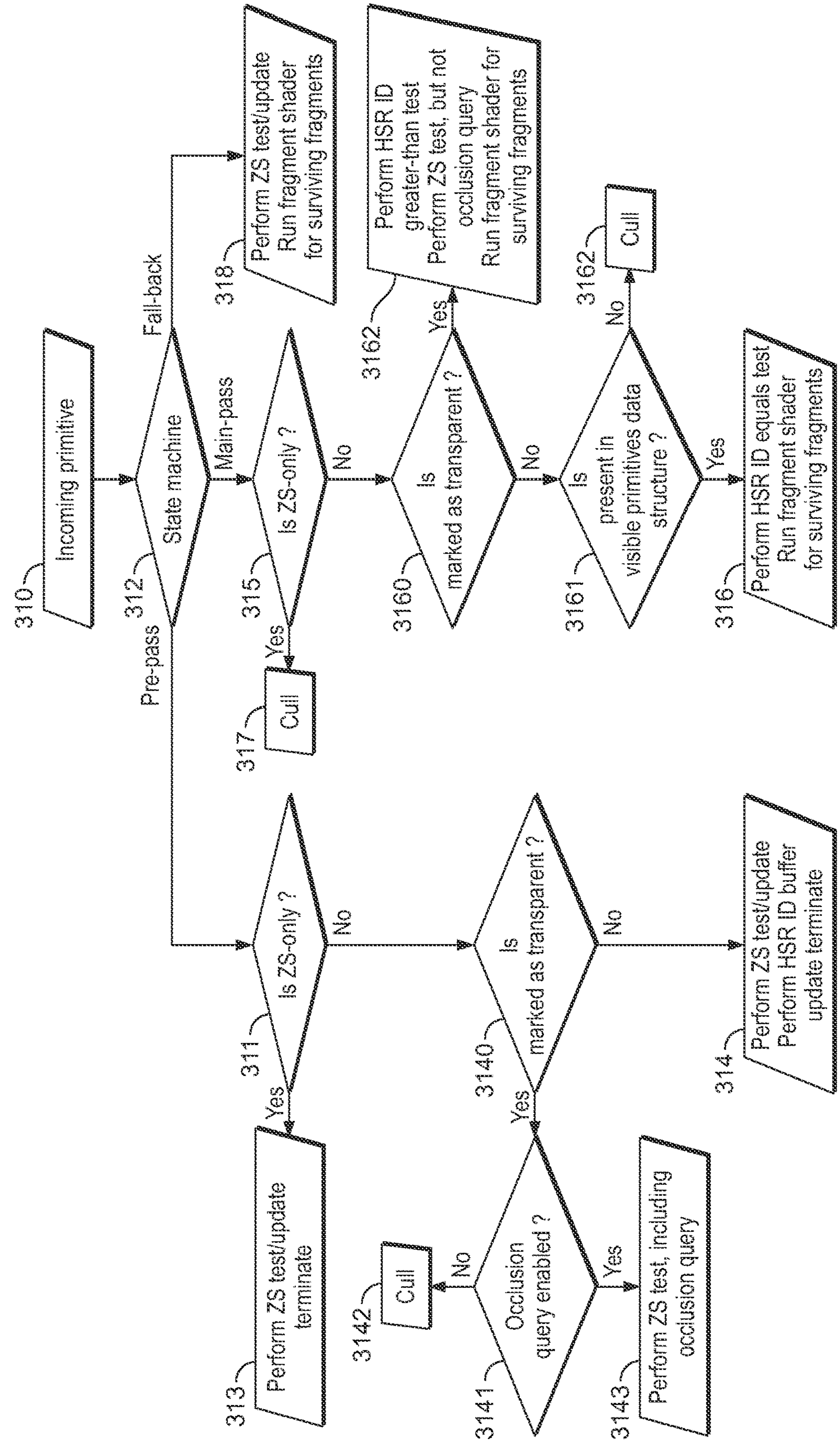
FIG. 57 shows schematically the operation of the corresponding state machine for the example that is illustrated in FIG. 56.

The "visible primitive culling data structure" in this way can then be used during the pre-pass decision stage 83 to cull entire primitives, as shown in FIG. 57. The decision logic in FIG. 57 is generally the same as that shown in FIG. 36 described above, however, during the second, main pass operation, for primitives that would otherwise be caused to be passed onwards, it is further checked (at step 580) whether or not the primitive is present in the visible primitive culling data structure. If the primitive is not present (step 3161—no), it can be culled (step 3162). Otherwise, the primitive is passed to the rasteriser 85, etc., and the second, main pass operation is performed as normal.

Figure 58:
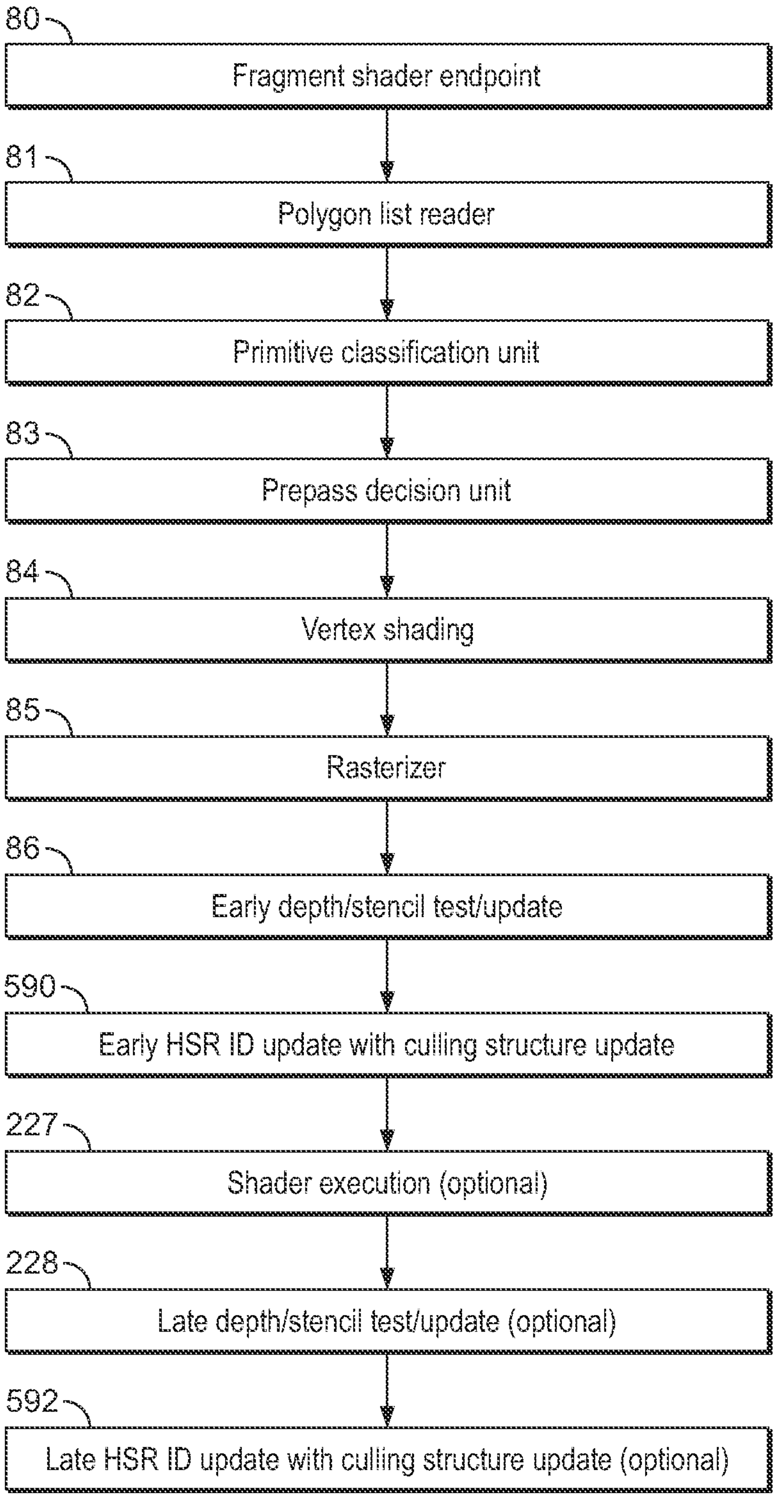
FIG. 58 shows schematically another example in which a "primitive culling" data structure is built during the first, pre-pass operation.

Various other examples are contemplated for building the primitive culling data structure. For example, FIG. 58 illustrates another example in which the primitive culling data structure is generated during the first, pre-pass operation 'on the fly' alongside updating the HSR ID buffer. Thus, the processing pipeline in this example is generally the same as that shown in FIG. 24 except that as shown in FIG. 58 the (early) HSR ID update 590 is modified to also update the primitive culling structure (and the (late) HSR ID update 592 when present is correspondingly also modified to perform a later update of the primitive culling structure).

Figure 59:
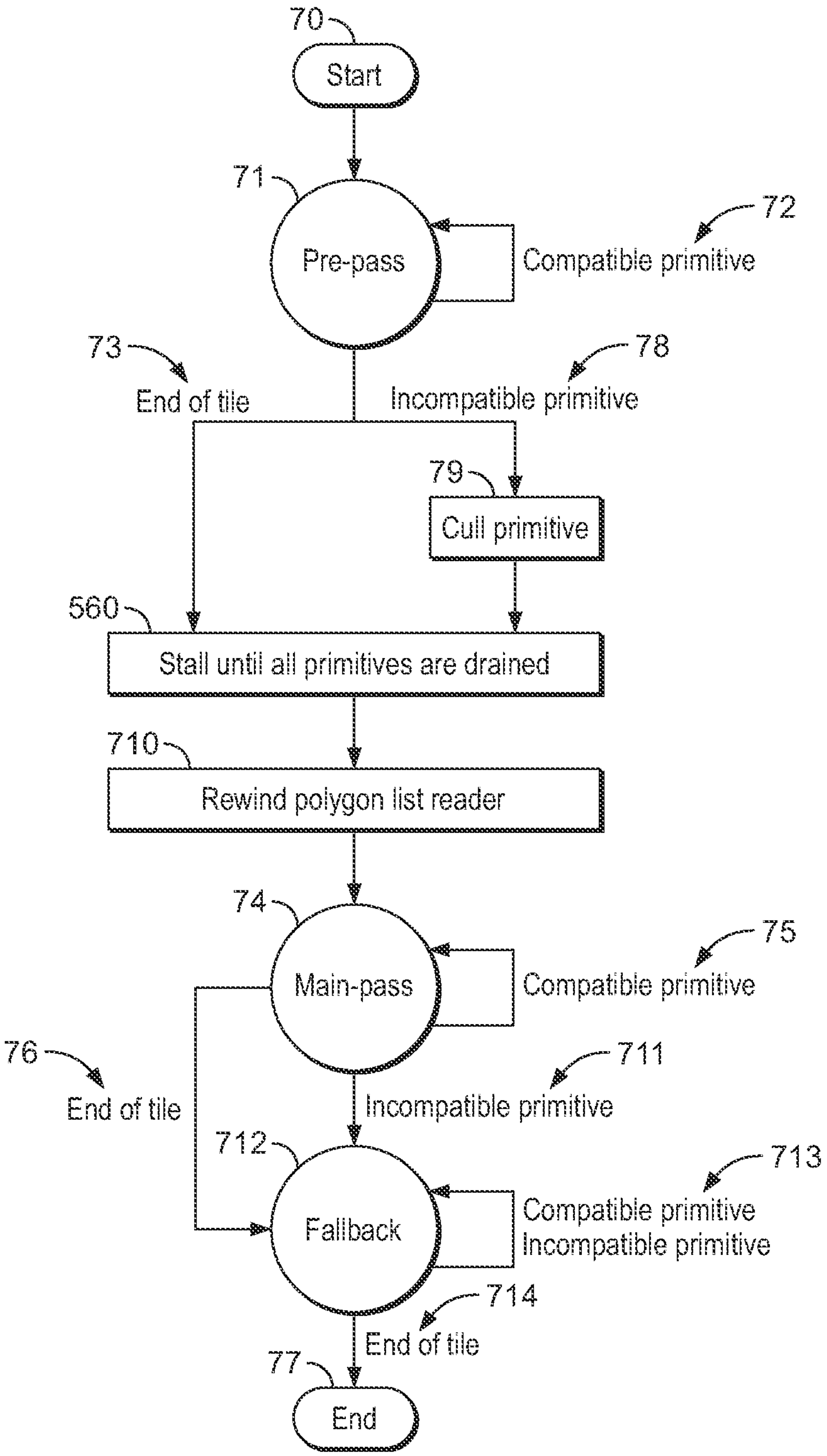
FIG. 59 shows schematically a state diagram for the graphics processor according to this example.

FIG. 59 shows the corresponding state diagram in this situation. Here, the second, main pass operation must still stall until all primitives are drained from the first, pre-pass operation (step 560), however, there is no additional step of building the primitive culling data structure (as compared to FIG. 55, for example), as this is instead done as part of the first, pre-pass operation. Various other arrangements would be possible in this regard.

Figure 60:
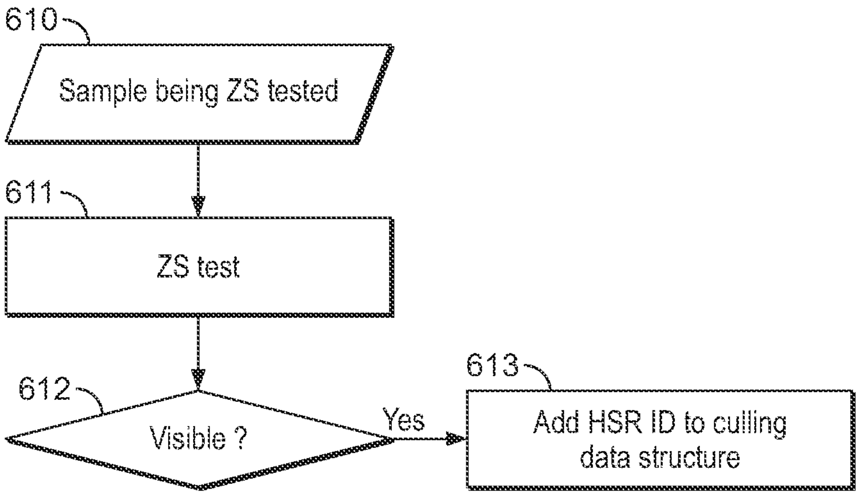
FIG. 60 shows schematically the generation of the "primitive culling" data structure according to another example.
Figure 61:
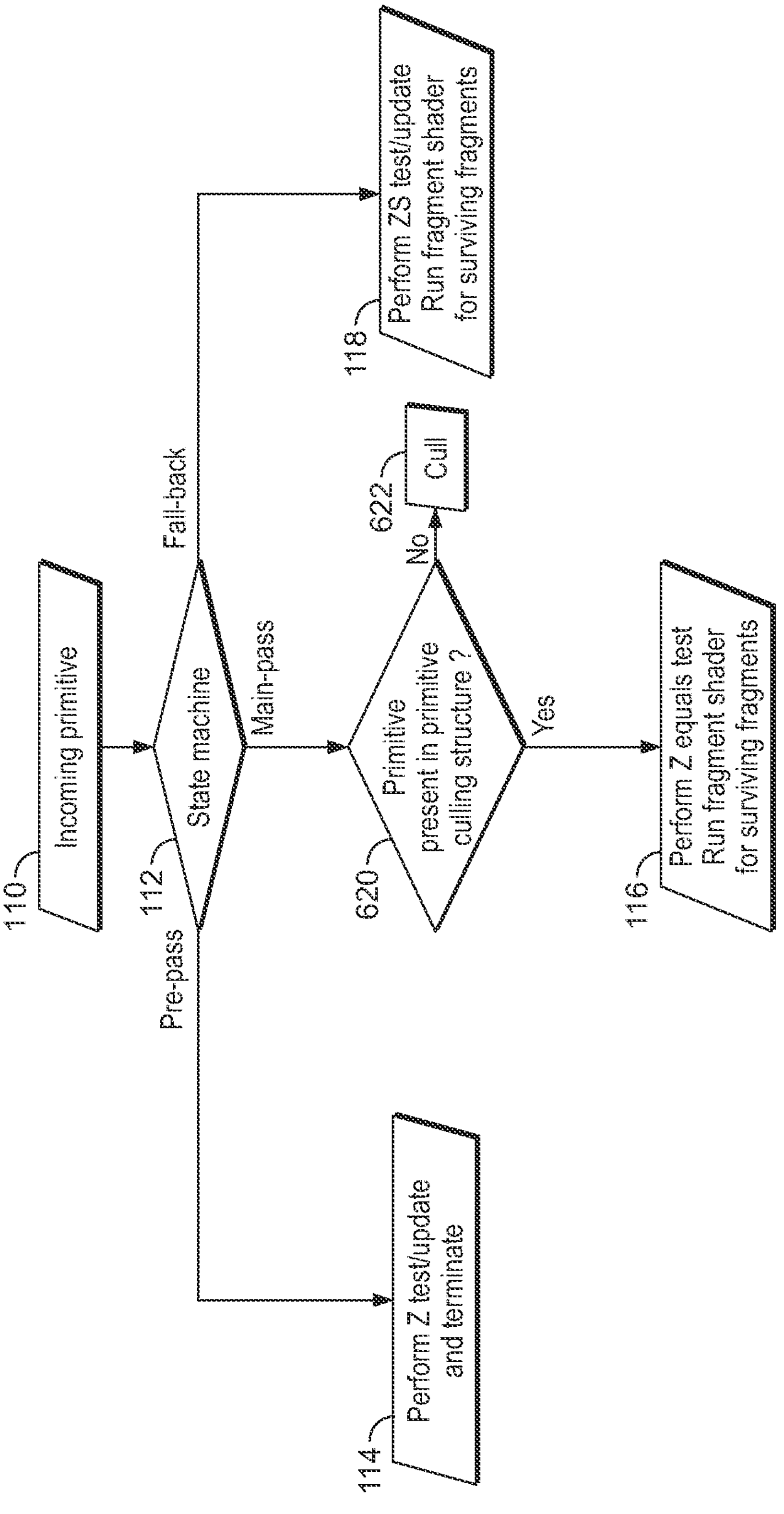
FIG. 61 shows schematically the operation of the corresponding state machine for the example that is illustrated in FIG. 60.

The primitive culling data structure can also be built directly from the depth (or stencil) testing without requiring a HSR ID buffer to be produced. An example of this is illustrated in FIG. 60. As shown in FIG. 60, for an incoming fragment for which depth/stencil testing is to be performed (step 610), the depth/stencil testing is performed (step 611), and if the fragment is determined to be visible (step 612), a respective HSR ID value identifying the primitive from which the fragment was derived is added to the primitive culling data structure (step 613). Note that in this example primitives are therefore still allocated HSR IDs during primitive classification, as described above, however, these are simply used to build the primitive culling data structure. FIG. 61 then shows a state machine illustrating, for an incoming primitive 110 to be processed, how the primitive 110 is processed differently according to the different possible states of the graphics processor in the example of FIG. 60. It will be appreciated that the state machine is identical to that shown in FIG. 11 except that when the graphics processor is configured in the main pass state, the pre-pass decision unit 83 is further configured to check whether or not the primitive 110 is present in the primitive culling data structure (step 620), and, if not, to cull the primitive accordingly in its entirety (step 622) at this point.

In the examples above it is described how primitives are added to the primitive culling data structure as and when they are determined to be visible. It may however be prohibitive to provide a primitive culling data structure that is capable of storing all possible primitives for an arbitrary sequence of primitives. In some examples therefore the primitive culling data structure is a fixed-size data structure. In that case, if the number of visible primitives is greater than the fixed-size of the primitive culling data structure, the primitive culling may be lost at that point. Alternatively, various arrangements are considered for using the entries of the fixed-size data structure to indicate sets of multiple primitives that are visible.

Figure 62:
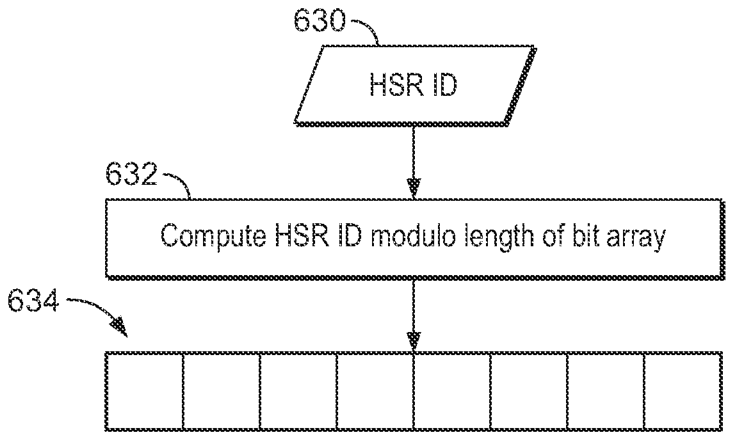
FIG. 62 shows schematically one example of populating a fixed-size "primitive culling" data structure.
Figure 63:
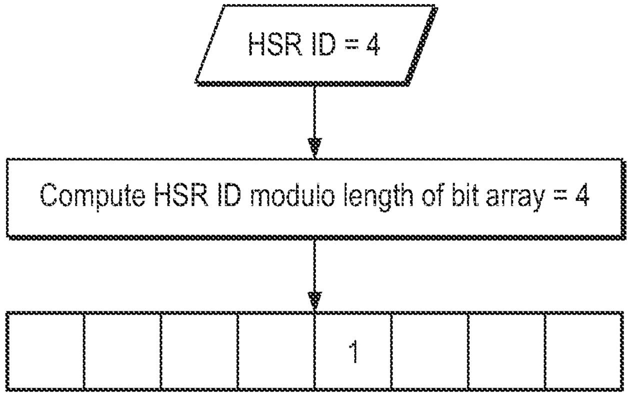
FIG. 63 and FIG. 64 provide worked examples to illustrate how fixed-size "primitive culling" data structure would be populated according to the example of FIG. 62.
Figure 64:
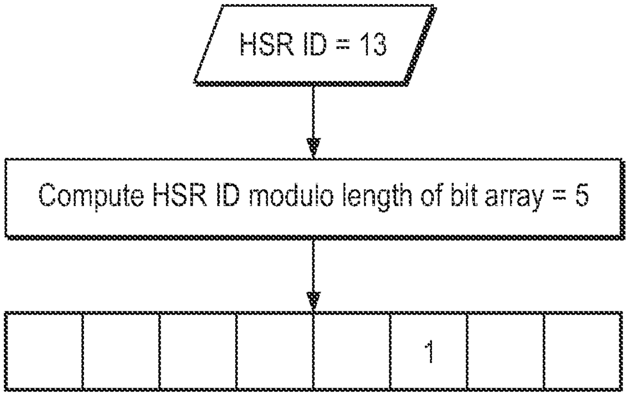

For instance, in FIG. 62, when a HSR ID value 630 is to be added to the primitive culling data structure 634, which in this example comprises an 8-bit value, the HSR ID value is computed modulo the length of the bit array (step 632), and the corresponding bit is then set accordingly if that primitive is visible. Thus, as shown in FIG. 63, for the HSR ID value 4, the computed length is 4, and so the fourth bit is set accordingly. Likewise, as shown in FIG. 64, for the HSR value 13, the computed length is 5, and so the fifth bit is set accordingly. This of course means that a bit may be set even when a primitive covered by that bit is not in fact visible. However, this is acceptable, as it simply means the primitive will be subsequently killed during the fragment level processing.

Figure 65:
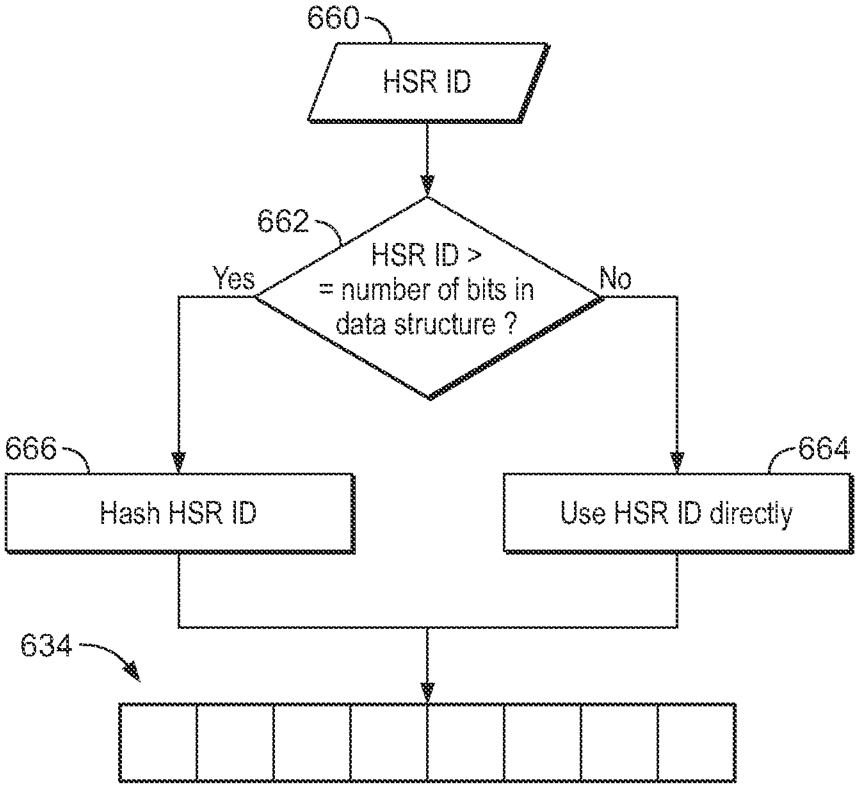
FIG. 65 shows schematically another example of populating a fixed-size "primitive culling" data structure.
Figure 66:
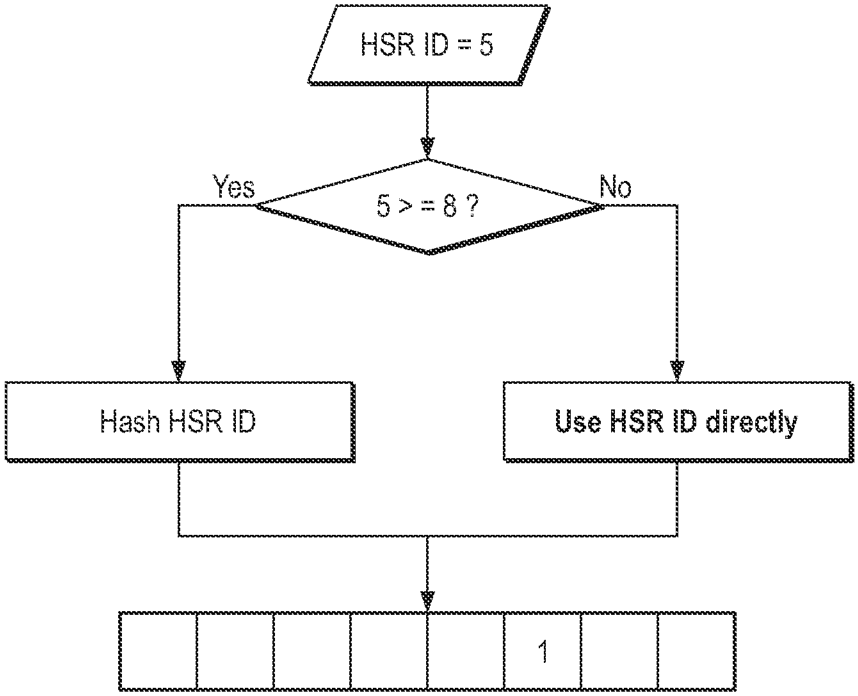
FIG. 66 and FIG. 67 provide worked examples to illustrate how fixed-size "primitive culling" data structure would be populated according to the example of FIG. 65.
Figure 67:
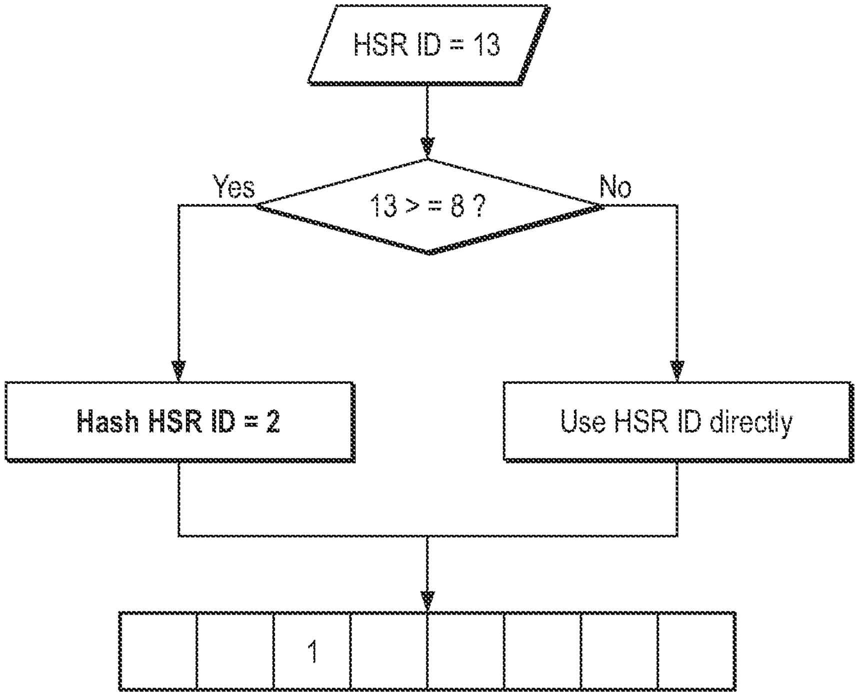

FIG. 65 shows another example, where in this case, when a HSR ID value 660 is to be added to the primitive culling data structure 634, it is checked whether the HSR ID value is greater than the number of bits available in the primitive culling data structure (step 662). If the HSR ID value is not greater than the number of bits available in the primitive culling data structure (step 662—no), the HSR ID value is used directly to set the corresponding bit (step 664). Thus, as shown in FIG. 66, for a HSR ID value of 5 (which is less than 8), the HSR ID value is used directly such that the fifth bit is set. On the other hand, for HSR ID values that are greater than the number of bits available in the primitive culling data structure (step 662—yes), a suitable hash function is computed using the HSR ID value to determine the respective bit that should be set (step 666). This is illustrated in FIG. 67.

Figure 68:
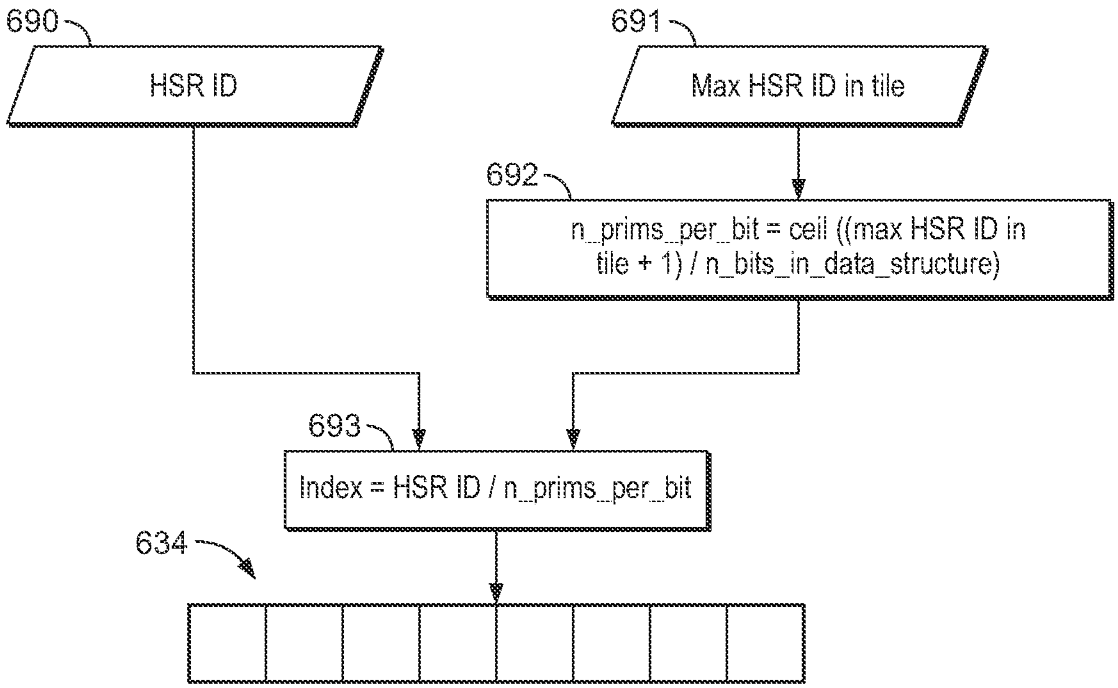
FIG. 68 shows schematically a yet further example of populating a fixed-size "primitive culling" data structure.
Figure 69:
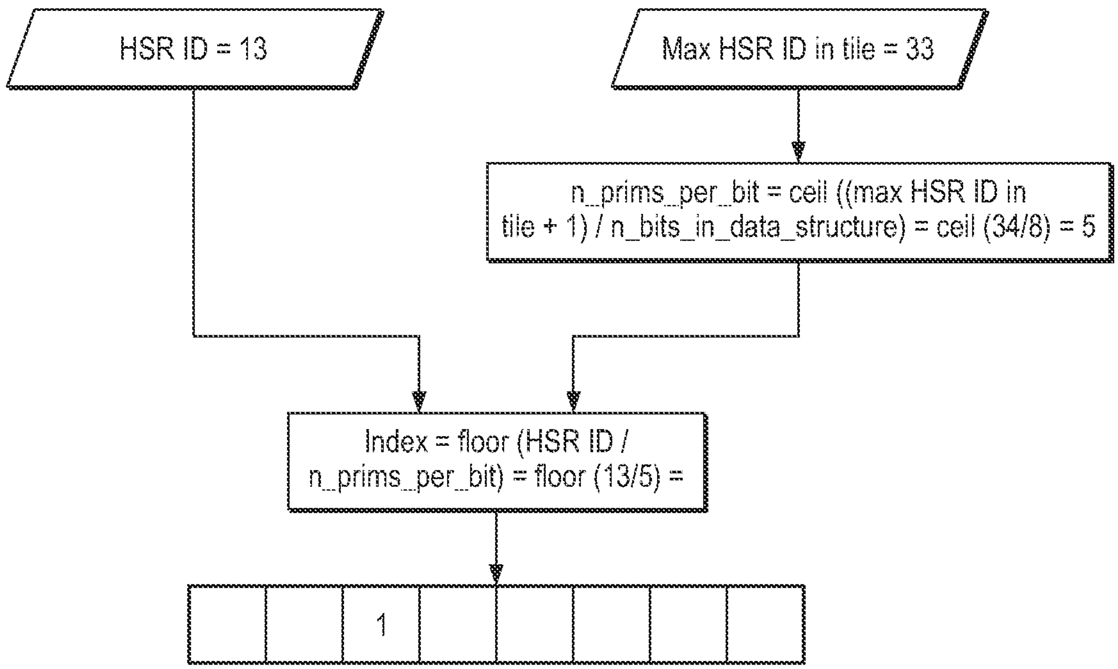
FIG. 69 provides a worked example to illustrate how fixed-size "primitive culling" data structure would be populated according to the example of FIG. 68.

FIG. 68 shows a further example, where in this case, when a HSR ID value 690 is to be added to the primitive culling data structure 634, the bit that should updated to reflect this is determined by working out the maximum HSR ID for the tile to which the primitive culling data structure relates (step 691), calculating the number of primitives that each bit of the primitive culling data structure should represent (step 692), and then calculating an index by dividing the HSR ID value 690 by the number of primitives represented by each bit of the primitive culling data structure (step 693). FIG. 69 shows a worked example of this.

Fragment Shader Endpoint Optimisation

As described above, the rendering of each tile may comprise first and second processing passes. In typical graphics processing arrangements there may be many tiles that need to be rendered. Each tile is in an embodiment processed in the same manner described above. In that case, the tiles could be rendered 'back-to-back' such that the pre-pass operation for a tile is only started after the main pass operation (or fallback operation, if required) for the previous tile has completed. This can generally work well. An example of this approach is shown in FIG. 70.

Figure 70:
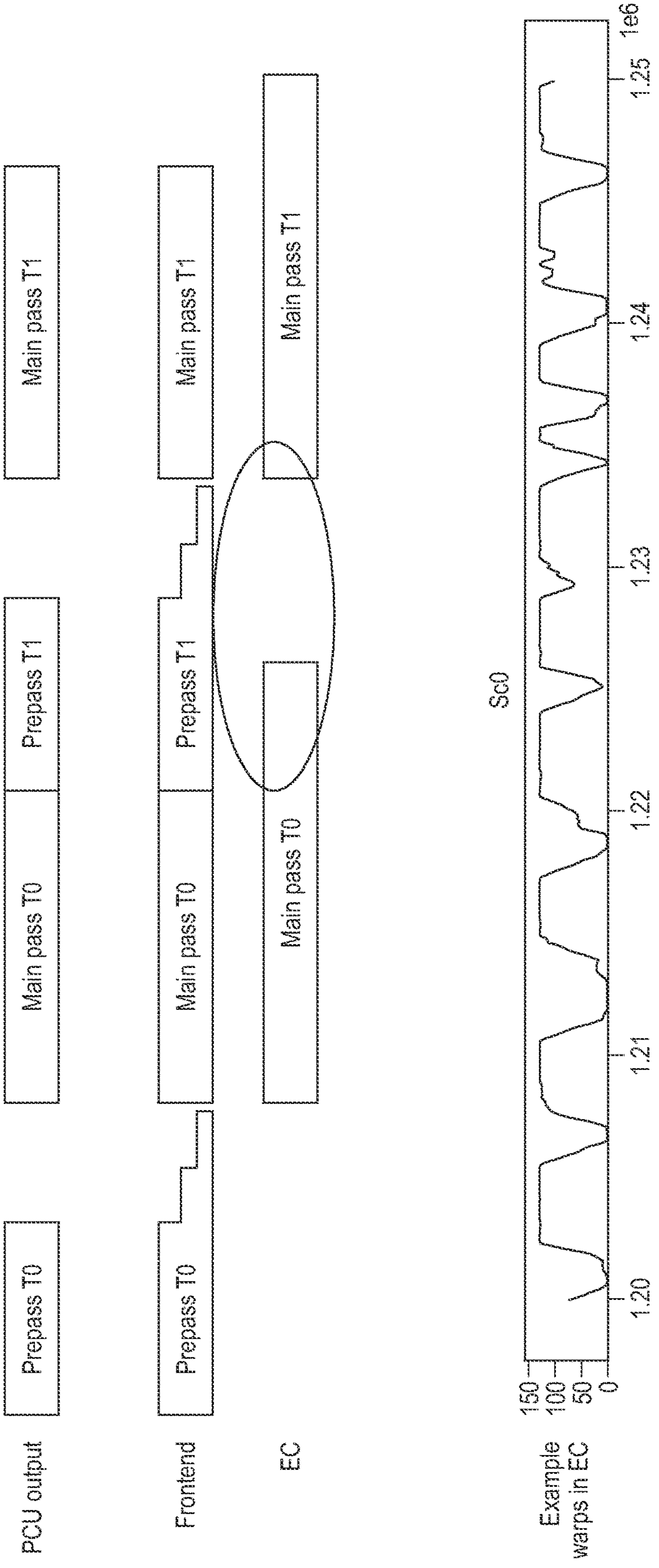
FIG. 70 shows schematically how respective processing tasks (passes) for different tiles may be issued to the graphics processing pipeline in a serial or 'back-to-back' manner.

As shown in FIG. 70, a first task for performing a first, pre-pass operation for a first tile is issued ('prepassT0') to the graphics processing pipeline. The primitives associated with that tile are then processed accordingly in the primitive list reader and correspondingly by the fragment frontend stages, as described above. In this example, there is no fragment shader executed during the first, pre-pass operation (although this could be done if desired). The corresponding main pass operation for the first tile ('mainpassT0') cannot be started until all of the primitives have completed the first, pre-pass operation. Thus, as shown in FIG. 70, the main pass operation for the first tile ('mainpassT0') waits for the corresponding pre-pass operation for the first tile ('prepassT0') to complete. The pre-pass operation for the second tile ('prepassT1') can be launched immediately after the previous main pass operation ('mainpassT0'). However, again, the corresponding main pass operation for the second tile ('mainpassT1') must wait for its pre-pass operation ('prepassT1') to complete. The effect of this, as shown in FIG. 70, is that there may be bubbles of inactivity especially in the execution core between adjacent main pass operations.

Various arrangements are therefore contemplated to attempt to improve speed of pre-pass operation.

Figure 71:
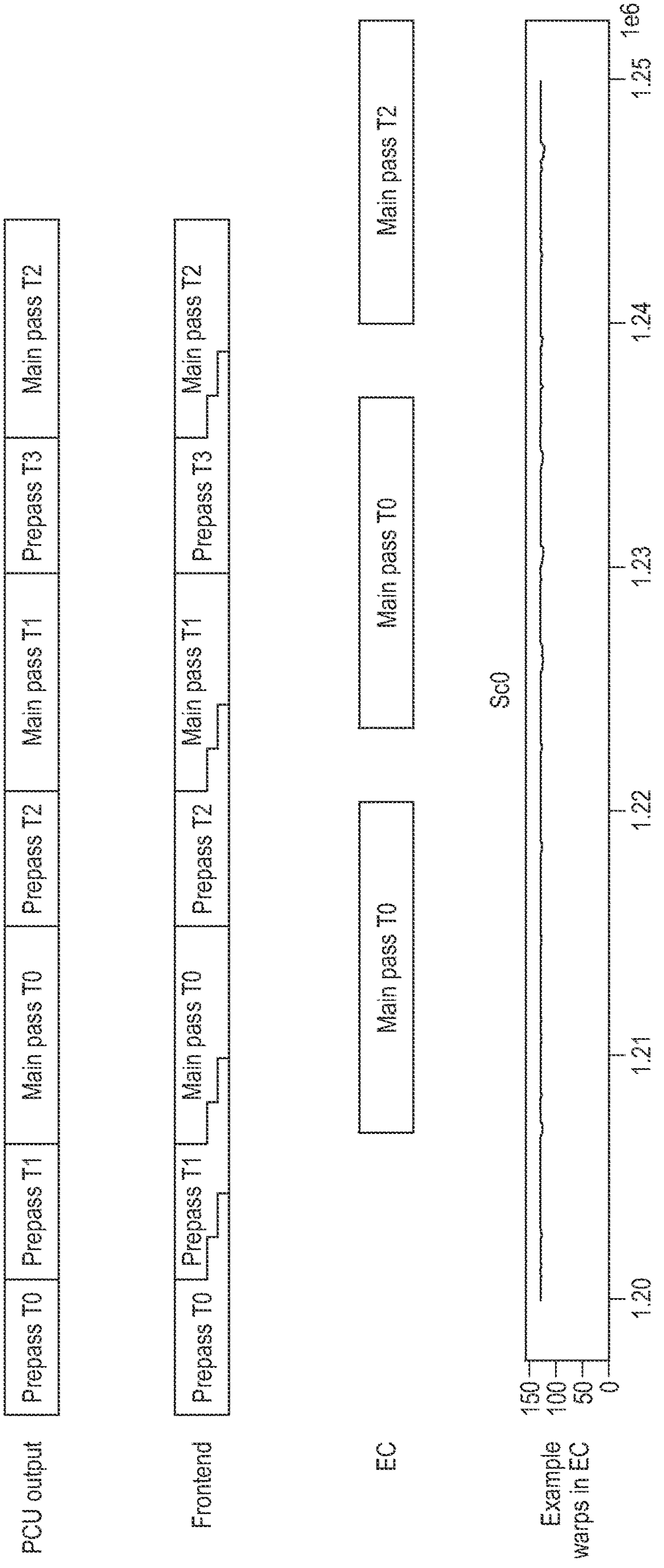
FIG. 71 shows schematically how respective processing tasks (passes) for different tiles may be interleaved in order to improve throughput of processing tasks (passes) for different tiles.

This can therefore work well to increase the speed of the overall rendering job. In other embodiments, the graphics processing pipeline may not be duplicated, but instead the fragment shader endpoint 80 attempts to interleave processing tasks for different tiles to provide a more continuous throughput. An example of this approach is shown in FIG. 71. In particular, as shown in FIG. 71, the fragment shader endpoint 80 may attempt to interleave processing tasks for respective processing passes for different tiles. To make this work, as shown in FIG. 71, the fragment shader endpoint 80 may initially schedule a set of two (or more) pre-pass operations, before attempting to interleave pre-pass and main pass operations for different tiles. This then means that the processing effectively works at least one pre-pass operation ahead which can reduce the bubbles described above. Thus, as shown in FIG. 71, the main pass operation for the first tile ('mainpassT0') can overlap in the fragment frontend with the pre-pass operation for the second tile ('prepassT1'). The main pass operation for the second tile ('mainpassT1') can thus be started relatively earlier since its corresponding pre-pass operation ('prepassT1' has already completed by the time the main pass operation for the second tile ('mainpassT1') is ready to be issued.

Figure 72:
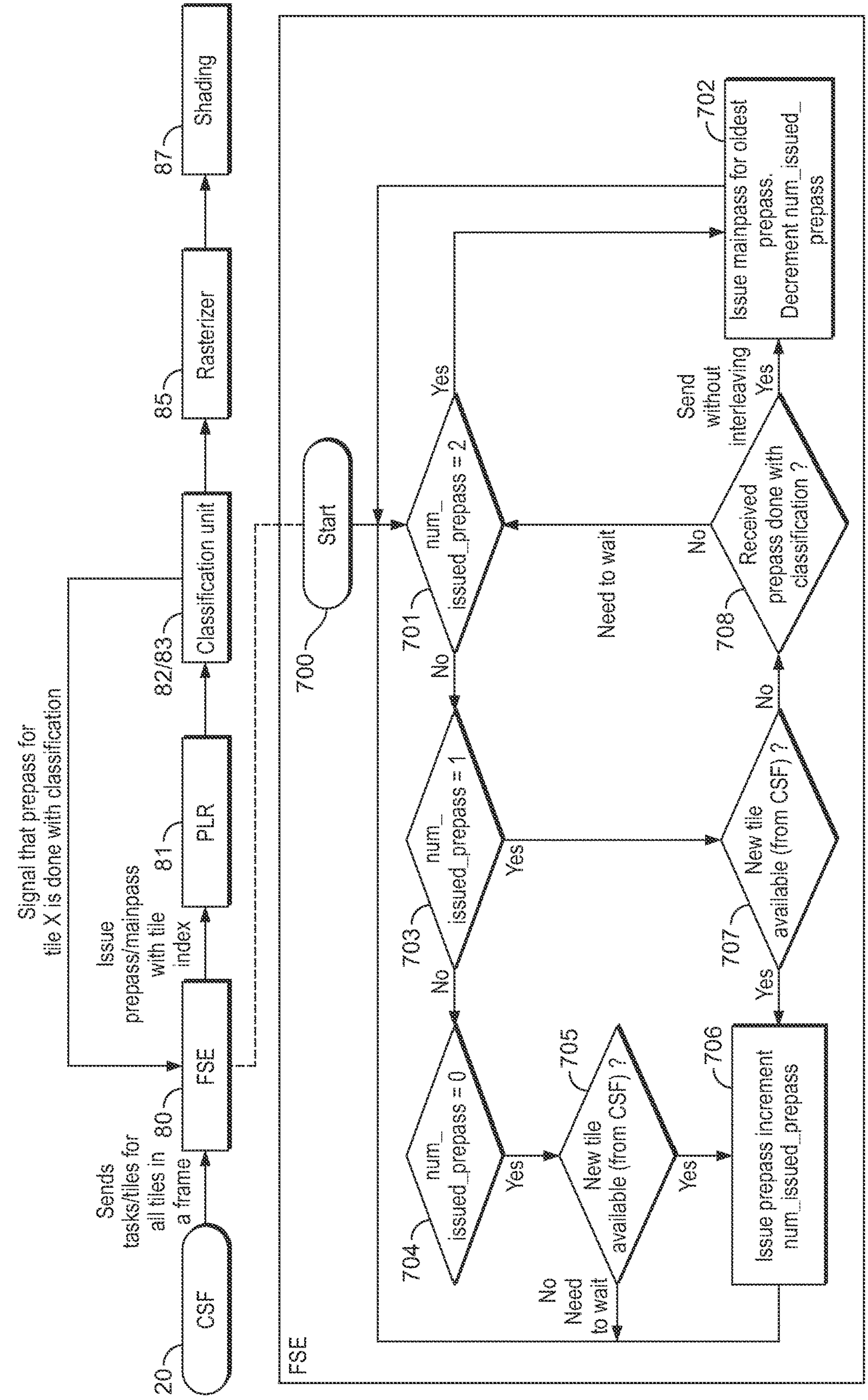
FIG. 72 schematically shows schematically a dynamic scheduling of tasks based on the interleaved operation shown in FIG. 71.

In some examples, the fragment shader endpoint 80 may always issue tasks according to the desired scheduling operation as shown in FIG. 71. In other examples however the fragment shader endpoint 80 may attempt to interleave tasks according to the desired scheduling operation as shown in FIG. 71 but is also able to perform a more dynamic control, e.g., and in particular, such that if the fragment shader endpoint 80 effectively runs out of the pre-pass operations, but there is a main pass operation ready to be performed, the desired scheduling operation can be interrupted accordingly to perform the main pass operation, e.g. rather than waiting for a command relating to the next pre-pass operation to be received from the command stream frontend 20. In that case, if the desired scheduling operation is interrupted the fragment shader endpoint 20 may be caused to then issue a set of two pre-passes back to back to restart the desired scheduling operation. FIG. 72 shows a corresponding work flow for a dynamic control of the scheduling such that the fragment shader endpoint 80 attempts to perform the interleaved operation as shown in FIG. 71 but is also able to interrupt the desired scheduling operation when it determines that is potentially more efficient to do so.

As shown in FIG. 72, and as described above in relation to FIG. 6, the processing tasks for performing the respective pre-pass and main pass operations for a given tile are generated by the fragment shader endpoint 80 in response to receiving a corresponding command from the command stream frontend 20. The command stream frontend 20 thus sends all tasks/tiles for all tiles in a frame to the fragment shader endpoint 80 which correspondingly breaks the tasks/tiles into respective pre-pass and main pass operations that are then issued to the graphics processing pipeline including the primitive list reader (polygon list reader 81), the primitive classification 82/pre-pass decision unit 83, rasterisation 85, fragment shading 87, etc., as described above. Although FIG. 72 shows a simplified graphics processing pipeline it will be appreciated that the graphics processing pipeline in this example may generally correspond to any of the graphics processing pipelines in the examples described above.

In the example shown in FIG. 72, at the start of a rendering job requiring multiple different tiles to be rendered (step 700), the fragment shader endpoint 80 in an embodiment issues a set of two pre-pass operations back to back, as shown in FIG. 71. The control is then performed as follows using a respective counter 'num_issued_prepass' that tracks how many pre-pass operations have been issued. If the number of issued pre-pass operations is equal to two (step 701—yes), the main pass operation for the oldest pre-pass is issued (step 702), and the counter 'num_issued_prepass' is decremented accordingly. If the number of issued pre-pass operations is not equal to two (step 701—no), it is checked whether the number of issued pre-pass operations is equal to one (step 703). If there is not even a single pre-pass available (step 701—no), such that the number of pre-pass operations is zero (step 704—yes), the fragment shader endpoint 80 is configured to check whether a new tile/task is available from the command stream frontend 20 (step 705), and either issue a pre-pass operation, and increment the 'num_issued_prepass' counter accordingly (step 706), when there is a tile/task available (step 705—yes), or otherwise (step 705—no), wait until a new tile/task is available. The effect of this loop is thus that at the start of a job, or if the fragment shader runs out of pre-pass operations, a set of two pre-pass operations is in an embodiment launched back to back.

However, as described above, in some cases, it may be desirable to issue a main pass operation out of sequence, when one is available to be performed. Thus, if the number of issued pre-pass operations equals one (step 703—yes), at that point it is checked whether there is already a new tile available from the command stream frontend 20 (step 707). If a new tile is available (step 707—yes), the scheduling operation proceeds according to the desired scheduling operation that is shown in FIG. 71 by issuing a pre-pass operation (step 706). On the other hand, if there is no tile available, and hence no pre-pass operation ready to be issued (step 707—no), a decision is then made as to whether to wait for a new tile to become available, or whether to immediately issue an outstanding main pass operation. In the example shown in FIG. 72, this decision checks whether the current pre-pass operation is done with primitive classification (step 708). Thus, a signal is provided from the primitive classification 82/pre-pass decision 83 stage to the fragment shader endpoint 80 to indicate this. If the received pre-pass is already done with classification (step 708—yes), the main pass operation is issued (step 702). Otherwise (step 708—no), the fragment shader endpoint 80 is caused to wait. Various other arrangements would be possible in this regard. For example, the decision as to whether or not to wait could also be performed using a time-out mechanism, such that if no new tile is available within a certain time period, a main pass is issued at that point.

Restartable Pre-Pass

The present embodiments thus introduce a novel "pre-pass" operation which, as described above, facilitates improved hidden surface removal efficiency. As shown in FIG. 7, and described above, in order to ensure safe hardware execution, a "fallback" operation is also provided, such that the graphics processor is able to switch to such fallback operation, as necessary, in order to handle primitives that cannot safely be handled by the pre-pass operation. For example, in the embodiment shown in FIG. 7, after the first, pre-pass operation encounters an incompatible primitive, the processing switches to the fallback operation and continues in the fallback operation to the end of the tile. A new pre-pass operation can then be initiated for the next sequence of primitives (e.g. the next tile) to be rendered.

In this respect, it would also be possible however to re-start the pre-pass operation within a tile, e.g. in response to identifying a further compatible primitive (or sequence of compatible primitives). This is illustrated, for example, in FIG. 73.

Figure 73:
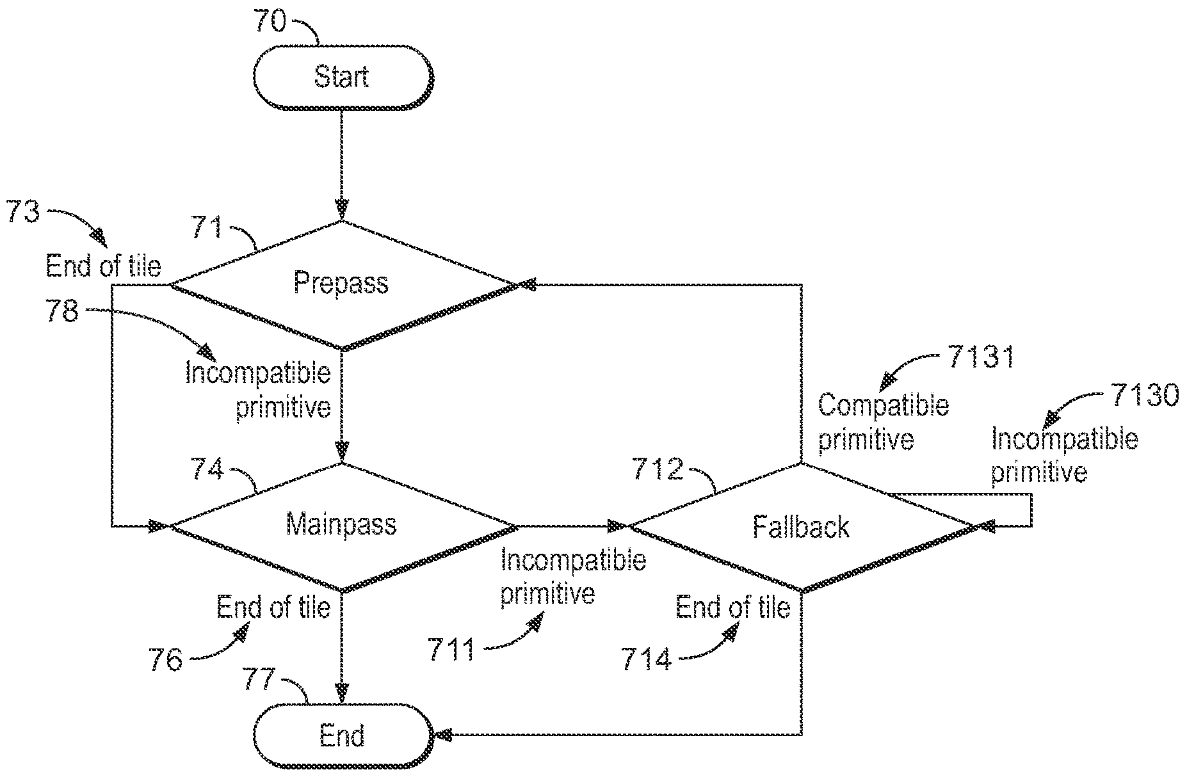
FIG. 73 schematically illustrates a rendering operation according to another embodiment in which the "pre-pass" operation can be re-started within a tile to provide continued hidden surface removal efficiency even after encountering an incompatible primitive.

FIG. 73 schematically illustrates a rendering operation according to another embodiment in which the novel "pre-pass" operation can be re-started within a tile. The processing operation thus generally proceeds as set out above in relation to FIG. 7. In this embodiment, however, after a switch to the fallback operation, the graphics processor is able to switch back from the fallback operation to the pre-pass operation in the event that a further compatible primitive is encountered. For example, consider the following sequence of primitives;

#primitive 1, compatible
#primitive 2, compatible
#primitive 3, incompatible
#primitive 4, compatible
#primitive 5, compatible
#primitive 6, incompatible If the sequence of primitives were processed according to the embodiment shown in FIG. 7, after reaching the first incompatible primitive ('#primitive3'), the graphics processor would switch to the fallback operation, and then continue to process all of the remaining primitives in the fallback operation, despite the fact that the next primitive ('#primitive4') is in fact compatible with being processed by the first, pre-pass operation. This means that some hidden surface removal efficiency may be lost. For instance, the example above is very simple, and in general a sequence of primitives may contain many primitives. In that case, there may be relatively longer sequences of compatible primitives after the first incompatible primitive, for which it may be desirable to switch back to the first, pre-pass operation, in order to allow for improved hidden surface removal efficiency.

According to the embodiment shown in FIG. 73 therefore, after the first incompatible primitive has been processed by the third, fallback operation, the graphics processor is caused to switch back to the first, pre-pass operation for the next compatible primitive ('#primitive4'). The operation sequence in this embodiment is then:

#run pre-pass for primitive 1
#run pre-pass for primitive 2
#primitive 3 encountered
#rewind to primitive 1
#run main pass for primitive 1
#run main pass for primitive 2
#primitive 3 encountered
#run fallback for primitive 3
#primitive 4 encountered
#switch to pre-pass operation, record primitive 4 as restart point
#resume pre-pass for primitive 4
#run pre-pass for primitive 5
#primitive 6 encountered
#run fallback for primitive 6
#end of tile Thus, the processing begins in the first, pre-pass operation, as described above, and when the first incompatible primitive ('#primitive3') is encountered, the first, pre-pass operation is stopped, with the primitive list reader rewinding to the start of the sequence of primitives, and then performing a corresponding main pass operation to complete the rendering of the primitives processed so far ('#primitive1' and '#primitive2'). When the second, main pass encounter the first incompatible primitive ('#primitive3'), the second, main pass is then stopped, and the fallback operation run to process the incompatible primitive. Up to that point, the processing is therefore the same as in the FIG. 7 embodiment. The processing then continues in the fallback operation at least for any further incompatible primitives in the sequence (step 7130).

However, rather than simply continuing in the fallback operation to the end of the tile, in response to the graphics processor identifying whilst in the fallback operation that there is a further compatible primitive (e.g. '#primitive4'), the graphics processor is able to switch back to the first, pre-pass operation and re-start the pre-pass operation from the position of the further compatible primitive (step 7131).

That is, in the example shown in FIG. 73, after the graphics processor is caused to switch to the fallback operation (in response to the pre-pass operation encountering an incompatible primitive), the graphics processor is further able to switch back from the third, fallback operation to the first, pre-pass operation in response to determining that there is a further compatible primitive within the sequence of primitives. The technology described herein thus allows the first, pre-pass operation to be restated within a sequence of primitives following a switch to the third, fallback operation when it is possible to do so.

in order to facilitate the switching of the graphics processor between these operations, e.g. and avoiding potentially introducing artefacts when the first, pre-pass operation is stopped and a transition is made to the third, fallback operation (or vice versa), the graphics processor should, and in an embodiment does, store suitable state or information to allow the processing of the sequence of primitives to continue accordingly beyond such switching events, e.g., and in an embodiment, in a more seamless manner that is able to use processing results from the previous mode of operation when continuing processing in the new mode of operation.

For example, and as will be explained further below, the visibility information that is generated by the first, pre-pass operation (and which is used to control the processing of fragments in the second, main pass operation) is in an embodiment generated based on the depth values for fragments for primitives that are processed during the first, pre-pass operation. The first, pre-pass operation may thus, and in an embodiment does, involve updating a depth buffer for the sequence of primitives. In the normal operation according to the technology described herein, the depth buffer, or other visibility information based on the depth values that is generated during the first, pre-pass operation, is then used during the second, main pass to control the fragment processing. When the first, pre-pass operation is stopped for a sequence of primitives, and the graphics processor is subsequently switched to the third, fallback operation for continued processing of the sequence of primitives, the third, fallback operation in an embodiment also performs depth testing (e.g. in the normal manner).

The depth buffer resulting from the aborted first, pre-pass operation is in an embodiment therefore carried through this transition so that the content of the depth buffer (reflecting the depth buffer for the primitives processed so far, i.e. up to the position of the incompatible primitive) is also available for use by the third, fallback operation. The third, fallback operation in an embodiment then continues to update the depth buffer based on depth testing primitives by the third, fallback operation, and in the event that a switch back to the first, pre-pass operation is subsequently performed, the content of the depth buffer at the point at which the third, fallback operation was stopped is in an embodiment then made available for use (and then used) during the resumed first, pre-pass operation when generating visibility information for the subsequent primitives that are to be processed by the resumed first, pre-pass operation, e.g., and in an embodiment, to allow continued improved hidden surface removal when the first, pre-pass operation is restated.

Thus, when the graphics processor transitions from the first, pre-pass mode of operation to the third, fallback operation, the depth buffer for the sequence of primitives is in an embodiment retained and the current content of the depth buffer generated by the processing so far (up to the point of the incompatible primitive that triggered the transition) of primitives by the first, pre-pass operation is then used for depth testing primitive (fragments) during the third, fallback operation.

Correspondingly, when the graphics processor switches back to the first, pre-pass operation from the third, fallback operation, the content of the depth buffer is in an embodiment again retained and used by the first, pre-pass operation to continue to generate visibility information for the sequence (or sub-sequence) of primitives that are to be processed by the resumed first, pre-pass operation.

It is in an embodiment also tracked during such transitions between the first, pre-pass and third, fallback operation which primitives in the sequence of primitives have been processed to completion so far so as to potentially generate rendered output data (that is, which primitives have been processed to completion either by performing both the first, pre-pass and second, main pass operations, or by performing the third, fallback operation). By tracking which primitives have been processed to completion so far, this then in an embodiment allows the graphics processor to re-start processing of a sequence of primitives from the desired primitive (such that the processing can effectively fast-forward through the sequence of primitives and resume from an arbitrary primitive). This may therefore facilitate the switching of the graphics processor between operation modes within a single sequence of primitives, e.g., and in an embodiment, by avoiding having to repeat substantial processing of primitives that have been processed.

For example, when the first, pre-pass operation is restarted, such that there is a switch from the third, fallback operation back to the first, pre-pass operation, by tracking which primitives have been processed so far, so long as the depth buffer (and any other desired information for re-starting the pre-pass operation) is available, the resumed first, pre-pass operation can then (and in an embodiment does) skip substantial processing of any primitives that have been already been processed, so that the first, pre-pass operation effectively resumes processing from the position of the further compatible primitive that triggered the restarting of the first, pre-pass operation.

This can be done in various suitable ways as desired. For example, in an embodiment, primitives may be annotated with suitable state indicating whether they have been previously processed in either way. In that case, the primitives could still be processed during the resumed pre-pass operation, but are in an embodiment effectively culled relatively earlier in the first, pre-pass operation on this basis, e.g., and in an embodiment, at the start of the resumed pre-pass operation, so that no substantial repeated processing of the primitives occurs during the resumed pre-pass operation. This may be relatively simpler to implement as it does not require any changes to how the primitives are obtained for processing (e.g. all of the primitives can be obtained for processing in the normal manner according to their specified rendering order, e.g. from the respective primitive lists, but primitives that have been processed already can then be culled during the first, pre-pass operation to avoid substantial repeat processing of such primitives). This approach may therefore facilitate more efficient hardware implementation. Various other arrangements would however be possible. For example, in other embodiments, the graphics processor when transitioning between operating modes may be configured to write out sufficient information to allow the processing to restart from the desired primitive in the sequence of primitives, which information can then be used accordingly when re-starting the first, pre-pass operation to start from the desired primitive.

The control of the switching from the third, fallback operation to the first, pre-pass operation may be performed in any suitable and desired manner but in an embodiment is also based on a primitive classification, e.g., and in an embodiment, based on the same primitive classification as described above in relation to the triggering of the third, fallback operation. Thus, the third, fallback mode of operation in an embodiment also comprises a step of (checking) primitive classification. However, in some embodiments, the switching back from the third, fallback mode of operation is performed more conservatively, and additional logic may therefore be provided to facilitate this. Various arrangements would be possible in this regard as will be explained below.

For example, in order to ensure safe rendering operation, the graphics processor should (and in an embodiment does) switch to the third, fallback mode whenever an incompatible primitive is encountered. Thus, the first incompatible primitive in the sequence of primitives will in an embodiment trigger stopping the first, pre-pass operation and subsequently processing the incompatible primitive by the third, fallback operation in the manner described above.

In some embodiments the graphics processor may correspondingly attempt to switch back from the third, fallback mode of operation to the first, pre-pass operation whenever a further primitive that is compatible with the first, pre-pass operation is encountered. That is, the decision to switch back to the first, pre-pass operation to process a further compatible primitive may be performed on a per-primitive basis, similarly to the decision to stop the first, pre-pass operation in response to an incompatible primitive. In that case, the graphics processor may continue processing primitives in the third, fallback operation only until the next compatible primitive is encountered, at which point the graphics processor switches back to the first, pre-pass operation. This can work well especially in typical situations where incompatible primitives are relatively rarer, such that switching on a per-primitive basis can provide improvements, at least on average.

It will be appreciated even from the simple example above that where a sequence of primitives includes a mixture of compatible and incompatible primitives this may cause the graphics processor to repeatedly switch state. At some point the additional time and energy used to switch state may outweigh any benefits of the improved hidden surface removal. Thus, in embodiments, rather than switching back to pre-pass operation as soon as the next compatible primitive (so '#primitive 4' in the example above) is encountered, the graphics processor may check one or more other conditions before triggering the switching out of the fallback operation.

These other conditions may be set as desired and various suitable heuristics may be applied in this respect. For instance, in the example above, there is a sequence of two further compatible primitives ('#primitive4' and '#primitive5'). If it can be identified in advance that there is a sequence of more than one further compatible primitives, this might therefore make switching more desirable. Thus, a look-ahead could be performed to check the sequence of primitives for contiguous sequences of more than one compatible primitive and a decision as to whether to switch (back) made on this basis. Another possible heuristic would be to wait until a set number of further compatible primitives has been reached before triggering the switch. This can work well as it is often the case that adjacent primitives are expected to have similar primitive properties (such that they can be processed in the same way).

Figure 74:
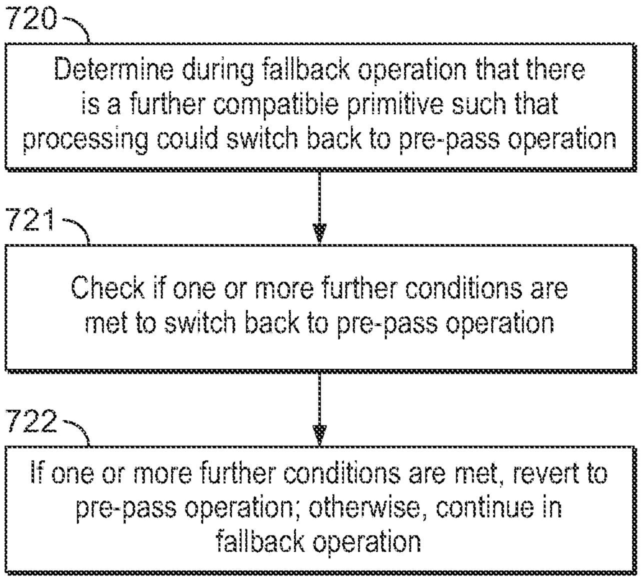
FIG. 74 is a flow chart illustrating further details of how the "pre-pass" operation can be re-started within a tile according to embodiments.

FIG. 74 illustrates this. Thus, during the third, fallback operation, when it is determined that there is a further compatible primitive (step 720), it is then checked whether one or more other conditions are met to cause the graphics processor to revert to the pre-pass operation. The further processing (step 722) is then performed accordingly. Thus, if the one or more conditions are met (step 721—yes), the graphics processor accordingly reverts to the pre-pass operation. Otherwise, if the one or more conditions are not met (step 721—no), the graphics processor continues in the fallback operation (at least for now).

Various arrangements would be possible in this regard.

It will be appreciated from the various embodiments and examples presented above that subject to the requirements of the technology described herein the pre-pass (and main pass) operation may be configured in various suitable ways as desired. It will also be appreciated that various other modifications may be made to the pre-pass (and main pass) operations, and that, for example, any of the examples and embodiments described above may advantageously be combined. In general the first, pre-pass and second main pass operations may thus comprise any other suitable processing operations as desired.

The foregoing detailed description has thus been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor, the method comprising:

for a sequence of primitives to be rendered for a render output:

performing a first, pre-pass operation in which primitives in the sequence of primitives to be rendered are rasterised into respective sets of one or more fragments, each set of fragments associated with a respective set of one or more sampling positions within the render output, and wherein the respective sets of one or more fragments are processed to determine visibility information for the sequence of primitives, the visibility information being usable to determine whether or not fragments for primitives in the sequence of primitives should subsequently be processed further for the render output;

generating a primitive culling data structure using the visibility information determination, the primitive culling data structure being usable to determine for respective sets of one or more primitives whether the sets of one or more primitives can subsequently be culled in their entirety, wherein the primitive culling data structure is a fixed-size data structure that is able to store a fixed number of entries, each entry indicating whether a respective set of one or more primitives represented by the entry can be culled or whether the respective set of one or more primitives represented by the entry should be processed further, and wherein primitives in the sequence of primitives to be rendered are allocated a respective unique primitive identifier, and wherein the corresponding entry in the primitive culling data structure for a primitive is determined based on the respective unique primitive identifier for the primitive, and wherein when the respective unique primitive identifier for a primitive is greater than the fixed-size of the primitive culling data structure, the primitive identifier is processed to determine the corresponding entry within the primitive culling data structure for the primitive.

2. The method of claim 1, wherein primitives in the sequence of primitives are defined in terms of a set of vertices for the primitive, wherein each vertex has a corresponding set of one or more vertex attributes that are to be used when rendering the primitive, and wherein the second, main pass operation comprises a stage of processing of one or more vertex attributes for a primitive, wherein the step of using the primitive culling data structure to determine whether a primitive can be culled is performed prior to processing the one or more vertex attributes in the second, main pass operation.

3. The method of claim 1, wherein when the respective unique primitive identifier for a primitive is smaller than the fixed-size of the primitive culling data structure, the primitive identifier is used directly to identify the corresponding entry within the primitive culling data structure.

4. The method of claim 1, wherein the primitive culling data structure comprises a bit mask, each bit indicating whether a respective set of one or more primitives represented by the bit can be culled.

5. The method of claim 1, wherein the primitive culling data structure is generated during the first, pre-pass operation alongside the processing of fragments to determine the visibility information for the sequence of primitives.

6. The method of claim 1, wherein the primitive culling data structure for a sequence of primitives is generated after the first, pre-pass operation has completed processing the sequence of primitives to determine the visibility information for the sequence of primitives, wherein the primitive culling data structure is generated using a set of primitive identifying information determined during the first, pre-pass operation that indicates which primitive should be rendered for which sampling positions of the render output.

7. The method of claim 1, wherein, after performing the first, pre-pass operation and generating the primitive culling data structure for the sequence of primitives to be rendered for the render output, the method further comprises:

performing a second, main pass operation in which at least some primitives that were processed by the first, pre-pass operation are processed again by rasterising the primitives into their respective sets of one or more fragments for processing to determine rendered output data for sampling positions associated with the fragments and in which second, main pass operation the processing of primitives that were processed during the first, pre-pass operation is controlled based on the primitive culling data structure, wherein the second, main pass operation comprises a step of using the primitive culling data structure to determine whether a primitive can be culled, wherein the step of using the primitive culling data structure to determine whether a primitive can be culled is performed prior to rasterisation, such that for any primitives for which it is determined using the primitive culling data structure that the primitive can be culled, the primitive is culled prior to rasterisation.

8. A graphics processor that is configured to generate a render output, the graphics processor comprising a rendering circuit that is operable to render sequences of primitives for the render output, wherein the graphics processor is configured to:

for a sequence of primitives to be rendered for a render output:

cause the rendering circuit to perform a first, pre-pass operation in which primitives in the sequence of primitives to be rendered are rasterised into respective sets of one or more fragments, each set of fragments associated with a respective set of one or more sampling positions within the render output, and wherein the respective sets of one or more fragments are processed to determine visibility information for the sequence of primitives, the visibility information being usable to determine whether or not fragments for primitives in the sequence of primitives should subsequently be processed further for the render output;

the graphics processor further comprising a primitive culling data structure building circuit that is configured to:

generate a primitive culling data structure using the visibility information determination, the primitive culling data structure being usable to determine for respective sets of one or more primitives whether the sets of one or more primitives can subsequently be culled in their entirety, wherein the primitive culling data structure is a fixed-size data structure that is able to store a fixed number of entries, each entry indicating whether a respective set of one or more primitives represented by the entry can be culled or whether the respective set of one or more primitives represented by the entry should be processed further, wherein primitives in the sequence of primitives to be rendered are allocated a respective unique primitive identifier, wherein the corresponding entry in the primitive culling data structure for a primitive is determined based on the respective unique primitive identifier for the primitive, and wherein when the respective unique primitive identifier for a primitive is greater than the fixed-size of the primitive culling data structure, the primitive identifier is processed to determine the corresponding entry within the primitive culling data structure for the primitive;

the graphics processor configured to:

cause the rendering circuit to:

thereafter perform a second, main pass operation in which at least some primitives that were processed by the first, pre-pass operation are processed again by rasterising the primitives into their respective sets of one or more fragments for processing to determine rendered output data for sampling positions associated with the fragments and in which second, main pass operation the processing of primitives that were processed during the first, pre-pass operation is controlled based on the primitive culling data structure, and wherein the second, main pass operation further comprises a step of using the primitive culling data structure to determine whether a primitive can be culled, and wherein the step of using the primitive culling data structure to determine whether a primitive can be culled is performed prior to rasterisation, such that for any primitives for which it is determined using the primitive culling data structure that the primitive can be culled, the primitive is culled prior to rasterisation.

9. The graphics processor of claim 8, wherein primitives in the sequence of primitives are defined in terms of a set of vertices for the primitive, wherein each vertex has a corresponding set of one or more vertex attributes that are to be used when rendering the primitive, and wherein the second, main pass operation comprises a stage of processing of one or more vertex attributes for a primitive, wherein the step of using the primitive culling data structure to determine whether a primitive can be culled is performed prior to processing the one or more vertex attributes in the second, main pass operation.

10. The graphics processor of claim 8, wherein when the respective unique primitive identifier for a primitive is smaller than the fixed-size of the primitive culling data structure, the primitive identifier is used directly to identify the corresponding entry within the primitive culling data structure.

11. The graphics processor of claim 8, wherein the primitive culling data structure comprises a bit mask, each bit indicating whether or not a respective set of one or more primitives represented by the bit can be culled.

12. The graphics processor of claim 8, wherein the primitive culling data structure is generated during the first, pre-pass operation alongside the processing of fragments to determine the visibility information for the sequence of primitives.

13. The graphics processor of claim 8, wherein the primitive culling data structure for a sequence of primitives is generated after the first, pre-pass operation has completed processing the sequence of primitives to determine the visibility information for the sequence of primitives, wherein the primitive culling data structure is generated using a set of primitive identifying information determined during the first, pre-pass operation that indicates which primitive should be rendered for which sampling positions of the render output.

14. A method of operating a graphics processor, the method comprising:

for a sequence of primitives to be rendered for a render output, wherein primitives in the sequence of primitives are defined in terms of a set of vertices for the primitive, wherein each vertex has a corresponding set of one or more vertex attributes that are to be used when rendering the primitive:

performing a first, pre-pass operation in which primitives in the sequence of primitives to be rendered are rasterised into respective sets of one or more fragments, each set of fragments associated with a respective set of one or more sampling positions within the render output, and wherein the respective sets of one or more fragments are processed to determine visibility information for the sequence of primitives, the visibility information being usable to determine whether or not fragments for primitives in the sequence of primitives should subsequently be processed further for the render output;

generating a primitive culling data structure using the visibility information determination, the primitive culling data structure being usable to determine for respective sets of one or more primitives whether the sets of one or more primitives can subsequently be culled in their entirety; and thereafter performing a second, main pass operation in which at least some primitives that were processed by the first, pre-pass operation are processed again by rasterising the primitives into their respective sets of one or more fragments for processing to determine rendered output data for sampling positions associated with the fragments and in which second, main pass operation the processing of primitives that were processed during the first, pre-pass operation is controlled based on the primitive culling data structure, wherein the second, main pass operation comprises, prior to rasterisation, a stage of processing of one or more vertex attributes for a primitive, wherein the step of using the primitive culling data structure to determine whether a primitive can be culled is performed prior to processing the one or more vertex attributes in the second, main pass operation, such that for any primitives for which it is determined using the primitive culling data structure that the primitive can be culled, the primitive is culled prior to the stage of processing vertex attributes for the primitive.

15. A method of operating a graphics processor, the method comprising:

for a sequence of primitives to be rendered for a render output:

performing a first, pre-pass operation in which primitives in the sequence of primitives to be rendered are rasterised into respective sets of one or more fragments, each set of fragments associated with a respective set of one or more sampling positions within the render output, and wherein the respective sets of one or more fragments are processed to determine visibility information for the sequence of primitives, the visibility information being usable to determine whether or not fragments for primitives in the sequence of primitives should subsequently be processed further for the render output;

generating, at the end of the first, pre-pass operation, a primitive culling data structure using the visibility information determination, the primitive culling data structure being usable to determine for respective sets of one or more primitives whether the sets of one or more primitives can subsequently be culled in their entirety, wherein the primitive culling data structure is a fixed-size data structure that is able to store a fixed number of entries, each entry indicating whether a respective set of one or more primitives represented by the entry can be culled or whether the respective set of one or more primitives represented by the entry should be processed further, and wherein each entry represents a range of plural primitives.

* * * * *